United States Patent
Bagepalli et al.

(10) Patent No.: US 7,921,686 B2
(45) Date of Patent: Apr. 12, 2011

(54) HIGHLY SCALABLE ARCHITECTURE FOR APPLICATION NETWORK APPLIANCES

(75) Inventors: Nagaraj Bagepalli, San Jose, CA (US); Prashant Gandhi, San Jose, CA (US); Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 12/101,850

(22) Filed: Apr. 11, 2008

(65) Prior Publication Data

US 2009/0063665 A1 Mar. 5, 2009

Related U.S. Application Data

(60) Provisional application No. 60/966,649, filed on Aug. 28, 2007.

(51) Int. Cl.
*G06F 15/173* (2006.01)

(52) U.S. Cl. .......... 70/223; 709/203; 709/217; 709/224; 370/352; 370/389; 370/401

(58) Field of Classification Search .................. 709/223, 709/224, 203, 217, 219; 370/352, 389, 401
See application file for complete search history.

(56) References Cited

U.S. PATENT DOCUMENTS

| | | | |
|---|---|---|---|
| 5,706,429 A | 1/1998 | Lai et al. | |
| 6,131,120 A | 10/2000 | Reid | |
| 6,205,480 B1 | 3/2001 | Broadhurst et al. | |
| 6,223,217 B1 | 4/2001 | Pettus | |
| 6,460,141 B1 | 10/2002 | Olden | |
| 6,594,712 B1 | 7/2003 | Pettey et al. | |
| 6,640,238 B1 | 10/2003 | Bowman-Amuah | |
| 6,658,469 B1 | 12/2003 | Massa et al. | |
| 6,675,200 B1 | 1/2004 | Cheriton et al. | |
| 6,728,884 B1 | 4/2004 | Lim | |
| 6,754,829 B1 | 6/2004 | Butt et al. | |

(Continued)

FOREIGN PATENT DOCUMENTS

WO WO 03/104943 A2 12/2003

(Continued)

OTHER PUBLICATIONS

International Search Report and Written Opinion mailed Feb. 2, 2009, for International Application No. PCT/US08/10080, 10 pages.

*Primary Examiner* — Lashonda T Jacobs

(57) ABSTRACT

A highly scalable application network appliance is described herein. According to one embodiment, a network element includes a switch fabric, a first service module coupled to the switch fabric, and a second service module coupled to the first service module over the switch fabric. In response to packets of a network transaction received from a client over a first network to access a server of a data center having multiple servers over a second network, the first service module is configured to perform a first portion of OSI (open system interconnection) compatible layers of network processes on the packets while the second service module is configured to perform a second portion of the OSI compatible layers of network processes on the packets. The first portion includes at least one OSI compatible layer that is not included in the second portion. Other methods and apparatuses are also described.

24 Claims, 101 Drawing Sheets

U.S. PATENT DOCUMENTS

| | | |
|---|---|---|
| 6,804,720 B1 | 10/2004 | Vilander et al. |
| 6,889,294 B1 | 5/2005 | Nichols et al. |
| 6,901,491 B2 | 5/2005 | Kohn et al. |
| 6,912,604 B1 | 6/2005 | Tzeng et al. |
| 6,922,724 B1 | 7/2005 | Freeman et al. |
| 6,947,984 B2 | 9/2005 | Schweitzer et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,171,681 B1 | 1/2007 | Duncan et al. |
| 7,177,277 B2 * | 2/2007 | Koponen et al. ............... 370/235 |
| 7,178,163 B2 | 2/2007 | Reeves, Jr. |
| 7,184,445 B2 * | 2/2007 | Gupta et al. ................... 370/420 |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 * | 4/2007 | Acharya et al. ............... 709/240 |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,633,955 B1 * | 12/2009 | Saraiya et al. ................. 370/401 |
| 7,664,110 B1 * | 2/2010 | Lovett et al. .................. 370/392 |
| 2002/0107971 A1 * | 8/2002 | Bailey et al. .................. 709/231 |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0014544 A1 * | 1/2003 | Pettey ............................ 709/249 |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0077989 A1 * | 4/2006 | Lu et al. ........................ 370/401 |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Aloni et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 * | 9/2007 | Sharp et al. ................... 719/313 |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

* cited by examiner

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| 0xFF | | | | | | | | 'S' | | | | | | | | 'M' | | | | | | | | 'B' | | | | | | | |
| Command | | | | | | | | Error Class | | | | | | | | Must be zero | | | | | | | | Error Code | | | | | | | |
| Error Code (continued) | | | | | | | | Flags | | | | | | | | Flags2 | | | | | | | | | | | | | | | |
| Pad or security signature -- typically pad and therefore must be zero | | | | | | | | | | | | | | | | | | | | | | | | | | | | | | | |
| Tree ID (TID) | | | | | | | | | | | | | | | | Process ID (PID) | | | | | | | | | | | | | | | |
| User ID (UID) | | | | | | | | | | | | | | | | Multiplex ID (MID) | | | | | | | | | | | | | | | |
| WordCount | | | | | | | | ParameterWords[WordCount] – the number of words in this variable size section is specified by the WordCount variable. | | | | | | | | | | | | | | | | | | | | | | | |
| ByteCount | | | | | | | | | | | | | | | | | | | | | | | | | | | | | | | |
| Buffer[ByteCount] – the number of bytes in this variable size section is specified by the ByteCount variable. | | | | | | | | | | | | | | | | | | | | | | | | | | | | | | | |

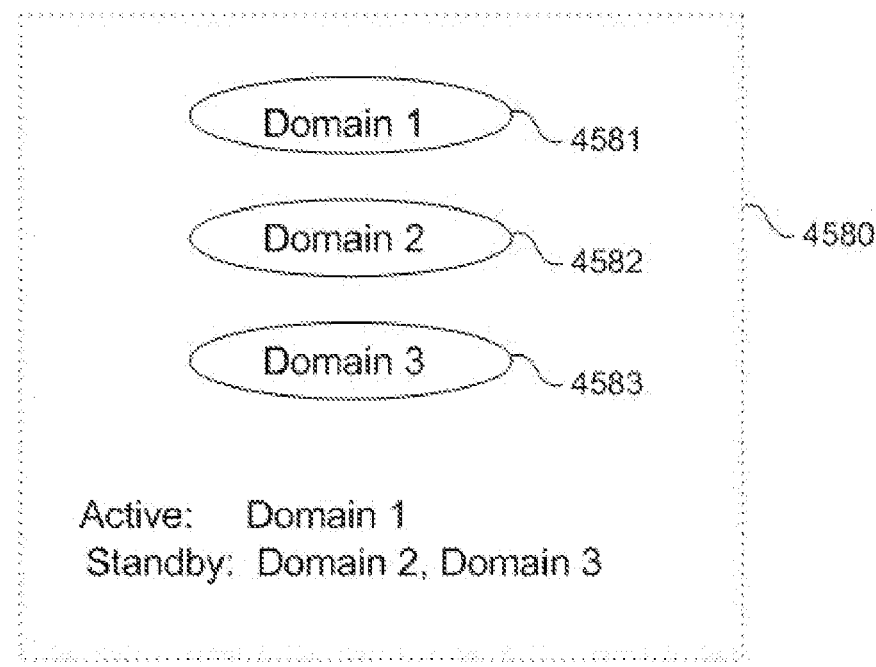
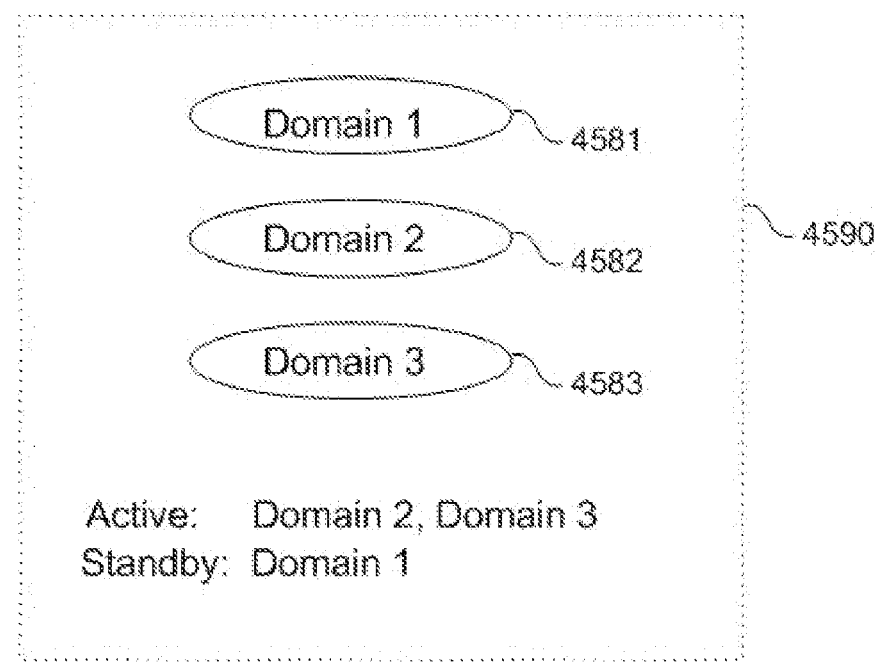
FIG. 85

HIGHLY SCALABLE ARCHITECTURE FOR APPLICATION NETWORK APPLIANCES

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application network appliances. More particularly, this invention relates to highly scalable architecture for application network appliances.

BACKGROUND

1. Common Problems

The ability to connect information technology infrastructure reliably, cost-effectively and securely is of high importance for today's global enterprises. To communicate with customers, clients, business partners, employees, etc., the Internet has proven to be more appropriate compared to private communication networks.

However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1.

As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditionally, ISO Layer-4 to ISO Layer-7 services have been developed either as server-hardware and -software based single-function (or even multi-function) network appliances or as service modules on ISO Layer-2 to ISO Layer-3 packet switches. The latter approach, though welcomed initially, has not gained momentum in the market place due to the inherent cost and complexity of managing stream-oriented ISO Layer-4 to ISO Layer-7 services in the same product that was originally designed for packet-oriented ISO Layer-2 to ISO Layer-3 switching/routing. In reality, ISO Layer-4 to ISO Layer-7 service modules never became integral parts of the packet switching architecture, because the needs and tradeoffs are quite different. The network appliance approach has been very successful in introducing new innovative functions into the data center, such as Application Front Ends, Application Firewalls, and Wide Area Network (WAN) Optimizations, in a very short period of time, albeit at a lower performance and scalability. However, this approach has also led to the proliferation of multiple single-function network appliances in the enterprise network, particularly for multi-service deployments. Multiple network appliances functioning in the path of a client-server-connection introduce high latency due to multiple transport protocol termination, and involve high management and deployment complexity as the network needs to be carefully designed, taking all failure scenarios into consideration. Customers have begun to experience the negative impact of deploying multiple single-function network appliances and are looking for alternatives. Also, as enterprise data centers migrate to higher bandwidth Ethernet and to converged interconnect fabric, the existing ISO Layer-4 to ISO Layer-7 solutions become ineffective. With this as the background, there is a need for next generation architectures to securely, efficiently and reliably deliver ISO Layer-4 to ISO Layer-7 services.

Traditional security products generally assume the existence of a trusted intranet—locations where enterprises control their own LANs, switches and routers—which can be organized into or placed within some type of security perimeter, to protect its resources from the un-trusted Internet. However, in today's business environment, enterprises no longer enjoy the same level of trust and control of their intranets, as enterprises increasingly rely on contractors, partners, consultants, vendors, and visitors on-site for daily operation. As a result, enterprises are exposing internal resources to this wide set of clients whose roles are also frequently changing. Thus, the network trust boundary, delineating inside and outside clients, is disappearing—a phenomenon referred to as "de-perimeterization". In such an environment, protection of an enterprise's resources—such as its intellectual property, as well as mission-critical and operational systems—becomes of critical importance. Also, most security exploits easily traverse perimeter security, as enterprises typically let through email, web and any encrypted network traffic, such as Secure Sockets Layer (SSL), Simple Mail Transfer Protocol (SMTP) with Transport Layer Security (TLS), and authenticated Virtual Private Network (VPN) traffic, for example via IP Security (IPSec). Traditional perimeter security approaches, for example firewalls, intrusion detection systems and intrusion prevention systems have little or no benefit at the perimeter in providing access control functions to the resources. They have become more attack mitigation mechanisms than access control mechanisms. Enterprises are coming to terms with the fact that a hardened perimeter strategy is un-sustainable.

Traditional firewall or router access control lists cannot protect application resources from unauthorized access because network parameters such as Internet Protocol (IP) addresses and IP port numbers no longer deterministically identify resources, nor identify users, clients, or applications accessing these resources. Network firewall technology was invented when enterprises had a limited set of applications such as Telnet, File Transfer Protocol (FTP), and Email, and its primary functions were to limit access to specific applications from the outside and to limit access by systems within the enterprise to specific applications outside the firewall. Network layer parameters such as source, destination IP address and TCP or UDP port numbers were sufficient to identify the client and the operations the clients intended to perform on a particular resource. However, with the proliferation of mobile devices and tunneled applications, the network layer parameters are no longer useful to identify the client, the resource accessed, and the operation. Firewalls have evolved over the time, embracing functions such as deep packet inspection and intrusion detection/prevention, to handle application-level attacks, but the core access control function remains the same.

In effect, de-perimeterization demands that access control functions are positioned close to application resources and that a micro-perimeter is established in the heart of the data center by placing an identity-based policy enforcement point in front of any application resource. Enterprise business drivers for such an enforcement point are the need for rich and uniform protection of resources, business agility via attribute-based, policy-driven provisioning, and regulatory compliance. Traditional server-centric authorization solutions providing role-based authorization often require custom code development, extensive cross-vendor testing whenever there is a version change (of the underlying operating system, agent or application), and are costly and difficult to maintain because of their proprietary nature. Also, traditional server-based network appliances—primarily focused on low-bandwidth ISO Layer-4 to ISO Layer-7 perimeter services—are unsuitable for data center deployment, both in functional richness and in ISO Layer-7 performance.

The present inventions provide, among other innovations, novel identity- and resource-aware network appliance platforms that provide network-centric, application-agnostic secure authorization services based on Triangulated Authorization (as described below). Such Triangulated Authorization can be instantiated in an enterprise network, for example, at a common nexus among the client, the application server, and other essential enterprise services such as a single-sign-on (SSO) server, an Identity Management server, and an authorization Policy Server.

1.1 Architecture Scalability for Network Appliances

In a typical network system such as in FIG. 1, the front-end segment between the client 1001 or client 1002 and, for example, a WWW application server just behind Perimeter 1010 in WWW server farm 1012 has a high round-trip delay time, low throughput and varying speeds, while the back-end connection between the WWW application server and application server 1017 in Data center 1016 has a low round-trip delay time and high throughput. This proxy-like setup requires flow control for the original client-to-server connection.

Load balancing is an important option for scaling a network appliance to meet increased network bandwidth demands. Load balancing requires multi-sided communication for load monitoring—typically performed by fast processors at each side—which is difficult to do in practice and has implications on the scalability as well as the reliability.

One aspect of the invention disclosed is a novel system and method for reliable, scalable, high-performance load-balancing.

1.2 Centralized Transport Protocol Termination for Multiple Services in a Data Center Providing multiple ISO Layer-4 to ISO Layer-7 services (such as SSL acceleration, application acceleration, or application firewall, etc.) degrades the performance to a large extent because, in today's approaches, multiple transport protocol terminations happen at each of the cascaded Network Service points. These multiple TCP or multiple SSL terminations, for example, add-up to the overall latency and make the entire setup hard to administer. This problem exists regardless of whether multiple server-based network appliances are chained (each providing a different ISO Layer-4 to ISO Layer-7 service), or whether a single network appliance using a packet based switch architecture with multiple modules (one for each different ISO Layer-4 to ISO Layer-7 service) is used.

This problem is highlighted in FIG. 3 where several services are cascaded. The connection between a client 1081 and a server 1085 is terminated at each stage and forwarded multiple times: First for service 1082 (which, for example, could be TCP), then for service 1083 (which, for example, could be TLS), then for service 1084 (which, for example, could be SMTP), and so on.

1.3 High-Availability and Zero-Click Fail-Over

Network system reliability and availability is very important for enterprise networks. High-availability for network systems has two aspects, to minimize downtime of the network system, and to remain functional in spite of failures. High-availability is typically implemented by adding redundancy to a system. Two or more peers will perform the functionality together.

Traditionally a fault may cause the protocol stack processing to fail, which results in disconnecting the client. The resuming peer then reconnects the client, it determines which packets got lost and the lost data is then retransmitted. For many applications it is not acceptable to disconnect clients. Therefore, a so-called zero-click fail-over is important.

Architectures commonly used in other approaches to solving these problems have shown several difficulties: A system processor is involved in performing the data structure replication in creating and forwarding the data packet down and up the network stack during transmit and receive, which severely degrades the system throughput. The system processors may incur substantial overhead from copying data in memory as part of Input/Output (I/O) operations. Copying is necessary in order to align data, place data contiguously in memory, or place data in specific buffers supplied by the application. A reliable protocol must be implemented between the peers to prevent packet loss.

FIG. 4 shows this inefficiency as it exists in today's approaches: All communication via a network connection 1029 goes into a Network Interface Card (NIC) 1024 and then gets copied by TCP processing 1025 running in kernel space. The data is then stored in a TCP buffer 1023, which is in the system memory 1021. The processor 1026 is then needed to execute a process which copies the data from the TCP buffer 1023 into the application buffer 1022 to make the data available for processing by the application. This approach is highly inefficient because it occupies the processor 1026 with many memory copy operations and loads the processor 1026 heavily especially for high-bandwidth communication. This also makes it much more difficult to scale a system for higher network bandwidth demands.

FIG. 4 also shows how current systems use the available network protocol stack within each system to monitor peer health status, to detect peer failure, to share critical data structures with peers, to maintain states of each other and to share configuration data. The basic method is to periodically do checkpointing, provide this checkpoint information to one or more peers, which in case of a failure allows a peer to reconstruct the interrupted process and to resume the failed peer's task.

The drawbacks of approaches know in the art include that the system processor, for example processor 1026 or processor 1036, perform compute extensive data structure replication which comprises creating and forwarding data packets down and up the network stack during each send/receive operation. This causes substantial compute overhead from data copy Input/Output (I/O) because data needs to be aligned and placed into specific data buffers.

1.4 Converged Data Center Fabric

Data Centers generally consists of a number of different types of networks—an Ethernet LAN for connecting web and application servers, a fibre channel storage area network (SAN) for connecting storage arrays and sometimes an Infini-Band (IB) or proprietary interconnect based High-Performance Computing network for clustering servers. The proliferation of multiple, disparate, interconnect technologies drives up overall total cost of ownership in the enterprise data center. In order to increase operational efficiency and reduce overall cost, next generation data center networks are likely to migrate to a single converged multi-protocol fabric technology to carry all three types of traffic, Ethernet, storage and Inter-Process Communication. This converged fabric can, for example, without limitation, be based on IB or Data Center Ethernet (DCE)—an extension of today's Ethernet. When the back-end data center starts to converge onto a single fabric, a network junction gets created in the data center between classic Ethernet networks and converged fabric networks, in front of the data center architecture. Typically, a gateway for protocol translation is used at any network junction between two different technologies, for example a gateway between fibre channel and Ethernet or a gateway between Ethernet and IB. This gateway functionality involves termination of one protocol and translation into the other protocol.

2.1 Lossless Low-Latency High-Bandwidth Interconnect Fabrics

Remote Direct Memory Access (RDMA) has been used as a lossless, low-latency, high-bandwidth, interconnect fabric for example in High-Performance Compute Clusters and in storage area networks (SAN). IB, which supports RDMA transfers, has shown great promise for implementing such a lossless low-latency high-bandwidth interconnect. Other interconnect technology that support RDMA is Data Center Ethernet (DCE) and Internet Wide Area RDMA Protocol (iWARP).

While various other approaches successfully have applied IB and RDMA to high-performance computing and to storage networks they fail to teach how this technology can be made to work as a Lossless Data Transport Fabric (LDTF) for a high-availability, scalable, application layer network system with Centralized Transport Protocol Termination.

2.2 Authorization, Authentication and Access Control

Authorization or access control typically determines the allowed set of actions by a legitimate client, possibly intercepting every access of the client to a resource in the system. Authentication is used in conjunction with authorization—authentication determines and verifies the basic identity of, for example, a user or a client process. Then, based on determining the user's or client's identity, an authorization decision can be appropriately made. Of course, if a client's or user's identity can not be verified, the authorization decision is quite simple—deny access or authority to perform any action.

Typically, authentication is performed once every session, unlike authorization, which is performed for every client action. Granular authorization is achieved by leveraging details of the identity such as attribute values, group membership, role assignment etc. Typically, Information Technology (IT) infrastructure implements access control in many places and at different levels. The following key concepts are used in the art (and defined by Organization for the Advancement of Structured Information Standards (OASIS)) to describe access control or authorization; these definitions are not intended to be limiting on the inventions described herein, but merely to provide context for the disclosures below:

Subject—An active entity, generally in the form of a person, process or device that causes information to flow among Objects; a subject can, for example, be a client such as client 1001, or client 1002, or client 1003, or client 1004 from FIG. 1.

Object—An entity that contains or receives information. Access to an Object potentially implies access to the information it contains. Examples are a web page, a file, a directory, a process, a program, as well as a server, for example, such as a WWW application server in region 1012 of an enterprise network, or an application server 1017 in Data center 1017.

Operation—Action initiated by the Subject. For example, the GET or the POST action in a HTTP transaction, or querying or updating a given database.

Permission—An authorization to perform certain action on the Object. Permission refers to the combination of Object and Operation. An Operation performed on two different Objects represents two different Permissions; similarly, two different Operations performed on a single Object represent two different Permissions.

Traditionally, authentication and authorization is done inside the application, however because of the long cycle of development and deployment in the process, not all applications have the same level of support. Many applications have a basic form of authentication using user name and a secret password. Certain vendor-specific applications support role-based authorization which is often vendor proprietary and does not interoperate well with implementations in another applications—it creates multiple silos of applications within an enterprise network infrastructure. Role provisioning is often challenging; without careful planning, enterprises often end up with the number of roles greater than the number of users, which eviscerates any potential management efficiency gains. As a result, a large number of applications are left behind with no protection and with no support for authentication or authorization. With de-perimeterization, enterprises are seeing a need to protect these applications uniformly with network-centric solutions that do not mandate modifying the application.

There are two types of authorization decisions that are typically done in applications: One that does not depend on dynamic information such as the application's state of execution, and a second that depends on the current state of execution and often involves derived data from multiple applications. The latter type of authorization decision is best done in applications, as it is hard to externalize the authorization without interaction with the application. However, the former type of authorization decision can be externalized efficiently and can be performed efficiently outside the applications, as it depends on attributes which are visible in the network. In today's enterprise networks a large number of applications (approximately 70% to 80%) fall into the former category, hence can be addressed with a network-centric solution. In general, an authorization architecture consists of the following key components as shown in FIG. 5:

A Policy Administration Point (PAP) 4702 is the central management console to provide central administration, management and monitoring of policies. Policy editing or definition will include support for subject attributes, objects and operations that are being protected, as well as network and environment attributes.

A Policy Information Point (PIP) 4705 is the information store for different attributes and policies. For example an enterprise directory (LDAP, AD) keeps information regarding users and its associated identity attributes.

Policy Decision Points (PDP) 4701 and 4703 can be distributed and provide evaluation of authorization policies. PDPs are the core policy engines that evaluate the authorization rules written using different attributes.

A Policy Enforcement Point (PEP) 4704 enforces the policy decision that is made by a PDP.

Sometimes, depending on the enterprise application architecture, applications have their application-specific PDP and PEP embedded as described in FIG. 6. A subject 4711 requests access to a resource 4714 which resides in an application server 4710. By analyzing user attributes 4712, the PDP 4715 computes a decision, which the PEP 4713 uses to grant or reject subject 4711 access to the resource 4714. Both PDP 4715 and PEP 4713 are embedded in the application server where the request gets processed.

In some other case, which are shown in FIG. 7, the PDP 4725 runs inside another server 4726 and thus is external to the application server 4720. When a subject 4721 requests access to a resource 4724 which is hosted by the application server 4720, the PEP 4723, which also resides inside application server 4720 queries the PDP 4725. The PDP 4725 uses the user attributes 4722 to make the access decision based on policies, which is then used by PEP 4723. This approach may suffer from high latency due to a network call from PEP 4723 to PDP 4725 in the authorization path. This often leads to poor application performance. Also, this may require a plug-in/agent on the application server 4720 for PEP 4723.

In a common scenario for enterprise web Application Services, which is shown in FIG. 41 both PDP 4745 and PEP 4743 are processed by a dedicated policy server 4740 and thus are external from the application server 4710 which hosts the resource 4714. In this configuration no plug-in in the application server 4710 is needed, and also no high-latency PEP/PDP interaction occurs because both PDP 4745 and PEP 4743 are co-located on policy server 4740. Externalizing both PEP and PDP helps enterprises to protect application resources uniformly, sitting in front of applications in the network. Therefore, this arrangement is often called network-centric authorization. However, to make full use of this network-centric authorization, the dedicated policy server 4740 has to analyze the protocol and content attributes 4742, which requires a very compute-intensive analysis of ISO Layer-7 application data. No approach is yet known that can efficiently perform such ISO Layer-7 application data analysis in a network environment.

While certain aspects of the system described herein can be applied to either case of policy frameworks the most beneficial use of this system is in combination with network-centric authorization architectures. Due to the enhanced visibility in the network, policies can be much richer, for example policies can include network and environmental attributes such as location, network address etc, which are typically not visible inside the application.

2.3 Policy and Policy Languages

Policy definition is a key component in the system. This is typically done by using policy languages. A policy language must be flexible enough to accommodate the policy definition for multiple ISO Layer-4 to ISO Layer-7 applications. The following aspects need to be considered when selecting a policy language: The language should be generic so that one can define policies for multiple applications using the same language. Using the same policy language for different applications makes policy administration much easier. The policy language should be extensible so that new requirements imposed by the newer applications can easily be supported. The policy language should provide enough mechanism to define different actions that may need to be performed while enforcing the policy. The policy language should be standardized, because standards are robust and have been reviewed by a large community of experts. Each application has specific requirements for a policy language.

Specifically, for access control, several additional aspects need to be considered while selecting a policy language: The selected policy language should allow the definition a policy with expressions having any of the subjects, resources, actions and environment attributes. The selected policy language also should be able to define the policy using multiple sub-policies; instead of having one single monolithic policy, different people or groups can manage sub-pieces of policies as appropriate to reduce policy administration costs. There should be a way to combine the results from these different sub-policies into one decision. In general there are several possibilities for policy languages known in the art, however, these are mere examples and should not be considered limiting.

A standard descriptive language such as Extensible Markup Language (XML) is used for defining policies. For access control functionality, there is an emerging standard policy language called eXtensible Access Control Markup Language (XACML), which is being increasingly adopted by the enterprise customers. An effort can be made to extend XACML to accommodate all the applications. The advantage of this approach is that if customers already have XACML policies, it is easy to import them and process the policies. The disadvantage of XACML is that integrating different kinds of applications in XACML policy framework may be difficult.

Scripting languages, such as the Tool Command Language (TCL), are sometimes used to define a custom policy language. This is, for example, used in the art by commercial policy infrastructure. The disadvantage of this approach is that existing customer policies based on a standard language such as XACML need to be redefined using the custom language, which requires a custom translator from a standard policy language such as XACML to the proprietary policy language.

Another option known in the art is to support cascaded two-stage policy definition and execution which use a proprietary scripting language in a first pre-processing stage and then use a standard policy language such as XACML in a second stage. The obvious advantage of this approach is that existing customer policies based on XACML can be reused. However, the disadvantage with this approach is that it might be difficult to define clear cut policies on what needs to be done in the first stage and the second stage because the scripting language also has the capabilities to define the rules defined in the second stage.

2.4 XACML

XACML is an Organization for the Advancement of Structured Information Standards (OASIS) standard that describes both a policy language and an access control decision request/response language (both encoded in XML). The policy language is used to describe general access control requirements, and has standard extension points for defining new functions, data types, combining logic, etc. The request/response language allows one to form a query to ask whether or not a given action should be allowed, and to interpret the result. The response always includes an answer about whether the request should be allowed using one of four values, for example, permit, deny, indeterminate (an error occurred or some required value was missing, so a decision cannot be made) or not applicable (the request can't be answered by this service). The request/response language helps to define a standard distributed architecture wherein multiple disparate external PEPs communicate with a centralized PDP for determining an access control decision.

At the root of all XACML policies is a policy or a policy-set. A policy-set is a container that can hold other policies or policy-sets, as well as references to policies found in remote locations. A policy represents a single access control policy, expressed through a set of rules. Each XACML policy document contains exactly one policy or policy-set root XML tag. A policy is a combination of sub-components: target, rules, rule-combining algorithm and obligations. Each of these sub-components is explained in the following however, these are mere examples and should not be considered limiting.

Targets: Part of what a XACML PDP does is to find policies that apply to a given request. To do this, XACML provides another feature called a target. The target helps in determining whether the policy is relevant for the request. The policy's relevance to the request determines whether the policy is to be evaluated for the request. This is achieved by defining attributes of three categories in the target—subject, resource, and action—along with their values. It is not mandatory to have attributes for all the three categories in a target. The values of these attributes are compared with the values of the same attributes in the request; if they match, then the policy is considered relevant to the request and is evaluated. In addition to being a way to check applicability, target information also provides a way to index policies, which is useful if you need to store many policies and then quickly sift through them to find which ones apply. For instance, a policy might contain a target that only applies to requests on a specific service. When a request to access that service arrives, the PDP will know where to look for policies that might apply to this request, because the policies are indexed based on their target constraints. Note that a target may also specify that it is universal, and thus applies to any request.

Rules: A policy can have any number of rules, which contain the core logic of an XACML policy. Each rule is composed of a condition, an effect and a target. Conditions are statements (Boolean functions) about attributes that upon evaluation return true, false, or indeterminate. Effect is the intended consequence of the satisfied rule. It can either take the value permit or deny. Target, as in the case of a policy, helps in determining whether or not a rule is relevant for a request. The mechanism for achieving this is also similar to how it is done in the case of a target for a policy. The final outcome of the rule depends on the condition evaluation. If the condition evaluates to true, then the rule's effect (permit or deny) is returned. If the condition evaluates to false, the condition doesn't apply (not-applicable). Evaluation of a condition can also result in an error (indeterminate). Conditions can be quite complex, built from an arbitrary nesting of functions and attributes branching from the top-level Boolean function.

Rule/Policy Combining Algorithms: Because a policy or policy-set may contain multiple rules or policies, each of which may evaluate to different access control decisions, XACML needs some way of reconciling the decisions each rule or policy makes. This is done through a collection of combining algorithms. Each algorithm represents a different way of combining multiple decisions into a single decision. There are policy combining algorithms (used by policy-Set) and rule combining algorithms (used by policy). An example of these is the deny overrides algorithm, which says that no matter what, if any evaluation returns deny, or no evaluation permits, then the final result is also deny. These combining algorithms are used to build up increasingly complex policies, and they are what allow XACML policies to be distributed and decentralized. While there are several standard algorithms, one can build one's own combining algorithm to suit specific needs.

Obligations: One of the objectives of XACML is to provide much finer-level access control than mere permit and deny decisions. Obligations are the mechanism for achieving this. Obligations are the actions that shall be performed by the PEP in conjunction with the enforcement of an authorization decision. After a policy has been evaluated, specific obligations are sent to the PEP along with the authorization decision. In addition to enforcing the authorization decision, the PEP is responsible for executing the operations specified as obligations. One example of the obligation is to send a log message to a specified log server whenever a request is denied.

Attributes, Attribute Values, and Functions: The currency that XACML deals in is attributes. Attributes are named values of known types. Specifically, attributes are characteristics of the subject, resource, action, or environment in which the access request is made. For example, a user's name, their group membership, a file they want to access, and the time of day are all attribute values. When a request is sent from a PEP to a PDP, that request is formed almost exclusively of attributes, and they will be compared to attribute values in a policy to make the access decisions. A policy resolves attribute values from a request or from some other source through two mechanisms: the AttributeDesignator and the AttributeSelector. An AttributeDesignator lets the policy specify an attribute with a given name and type, and optionally an issuer as well. The PDP looks for that value in the request, and failing that, can look in any other location (like an LDAP service). There are four kinds of designators, one for each of the types of attributes in a request: subject, resource, action, and environment. Subject attributes can be broken into different categories to support the notion of multiple subjects making a request (for example, the user, the user's workstation, the user's network, etc.), so SubjectAttributeDesignators can also specify a category to look in. AttributeSelectors allow a policy to look for attribute values through an XML Path Language (XPath) query. A data type and an XPath expression are provided, and these can be used to resolve some set of values either in the request document or elsewhere (just as AttributeDesignators do).

Both the AttributeDesignator and the AttributeSelector can return multiple values (since there might be multiple matches in a request or elsewhere), so XACML provides a special attribute type called a bag. Bags are unordered collections that allow duplicates, and are always what designators and selectors return, even if only one value was matched. In the case that no matches were made, an empty bag is returned, although a designator or selector may set a flag that causes an error instead in this case. Bags are never encoded in XML or included in a policy or request/response. Once some bags of attribute values are retrieved, the values need to be compared to the expected values to make access decisions are available. The comparison and retrieval is done through a powerful system of functions. Functions can work on any combination of attribute values, and can return any kind of attribute value supported in the system. Functions can also be nested, so you can have functions that operate on the output of other functions, and this hierarchy can be arbitrarily complex. Custom functions can be written to provide an even richer language for expressing access conditions. One thing to note when building these hierarchies of functions is that most of the standard functions are defined to work on specific types (like strings or integers) while designators and selectors always return bags of values. To handle this mismatch, XACML defines a collection of standard functions of the form [type]-one-and-only, which accept a bag of values of the specified type and return the single value if there is exactly one item in the bag, or an error if there are zero or multiple values in the bag. These are among the most common functions used in a condition.

2.5 Common Network Platforms

There are many hardware and software based approaches known in the art that provide authorization services to applications: Server-centric approaches provide authorization services in the server, typically from within the application, where access control is tightly integrated. Network-centric approaches such as firewalls use network-layer constructs (for example, MAC address, IP address, ISO Layer-4 port information, etc.) for access control. Most network-centric approaches are implemented as network appliances and operate in a similar fashion to a network proxy and/or network gateway.

For such authorization systems to work with ISO Layer-4 to ISO Layer-7 applications, it is essential to understand the semantics of the many different protocols, for example, Hypertext Transfer Protocol (HTTP), Common Internet File System (CIFS), SQLNet, etc., because, depending on a configured policy it may be necessary to change the payload of an application message. Therefore, to understand the protocol semantics and perform the actions specified in the policy, a protocol proxy may need to be implemented.

FIG. 9 shows such a protocol proxy as it is currently used in the art: The proxy 4032 sits in between a connection from a client 4031 to a server 4033. The proxy 4032 services requests of its client 4031 by forwarding requests to one or more other servers 4033. A client 4031 connects to the proxy 4032, requesting some service, such as a file, connection, web page, or other resource, available from a server 4033. The proxy 4032 provides the resource by connecting to the specified server 4033 and requesting the service on behalf of the client 4031. A proxy 4032 may optionally alter the client's request or the server's response, and sometimes it may serve the request without contacting the specified server, for example when the proxy has already cached a copy of the expected reply from server 4033.

Building a proxy for a standard protocol such as HTTP is a well known in the art. However, in practice there exist specific custom protocols written on top of TCP. Thus, mechanisms should be provided for understanding the semantics of these custom protocols. Depending on the application, a protocol proxy may need to analyze the request, analyze the response or analyze both request and response. For example, network-based authorization decision may need to be made to analyze the request to determine whether the given transaction shall be allowed or not.

2.6 Virtualization

Virtualization in computing refers to the abstraction of computing resources. It can be used to hide the physical characteristics of computing resources from the way in which other systems, applications, or end users interact with those resources. For example, the electronic system 1061 from FIG. 10 is hidden by the Electronic System View 1060.

Virtualization includes making a single physical resource (such as a server, an operating system, an application, or storage device) appear to function as multiple logical resources. This is sometimes called partitioning and is described in FIG. 11: The Electronic System 1050 provides several resources, so-called contexts such as Context A 1051, Context B 1052, Context C 1053, Context D 1054.

Virtualization can also cluster multiple physical resources (such as storage devices or servers) to make them appear as a single logical resource, which is described in FIG. 12: Several Electronic Systems, Electronic System A 1041, Electronic System B 1042, Electronic System C 1043 and Electronic System D 1044, are clustered to form one Electronic System Cluster 1040.

In enterprise networking, virtualization can be used to achieve high availability, for example by clustering redundant physical resources, or can reduce the total cost of ownership by sharing one partitioned resource among different business units.

2.7 Virtual Directory Infrastructure

Many enterprises end up deploying and maintaining a variety of user identity stores in their environment. Multiple identity stores emerge for a number of reasons: Existing deployments of applications may require their own, dedicated user identity repositories. Or, different identity repositories may be deployed to support distinct client communities, for example, intranet versus Internet clients, or clients in different divisions of the same company. Also, different identity stores may be deployed to support a distinct community of applications such as Enterprise Resource Planning (ERP) systems, remote network access, collaboration, etc. In addition, merged or acquired companies may bring their own user identity stores into the enterprise.

There are no standard ways in the art to store identity information. For example, it could be managed in any of the following ways: In external directories such as LDAP, AD; using external databases, or using application-specific custom formats, or in any other way known to or contemplated by one of skill in the art.

With multiple identity stores, it is difficult to enforce and monitor compliance and maintain consistent corporate security policies. Without a single application-level view of the identity information, deployment of enterprise access services such as authorization or single sign-on becomes very difficult. The entity providing the service should be capable of supporting the many different protocols required by different identity repositories. In addition, different sources store identity information in different formats, and access to the data requires different interfaces.

Virtual Directory Infrastructure (Virtual Directory Infrastructure) simplifies this task by providing an abstraction layer to communicate with different identity stores. Virtual Directory Infrastructure is commercially available in either hardware or software products.

2.8 Traditional Multiple-Server-Based Appliances

Architectures known in the art for enterprise multi-server based network appliances are typically either Ethernet packet-switch based architectures implemented in multiple modules or X86 server-based in a single network appliance. The fundamental drawbacks of such architectures found in other approaches is the overhead of running a reliable protocol when communication needs to happen between modules, and problems with multiple transport protocol termination for multiple services (or sometimes even for single service if the implementation of the single service is split across multiple modules). One problem of multiple transport protocol terminations for multiple services is outlined in FIG. 3: It is clear that multiple transport protocol terminations add to the overall latency in the client-to-server (or server-to-server) communication.

Other drawbacks of Ethernet packet-switch based architectures are that they support only very primitive flow control or no flow control at all, which makes it hard to scale these architectures with increasing network bandwidth demand. Nor is there any hardware retry of corrupted packets, or memory level visibility within different processing elements to build a reliable solution for high availability.

SUMMARY OF THE DESCRIPTION

A highly scalable application network appliance is described herein. According to one embodiment, a network element includes a switch fabric, a first service module coupled to the switch fabric, and a second service module coupled to the first service module over the switch fabric. In response to packets of a network transaction received from a client over a first network to access a server of a data center having multiple servers over a second network, the first service module is configured to perform a first portion of OSI (open system interconnection) compatible layers of network processes on the packets while the second service module is configured to perform a second portion of the OSI compatible layers of network processes on the packets. The first portion includes at least one OSI compatible layer that is not included in the second portion.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 48 is a block diagram which illustrates the CIFS protocol packet;

FIG. 85 is a block diagram which illustrates deployment of an ANA in an active-active setup for a high-availability mode according to another embodiment of the invention;

DETAILED DESCRIPTION

Figure 1:
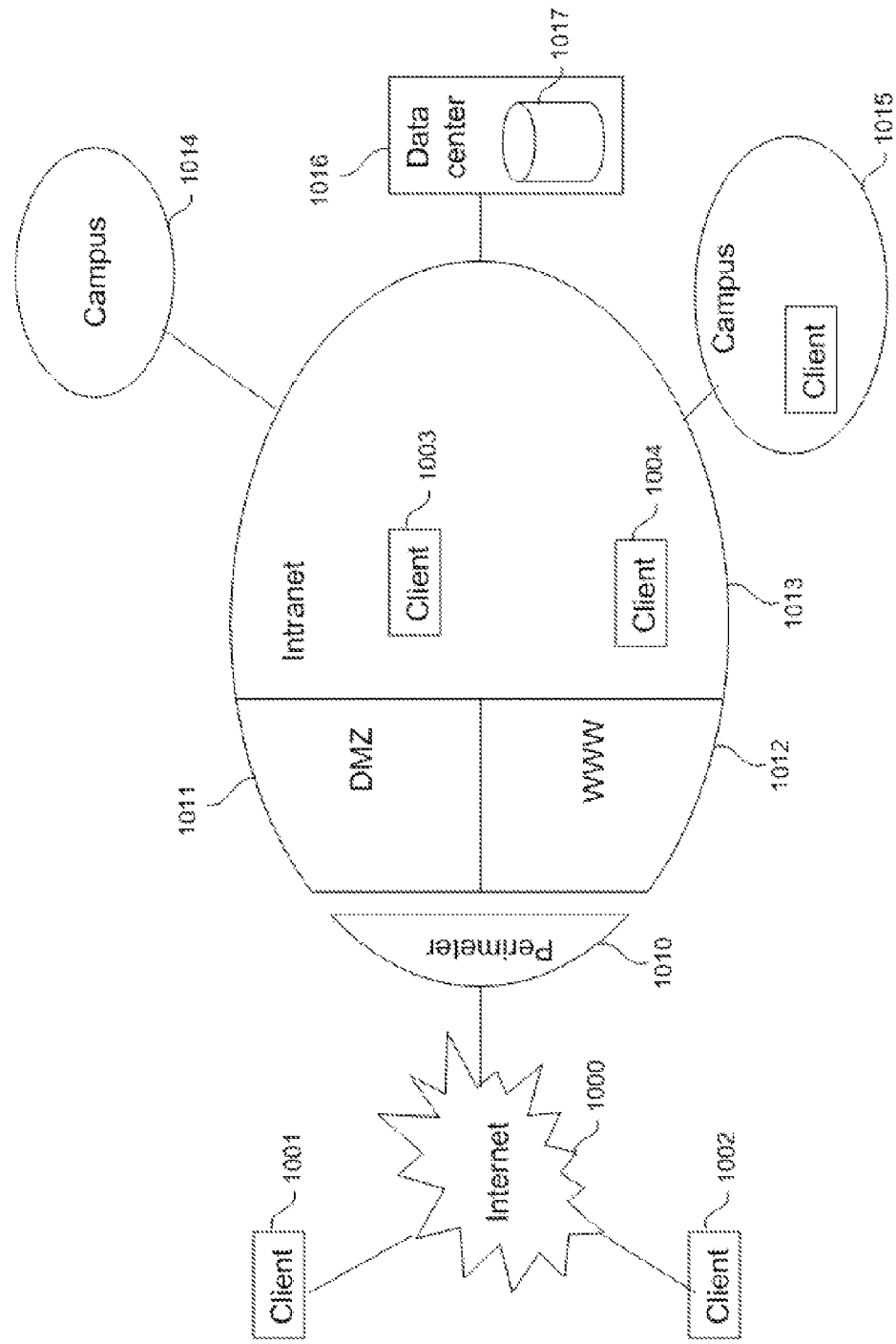
FIG. 1 illustrates a typical corporate computer network connected to the Internet.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

In one aspect, an embodiment of the invention is an Application Network Appliance (ANA) coupled between one or more clients and one or more application servers. The one or more clients or the one or more application servers can be coupled to the Internet. The ANA behaves as a network proxy and thus splits the client-to-server connections (or, similarly, server-to-server connections) into client-to-proxy and proxy-to-server connections. The ANA then performs Network Service processing on the data exchanged between the one or more clients (or the one or more servers) and the one or more servers. The ANA can also act as an Application Protection System (APS) to perform network access control, for example.

One aspect of the invention is the use of a Lossless Data Transport Fabric for Layer-7 Networking, comprising an ISO Layer-7 networking system, which performs network operations in multiple separate processing domains, which are interconnected via the Lossless Data Transport Fabric (LDTF). This LDTF may be an RDMA-capable fabric, such as InfiniBand or iWARP.

Yet another aspect of the invention is to perform Triangulated Authorization as a means for network-centric, application-agnostic authorization and access control to certain Application Services. The concept of Triangulated Authorization operates on policies, which can take into account multiple aspects of clients, of the networking environment and of the applications and services requested by clients. Performing Triangulated Authorization requires analysis of the ISO Layer-7 application data, which can be transmitted via various protocols. Using a LDTF in a multi-processing approach provides the compute power to perform such analysis efficiently. The concept of Triangulated Authorization can be enhanced by utilizing a Virtual Directory Infrastructure (VDI) to multiple directory stores. Further, because LDTF can support virtualization, for example InfiniBand as the LDTF supports so-called virtual lanes, the concept of Triangulated Authorization can also be implemented in a virtualized manner. One physical ANA can then be used to serve multiple independent network domains thus increasing flexibility and reducing the cost and the complexity of access control.

One aspect of the invention is a Network Application Protection system and method, for access control in a network environment by using Triangulated Authorization based on user attributes, environment attributes, and resource attributes to make rapid, reliable, and secure authorization decisions, based on a number of factors, including user attributes, environment attributes, and subject attributes. User attributes may include, among others: company department, role, project association, seniority, citizenship. Environment attributes may include, among others: network access method, location, time and date. Subject attributes may include, among others: protocol attributes, content attributes, and resource attributes.

One aspect of the invention is a system and method for Centralized Transport Protocol Termination for Multi-Service Layer-7 Networking, comprising a system, in a network environment, for terminating one or more transport protocols in a centralized fashion, in, for example, an Application Network Appliance as described herein. Transport protocols may include, among others: TCP, SSL, IPSec, RTSP, RTP, CIFS, JDBC.

Yet another aspect of the invention provides a Transparent Secure Transport mechanism between client-to-server (or server-to-server) connections which will not break existing ISO Layer-4 networking. While the payload (i.e. the sensitive data) is encrypted for privacy and security, the original TCP and IP headers are kept unchanged. This results in a secure transport method which is transparent to existing ISO Layer-4 network services.

One aspect of the invention is a system and method for Transparent Secure Transport for End-to End Application Protection, comprising a method for secure transport in a network environment using data packets which protects the transported data by encrypting the payload of the data packets and which does not alter the ISO Layer-3 and ISO Layer-4 information of said data packets. The described Transparent Secure Transport (TST) may be dynamically installed and enabled in an endpoint by downloading the requisite TST agent software as needed into, for example, a client system, or, the requisite TST capabilities may be pre-installed in an endpoint.

One aspect of the invention is a system and method for High-Availability Networking by using a Lossless Data Transport Fabric with an ISO Layer-7 networking system which comprises multiple redundant modules and which copies state information from one module to another module via the Lossless Data Transport Fabric in order to enable transparent High Availability failover. This LDTF may be an RDMA-capable fabric, such as InfiniBand or iWARP.

One aspect of the invention is a system and method providing a Layer-7 Services Gateway for Converged Data Center Fabric, comprising an ISO Layer-7 gateway between classical network fabric and converged network fabric. The classical network fabric may be, for example, Ethernet or fibre channel. The converged network fabric may be, for example, one of Data Center Ethernet, Lossless Data Transport Fabric, RDMA fabric, InfiniBand, or iWARP.

One aspect of the invention is a system and method for Highly-Scalable Layer-7 Networking, comprising an ISO Layer-7 networking system with multiple processing elements connected via a Lossless Data Transport Fabric where the processing necessary to perform the network operation(s) are distributed over the processing elements. In some configurations, at least one of the processing elements is dedicated to operations for ISO Layer-7 processing. In some configurations, at least one of the processing elements is dedicated to operations for ISO Layer-2 to ISO Layer-5 processing.

One aspect of the invention is a system and method for Virtualization in a Layer-7 Networking System, which may be implemented as an ISO Layer-7 networking system which performs network operations for multiple virtual contexts using multiple separate processing elements and where the multiple processing elements are interconnected via a Lossless Data Transport Fabric. Virtual contexts may be mapped directly onto separate processing elements, or processing elements may be virtualized so that they can be shared in some way across subsets of virtual contexts, depending on the specific requirements of a given installation. Further, this system and method provides for termination of multiple transport protocols among multiple virtual contexts. Distinct specific transport protocols may be mapped directly onto and terminated onto distinct specific virtual contexts, or sharing of support for transport protocols may be offered across sets of virtual contexts, depending on the specific requirements of a given installation.

One aspect of the invention is a system and method for using Virtual Directory Infrastructure in a broad range of Layer-7 Networking applications, including a system and method, in a network environment, for access control, based on a number of factors including user attributes, environment attributes, and resource attributes, and where the attributes are obtained via a Virtual Directory Interface. User attributes may include, among others: company department, role, project association, seniority, citizenship. Environment attributes may include, among others: network access method, location, time and date. Subject attributes may include, among others: protocol attributes, content attributes, and resource attributes.

One aspect of the invention is a system and method for Inter-Module Communication using USB Bus in Layer-7 Networking, comprising a networking system including at least two communication planes, one communication plane for network traffic, and one for out-of-band communication, where the out-of-band communication is done using Universal Serial Bus.

One aspect of the invention is a system and method for running Applications in a Layer-7 Networking platform environment, which comprises an ISO Layer-7 networking system using multiple distributed processing elements, each connected via a Lossless Data Transport Fabric, wherein at least one distributed processing element is dedicated to performing ISO application layer services. Such ISO application layer services may include, for example, without limitation, at least one of: Server Load Balancing, SSL Acceleration, Application Acceleration, Triangulated Authorization, Extensible Markup Language (XML) acceleration, Advertisement Insertion, Virtual Private Network acceleration, Deep Packet Inspection, and Intrusion Detection.

The ANA comprises a Lossless Data Transport Fabric (LDTF) for inter-process communication between multiple processing elements. Various possibilities exist to implement such LDTF: In one embodiment of the invention, InfiniBand (IB) is used as a fabric; in another embodiment RDMA-enabled Data Center Ethernet (DCE) can be used as a fabric; in yet another embodiment any RDMA-enabled interconnect fabric can be used such as Internet Wide Area RDMA Protocol (iWARP), for example.

In one embodiment of the invention, LDTF has many benefits: It allows dedicated processing elements to be assigned to certain compute intensive network processing tasks. For example, by splitting the processing of the seven ISO network layers into two processing domains, one Network Service processing domain and another ISO Layer-7 Application Service processing domain, multiple processing elements can be utilized efficiently for parallel computation. Applying principles of heterogeneous parallel computation to network processing is not a trivial task. In a multi-processing approach, specialized processing elements can be dedicated to certain compute intensive tasks and the computational load can be balanced among those multiple processing elements. As a result, more cost efficient processing elements can be deployed, plus the entire system can more easily be scaled to match increased network bandwidth demands, for example. Using the same principles, the LDTF can not only be used for inter-process communication but also for communication with application servers via a Converged Data Center Fabric which supports RDMA. Therefore certain embodiments of the inventions can not only be applied to connect to application servers via classical Ethernet but also via converged data center fabrics such as Data Center Ethernet.

In another embodiment of the invention, transport protocols such as Transmission Control Protocol (TCP) connections, Secure Sockets Layer (SSL) connections, etc, can be terminated in a centralized fashion, and their Protocol Data Units (PDU) can be transformed into a data stream which can be transported via the LDTF for processing by one or more dedicated Application Service processing elements. Compared with multiple cascaded transport protocol termination points, this Centralized Transport Protocol Termination has the big advantage of reducing the overall latency in client-toserver connections when multiple Network Services are provided. In addition, the LDTF can be used to replicate all state information, including the ISO Layer-7 data stream, among multiple modules or multiple ANAs to achieve high-availability with zero-click failover behavior.

In a further embodiment of the invention, the system can be further enhanced by applying Universal Serial Bus (USB) technology as out-of-band communication for system configuration, administration and status information between the multiple modules, components, or even between ANAs. Because USB technology allows hot-pluggability, a running system can be enhanced, maintained, changed, or repaired without affecting its operation. This further enhances the high-availability and reliability nature of this system.

The various embodiments of the inventions described herein are contemplated to be implemented in numerous ways including as methods, systems, devices, and computer readable mediums. Several embodiments of the inventions described herein are discussed below. One embodiment of the invention comprises a system and a method for network-centric authorization for protecting applications in an enterprise network. Another embodiment of the invention comprises a system and a method for Transparent Secure Transport to enable security and privacy in network communication without breaking existing ISO Layer-4 Network Services.

Other aspects and advantages of various embodiments of the inventions described herein will become apparent from the following detailed description, taken in conjunction with the accompanying drawings which illustrate, by way of example, the principles of the inventions. It will be understood by one of ordinary skill in the art that the following embodiments are provided for illustrative and exemplary purposes only, and that numerous combinations of the elements of the various embodiments of the present invention are possible.

1. DEFINITIONS

Note: these definitions are not intended to be limiting on the inventions described herein, but merely to provide background and context for the disclosures included here.

"Active Directory" (AD) is an implementation of Lightweight Directory Access Protocol (LDAP) directory services by Microsoft for use primarily in Windows environments. The main purpose of Active Directory is to provide centralized authentication and authorization services for Windows based computers.

"Authentication" means to verify the identity of a subject, such as a user or a client, based on one or more authentication factors.

"Authorization" determines whether a subject such as a client, a computer, a user, a machine, or a person may be permitted access to a resource which can be, for example, a file, certain data, a program, storage or a device.

"Access control" is based on authorization and is the ability to determine whether access to a resource is granted or rejected to a subject.

Common Internet File System ("CIFS") which is also known as Server Message Block (SMB) is an application-level network protocol mainly applied to shared access to files, printers, serial ports, and miscellaneous communications between nodes on a network. It also provides an authenticated Inter-process communication mechanism.

HTTP cookies, sometimes known as web cookies or just "Cookies", are parcels of text sent by a server to a web browser and then sent back unchanged by the browser each time it accesses that server. HTTP cookies are used for authenticating, tracking, and maintaining specific information about users, such as site preferences and the contents of their electronic shopping carts.

"CORBA" means Common Object Request Broker Architecture and is a standard defined by the Object Management Group (OMG) that enables software components written in multiple computer languages and running on multiple computers to work together.

A central processing unit ("CPU"), or sometimes simply "processor", is the component in a digital computer capable of executing a program. With the advancement in semiconductor technology, one or more so-called processing elements or "cores" can be integrated within one device, or two or more processors can interoperate in a multi-processing environment.

"CSIv2" means Common Secure Interoperability Protocol Version 2, which is a protocol implementing security features for inter-ORB communication.

"Data Center Ethernet", or DCE is part of the Ethernet family, which is a large, diverse family of frame-based computer network technologies that operates at many speeds for local area networks (LANs).

The "Datagram Transport Layer Security" (DTLS) protocol provides communications privacy for datagram protocols. The protocol allows client/server applications to communicate in a way that is designed to prevent eavesdropping, tampering, or message forgery. The DTLS protocol is based on the Transport Layer Security (TLS) protocol and provides equivalent security guarantees. Datagram semantics of the underlying transport are preserved by the DTLS protocol.

"DCOM" means Distributed Component Object Model and is a Microsoft proprietary technology for software components distributed across several networked computers to communicate with each other.

"Enterprise Java Bean" (EJB) is a managed, server-sided component architecture for modular construction of enterprise applications. The EJB specification is one of the several Java application programming interfaces (API) in the Java Platform, Enterprise Edition.

An "FPGA" is a Field Programmable Gate Array. FPGAs are electronic components that have a configurable function. These devices are able to change their functionality via an information stream transferred to the device. These electronic components are available from a number of different suppliers in a wide range of sizes and speeds. One example of these devices is the Virtex FPGA devices from Xilinx, Inc. located in San Jose, Calif.

"FTP" or File Transfer Protocol is used to transfer data from one computer to another over the Internet, or through a network. Specifically, FTP is a commonly used protocol for exchanging files over any network that supports the TCP/IP protocol.

"General Packet Radio Service" (GPRS) is a Mobile Data Service available to users of Global System for Mobile Communications (GSM) and IS-136 mobile phones.

"GTP" is the GPRS Tunneling Protocol which is an IP-based protocol used within GSM and UMTS networks. The GTP protocol is layered on top of UDP and comprises in fact three separate protocols, GTP-C, GTP-U and GTP'.

Hypertext Transfer Protocol ("HTTP") is a communications protocol used to transfer or convey information on the World Wide Web. HTTP is coordinated by the W3C (World Wide Web Consortium) and the IETF (Internet Engineering Task Force).

"IIOP" (Internet Inter-Orb Protocol) is the implementation of the General Inter-ORB Protocol for TCP/IP. It is a standard defined by the Object Management Group (OMG) that enables software components written in multiple computer languages and running on multiple computers to work together.

"IMAP" is the Internet Message Access Protocol, also known as Internet Mail Access Protocol or Interactive Mail Access Protocol.

"InfiniBand" (IB) is a switched fabric communications link primarily used in high-performance computing.

"IPsec" (IP security) is a suite of protocols for securing Internet Protocol (IP) communications by authenticating and/or encrypting each IP packet in a data stream. IPsec also includes protocols for cryptographic key establishment. IPsec protocols operate at the ISO Layer-3 network layer.

The Internet Protocol ("IP") is a data-oriented protocol used for communicating data across a packet-switched network. Currently two versions exist, the widely deployed IPv4 and the successor, Internet Protocol version 6 (IPv6).

Internet Protocol Television ("IPTV") is an approach where a digital television service is delivered by using Internet Protocol over a network infrastructure.

"J2EE", the Java Platform, Enterprise Edition or Java EE is a widely used platform for server programming in the Java programming language.

"JDBC", the Java Database Connectivity, is an API for the Java programming language that defines how a client may access a database. It provides methods for querying and updating data in a database. JDBC is oriented towards relational databases.

"Kerberos" is the name of a computer network authentication protocol, which allows individuals communicating over an insecure network to prove their identity to one another in a secure manner. It is also a suite of free software published by Massachusetts Institute of Technology (MIT) which implements this protocol. Its designers aimed primarily at a client-server model, and it provides mutual authentication.

The Layer 2 Tunneling Protocol ("L2TP") is a tunneling protocol used to support virtual private networks.

"LAN" means Local Area Network, which is a computer network covering a small geographic area, such as a home, office, or group of buildings. One example (and widely-used) LAN standard is, defined by the IEEE as IEEE 802.11.

"LDAP" is the Lightweight Directory Access Protocol, which is an application protocol for querying and modifying directory services, running over TCP/IP.

"MIME" is Multipurpose Internet Mail Extensions, which is an Internet Standard that extends the format of e-mail.

"MPEG-TS" is the communications protocol for audio, video, and data which is specified in MPEG-2 Part1, Systems (ISO/IEC standard 13818-1).

"ORB" means Object Request Broker (ORB) which is a piece of middleware software that allows programmers to make program calls from one computer to another via a network.

"PDU" is a Protocol Data Unit and is relevant in relation to the layers of the OSI model as follows: The ISO Layer-1 PDUs are streams, the ISO Layer-2 PDUs are frames, the ISO Layer-3 PDUs are packets, the ISO Layer-4 PDUs are segments, and for ISO Layer-5 and above, simply is referred to as application data, or data.

The Point-to-Point Tunneling Protocol ("PPTP") is a protocol for virtual private networks.

A "proxy" is an intermediary device that sits in the middle of client-to-server connections. It terminates the incoming connection, performs PDU processing and re-initiates another connection towards the server. In effect, the proxy device breaks the original client-to-server connection into two halves, one between client and proxy (client-connection) and another between proxy and the server (server-connection).

"RADIUS" is the Remote Authentication Dial In User Service protocol, is an authentication, authorization, and accounting protocol often used with dial-up, DSL, or 802.11 connections to ensure that users are authenticated, authorized, and their use accounted for.

Remote Direct Memory Access, also known as Remote DMA, also known as "RDMA" allows data to move directly from the memory of one processing element into that of another. This permits lossless, high-throughput, low-latency networking. RDMA relies on a special philosophy in using DMA.

"RDP" is the Remote Desktop Protocol, which is a multichannel protocol that allows a user to connect to a computer running Microsoft Terminal Services.

The Java Remote Method Invocation API, or "Java RMI", is a Java application programming interface for performing the object equivalent of remote procedure calls.

Remote procedure call ("RPC") is a technology that allows a computer program to cause a subroutine or procedure to execute in another address space (commonly on another computer on a shared network) without the programmer explicitly coding the details for this remote interaction.

"RTP" is the Real-time Transport Protocol.

"RTCP" is the RTP Control Protocol which is a sister protocol of the Real-time Transport Protocol.

"RTSP" is the Real Time Streaming Protocol.

"SAML" is the Security Assertion Markup Language which is an XML standard for exchanging authentication and authorization data between security domains. SAML is a product of the OASIS Security Services Technical Committee.

"SCTP" is the Stream Control Transmission Protocol as it is defined by the IETF Signaling Transport (SIGTRAN) working group.

"SDP" is the Session Description Protocol, which is a format for describing streaming media initialization parameters.

A "session" is defined as a long-lived association between a user and a server, usually involving the exchange of many request-response transactions between a client and a server. A session is typically implemented as a layer in a protocol stack e.g., Telnet and FTP. However, for certain protocols such as HTTP and HTTPS, where connections proper are generally very short-lived, sessions are implemented by having each exchange between the client and the server include some form of "cookie". Usually a session contains multiple connections sharing the same session state and belongs to a single client/user.

"Single Sign-On" (SSO) is a method of access control that enables a user to authenticate once and gain access to the resources of multiple software systems. Many free and commercial SSO or reduced sign-on solutions are currently available.

"SIP" is the Session Initiation Protocol and is an application-layer control (signaling) protocol for creating, modifying, and terminating sessions with one or more participants.

"SOAP" is a protocol for exchanging XML-based messages over computer networks, normally using HTTP/HTTPS. SOAP forms the foundation layer of the Web services stack, providing a basic messaging framework that more abstract layer can be built on.

Symmetric multiprocessing, or "SMP", is a multiprocessor computer architecture where two or more identical processors are connected to a single shared main memory.

"SMTP" is the Simple Mail Transfer Protocol and is the de facto standard for e-mail transmissions across the Internet.

"SSH" means Secure Shell and is a network protocol that allows data to be exchanged over a secure channel between two computers.

The Secure Sockets Layer "SSL" and its successor, Transport Layer Security (TLS), are cryptographic protocols that provide secure communications on the Internet for such things as web browsing, e-mail, Internet faxing, instant messaging and other data transfers.

The Transmission Control Protocol ("TCP") is one of the core protocols of the Internet protocol suite, often simply referred to as TCP/IP.

"Telnet" (TELecommunication NETwork) is a network protocol used on the Internet or local area network (LAN) connections, generally to provide remote terminal service between a user at a client system and a process at some server.

User Datagram Protocol ("UDP") is one of the core protocols of the Internet protocol suite. Using UDP, programs on networked computers can send short messages sometimes known as datagrams to one another.

"UMTS" is the Universal Mobile Telecommunications System, which is one of the third-generation (3G) mobile phone technologies.

"URL" is Uniform Resource Locator, which is widely used as a synonym for Uniform Resource Identifier (URI).

"USB" is the Universal Serial Bus, which is a serial bus standard to interface devices, such as mice and keyboards.

Voice over Internet Protocol, also called "VoIP", IP Telephony, Internet telephony, Broadband telephony, Broadband Phone and Voice over Broadband is the routing of voice conversations over the Internet or through any other IP-based network.

"VLAN" is virtual LAN, which is a method of creating independent logical networks within a physical network. Several VLANs can co-exist within such a network.

Wide Area Network ("WAN") is a computer network that covers a broad area, i.e. any network whose communications links cross metropolitan, regional, or national boundaries.

A wireless LAN or "WLAN" is a wireless Local Area Network, which is the linking of two or more computers without using wires. WLAN is, for example, defined in IEEE 802.11, a set of Wireless LAN standards developed by working group 11 of the IEEE LAN/MAN Standards Committee.

"XACML" stands for eXtensible Access Control Markup Language. It is a declarative access control policy language implemented in XML, and a processing model, describing how to interpret the policies. XACML is standardized by the OASIS standards organization.

2. OVERVIEW

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

2.1 Centralized Transport Protocol Termination for Multi-Service

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

Figure 3:
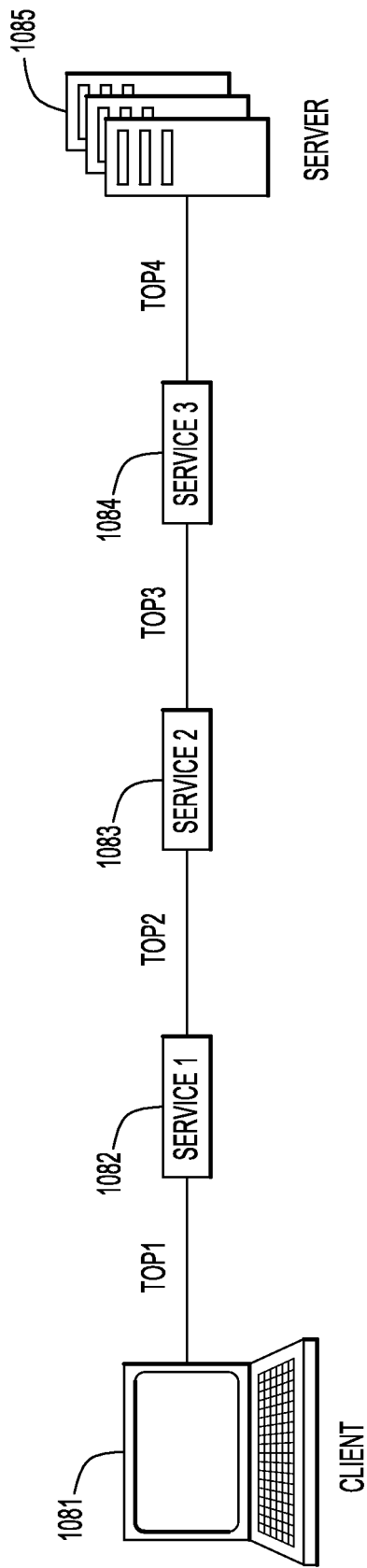
FIG. 3 illustrates multiple transport protocol termination in a typical computer network.

One embodiment of the invention is a network appliance which terminates multiple transport protocols in one central point to overcome the many drawbacks of multiple transport protocol termination, such as increased latency and lack of scalability. Multiple transport protocol termination is explained above (see FIG. 3). Therefore, the network appliance may need to perform a set of functions similar to those typical of application servers such as network proxy, deep packet inspection, cryptography, data compression, regular expression parsing, etc. Network services that may need Centralized Transport Protocol Termination include but are not limited to application authentication and authorization, application firewalls, application data routing, in-line intrusion-detection and intrusion prevention, SSL offloading/acceleration, server load balancing, XML offloading/acceleration, and application front-end engine services (also called application acceleration).

ISO Layer-2 to ISO Layer-5 processing typically involves packets, segments and records processing, whereas ISO Layer-7 processing typically involves application data processing. Full ISO Layer-7 inspection goes beyond application headers and typically involves reassembling application layer data. A general rule used in the art is that a 1 GHz processor is needed for processing ISO Layer-3 or ISO Layer-4 PDUs at 1 Gbps, whereas a 10 GHz processor is needed for application data processing at 1 Gbps (for example for SSL VPN URL mangling operation). Therefore, the computational complexity required for scaling the proxy functionality is quite different from the computational complexity required for scaling ISO Layer-7 processing.

To solve the computational complexity in an efficient way, one embodiment of the invention splits the overall ISO Layer-2 to ISO Layer-7 stack into (at least) two independent processing domains. One domain, which is called Network Service processing for ISO Layer-2 to ISO Layer-5 processing (i.e., up to TCP/SSL processing) provides proxy functions, and a second domain which is called Application Service processing for ISO Layer-7 processing. Splitting the stack requires a reliable, lossless, low-latency, high-bandwidth connection between those two (or more) processing domains in order for the Network Service processing to forward the data stream to the Application Service processing for further processing. As a solution, this approach uses a LDTF such as RDMA-capable fabric technology to provide this reliable lossless, low-latency, high-bandwidth interconnect between processing domains.

Figure 13:
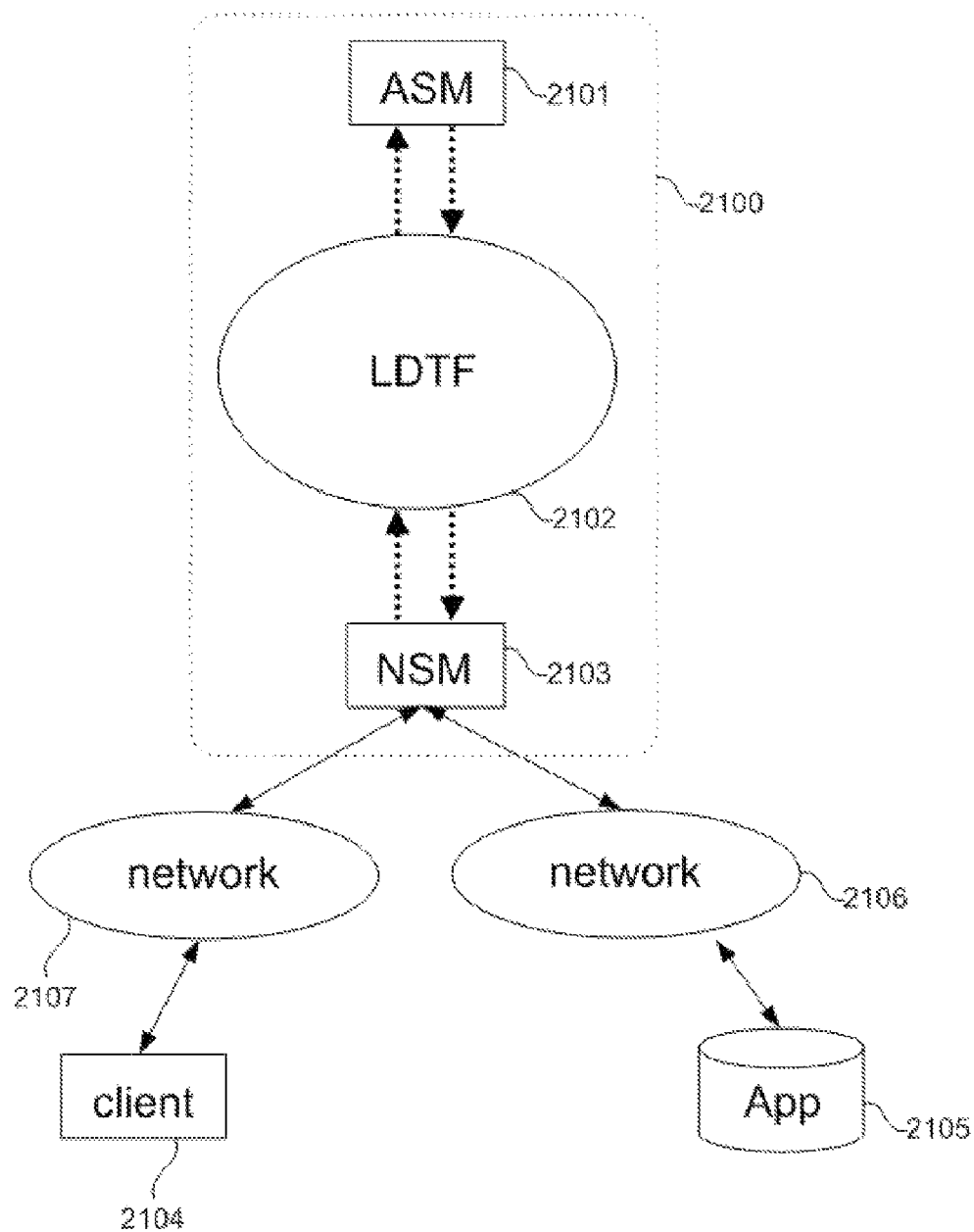
FIG. 13 is a network connected block diagram of an ANA according to another embodiment of the invention.
Figure 14:
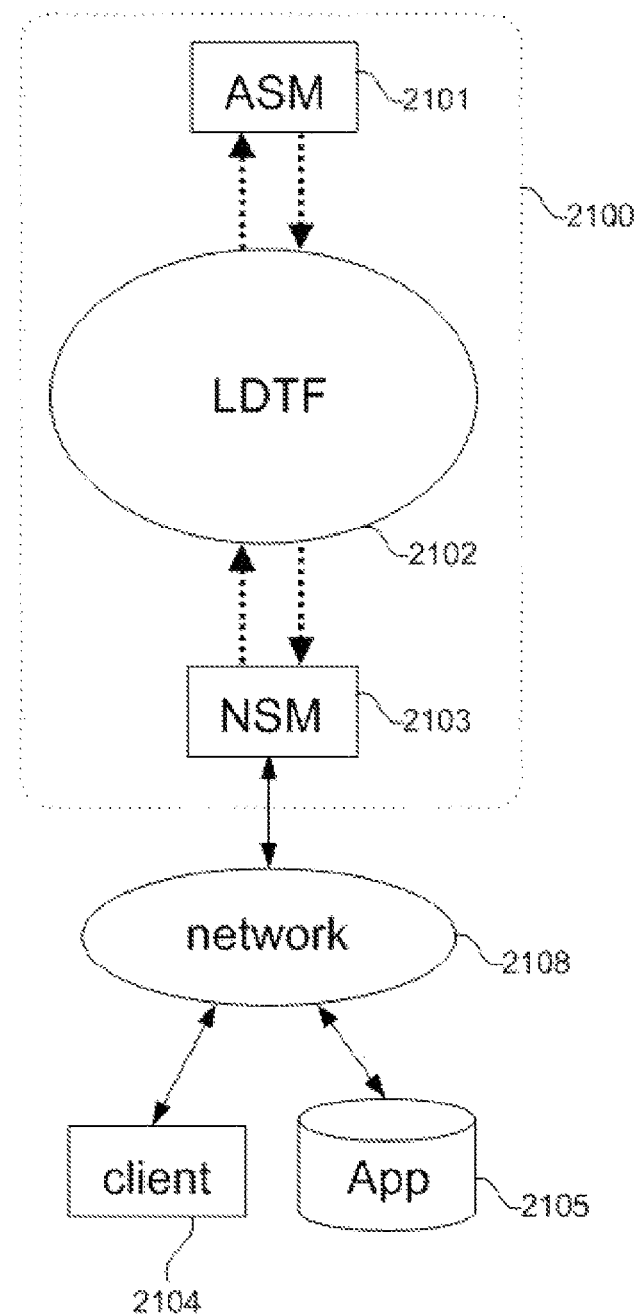
FIG. 14 is a shared network connected block diagram of an ANA according to another embodiment of the invention.
Figure 15:
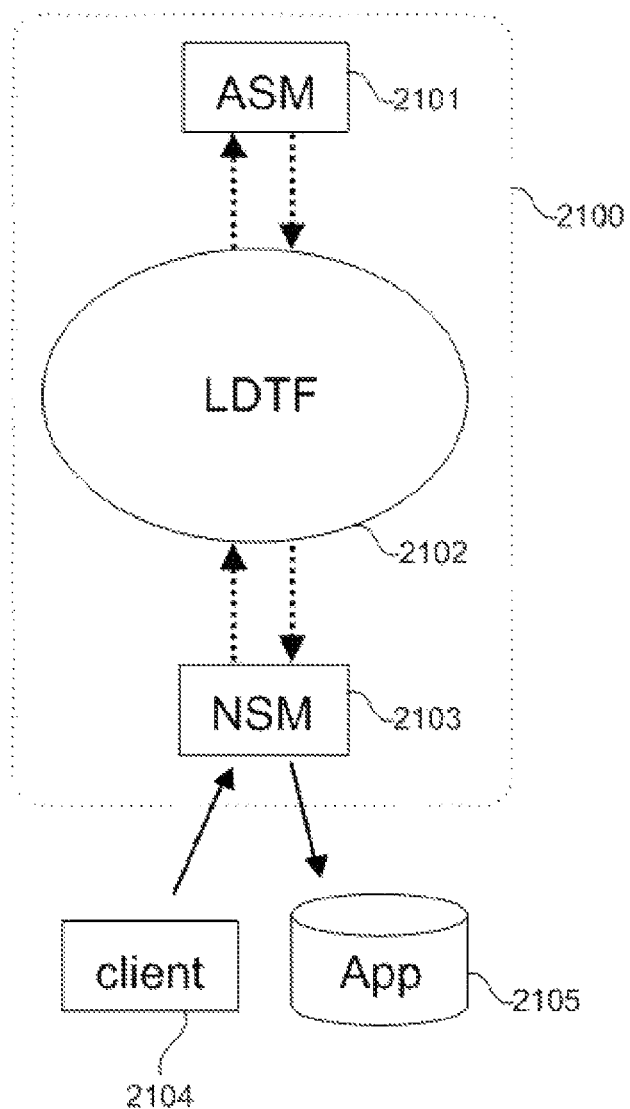
FIG. 15 is a simplified view of a block diagram of an ANA according to another embodiment of the invention.

This approach is illustrated in FIG. 13. The ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Client 2104 and application server 2105 can share the same network, for example network 2108 from FIG. 14. While it is apparent that multiple clients and multiple application servers may be connected to the ANA 2100, for the sake of simplicity a single client, single application server case is used as a placeholder throughout. This simplified view is shown in FIG. 15 where the network connections are omitted for simplification purposes. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

2.2 Converged Data Center Fabric

In one embodiment of the invention described herein the system and method functions as an ISO Layer-4 to ISO Layer-7 services gateway for a converged data center fabric to provide extra functionality in addition to basic protocol gateway function between classic Ethernet and the converged data center fabric.

Figure 2:
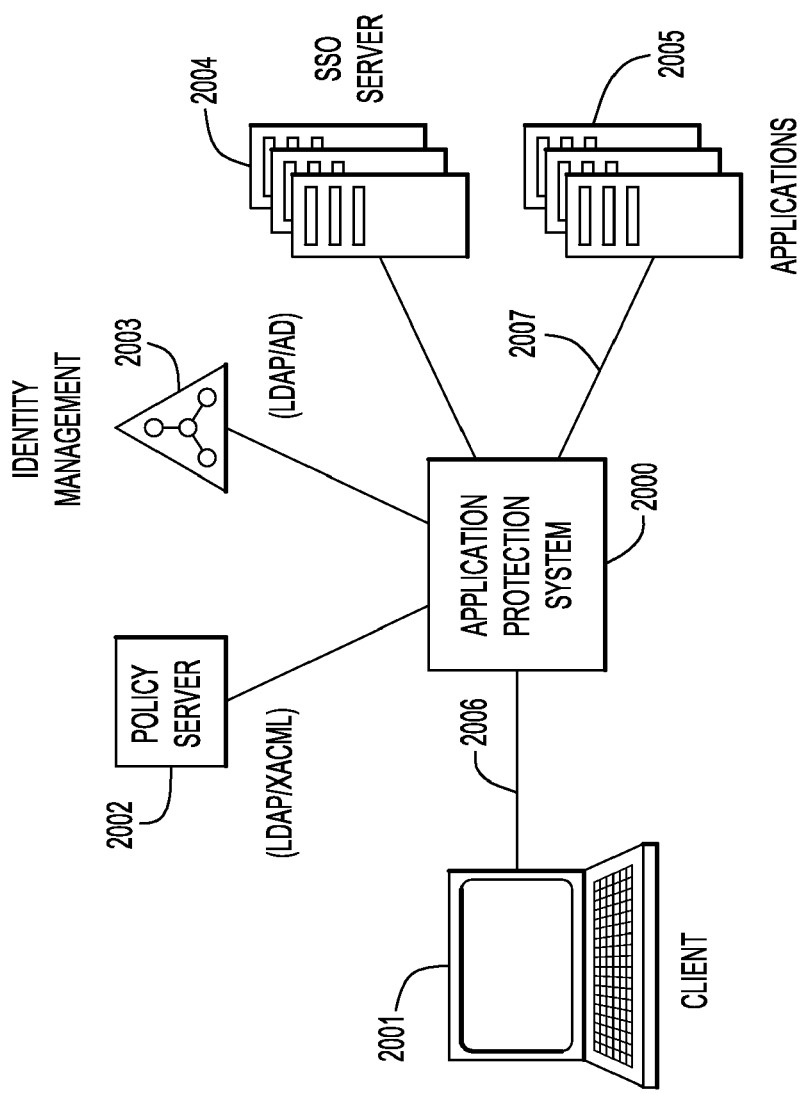
FIG. 2 illustrates the application of an ANA as the APS according to one embodiment of the invention.

FIG. 2 illustrates such an embodiment. In FIG. 2, one embodiment of the invention, the APS 2000 can operate as a gateway and can connect to a client (for example client 2001) over a classical Ethernet interface and to the server (for example application server 2005) over a converged data center fabric interface. The converged fabric interface can, for example, without limitation, be IB or Data Center Ethernet (DCE), or any other converged fabric interface known or contemplated by one of skill in the art. The APS 2000 accepts incoming client-to-server traffic over one of its Ethernet interfaces, and terminates the transport protocol and reassembles the PDUs into a data stream. In one embodiment of the invention, the APS 2000 can use RDMA-capable, lossless, high-throughput, low-latency fabric to switch the incoming data stream to one or more processing units, which then perform certain configured ISO Layer-7 services on the data stream.

Once the ISO Layer-7 service is applied to the client traffic, it is forwarded over the converged fabric interface towards the server, for example towards application server 2005. The APS 2000 can optionally regenerate the data stream over RDMA, if the converged fabric is RDMA-capable. The application server 2005 can accept traffic over, for example, without limitation, Socket Direct Protocol or native RDMA interfaces, or any other protocol appropriate to the converged fabric and known to one of skill in the art. The former approach avoids application rewrite, and any socket-compliant application will work without any rewrite. The latter approach, though more performance-efficient involves rewriting of the application to work with RDMA. In either approach, application servers run TCP-less, which significantly boosts application throughput.

Compared with typical TCP stack processing, the novel RDMA implementations disclosed here can avoid buffer copy overhead and therefore can eliminate TCP protocol processing on the application server, which provides better application performance. Similarly to client connections, in one embodiment of the invention, the APS 2000 can accept server to client traffic on a converged fabric interface, perform the necessary ISO Layer-7 processing functions and forward the traffic over one of its classic Ethernet interfaces towards the client network.

Figure 16:
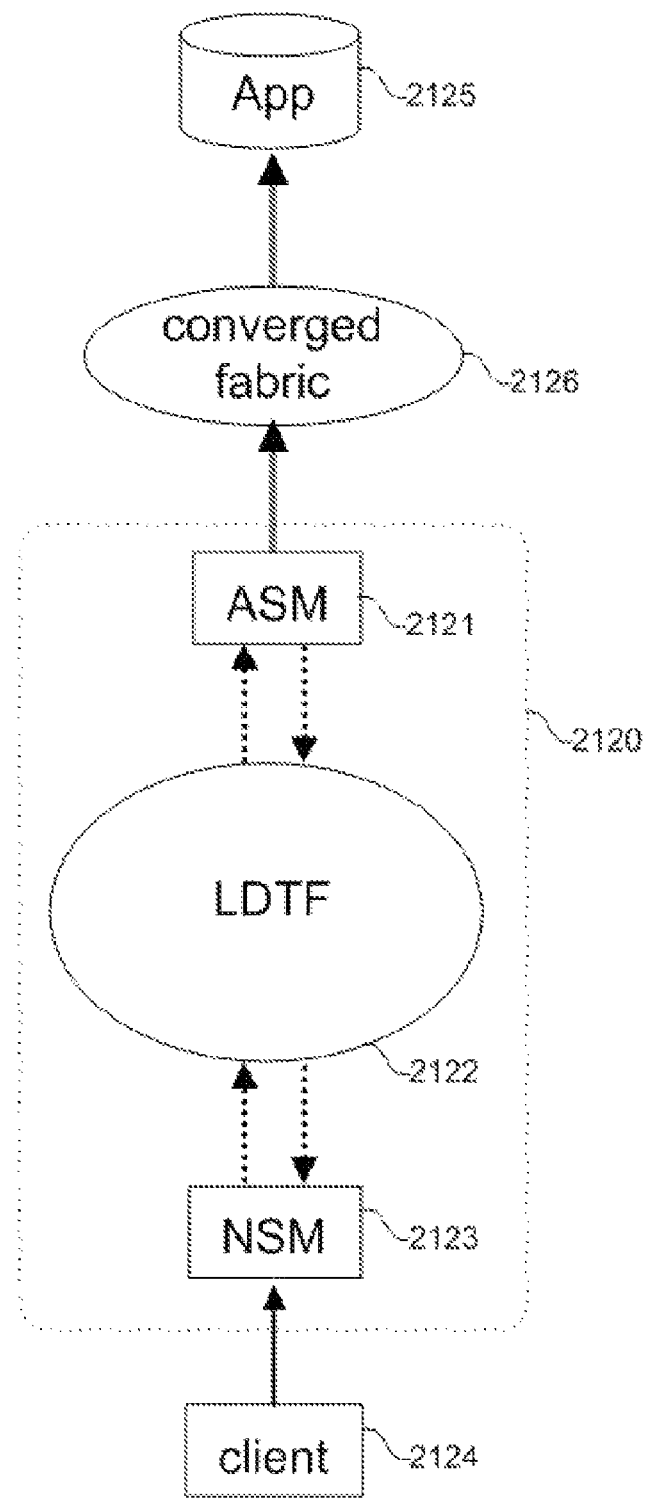
FIG. 16 is a block diagram of an ANA for converged data center fabric according to yet another embodiment of the invention.
Figure 17:
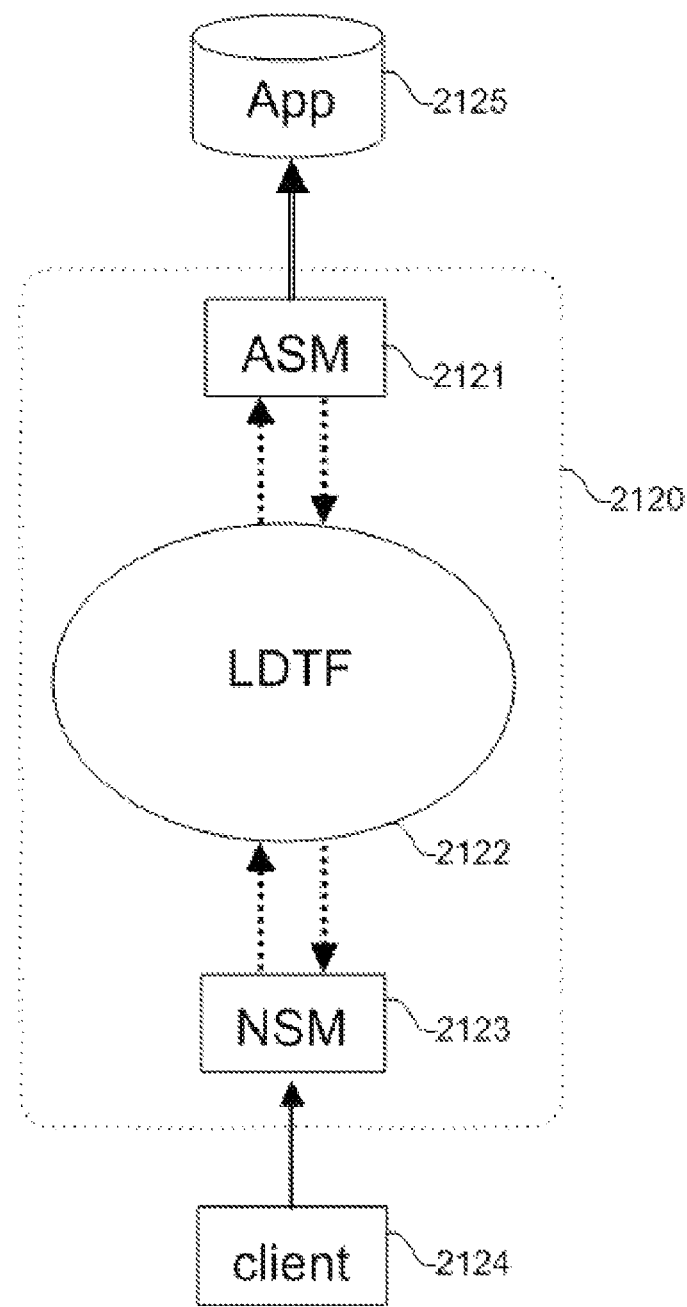
FIG. 17 is a simplified view of a block diagram of an ANA for converged data center fabric according to yet another embodiment of the invention.

As described above, the interconnect fabric within data centers is highly heterogeneous and uses many different interconnect standards, including, but not limited to Ethernet, Gigabit Ethernet, 10 Gigabit Ethernet, and Storage Area Networks (SANs). However, for cost efficiency reasons there is a high likelihood that the interconnect fabric within data centers eventually will converge into one single fabric that covers all aspects required and that supports RDMA. For such a converged RDMA-based data center fabric, one embodiment of the invention is described in FIG. 16. The ANA 2120 acts as a proxy between a client 2124 and an application server 2125. The connection to client 2124 can be via Ethernet while the connection to the application server 2125 can be via RDMA-based converged data center fabric 2126. Alternatively, without limitation, the connections could be, for example, Gigabit Ethernet or 10 Gigabit Ethernet, respectively, or any other connection known to one of skill in the art. Incoming connections from the client 2124 are terminated in a NSM 2123 and are transformed into a data stream. This data stream is transported via LDTF 2122 to the ASM 2121 for further ISO Layer-7 processing. The result of ISO Layer-7 processing done by ASM 2121 is then transported—still as a data stream—via RDMA directly to the application server 2125. Connections which originate from the application server 2125 obviously can be handled similarly. FIG. 17 shows a simplified view of the ANA 2120 connected to the application server 2125 via a converged fabric where the explicit node for the converged fabric 2126 has been omitted for the sake of simplicity.

All concepts and the various embodiments of the inventions described herein are equally applicable to cases where application servers are connected via classical Ethernet or via converged data center fabric, or via any other connection means known to one of skill in the art.

2.3 Triangulated Authorization

The novel approach described herein, which in one embodiment of the invention is the APS 2000 of FIG. 2, provides attribute-based authorization based on Triangulated Identity (for example, based on user, network/environment, protocol and content/resource attributes) to control access to application resources. Both policy decision point (PDP) and policy enforcement point (PEP) are centralized in the network to provide a policy-driven, standards-based and granular authorization enforcement that is non-invasive to applications. It complements network access control in that network access control protects the network via client-side (in-building) deployment whereas the APS 2000 can be used to protect applications for both client-to-server and server-to-server sessions via data center-side deployment. Network access control ensures only that the proper client with appropriate host integrity gets access to the network, where as the APS 2000 of this approach ensures that the client is restricted to legitimate use once he/she is on the network. Thus a client (a user or machine) having access to a given LAN no longer gets automatic access to LAN applications unless explicitly authorized. The novel approach described herein leverages existing enterprise identity management and policy definition infrastructure through standards-based protocols (e.g. via LDAP/AD, XACML, SAML/Kerberos). In order to apply the authorization policy to any connection/session, it is essential to identify the client originating that connection.

As described in detail in this disclosure, there are many embodiments of the invention that can be used to identify a client and to grant or reject authorization. In one embodiment of the invention, as an ANA it can be used to act as an authentication proxy for web (HTTP, for example) and file (CIFS, for example) protocols. For example, in case of a not-yet-authorized, or a known illegitimate HTTP request, the APS 2000 could send an HTTP 401 status response to a client requesting the client to provide its credentials. In another embodiment of the invention, the APS 2000 together with Windows Single-Sign-On can provide a seamless end user login experience in active directory (AD) environments. In yet another embodiment of the invention, the APS 2000 can interact with a network gateway and provide the username credentials for seamless user login.

Various other embodiments of the invention can be used as an LDAP Proxy, for snooping of AD/RADIUS transactions, etc. In all these cases, this approach may maintain an IP address to user-id mapping, though such mapping cannot be solely relied on, because of the possibility of source IP address spoofing. When the Transparent Secure Transport functionality of this approach is enabled, IP spoofing can be made impossible—a major security benefit that no other approach known in the art can support—because integrity of the packet is checked making sure that the appropriate client is guaranteed to have generated the given IP packet.

2.4 Transparent Secure Transport Based on Policies

For end-to-end protection, one embodiment of the invention can provide encrypted Transparent Secure Transport for client sessions without breaking existing ISO Layer-2 to ISO Layer-4 services. Because the primary target of this function is to provide data privacy for internal communication, it is important to keep visibility to network headers so that network operators can continue to use traditional traffic monitoring and protocol analysis tools. Also this approach allows the Transparent Secure Transport function to co-exist with existing network layer services such as access control lists (ACL) and Quality of Service (QOS). The Transparent Secure Transport functionality allows creation of resource enclaves with different levels of security. For example, all sessions destined to high-security enclaves would always be encrypted while sessions destined to medium-security enclaves would be cryptographically authenticated only. Like the Triangulated Authorization service support, the Transparent Secure Transport service of our approach is non-invasive to application resources.

Referring back to FIG. 2, which illustrates one embodiment of the invention where both the front-end connection between the client 2001 and the APS 2000 can utilize Transparent Secure Transport 2006 and the back-end connection between the APS 2000 and the application server 2005 can use Transparent Secure Transport 2007. Application resources can be segmented in multiple security zones based on the sensitivity of the data transmitted.

Different security zones can be created with different levels of security based on policies. For example, encryption and integrity checks may be used for very sensitive data. In this case the payload in the each packet is encrypted and an integrity code (for example, a Message Authentication Code) is added to make sure there is no tampering with the encrypted data in between. For less sensitive data, only integrity codes may be added to each packet to make sure no one tampers with the data in between; however, the data itself is not encrypted.

Figure 18:
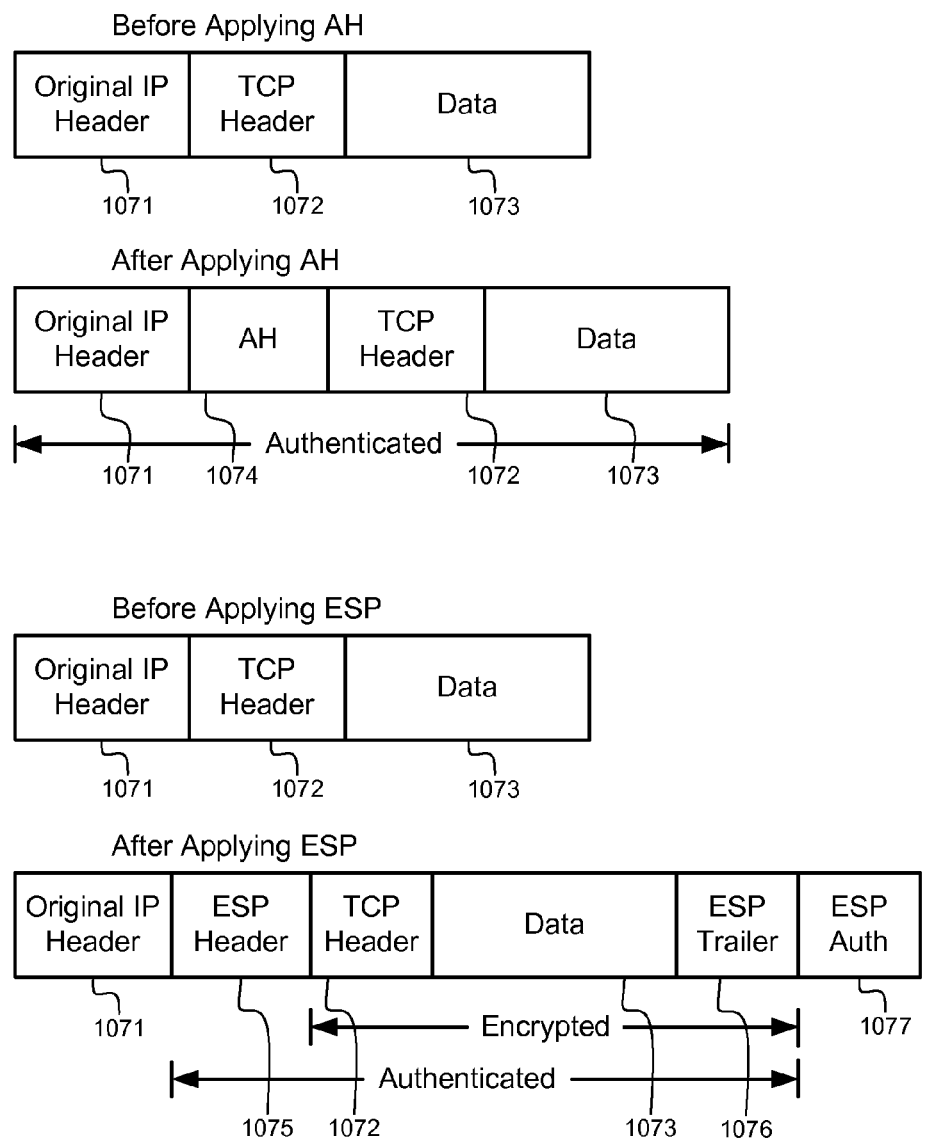
FIG. 18 illustrates TCP/IP packet in IPSec Transport Mode.
Figure 19:
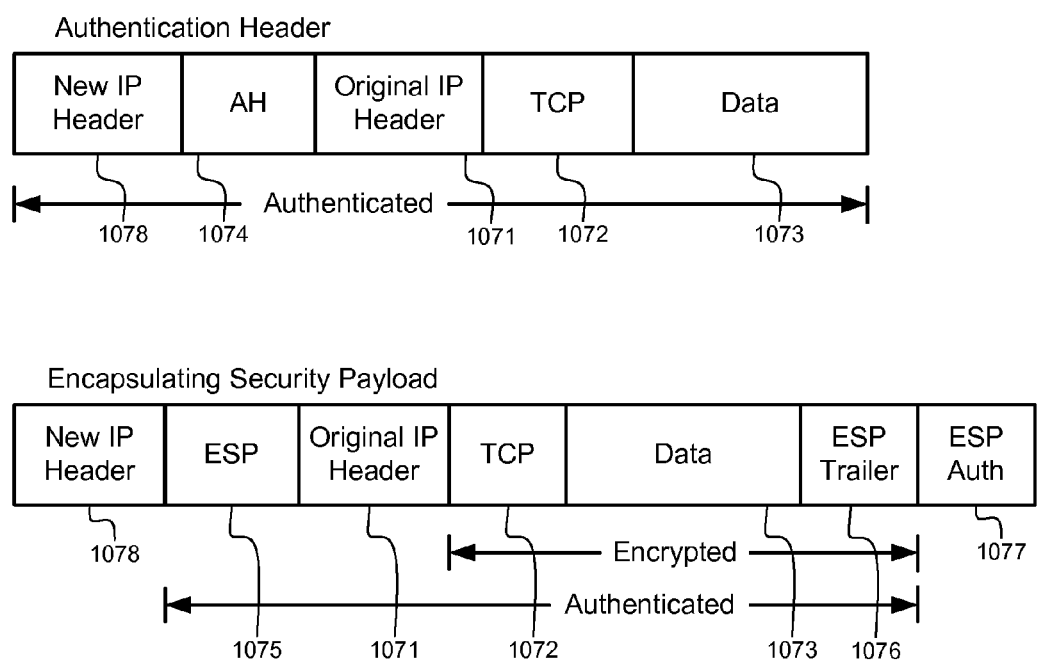
FIG. 19 illustrates TCP/IP packet in IPSec Tunneling Mode.

The Transparent Secure Transport of this approach, for example, Transparent Secure Transport 2006 or Transparent Secure Transport 2007, are transparent to existing ISO Layer-4 services, unlike other approaches known in the art such as IPSec or SSL-based VPN. For example, as is illustrated in FIG. 18, a packet, which is transported via IPSec's Transport Mode, will have its TCP header 1072 encrypted. As is shown in FIG. 19 a packet comprising an Original IP header 1071, a TCP header 1072 and data 1073, which is transported via IPSec's Tunneling Mode will not only have the TCP header 1072 but also have the Original IP header 1071 encrypted. In both cases this prevents existing ISO Layer-4 services from analyzing such network traffic because the original IP header and the TCP header are not visible anymore during such secure transport.

2.5 Virtual Directory Infrastructure

Figure 20:
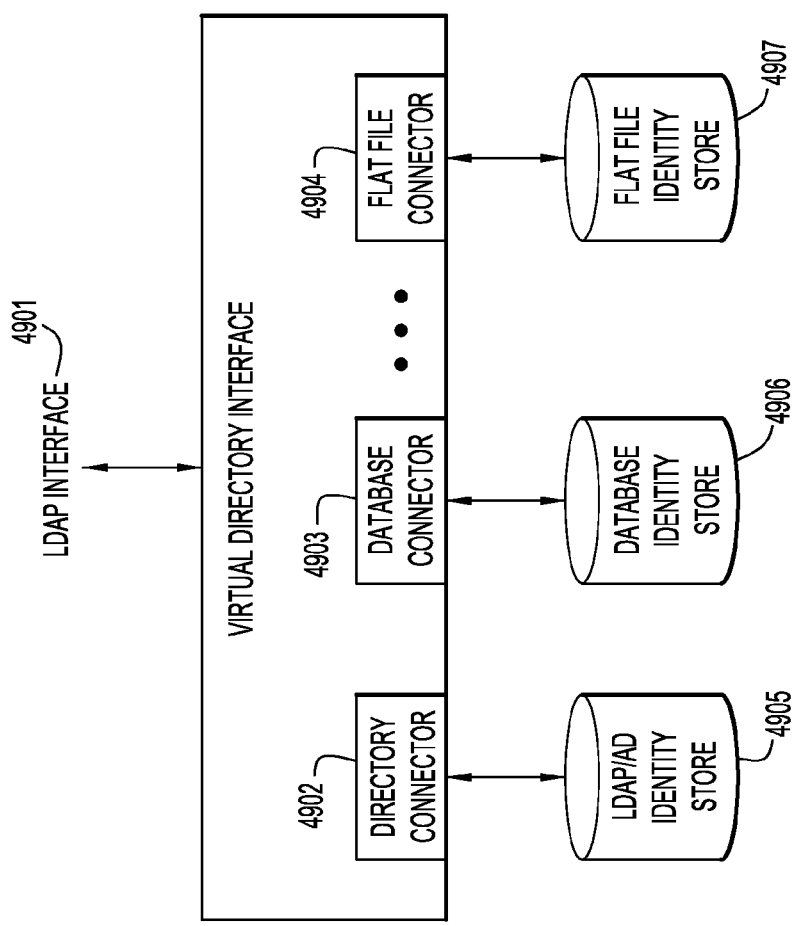
FIG. 20 is a block diagram of a Virtual Directory Infrastructure system for Triangulated Authorization according to another embodiment of the invention.

In one embodiment of the invention, for example as the APS 2000 of FIG. 2, the approach comprises techniques to utilize Virtual Directory Infrastructure. The Virtual Directory Infrastructure concepts of this approach are illustrated in FIG. 20. The Virtual Directory Infrastructure 4900 hides the complexity of the different protocols and the different formats by providing a common interface, for example the LDAP interface 4901, on one end and translating to the native protocols and formats of various identity stores, for example of identity store 4905 and identity store 4906, on the other end. The translation is done via special connectors, for example a Directory Connector 4902, or a Database Connector 4903. Providing this abstraction also helps to integrate emerging formats of identity stores into an enterprise network solution. When a new kind of identity store, for example, the Flat file Identity Store 4907 with a new format needs to be integrated, the Virtual Directory Infrastructure 4900 can be extended by adding a new connector (in this case the Flat file Connector 4904) which translates to the protocol of the new identity store.

Virtual Directory Infrastructure can provide real-time access to the existing identity stores without moving the data out of the original repository. Real-time access permits the data in the underlying stores to be quickly accessed, without requiring batch conversions of the repository data in advance. This has the advantage of maintaining the consistent identity information i.e., the modifications done in the identity store will take effect immediately. However, if the information changes rarely, then the Virtual Directory Infrastructure could be configured to cache the identity information so that it does not need to read from the identity store each time a request is made, and hence it can avoid the costly operation of translating between LDAP requests and the native protocols used by the identity repositories. The Virtual Directory Infrastructure can act as a single access point for retrieving or updating data in multiple data repositories. For example, the Virtual Directory Infrastructure can logically represent information from a number of disparate directories, databases, and other data repositories in a virtual directory tree. Various users and applications can get different views of the information, based on their access rights, which helps to control who can access/modify which identity information. The Virtual Directory Infrastructure can also provide multitude of other features as described below:

Dynamic Join: One of the main tasks of Virtual Directory Infrastructure is to act as a single access point where information from a large number of identity repositories need to be retrieved. Many times, there is no one-to-one correspondence between the information needed and the amount of information stored in the back-end repositories. A common situation is that the information is scattered over several data repositories. It is desirable therefore to dynamically join data sets from several repositories before the result is returned. The Virtual Directory Infrastructure can provide such a Dynamic Join function.

Multi-Search: In the case of Multi-Search, Virtual Directory Infrastructure submits the search request to all (or to a defined subset) of the available repositories. The Virtual Directory Infrastructure can have the capability to either return the first match found, or all the matching entries from all defined repositories.

Schema adaptations: Virtual Directory Infrastructure can overcome the schema differences between the incoming requests and the data sources by mapping the attribute names in the back-end data sources to the attribute names used in the incoming LDAP requests.

Attribute value modification: In many cases it may be necessary to change the actual attribute value being returned in the response. For example, changing the sequence of the surname and given name in the common name. The Virtual Directory Infrastructure can provide such attribute value modification.

3. FUNCTIONAL LEVEL DETAILS

3.1 LDTF

One embodiment of the invention described herein is a system for access control in enterprise networking. FIG. 15 shows how transport protocol connections can be terminated in one network appliance in a centralized manner, and how the different computational complexities of lower network layer processing and higher network layer processing can be addressed by splitting the network processing into two separate processing domains. A LDTF, such as the LDTF 2102 can be used for the inter-process communication between those domains.

Figure 21:
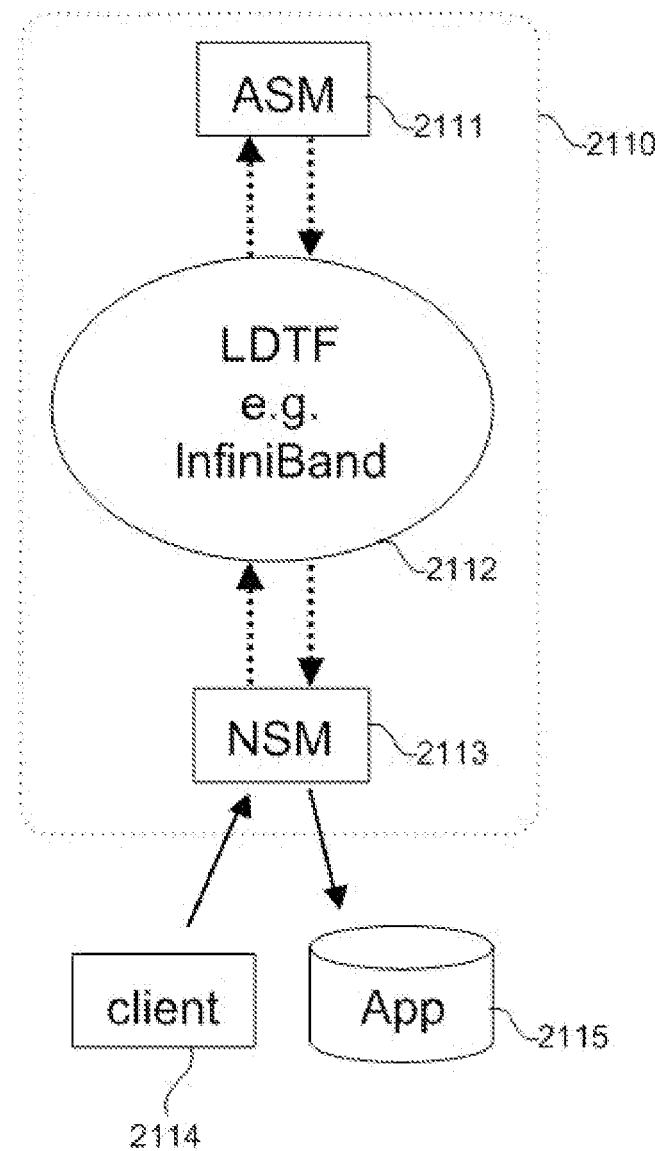
FIG. 21 is a block diagram of an ANA based on IB according to another embodiment of the invention.
Figure 22:
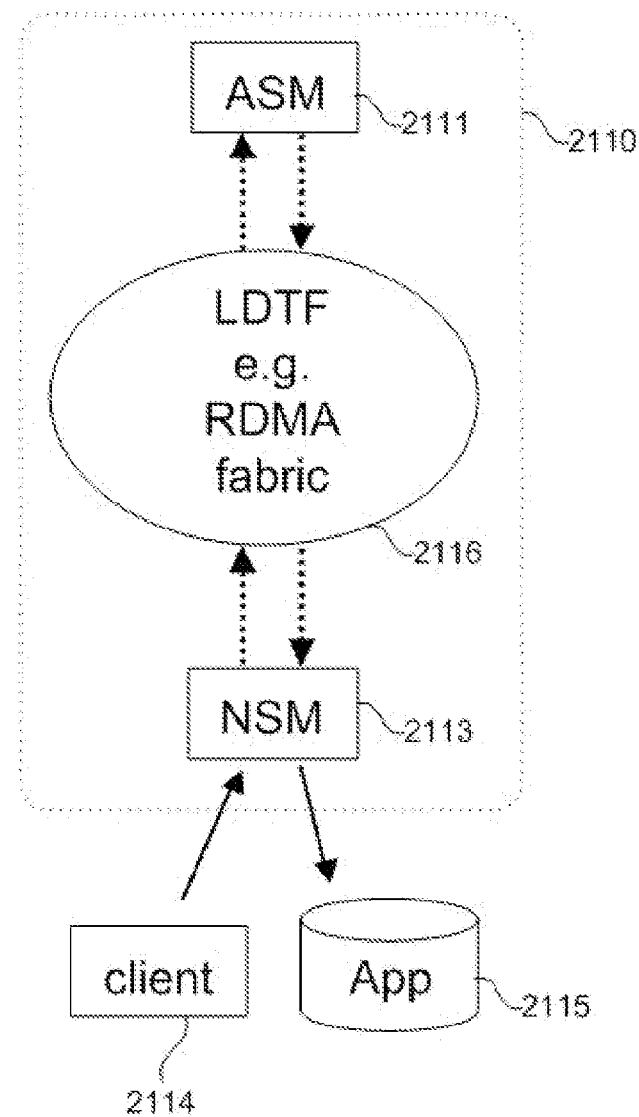
FIG. 22 is a block diagram of an ANA based on LDTF according to another embodiment of the invention.

In one embodiment of the invention, the LDTF is implemented using the IB point-to-point switch fabric architecture. This embodiment is shown in FIG. 21. The ANA 2110, which can be the ANA 2100 of FIG. 15, acts as a proxy between a client 2114 and the application server 2115. Incoming connections from the client 2114 are terminated in the NSM 2113 and are transformed into a data stream. This data stream can, for example, without limitation, be transported via the IB fabric 2112. In one other embodiment of the invention, the LDTF is implemented using an RDMA-capable interconnect fabric such as fabric 2116, as it is described in FIG. 22. In further embodiments of the invention, it is contemplated that other LDTFs may be used as interconnect fabrics, for example, without limitation, iWARP and other interconnect fabrics such as are known or may become known to one of ordinary skill in the art.

This can be done by PDU processing and reassembling the payload of the PDUs into their corresponding data stream. This data stream is transported via IB fabric 2112 to the ASM 2111 for further ISO Layer-7 processing. The result of ISO Layer-7 processing done by ASM 2111 is then transported back—still as a data stream—again via the IB fabric 2112 to the NSM 2113. The NSM 2113 then transforms the data stream into PDUs and sends the PDUs to the application server 2115 using the appropriate transport protocol. Connections which originate from the application server 2115 can be handled similarly.

In addition, in order to support converged data center fabric the ANA 2120 of FIG. 17 can be to accomplish this. In such a case, the LDTF 2122 of FIG. 17 is the IB fabric 2112 of FIG. 21. In yet another embodiment of the invention, the LDTF, for example LDTF 2102 of FIG. 15 or LDTF 2122 of FIG. 17, can be implemented via Data Center Ethernet, which is also a lossless, low-latency, high-bandwidth, RDMA-capable fabric. In yet another embodiment of the invention, the LDTF, for example LDTF 2102 of FIG. 15 or LDTF 2122 of FIG. 17, can be implemented via iWARP, which supports RDMA via TCP.

One benefit of the present approach is the overall reduction of latency in the communication link between clients and application servers. Yet another benefit is that the approach can be scaled with various, specialized, dedicated processing modules.

3.2 Use of RDMA to Provide High-Availability

Yet another benefit of the above approach is that it can be used to build ANAs with high-availability and zero-click fail-over behavior. High-availability with zero-click fail-over can be achieved by having redundant peer ANAs maintain a consistent redundant state with other peer ANAs. This means that all relevant state information including the data stream information is replicated and synchronized among the redundant peer ANAs. When ANAs behave as a high-speed proxy, fault-tolerant transport protocol functionality is required, which includes maintaining an active backup transport protocol stack, and keeping track of states of the transport protocol connection. A redundant peer ANA which acts as a backup for another ANA is able to take over the other ANA's protocol connection completely transparent to clients. The primary ANA's and the backup ANA's transport protocol stack each see the same client-to-server stream which means that both the primary and the backup ANA independently process the transport protocol state but only the current primary ANA responds to client-server requests.

Figure 4:
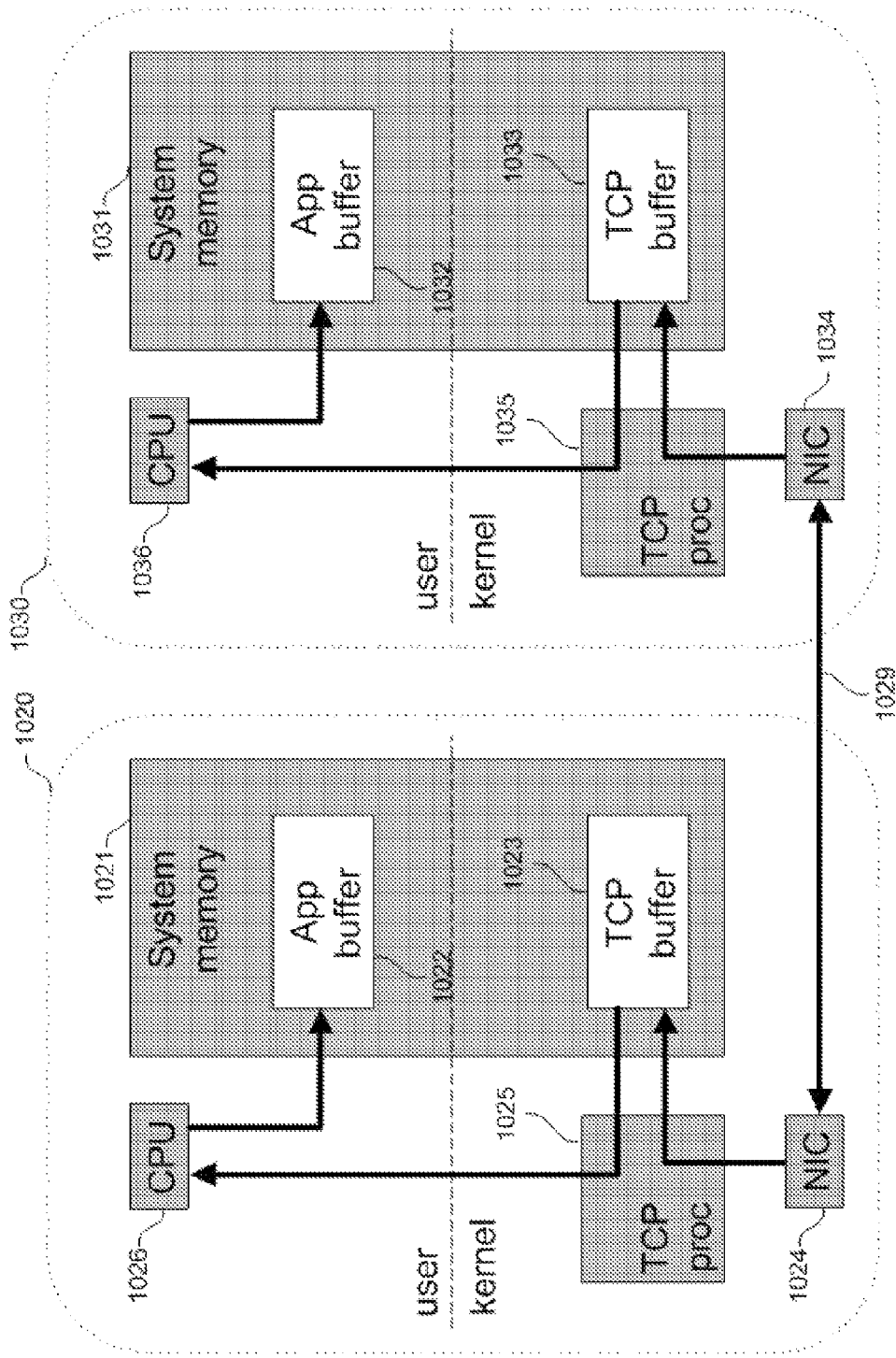
FIG. 4 illustrates a traditional high-availability network appliance setup.
Figure 5:
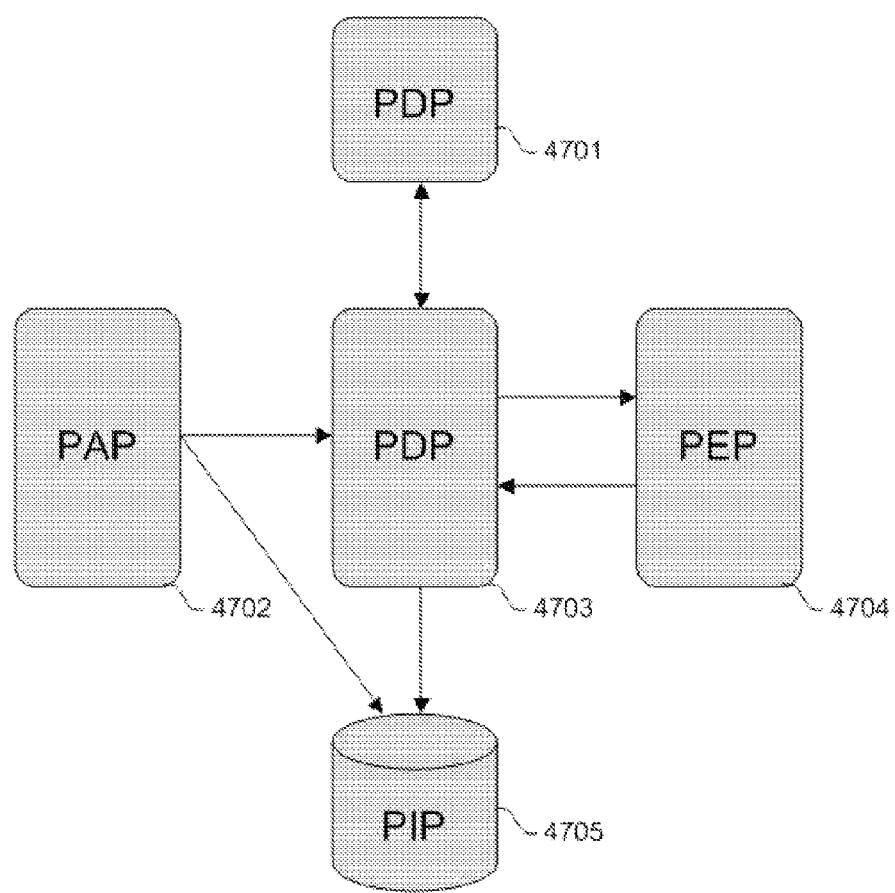
FIG. 5 is a block diagram of a system and method for authorization.

To facilitate state and data replication among redundant peer ANAs it is important that peer ANAs have visibility into their peers' memory. A lossless, low-latency, high-bandwidth, RDMA-capable interconnect fabric, which can be the LDTF 2102 of FIG. 15, the IB fabric 2112 of FIG. 21, or the LDTF 2122 of FIG. 17 can also be used for visibility into peer memory. This approach overcomes the main drawback of today's solutions for high-availability where visibility into peer memory comes with a significant compute (and communications) overhead, as was described above in relation to FIG. 4.

Figure 23:
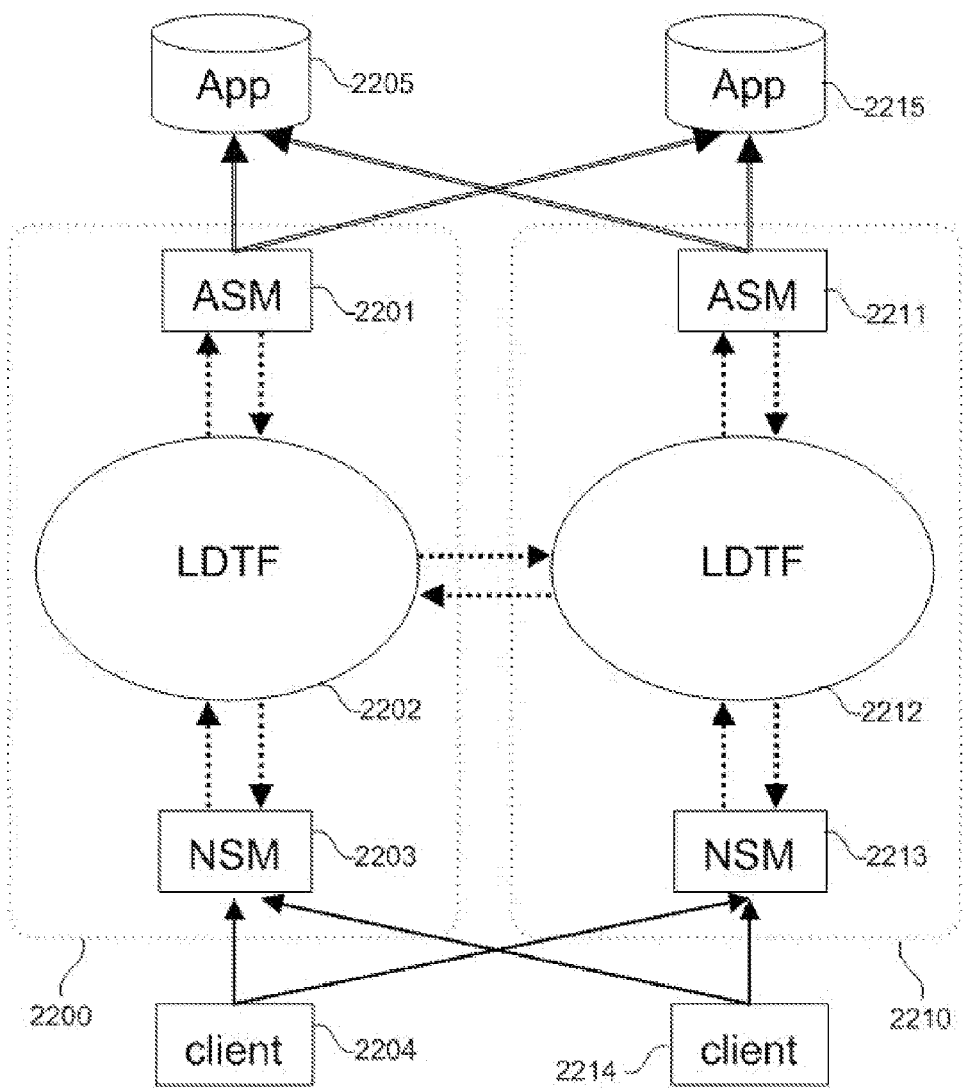
FIG. 23 is a block diagram which illustrates scalability of a ANA via multiple ANAs according to one embodiment of the invention.

FIG. 23 shows how peer memory visibility through LDTF can be achieved. In this case there are two ANAs, ANA 2200, which is dedicated to client 2204 and application server 2205, and ANA 2210, which is dedicated to client 2214 and application server 2215. High-availability can be achieved by having ANA 2200 be the backup for ANA 2210 whenever ANA 2210 fails such that ANA 2200 will also service client 2214 and application server 2215, and by having ANA 2210 be the backup for ANA 2200, similarly. Both ANAs 2200 and 2210 can be connected via an inter-chassis or inter-module RDMA-capable interconnect link. This link can be seen as an extension of the internal LDTF 2202 and 2212.

Each ANA ensures state redundancy its peer ANA(s). In one embodiment of the invention, NSM 2203 performs Network Service processing for client 2204 and consistently does stream replication via LDTF 2202 and LDTF 2212 to update its redundant state data in its peer's NSM 2213, and vice versa. Similarly, ASM 2201 performs ISO Layer-7 processing for application server 2205 and then replicates its ISO Layer-7 state information by updating its redundant state data in its peer's ASM 2211 via writing through LDTF 2202 and LDTF 2212 into its peer's state memory.

Figure 24:
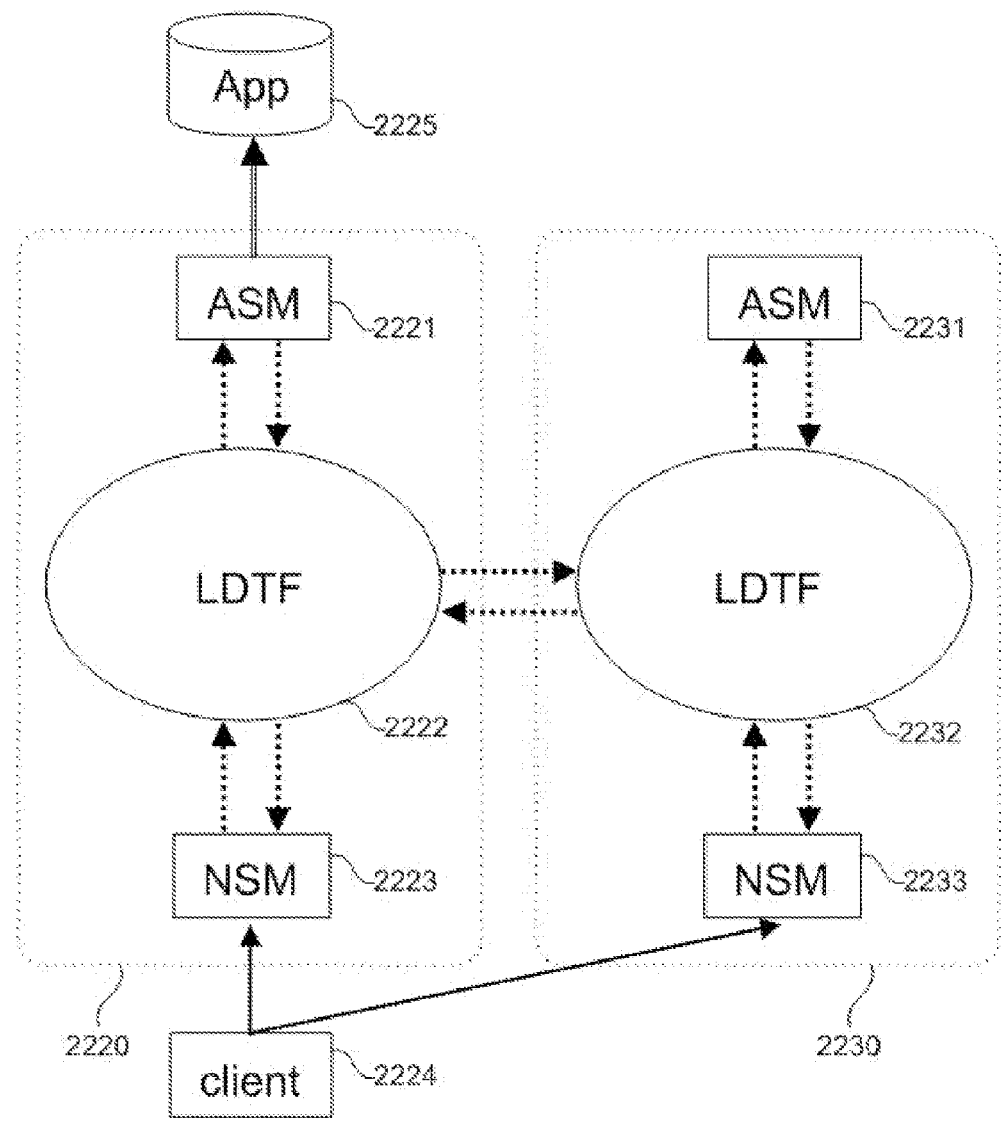
FIG. 24 is a block diagram which illustrates scalability of an ANA via multiple ANAs according to another embodiment of the invention.

FIG. 24 shows how an ANA 2220, which services a client 2224, and an application server 2225, is complemented with a backup ANA 2230. Both ANAs 2220 and 2230 can be connected via an inter-chassis or inter-module RDMA-capable interconnect link. This link can be seen as an extension of the internal LDTF 2222 and 2232. The ANA 2220 will ensure state redundancy in the backup ANA 2230. In one embodiment of the invention, NSM 2223 performs Network Service processing for client 2224 and consistently does stream replication via LDTF 2222 and LDTF 2232 to update its redundant state data in its backup's NSM 2233. Similarly, ASM 2221 performs ISO Layer-7 processing for application server 2225 and then replicates its ISO Layer-7 state information by updating its redundant state data in its backup's ASM 2231 via writing through LDTF 2222 and LDTF 2232 into its backup's state memory.

Figure 25:
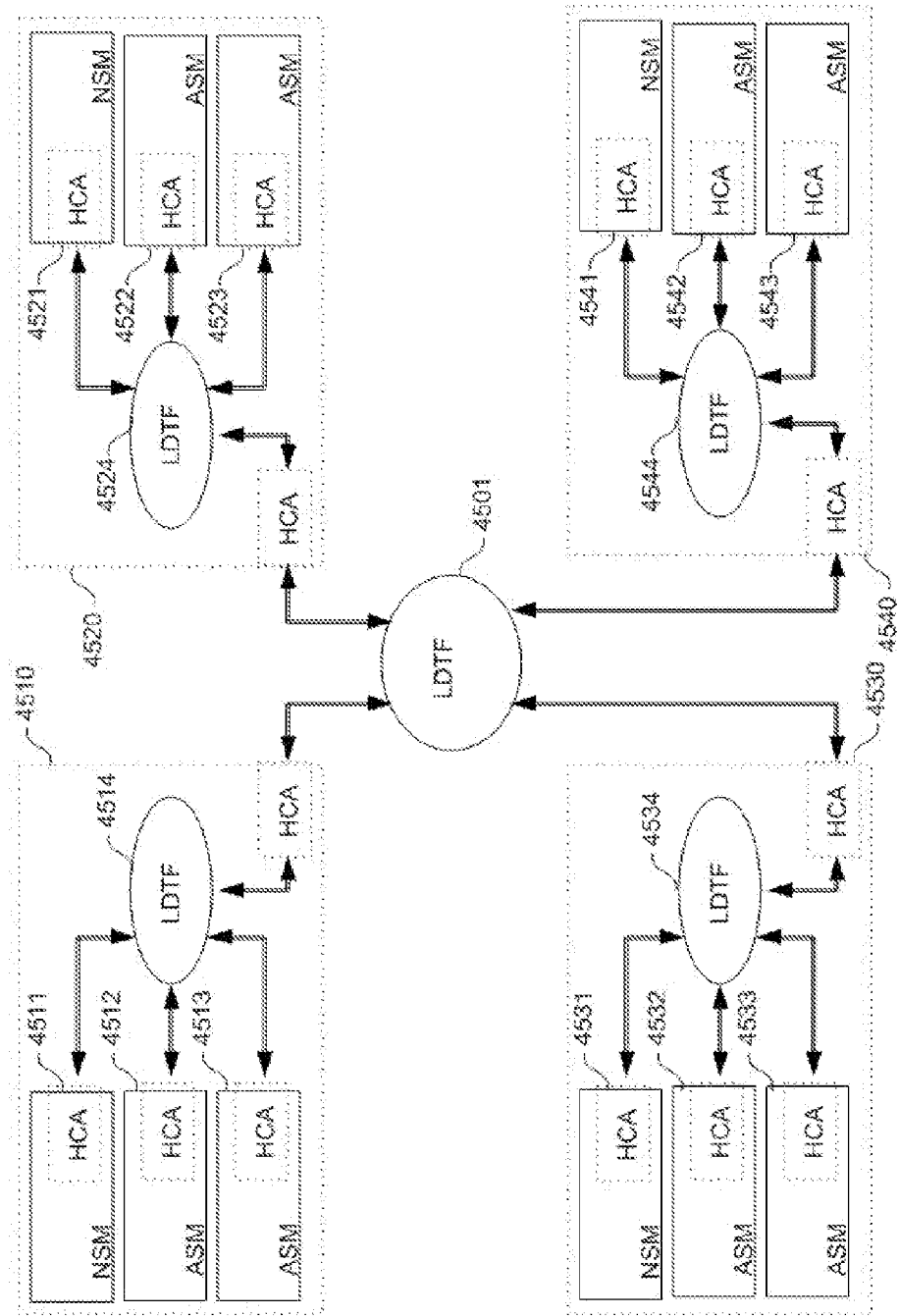
FIG. 25 is a block diagram of a high-availability system setup for an ANA according to one embodiment of the invention.

More than two ANAs such as the two ANAs 2200 and 2210 in FIG. 23 or ANAs 2220 and 2230 in FIG. 25 can be used to increase an enterprise network's reliability and availability even further. This is shown in FIG. 25 where in one exemplary setup four ANAs, 4510, 4520, 4530, 4540 are used in combination to provide scalability for high bandwidth performance as well as high-availability via redundancy. Any of ANAs 4510, 4520, 4530, 4540 can, for example, be the ANA 2100 of FIG. 15, or the APS 2000 of FIGS. 2 and 18. Each ANA itself provides a scalable and highly-available setup. For example, ANA 4510 comprises one NSM 4511 and two ASMs 4512 and 4513, all connected via LDTF 4514. For example, ANA 4520 comprises one NSM 4521 and two ASMs 4522 and 4523, all connected via LDTF 4524. For example, ANA 4530 comprises one NSM 4531 and two ASMs 4532 and 4533, all connected via so-called intra-ANA LDTF 4534. For example, ANA 4540 comprises one NSM 4541 and two ASMs 4542 and 4543, all connected via LDTF 4544. At the same time the LDTF connectivity is extended via so-called inter-ANA LDTF 4501. As a result, each ASM (of any ANA) can be made a backup ASM for zero or more other ASMs (again from any other ANA), for example ASM 4512 can operate as a backup ANA for ASM 4543, or as a backup ANA for ASM 4513.

3.3 Highly Scalable Architecture for Application-Layer Service Using LDTF

One key aspect of the invention described herein is the approach to keep the communication in separate planes: For example, a Network Service plane, an Application Service plane and a Management Service plane. The fact that the Network Service plane is separate from the Application Service plane is also reflected by splitting the network protocol processing into two or more domains, for example into Network Service processing and Application Service processing, as it is, for example, described in FIG. 15. This offers additional options for optimizing the performance of this approach and to make it scale better to networking and availability demands.

One option is that at the Network Service plane a processing unit for packet order work processing can be deployed. Then the packets of a particular connection can be handled by any processing element of a multi-processing architecture without the need for software locks. The packets can then be processed in multiple stages, which provide a higher degree of concurrency. Similarly, at the Application Service plane a processing unit for transaction order work processing can be deployed and, for example, implemented in software. Then the transactions of a particular connection can be handled by any processing element of a multi-processing architecture without the need for software locks. Therefore, each transaction can then be processed in a pipelined fashion which serializes the application data processing and increases the level of concurrency for ISO Layer-7 processing, which again further increases the compute efficiency of this approach.

Figure 26:
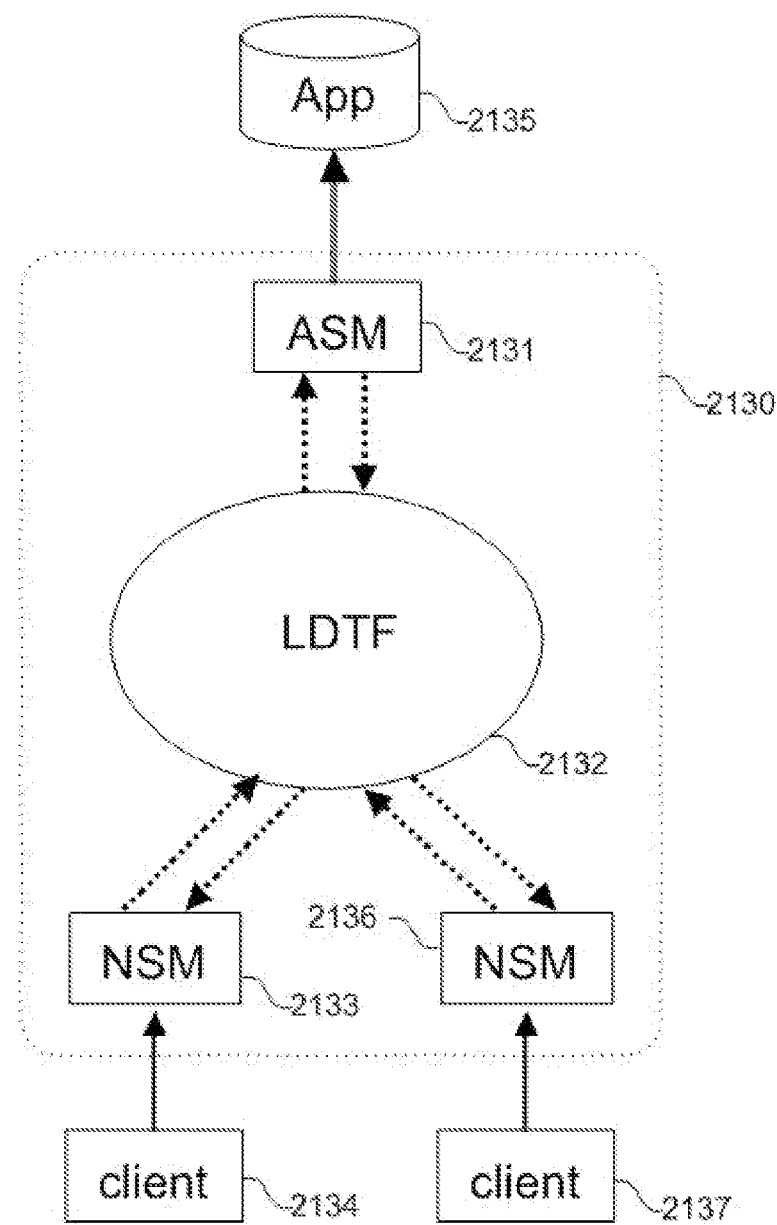
FIG. 26 is a block diagram which illustrates scalability of an ANA according to one embodiment of the invention.
Figure 27:
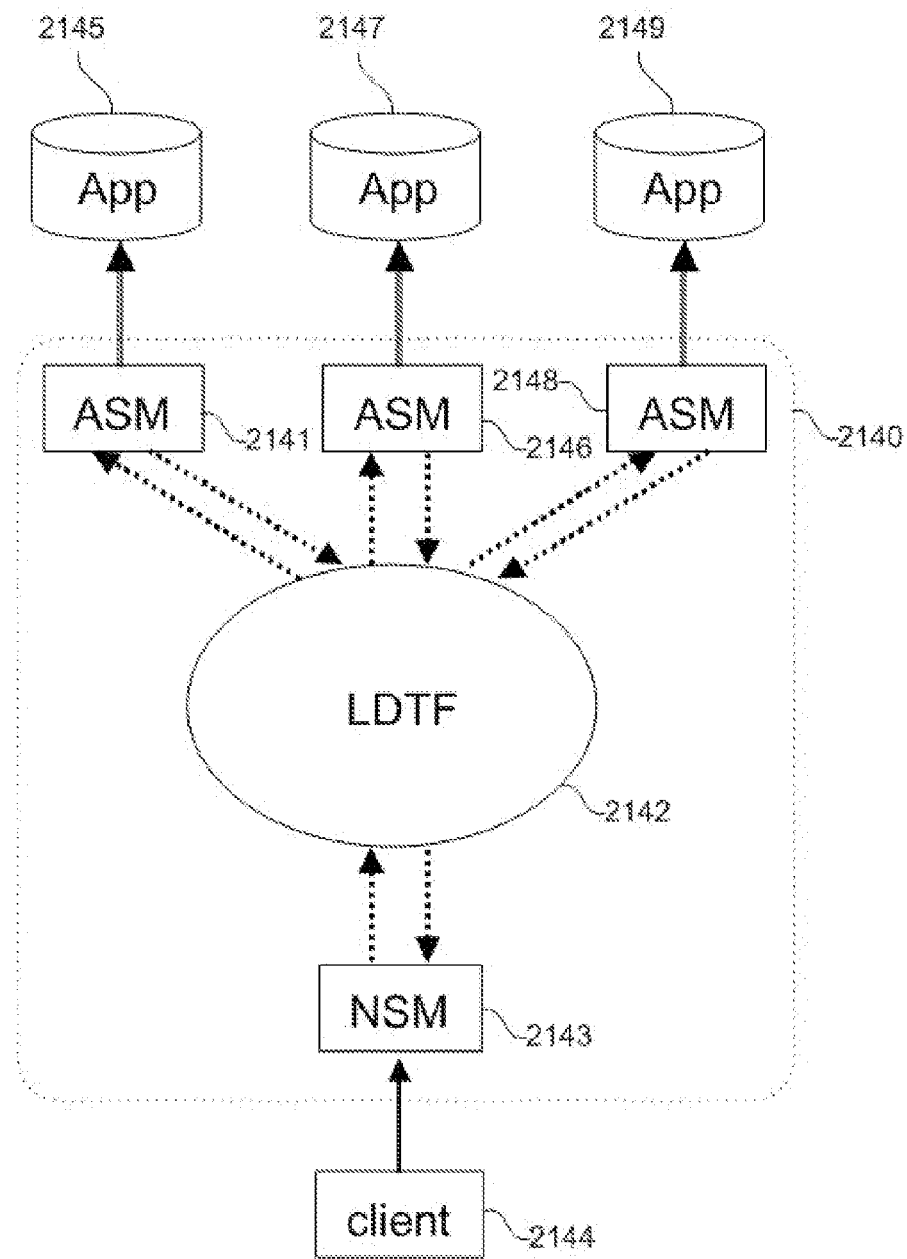
FIG. 27 is a block diagram which illustrates scalability of an ANA according to another embodiment of the invention.

At the Network Service plane various possibilities for network flow control schemes now become possible. FIG. 26 shows how two NSMs can be used to scale the ANA 2130 for an increased bandwidth demand. The NSM 2133 and the NSM 2136 each service client 2134 and client 2137 respectively therefore providing load balancing options. Both NSM 2133 and NSM 2136 reassemble the PDUs to transform the PDU payload into a data stream. Both NSMs are connected to LDTF 2132 to forward the data stream to ASM 2131 for ISO Layer-7 processing before it gets sent to the application server 2135. One advantage of balancing the transport protocol traffic over two—or more—NSMs is to reduce latency in a client-to-server connection, for example, when compute-intensive SSL termination is done by a NSM. While FIG. 27 illustrates the case of dedicated NSMs (one for client 2134 and another NSM for client 2137—somewhat reflecting the case of a segmented network) all the two—or more—NSMs could be connected to all clients as well.

In a practical enterprise network application another performance optimization is important. Typically, one NSM can keep several ASMs busy. Therefore it makes sense not only to load balance traffic in the Network Service plane but also in the Application Service plane. Various possibilities for such optimizations exist as disclosed herein. In one embodiment of the invention, the ANA 2140 of FIG. 27 uses one NSM 2143 for communication with client 2144 and that NSM 2143 forwards the transformed data stream via LDTF 2142 to two or more "parallel" ASMs. In this example, three ASMs 2141, 2146, and 2148 are available, each dedicated to one application server, namely 2145, 2147, and 2149. Load balancing among the two or more ASMs can be done by the NSM and can, for example, depend on which application server provides the Application Service requested by the client.

Figure 28:
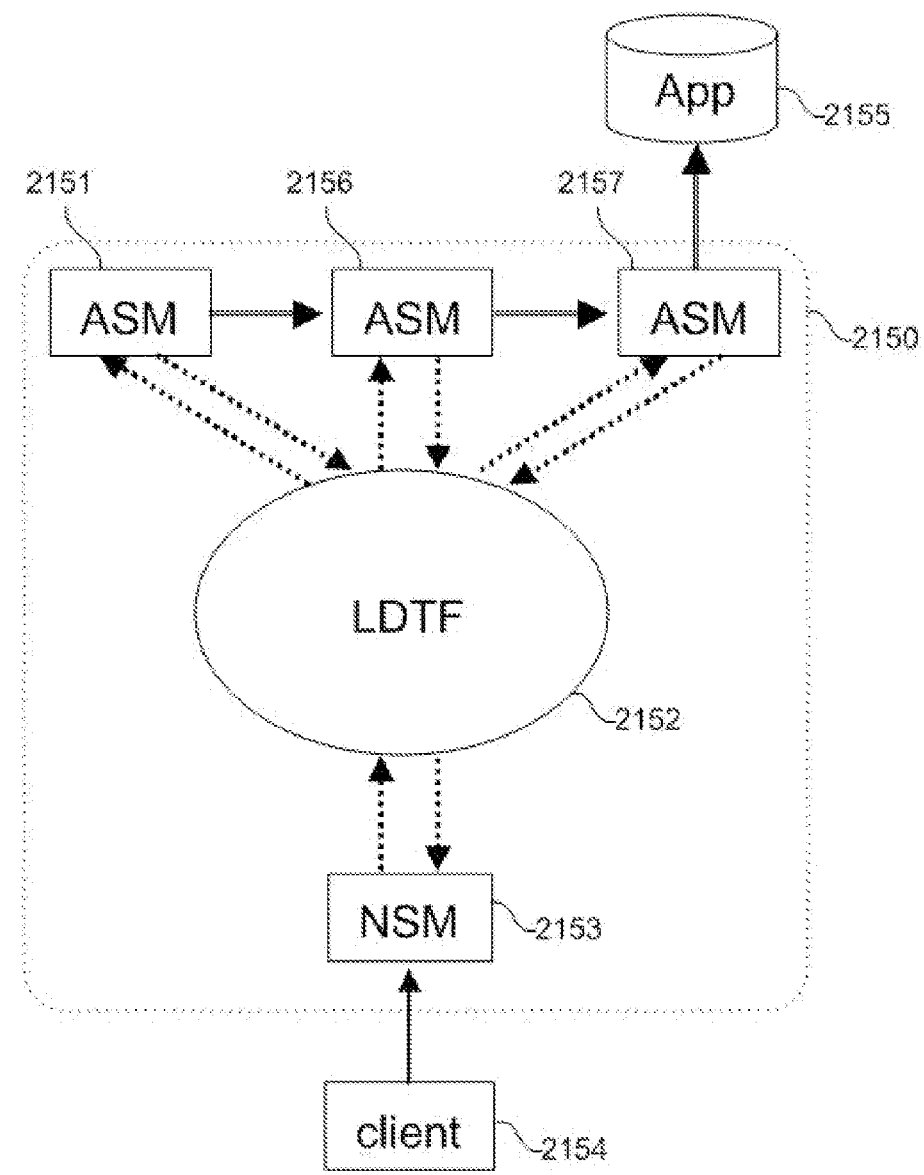
FIG. 28 is a block diagram which illustrates scalability of an ANA according to another embodiment of the invention.

FIG. 28 illustrates another option for scaling by load balancing in the Application Service plane. In another embodiment of the invention, the ANA 2150 uses one NSM 2153 for communication with client 2154 and that NSM 2153 forwards the transformed data stream via LDTF 2152 to two or more ASMs. In this example, three "pipelined" ASMs 2151, 2156, and 2157 are performing ISO Layer-7 processing in a pipelined manner: The ASM 2151 preprocesses the data stream and hands it over to ASM 2156 which performs additional ISO Layer-7 processing before it further hands the data stream over to ASM 2157 which does final ISO Layer-7 processing before the data is handed over to the application server 2155. Pipelined execution may also be done using out-of-order execution. Of course, all ASMs are connected to the LDTF 2152 which is used for efficient inter-process communication between the various ASMs. Thus, in this example, the ASMs build a logical processing chain: NSM 2153 only forwards the data stream to ASM 2151, and ASM 2157 only forwards the data to the application server 2155 via the converged data center fabric.

Figure 30:
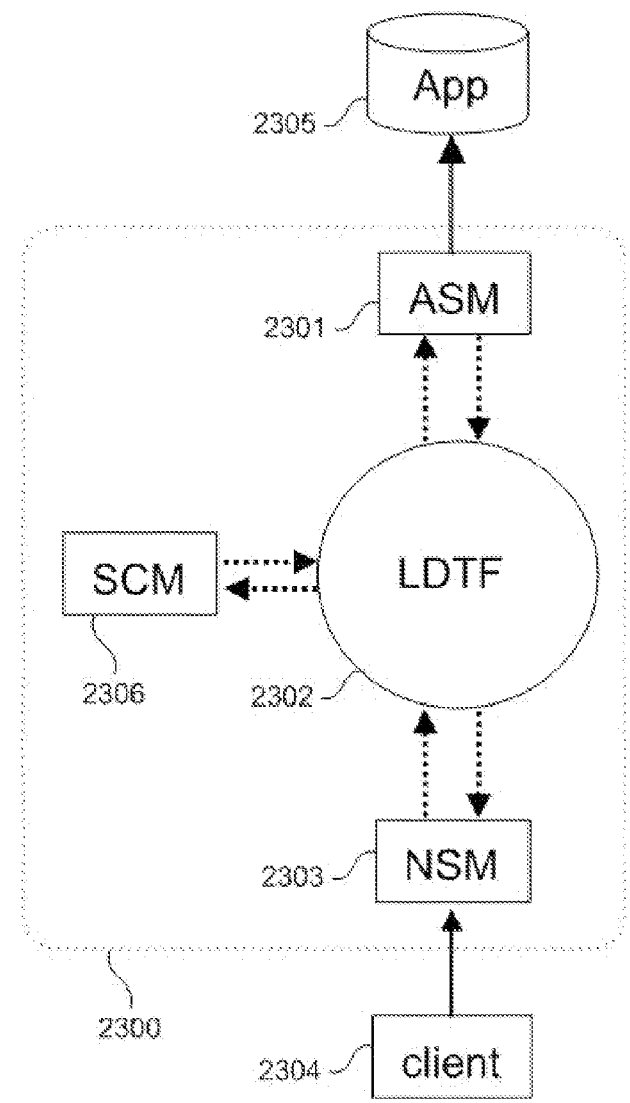
FIG. 30 is a block diagram of an ANA with a System Control Module (SCM) according to one embodiment of the invention.

Many combinations of scaling by connecting one or more NSMs and one or more ASMs are possible, all interconnected via lossless, low-latency, high-bandwidth LDTF. For example, in yet another embodiment of the invention which is illustrated in FIG. 30, a hybrid combination of "parallel" and "pipelined" ASMs is shown: The ANA 2160 uses one NSM 2163 for communication with client 2164 and that NSM 2163 forwards the transformed data stream via LDTF 2162 to two or more ASMs. One ASM 2161 performs dedicated ISO Layer-7 processing for application server 2165. Parallel to ASM 2161 three other ASMs 2166, 2167, and 2168 are pipelined to perform ISO Layer-7 processing for application server 2169.

The third plane, the Management Service plane, is a communication means for all administrative processing such as, for example, common system management functions, chassis management, power management, component audit and logging, component and system status update, as well as configuration, health monitoring and management of processing elements in network services and Application Service plane. The Management Service plane comprises System Control Modules (SCMs) which can have out-of-band connectivity (as well as in-band connectivity) to processing elements on the Network Service plane and to processing elements on the Application Service plane. Typically, software image download, configuration information, and statistics collection messages are exchanged between one or more SCMs and the rest of the system components.

FIG. 30 illustrates how SCMs can be connected to the other components. The ANA 2300, which can, for example, be the ANA 2100 of FIG. 2, behaves as a proxy for client-to-server connections and can be connected, for example, to a client 2304 and an application server 2305. The ANA 2300 can have one or more NSMs, such as NSM 2303, connected via LDTF 2302 to one or more ASMs 2301 for network processing. Also connected to the LDTF 2302 is a SCM 2306 which performs the administrative tasks. In one embodiment of the invention, IB is used as the LDTF, for example IB fabric 2112 from FIG. 21, which can support virtual lanes and a dedicated virtual lane may be reserved just for system management communication involving the SCM.

Figure 31:
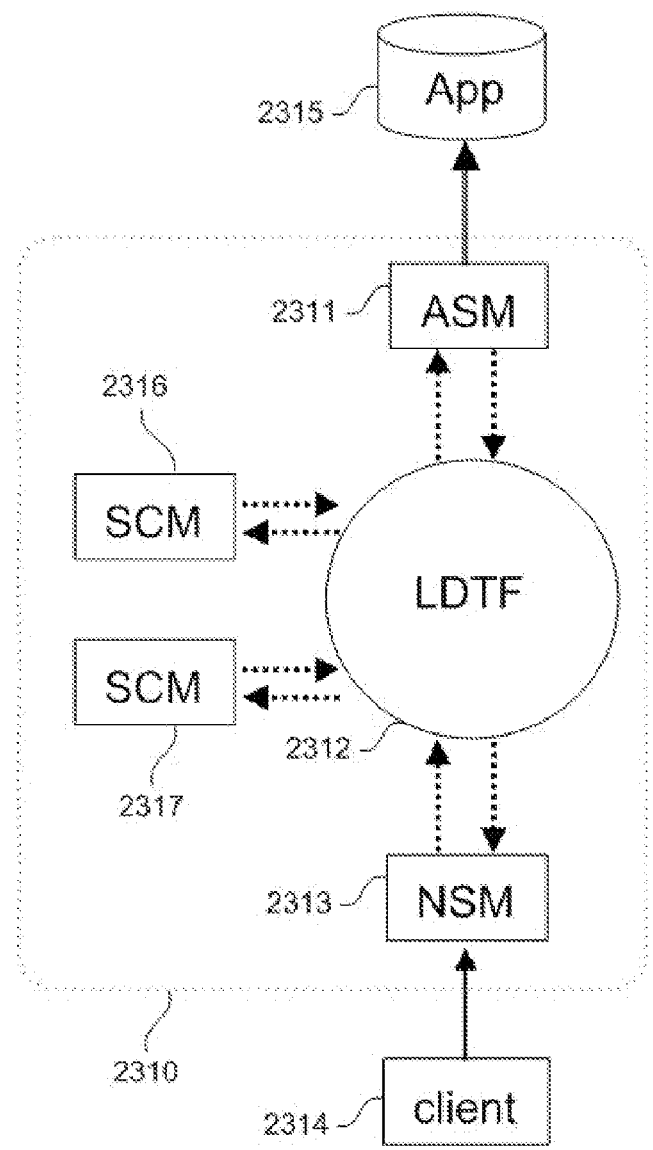
FIG. 31 is a block diagram of an ANA with two or more SCMs according to another embodiment of the invention.

For performance scaling purposes and to support high-availability, two or more SCMs can be connected to the LDTF. For example, in one embodiment of the invention, which is illustrated in FIG. 31, an ANA 2310, which behaves as a proxy for client-to-server connections and connected for network processing, for example, to a client 2314 and an application server 2315. The ANA 2310 can have one or more NSMs, such as NSM 2313, connected via LDTF 2312 to one or more ASMs, such as ASM 2311. The ANA 2310 can also have two—or more—SCMs, such as SCM 2316 and SCM 2317, also connected to LDTF 2312.

Figure 32:
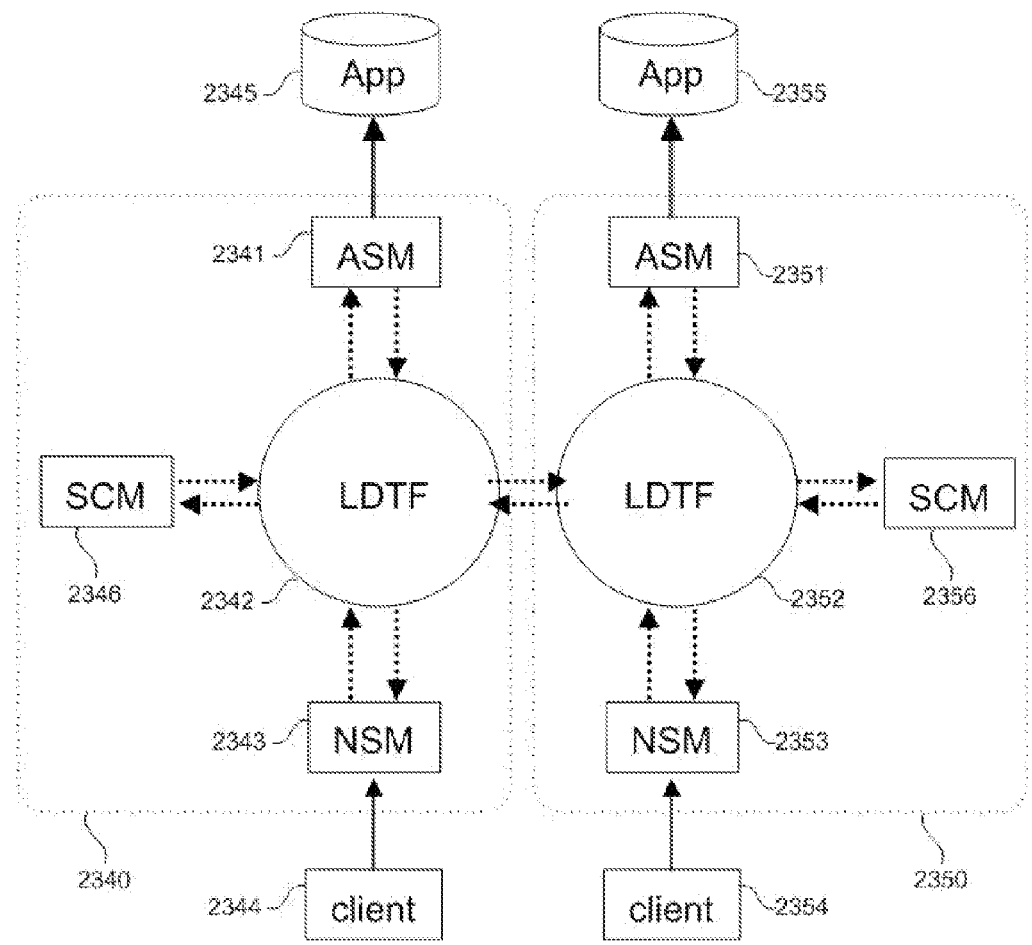
FIG. 32 is a block diagram of an ANA using two or more ANAs with a SCM according to another embodiment of the invention.
Figure 33:
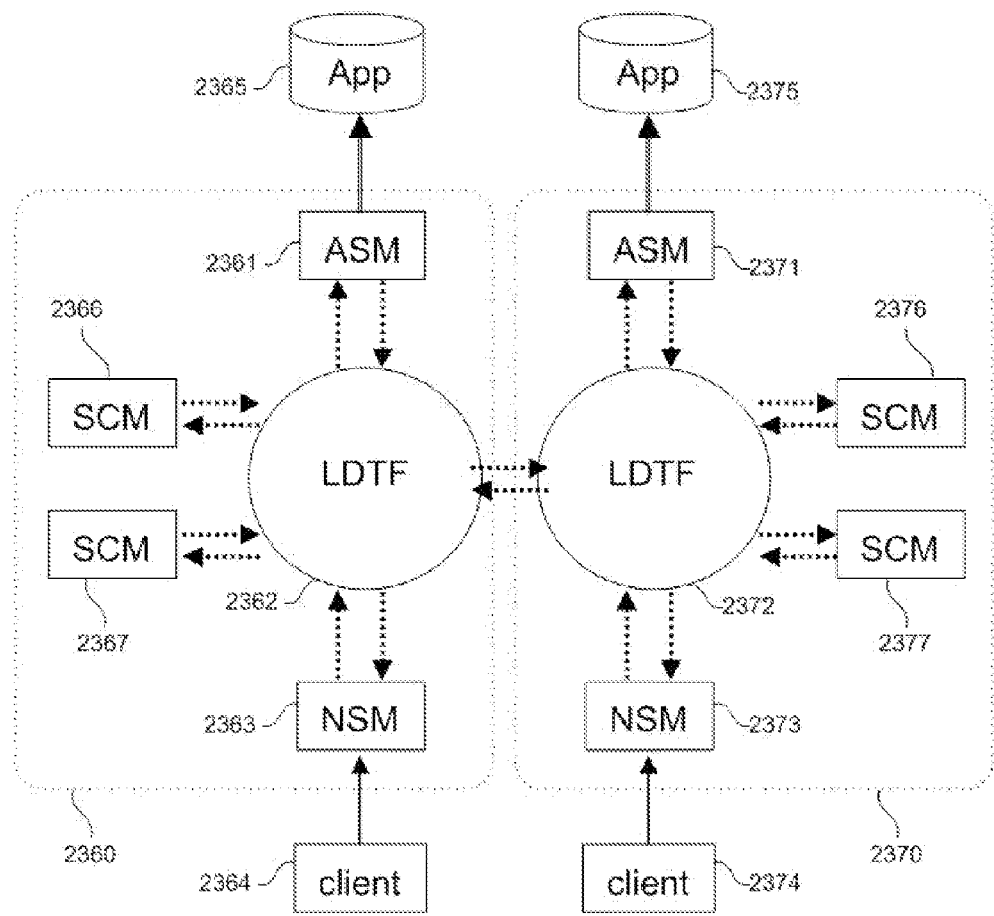
FIG. 33 is a block diagram of an ANA using two or more ANAs with two or more SCMs according to yet another embodiment of the invention.

In yet another embodiment of the invention, as is illustrated in FIG. 32, two—or more—ANAs, such as ANA 2340 and ANA 2350, can be connected via a high-availability link using LDTF. The high-availability link can be an external extension of the internal LDTFs 2342 and 2352. Each ANA can then operate as a backup ANA for one of its peers as it is described above. Similarly to NSMs and ASMs, the two—or more—SCMs can replicate their state information and update their state information in their backup ANA's SCM by writing state information into the peer's memory via the LDTF using, for example, RDMA. Similarly, in yet another embodiment of the invention, as is illustrated in FIG. 33, two—or more—ANAs, such as ANA 2360 and ANA 2370, can comprise two—or more—SCMs, such as SCM 2366 and SCM 2367, and SCM 2376 and SCM 2377, respectively.

3.3.1 L2-L5 Processing Unit

Figure 35:
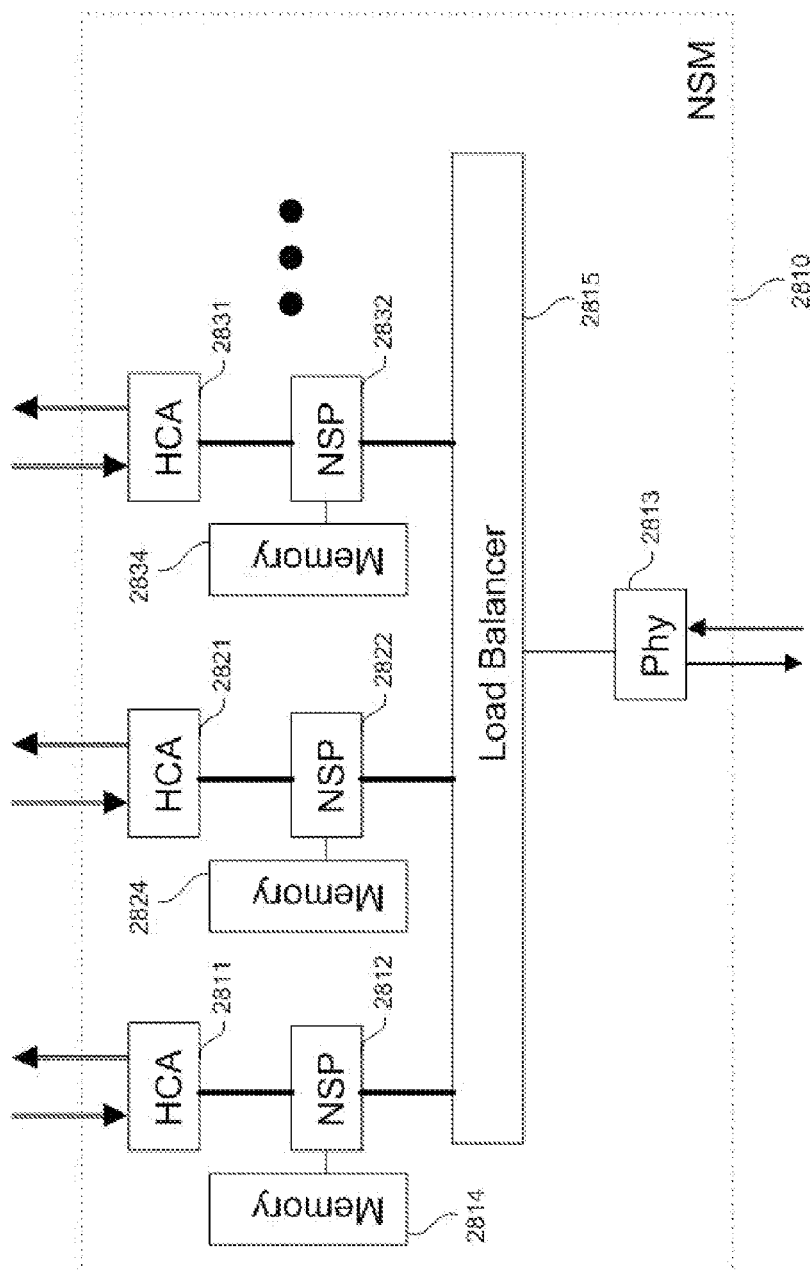
FIG. 35 is a block diagram of a NSM of an ANA according to another embodiment of the invention.

A NSM processes the lower network layers, ISO Layer-2 to ISO Layer-5. In one embodiment of the invention, such a NSM can be constructed as shown in FIG. 35. The NSM 2800 which can be, for example, the NSM 2103 in FIG. 15, comprises a host channel adapter (HCA) 2801, a network services processor (NSP) 2802, an physical network layer receiver (Phy) 2803 and memory 2804. The host channel adapter 2801 connects to the LDTF, which can be IB fabric. The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

Figure 36:
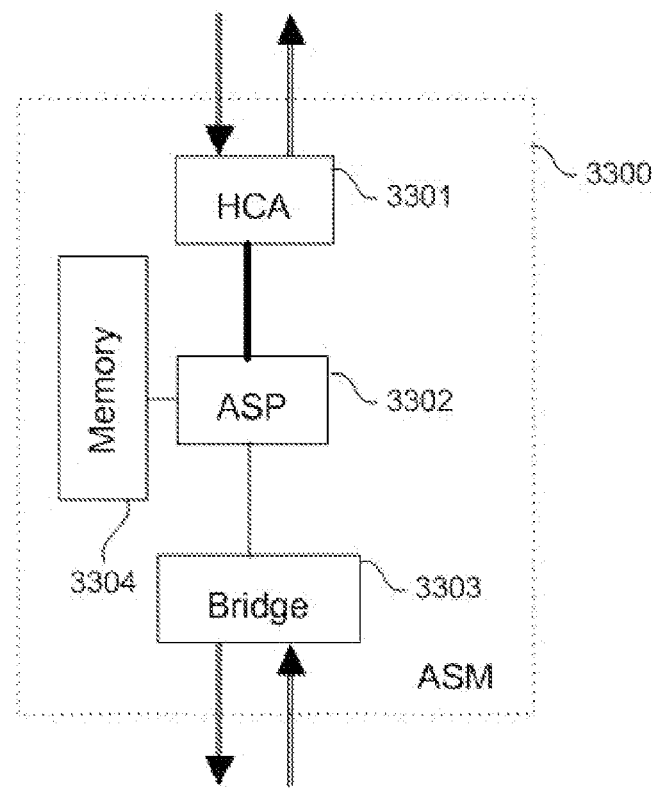
FIG. 36 is a block diagram of an Application Service Module (ASM) of an ANA according to one embodiment of the invention.

For better scalability, in one embodiment of the invention, a NSM can be a multi-processor architecture, as shown in FIG. 36. Here the NSM 2810 can comprise two—or more—NSPs, such as NSP 2812, NSP 2822, NSP 2832, each having a dedicated host channel adapter, such as host channel adapter 2811, host channel adapter 2821, and host channel adapter 2831, and dedicated memory, such as memory 2814, memory 2824, and memory 2834. A load balancer 2815 is in between the NSPs and the physical network layer receiver 2813 and balances the network load between the two—or more—NSPs. The load balancer 2815 can use common approaches known in the art to balance ingress or egress network traffic.

3.3.2 L7 Processing Unit

An ASM performs the ISO Layer-7 services, including application data processing on the data stream, which is the data stream of the transport protocol's PDU payload transformed by one or more NSMs. FIG. 36 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

Figure 37:
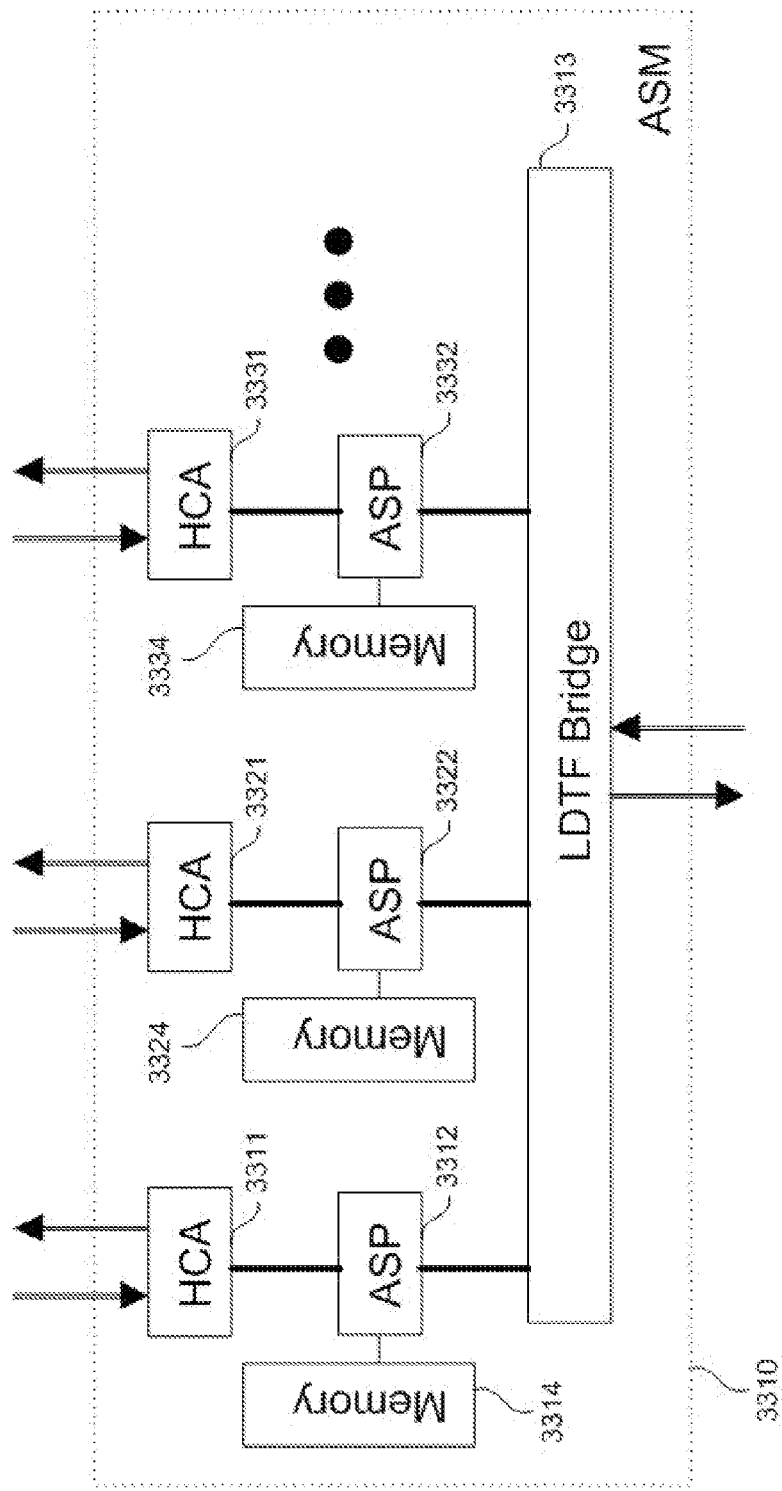
FIG. 37 is a block diagram of an ASM of an ANA according to another embodiment of the invention.
Figure 38:
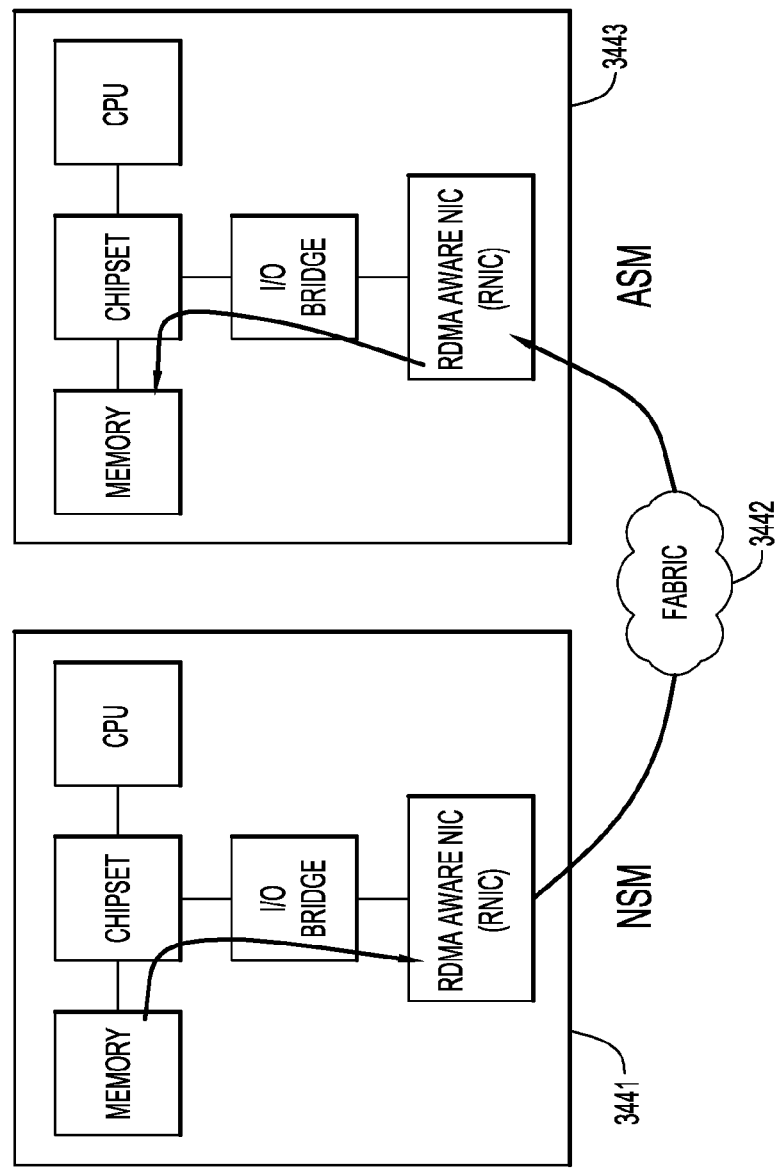
FIG. 38 is a block diagram which illustrates LDTF connectivity between a NSM and an ASM of an ANA according to one embodiment of the invention.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units. FIG. 37 shows such a multi-processor architecture: Here the ASM 3310 can comprise two—or more—ASPs, such as ASP 3312, ASP 3322, ASP 3332, each having a dedicated host channel adapter, such as host channel adapter 3311, host channel adapter 3321, and host channel adapter 3331, and dedicated memory, such as memory 3314, memory 3324, and memory 3334. The LDTF bridge 3313 connects the ASPs via the LDTF to the NSMs, for example.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

3.3.3 LDTF to Connect L2-L5 Unit with L7 Units

Figure 40:
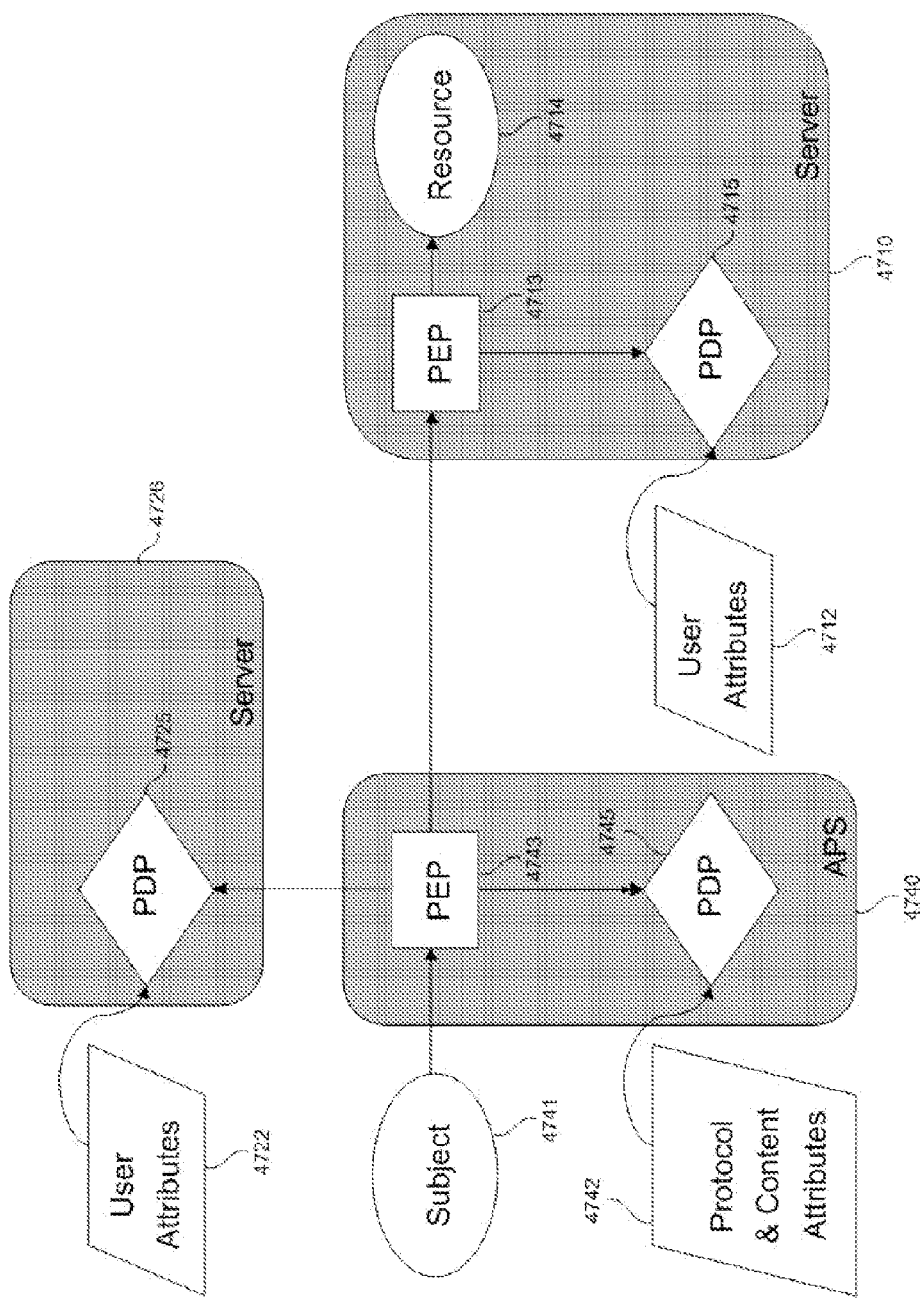
FIG. 40 is a block diagram of the APS combined with embedded PDP and PEP.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 40 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

3.3.4 Virtual Lanes

In yet another embodiment of the invention, when IB is used for the LDTF, virtual lanes in IB can be used to partition the communication, for example for hardware virtualization, or for separating system management communication from network traffic, or to partition an ANA into multiple logical instances, or to have an independent administrative domain. The concept of IB is explained in FIG. 39: IB virtual lanes are part of the IB link layer. A virtual lane, such as virtual lane 4101, virtual lane 4102, virtual lane 4103, virtual lane 4104, is a unique logical communication link that shares a single physical link, for example the physical link 4100. In IB technology each physical link can have up to 15 virtual lanes and a management lane. As a packet travels through the subnet, it can be assigned a priority or service level. Higher-priority packets are sent down special virtual lanes ahead of other packets.

3.4 Converged Data Center Fabric

Currently, data centers deploy many different fabrics for server interconnects. The transition of the data center fabric to a converged lossless, low-latency, high-bandwidth fabric is an important consideration, therefore various embodiments of some of these inventions for the case of converged data center fabric are provided. In such descriptions various possibilities to connect to application servers exist, for example, depending on whether the applications can communicate via Sockets Direct Protocol or whether applications support a native RDMA interface. Though the latter case is more performance-efficient it requires rewriting of legacy applications to work with native RDMA. In either case, application servers run TCP-less, which significantly boosts application throughput. For the case of a TCP-based connection to an application server, for example via Ethernet, it helps to compare FIG. 17 with FIG. 15 for guidance on how to construct the various embodiments of some of these inventions in case the one or more ASMs send the ISO Layer-7 processed data stream back to the one or more NSMs for transmission to the one or more application servers. Various modifications of this approach as contemplated by one of skill in the art may be used.

3.5 Triangulated Authorization

In one embodiment of the invention, the APS 2000 in FIG. 2 is used to perform attribute-based Triangulated Authorization services. In another embodiment of the invention, the ISO Layer-7 authorization server 4740 and/or 4710 of FIG. 40 is used for performing attribute-based Triangulated Authorization services for a subject 4741 which requests access to a resource 4714 hosted on an application server 4710. Attribute-based Triangulated Authorization complements existing approaches for access control known in the art via a network-centric, application-agnostic applications access control based on a Triangulated Identity. The Triangulated Identity can comprise protocol and content attributes, such as protocol and content attributes 4742 from FIG. 40, and thus extend the common identification concepts known in the art which almost solely rely on ISO Layer-4 attributes. The Triangulated Identity comprises three areas of identification:

User Attributes relate to attributes for identifying the user and client system itself. Those attributes can be, for example, the user name, the account name, an account number, a user identification token, a client machine identification, a unique Media Access Control (MAC) layer address, a client machine computer name, a unique client network interface serial number, personal identification tokens, fingerprint data, as well as attributes associated with the client, such as the work department, the client's role in the organization (for example, consultant, officer, engineer, maintenance staff, etc.), the association with certain projects (for example, the SOX compliance project, or the West Coast Open Source Design Project), the users' seniority, the user's current level of training, the user's citizenship, the user's security clearance, etc.

Environment Attributes relate to attributes for identifying the location of the client in the enterprise's network, such as source IP addresses or ports, destination IP addresses or ports, protocol numbers, other ISO Layer-2 to ISO Layer-5 attributes, network environment attributes, network access method used such as LAN access, WLAN access, Wi-Fi access, mobile access, mobile phone access (for example, via WAP, GPRS, UMTS), dial-up access, VPN access, as well as the physical location attributes of the client such as the country (for example, USA, China, India, Denmark) or the city (for example, Paris, London, Sunnyvale), the client is in, or other aspects of the location such as the vicinity (for example, inside a museum, inside a particular coffee-shop), as well as date and time, as well as the current threat level, or network security classification.

Protocol and Content Attributes relate to on-the-wire session attributes, such as protocol attributes (for example, for HTTP or HTTPS—methods and parameters, FTP, SSH, Telnet, RDP), as well as file-based protocol attributes (for example, for CIFS), content attributes (for example, URL fields, web cookies, MIME types, file names), or resource attributes (for example, for JDBC/SQL data, J2EE/EJB methods and parameters).

Figure 6:
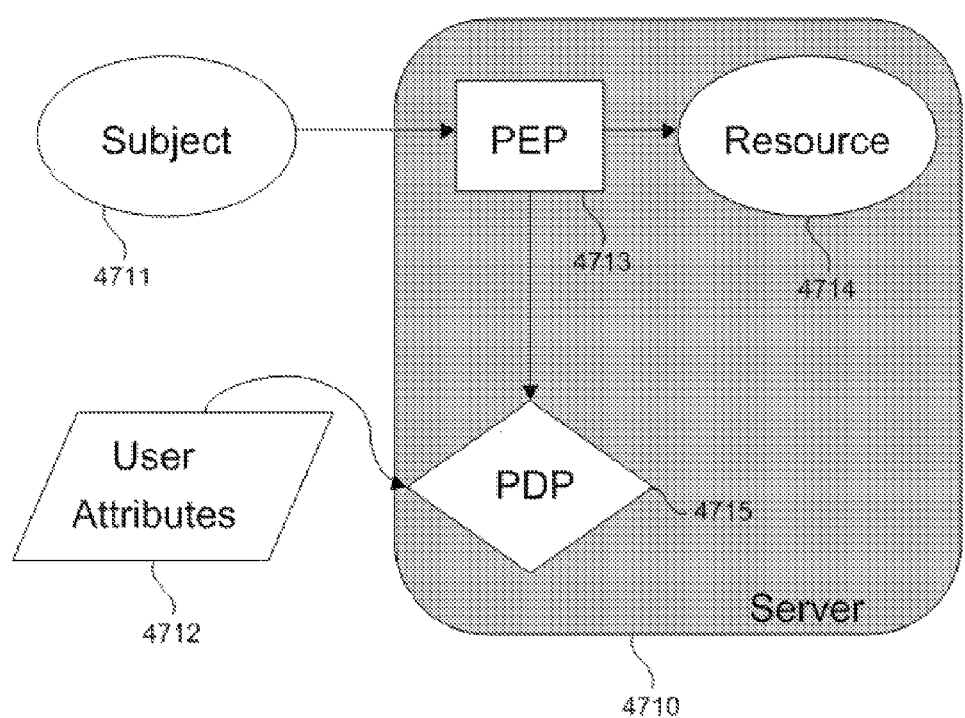
FIG. 6 is a block diagram which illustrates an authorization system with embedded PDP and embedded PEP.
Figure 7:
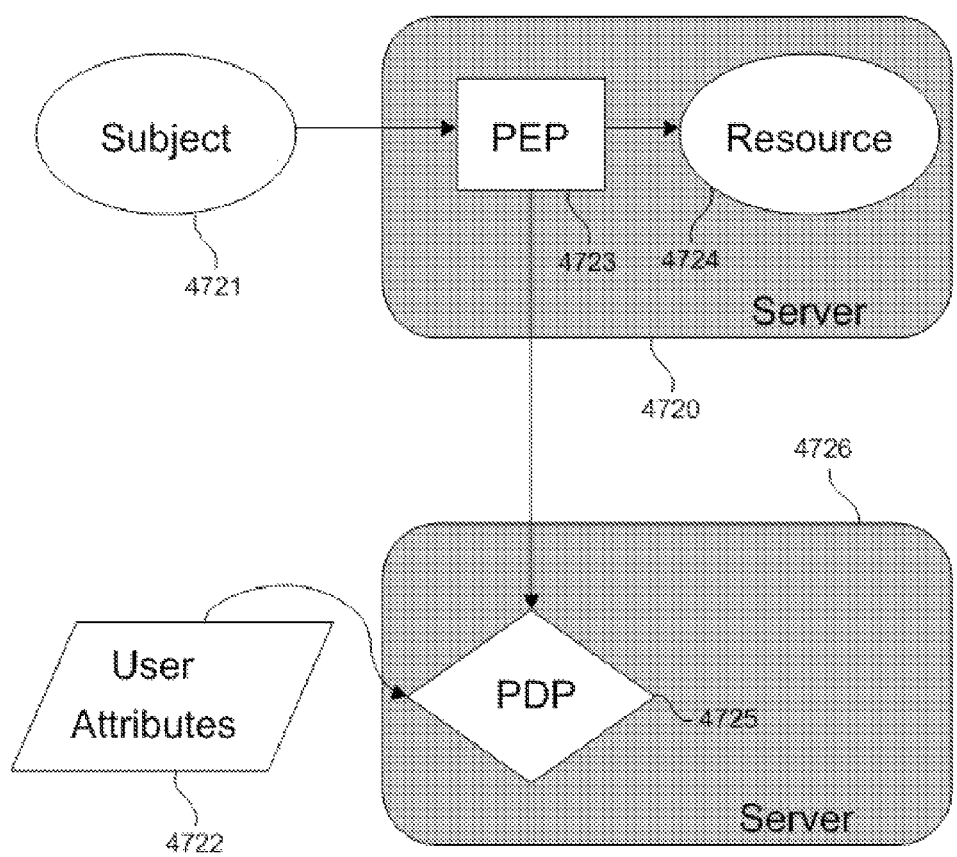
FIG. 7 is a block diagram which illustrates an authorization system with embedded PDP and external PEP.

The Triangulated Authorization can complement and even co-operate with other existing approaches for authorization and authentication, for example, to form a multi-stage authorization solution: In a first stage, classical ISO Layer-3-based and/or ISO Layer-4-based authorization can be done, for example, using a classical firewall. Requests that pass this first stage then get processed by a second stage authorization. In this second stage, the appropriate APS performs Triangulated Authorization based on ISO Layer-7 Application Service data. If the request passes this second stage, it will get handled by a third stage. This third stage can, for example, be another APS—in a multi-APS and/or in a multi-ANA architecture, or it can be handled by classical application-centric authorization methods such as illustrated in FIG. 6 or FIG. 7.

Besides cascaded operation, the APS can perform Triangulated Authorization in combination with embedded PDP and embedded PEP and, optionally, with external PDP. In one example, as shown in FIG. 40 a subject 4741 requests access to a resource 4714 which is provided by application server 4710. In a first authorization stage, the APS 4740 performs Triangulated Authorization using its own internal PEP 4743 and its own internal PDP 4745. This PDP 4745 operates on the Triangulated Identity which can rely on protocol and content attributes 4742, for example. The APS 4740 can, optionally, also interact with another external PDP, such as PDP 4725, which is served by a policy server 4726 and which operates on the user attributes 4722. When the APS 4740 grants subject 4741 access to resource 4714 a secondary authorization, this time embedded in the application server 4710, can be performed. Various possibilities exist, for example, the application server 4710 can have its own embedded PEP 4713 and its own embedded PDP 4715. The embedded PDP 4715 can operate on user attributes 4712 to make an access control decision. Or, PDP 4715 can operate on user attributes 4722, for example via a Virtual Directory Infrastructure. In another example, the application server 4710 has no embedded PDP 4715 and instead interacts with the PDP 4745 from the APS 4740, or with the PDP 4725 from policy server 4726, or both. In yet another example, the application server 4710 has no embedded PEP 4713 and instead utilizes the PEP 4743 from the APS 4740 for access control.

In one of the embodiments of one of these inventions, policies are used in a rule-based authorization method to define sets of rules for authorization permissions. Rules are expressions or conditions on multiple, arbitrary attributes which evaluate to TRUE or FALSE and determine whether access shall be granted or rejected. Policies are stored in a PDP, for example, PDP 4735, which can be, for example, LDAP/AD. Also, policies can interact with single-sign-on assertions from SAML, or Kerberos. The policies can be described in various formats including common scripting languages such as TCL, Python, or Perl. Policies can also be described in industry standard formats such as XACML or in proprietary formats, or combinations thereof.

Figure 41:
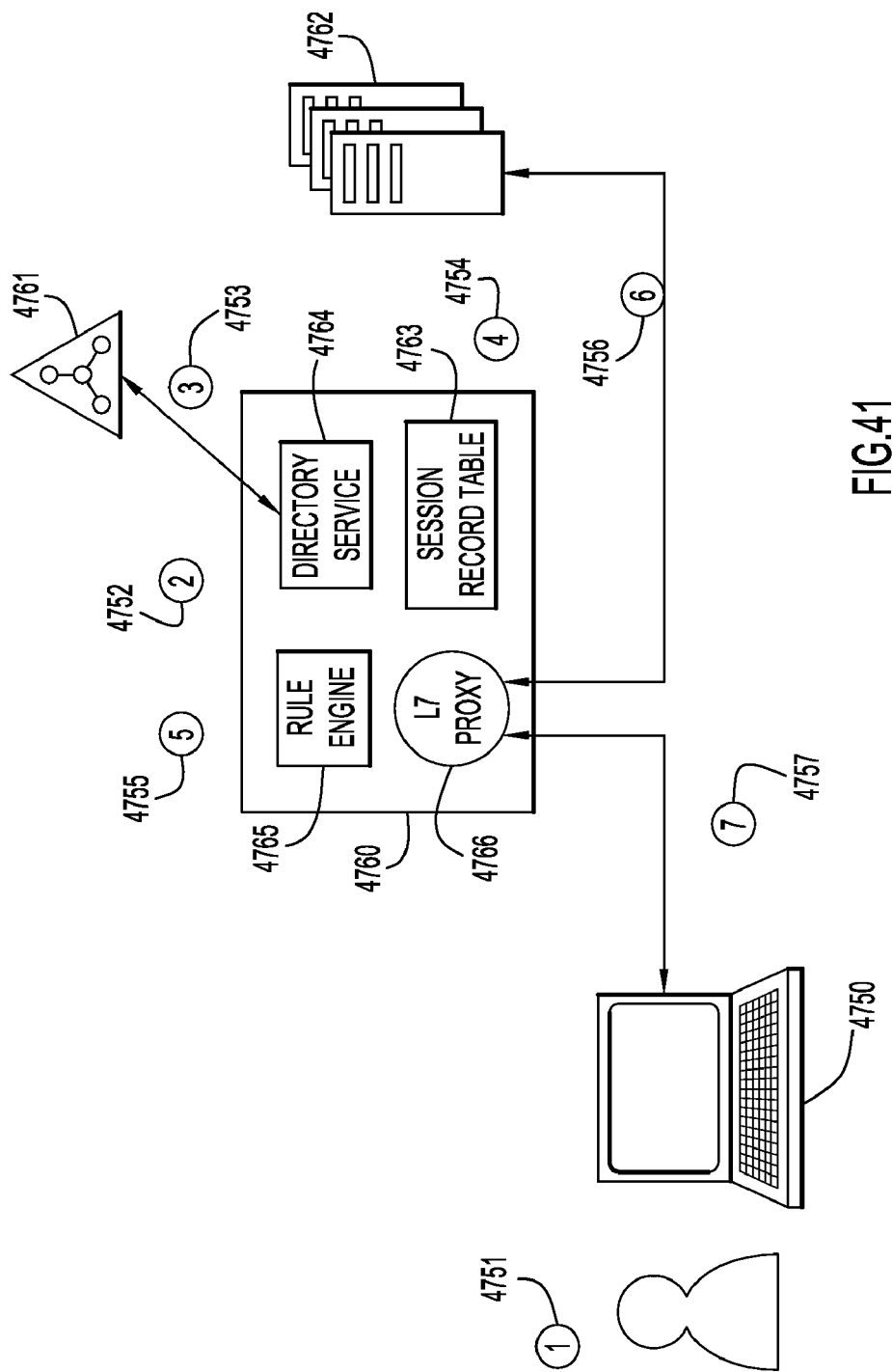
FIG. 41 is a block diagram of a system for Triangulated Authorization of a first request according to one embodiment of the invention.
Figure 42:
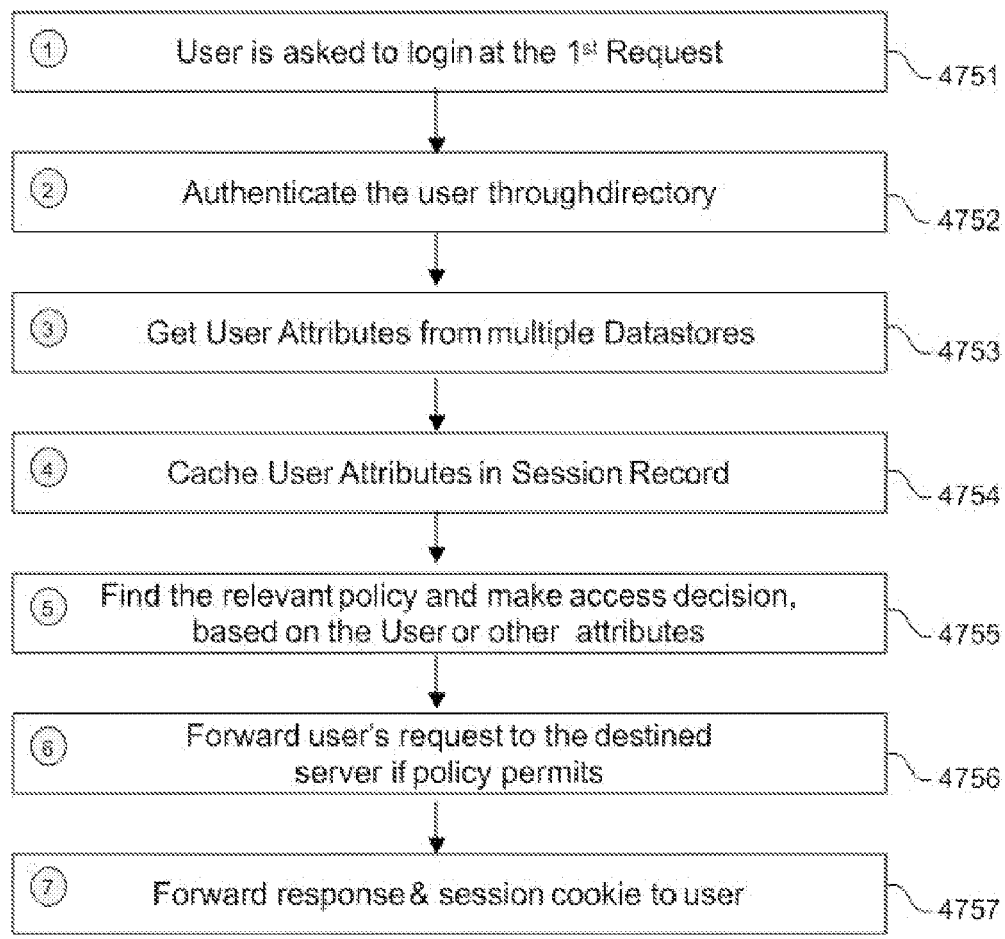
FIG. 42 is a flow diagram of a method for Triangulated Authorization of a first request according to one embodiment of the invention.

FIG. 41 and FIG. 42 show how one embodiment of the invention can perform Triangulated Authorization when a client issues a first request. A user 4750, which can be, for example, client 1001 of FIG. 1, or client 2001 of FIG. 2, connects to the ANA 4760, which can be, for example, the APS 2000 of FIG. 2, or any appropriate authorization approach contemplated by one of ordinary skill in the art. In a first step 4751, the user 4750 issues for the first time a request to login (for example, to access certain resources) on application server 4762; ISO Layer-7 proxy 4766 terminates the transport protocol connection from the user 4750 and acts as a proxy for application server 4762 as described above. In a second step 4752, the ANA 4760 then authenticates the user via access to a directory service 4764. In a third step 4753, the directory service 4764 obtains user attributes from the multiple identity data stores 4761. In a fourth step 4754, the obtained user attributes get cached in the session record table 4763. In a fifth step 4755, the ANA 4760 finds the relevant policy and makes a policy-based access decision based on the user or other attributes, obtained, for example, via ISO Layer-7 service processing using the rule engine 4765 as described above. In a sixth step 4756, the ISO Layer-7 proxy 4766 forwards the request from user 4750 to the application server 4762, if and only if permitted by the policy. In a seventh step 4757, the ISO Layer-7 proxy 4766 proxies the response from the application server 4762 and forwards the server's response, together with a session cookie, back to the user 4750. The order of the above steps is exemplary only, and is not intended to be limiting.

Figure 43:
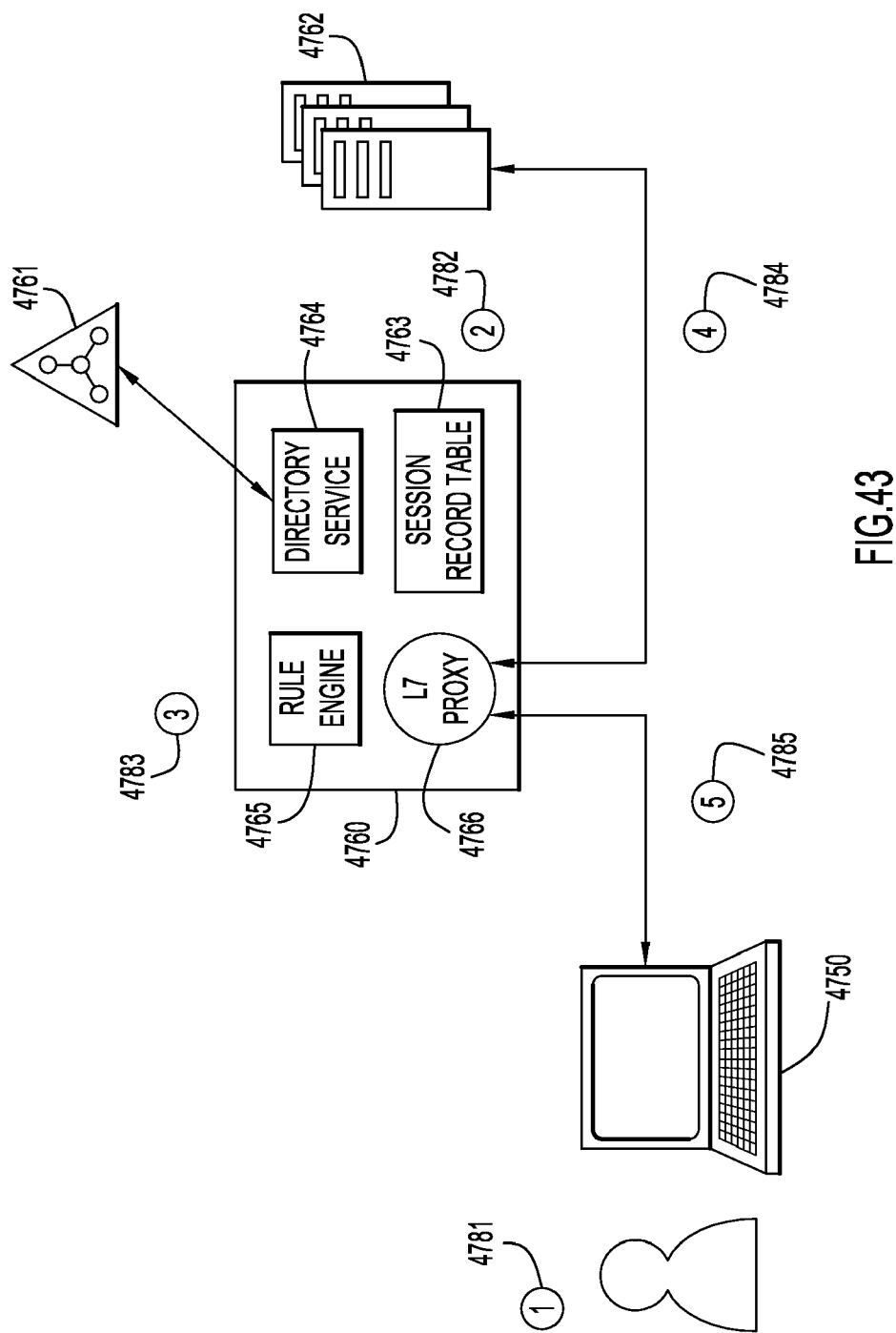
FIG. 43 is a block diagram of a system for Triangulated Authorization of a subsequent request according to one embodiment of the invention.
Figure 44:
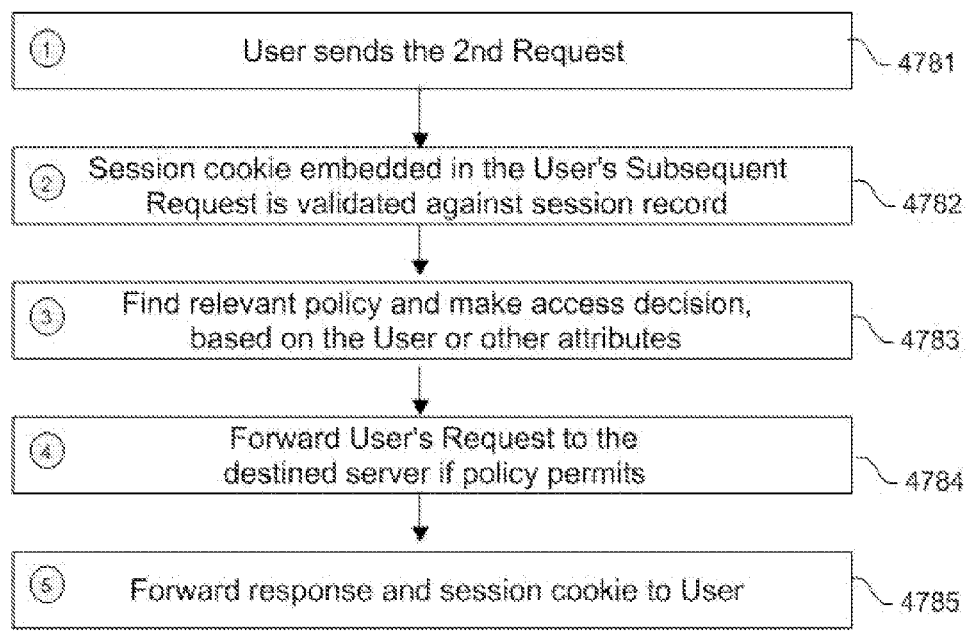
FIG. 44 is a flow diagram of a method for Triangulated Authorization of a subsequent request according to one embodiment of the invention.

FIG. 43 and FIG. 44 show how an embodiment of the invention performs Triangulated Authorization when a client issues a subsequent request. The user 4750 connects to the ANA 4760. In a first step 4781, the user 4750 issues a subsequent request to login (for example, to again access certain resources) on application server 4762; ISO Layer-7 proxy 4766 terminates the transport protocol connection from the user 4750 and acts as a proxy for application server 4762 as described above. In a second step 4782, the session cookie embedded within the user's subsequent request is validated against the session record in the session record table 4763. In a third step 4783, the ANA 4760 finds the relevant policy and makes a policy-based access decision based on the user or other attributes, obtained, for example, via ISO Layer-7 service processing using the rule engine 4765 as described above. In a fourth step 4784, the ISO Layer-7 proxy forwards the request from user 4750 to the application server 4762, if and only if permitted by the policy. In a fifth step 4755, the ISO Layer-7 proxy proxies the response from the application server 4762 and forwards the server's response, together with a session cookie, back to the user 4750. The order of the above steps is exemplary only, and is not intended to be limiting.

Figure 45:
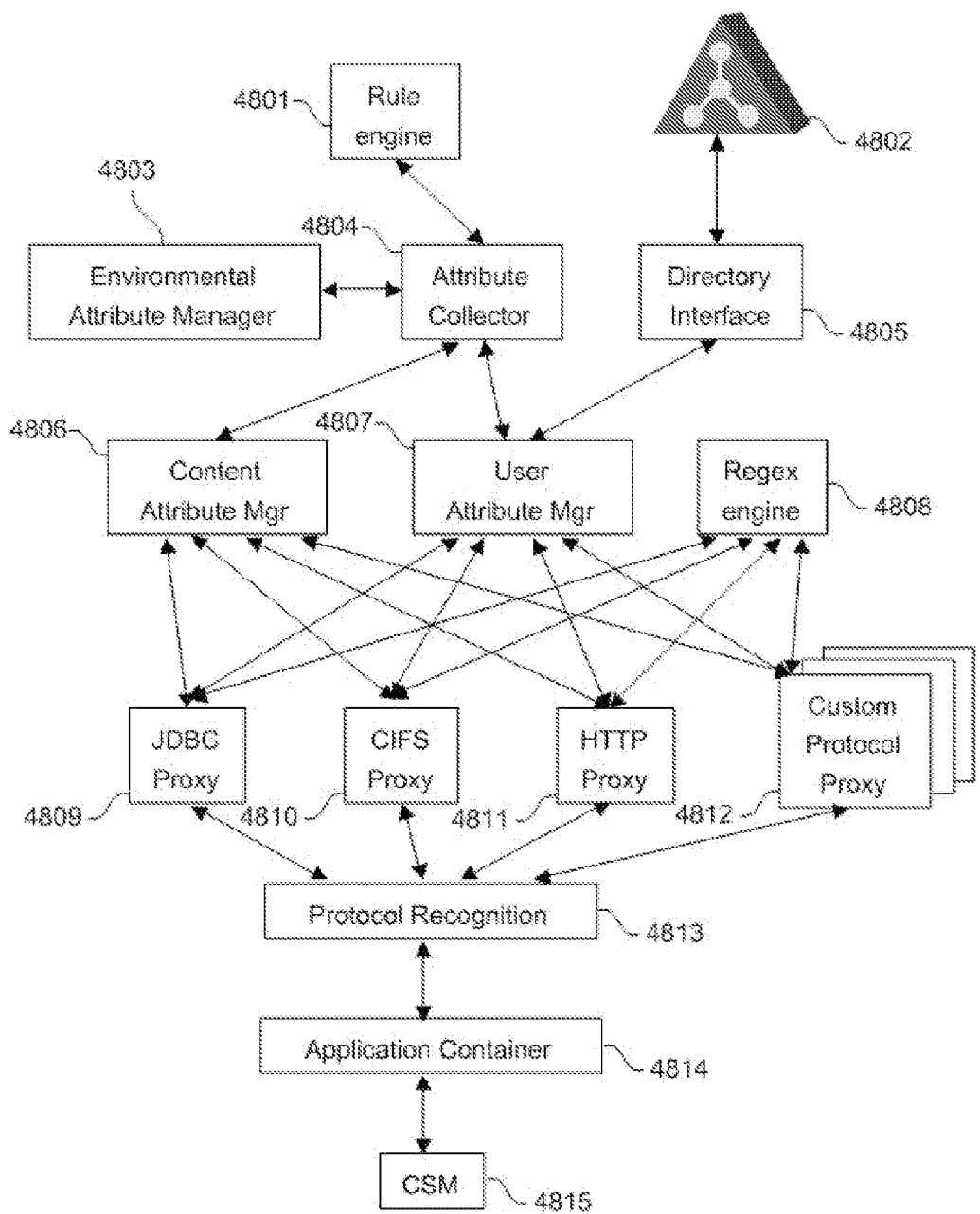
FIG. 45 is a detailed flow diagram of Triangulated Authorization in an ANA according to one embodiment of the invention.

FIG. 45 shows the details of Triangulated Authorization according to one embodiment of the invention. A communication subsystem manager 4815 forwards the data stream to the application container 4814. In a multi-processing architecture, application container 4814 can perform load balancing and dispatching of tasks to one or more processing elements. The one or more processing elements then perform protocol recognition 4813 and, depending on the protocol recognized in the data stream, forward the data stream to the appropriate protocol proxy. For example, if the JDBC protocol was recognized, the data stream is forwarded to the JDBC proxy 4809, if the CIFS protocol was recognized, the data stream is forwarded to the CIFS proxy 4810, if the HTTP protocol was recognized, the data stream is forwarded to the HTTP proxy 4811, or if a custom protocol was recognized, the data stream is forwarded to the custom protocol proxy 4812. The custom protocol proxy 4812 can be programmable, for example, without limitation, using the Java™ programming language or the TCL scripting language, or any other programming language as may be contemplated by one of skill in the art, to analyze various custom protocols. Each protocol engine can then use the regular expression engine 4808, the user attribute manager 4807 and the content attribute manager 4806 to extract Triangulated Identity attributes from the data stream. The user attribute manager 4807 can query an identity store 4802 through a directory interface 4805 to obtain user attributes. The attribute collector 4804 collects all attributes extracted, including attributes obtained by the environmental attribute manager 4803, to query a rule engine 4801 whether the particular request matches policies such that a policy decision can be made.

Figure 46:
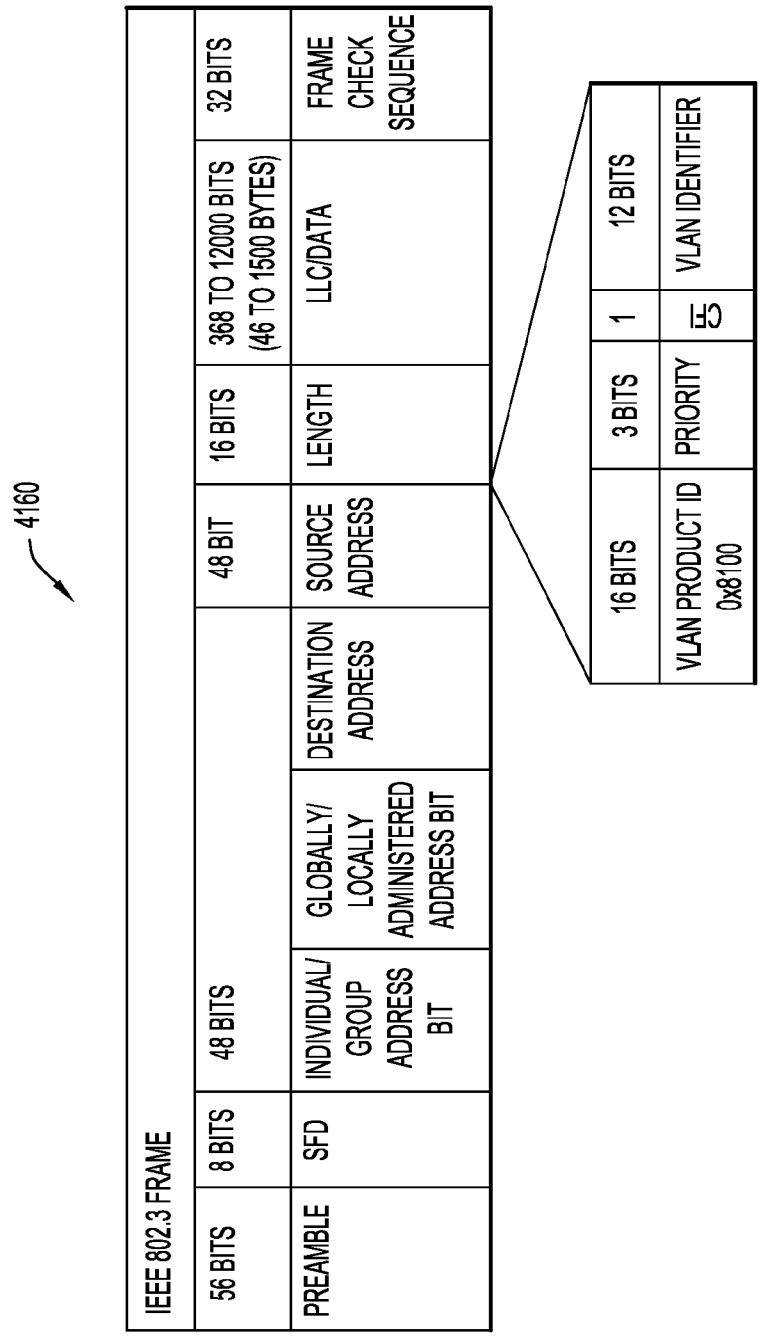
FIG. 46 is a block diagram which illustrates context identification for a virtualized Triangulated Authorization in an ANA according to one embodiment of the invention.
Figure 47:
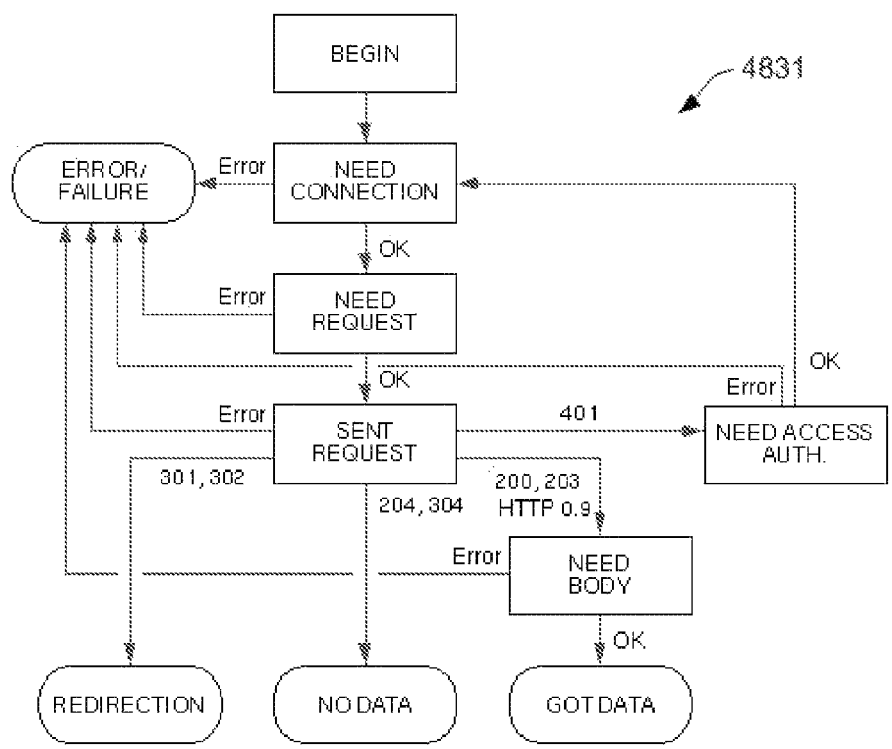
FIG. 47 is a flow diagram which illustrates the HTTP protocol.
Figure 49:
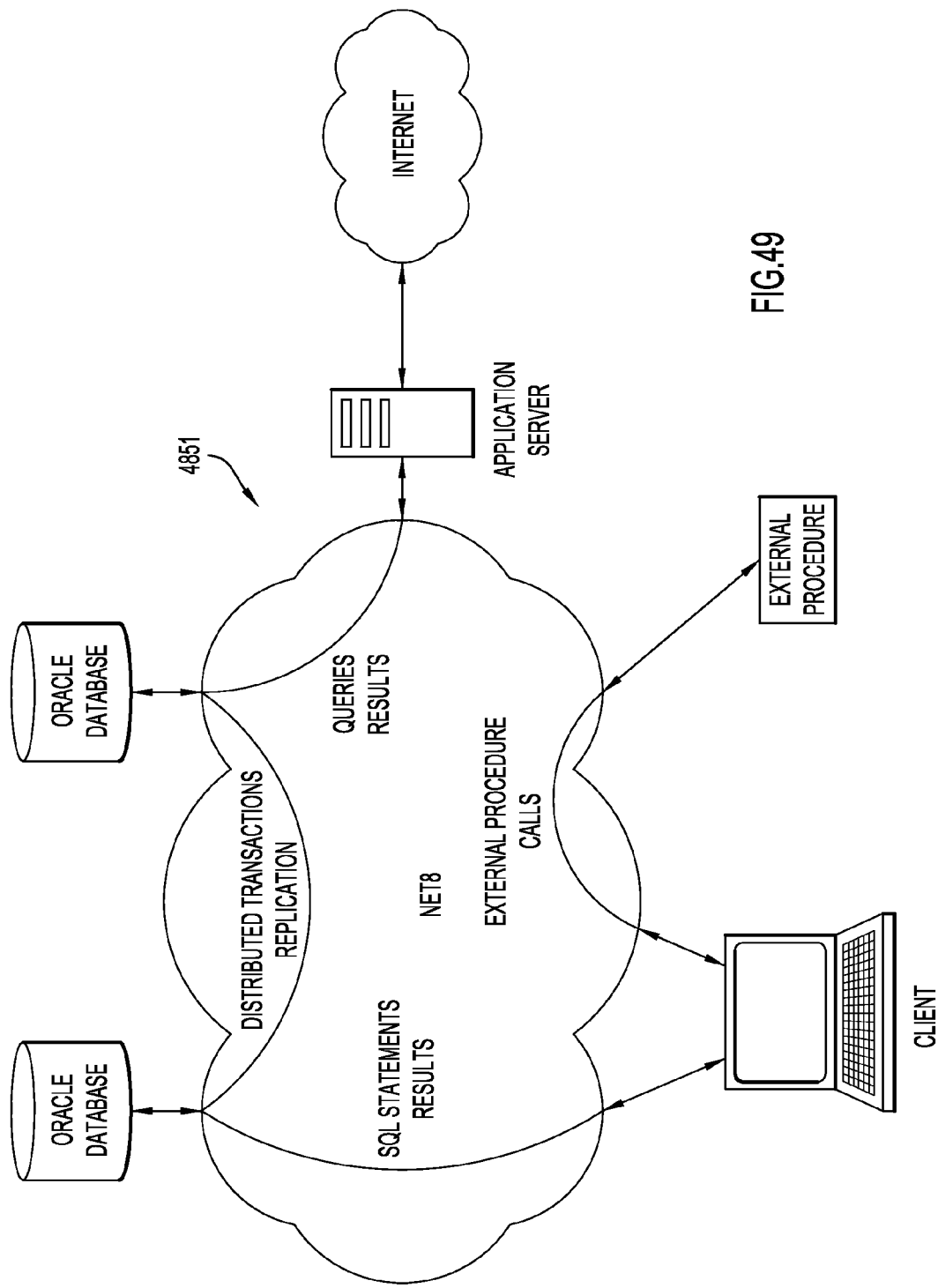
FIG. 49 is a block diagram which illustrates the application of the SQLnet protocol.

In protocol recognition 4813 of FIG. 45, various approaches for analyzing protocols can be deployed for protocol analysis. LAN frames and VLAN frames can be analyzed by looking at their portions (FIG. 46). The HTTP protocol is illustrated in FIG. 47. The CIFS protocol is illustrated in FIG. 48. The SQLNet protocol is illustrated in FIG. 49.

3.6 Virtual Directory Infrastructure

Figure 8:
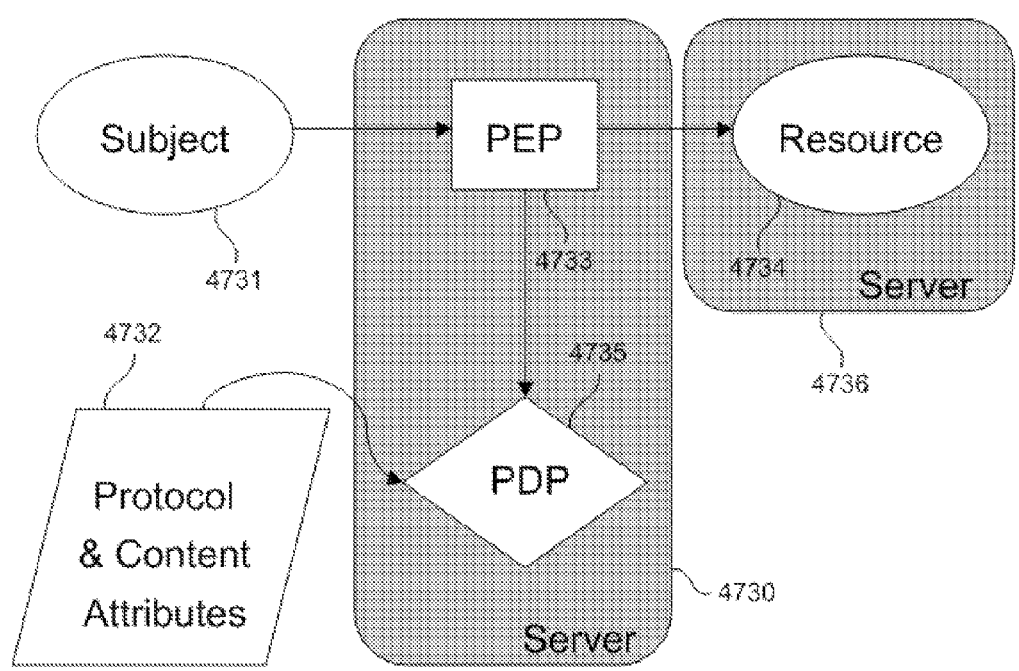
FIG. 8 is a block diagram of a system for network-centric authorization.
Figure 9:
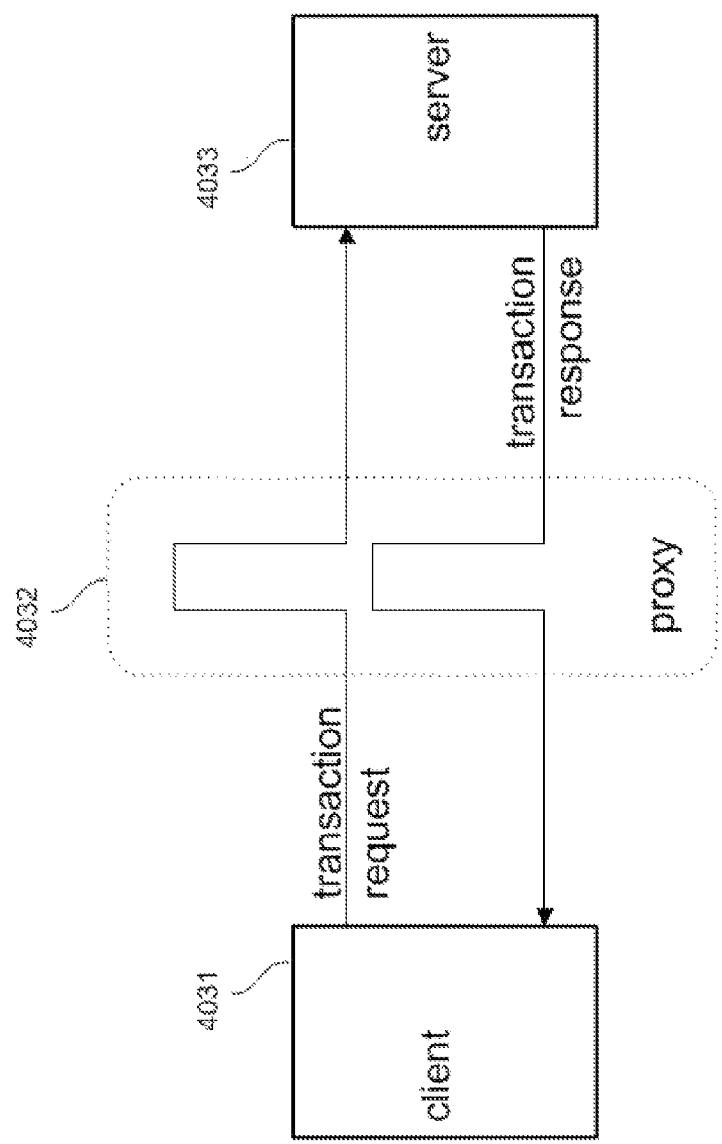
FIG. 9 is a block diagram of a ISO Layer-7 proxy in an ISO Layer-7 network system.
Figure 10:
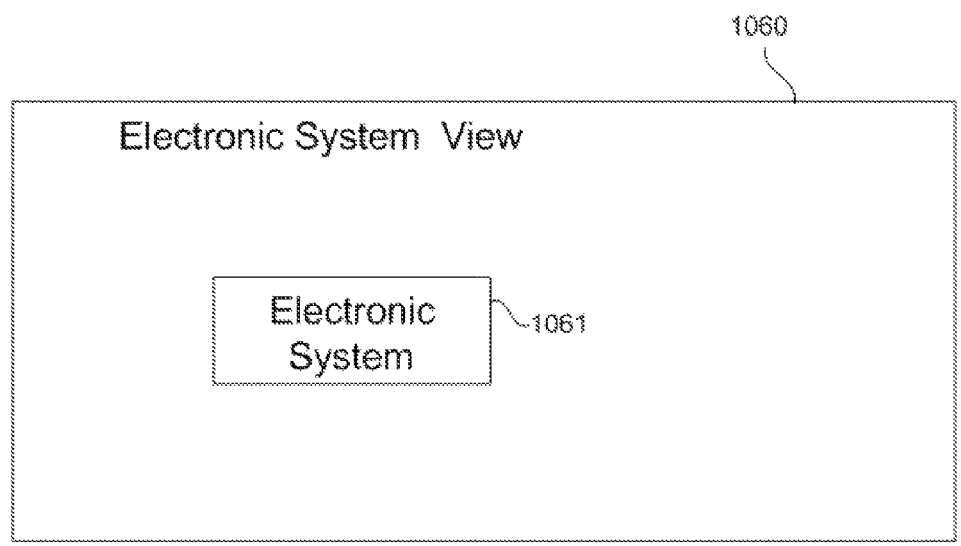
FIG. 10 illustrates the virtualization of electronic systems for abstraction.
Figure 11:
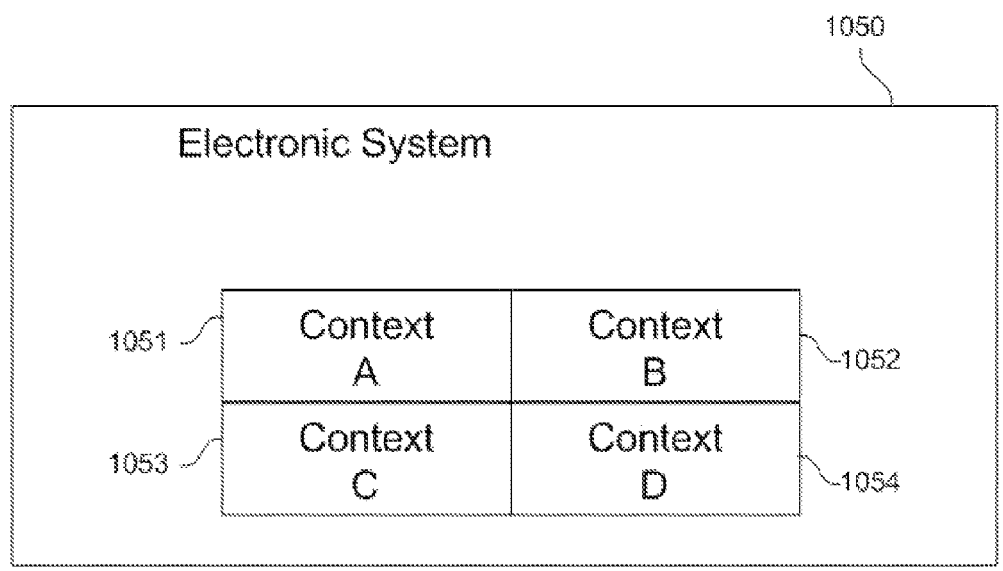
FIG. 11 illustrates the virtualization of electronic systems for partitioning.
Figure 12:
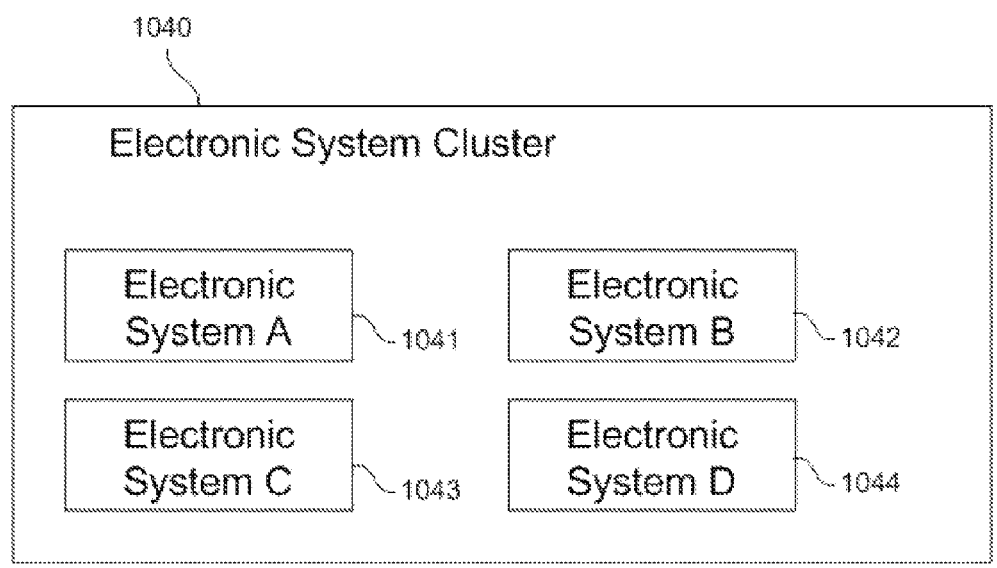
FIG. 12 illustrates the virtualization of electronic systems for clustering.
Figure 51:
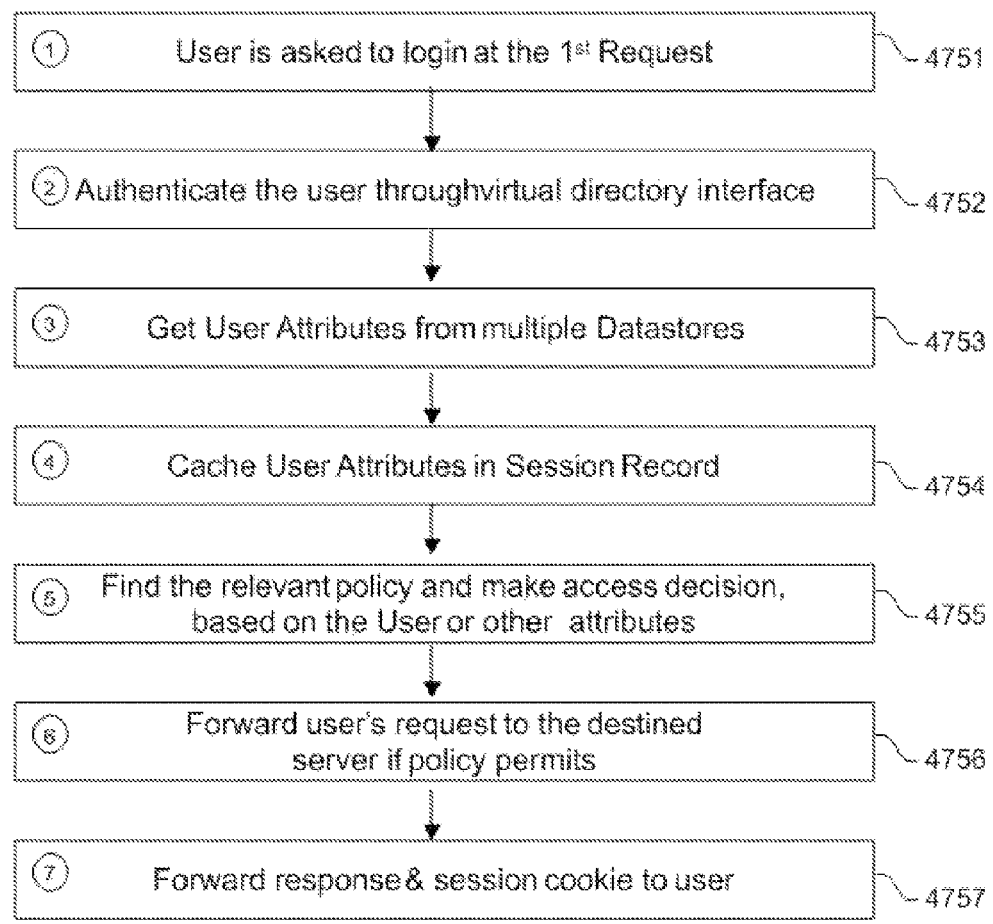
FIG. 51 is a flow diagram of a method for Triangulated Authorization of a first request using a Virtual Directory Infrastructure according to another embodiment of the invention.
Figure 52:
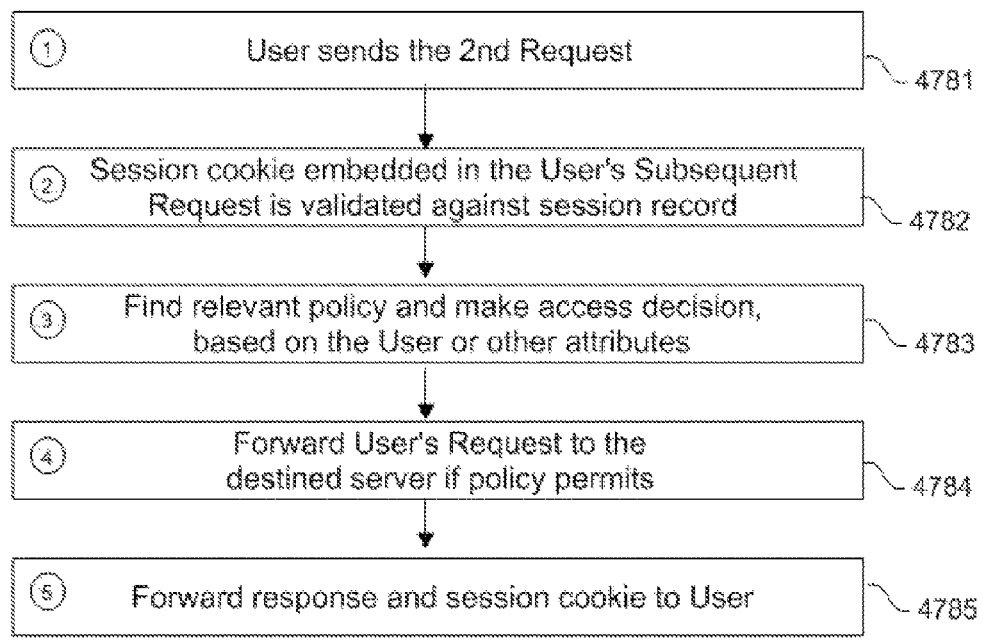
FIG. 52 is a flow diagram of a method for Triangulated Authorization of a subsequent request using a Virtual Directory Infrastructure according to another embodiment of the invention.

A Virtual Directory Infrastructure hides the complexity of the different protocols and the different formats of identity stores and can provide real-time access to the existing identity stores without moving the data out of the original repository. The Virtual Directory Infrastructure can be used in conjunction with Triangulated Authorization. FIG. 51 and FIG. 52 show how one embodiment of the invention can perform Triangulated Authorization when a client issues a first request and Virtual Directory Infrastructure is utilized. A user 4750, which can be, for example, client 2001 of FIG. 2, or client 2104 of FIG. 15, or client 2124 of FIG. 17, connects to the ANA 4760, which can be, for example, the APS 2000 of FIG. 2, or the authorization server 4730 of FIG. 8. In a first step 4751, the user 4750 issues for the first time a request to login (for example, to access certain resources) on application server 4762; ISO Layer-7 proxy 4766 terminates the transport protocol connection from the user 4750 and acts as a proxy for application server 4762 as described above. In a second step 4752, the ANA 4760 then authenticates the user via access to Virtual Directory Infrastructure 4768. This Virtual Directory Infrastructure can, for example, be Virtual Directory Infrastructure 4900 of FIG. 20. In a third step 4753, the Virtual Directory Infrastructure 4768 obtains user attributes from the multiple identity data stores 4761 and 4767. In a fourth step 4754, the obtained user attributes get cached in the session record table 4763. In a fifth step 4755, the ANA 4760 finds the relevant policy and makes a policy-based access decision based on the user or other attributes, obtained, for example, via ISO Layer-7 service processing using the rule engine 4765 as described above. In a sixth step 4756, the ISO Layer-7 proxy 4766 forwards the request from user 4750 to the application server 4762, if and only if permitted by the policy. In a seventh step 4757, the ISO Layer-7 proxy 4766 proxies the response from the application server 4762 and forwards the server's response, together with a session cookie, back to the user 4750. The order of the above steps is exemplary only, and is not intended to be limiting.

FIG. 52 shows how an embodiment of the invention can perform Triangulated Authorization when a client issues a subsequent request. Referring to FIGS. 51-52, user 4750 connects to the ANA 4760. In a first step, the user 4750 issues a subsequent request to login (for example, to again access certain resources) on application server 4762; ISO Layer-7 proxy 4766 terminates the transport protocol connection from the user 4750 and acts as a proxy for application server 4762 as described above. In a second step, the session cookie embedded within the user's subsequent request is validated against the session record in the session record table 4763. In a third step, the ANA 4760 finds the relevant policy and makes a policy-based access decision based on the user or other attributes, obtained, for example, via ISO Layer-7 service processing using the rule engine 4765 as described above. In a fourth step, the ISO Layer-7 proxy 4766 forwards the request from user 4750 to the application server 4762, if and only if permitted by the policy. In a fifth step, the ISO Layer-7 proxy 4766 proxies the response from the application server 4762 and forwards the server's response, together with a session cookie, back to the user 4750. The order of the above steps is exemplary only, and is not intended to be limiting.

Figure 53:
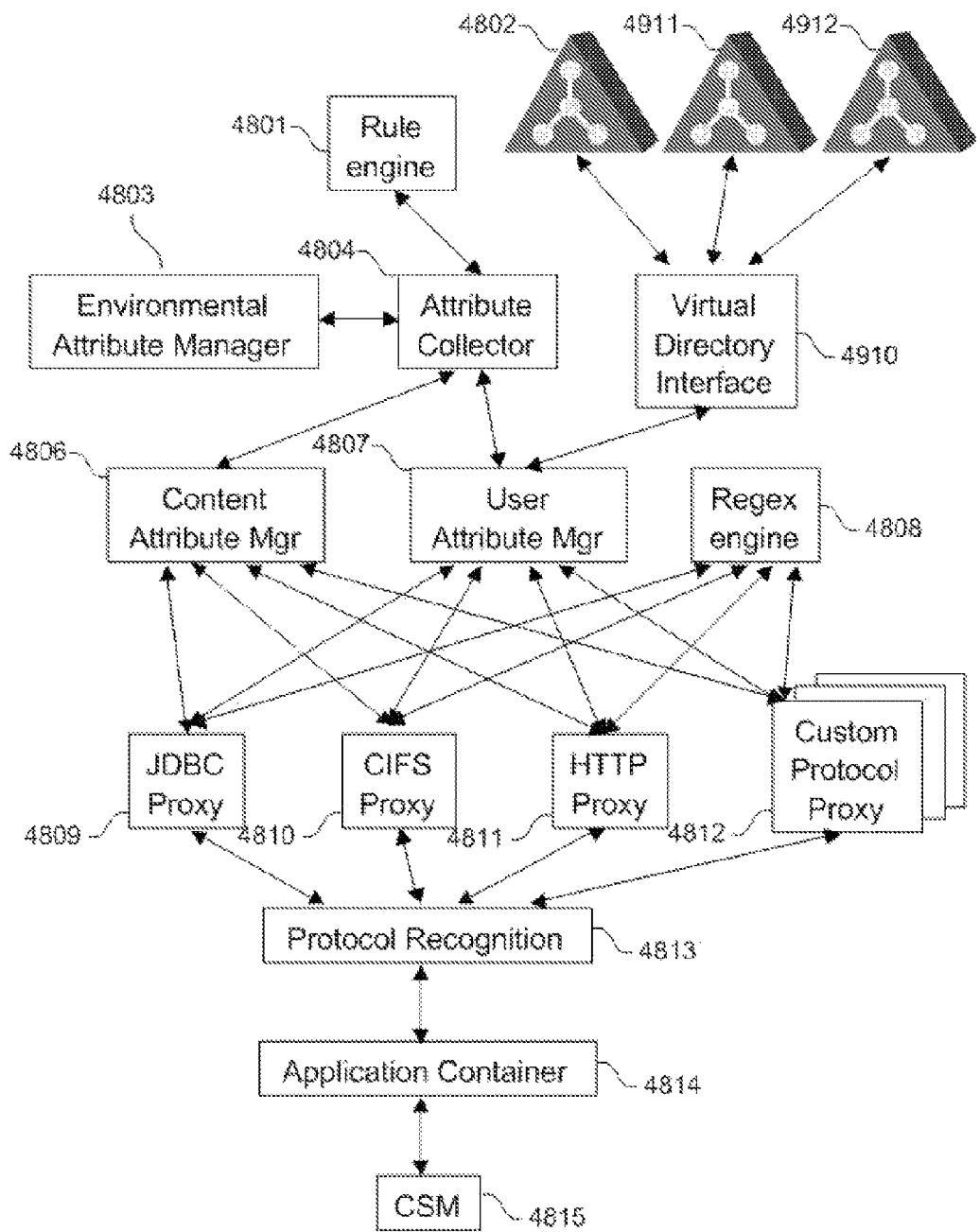
FIG. 53 is a detailed flow diagram of Triangulated Authorization in an ANA using a Virtual Directory Infrastructure according to one embodiment of the invention.

FIG. 53 shows the details of Triangulated Authorization utilizing Virtual Directory Infrastructure according to one embodiment of the invention. A communication subsystem manager 4815 forwards the data stream to the application container 4814. In a multi-processing architecture, application container 4814 can perform load balancing and dispatching of tasks to one or more processing elements. The one or more processing elements then perform protocol recognition 4813 and, depending on the protocol recognized in the data stream, forward the data stream to the appropriate protocol proxy. For example, if the JDBC protocol was recognized, the data stream is forwarded to the JDBC proxy 4809, if the CIFS protocol was recognized, the data stream is forwarded to the CIFS proxy 4810, if the HTTP protocol was recognized, the data stream is forwarded to the HTTP proxy 4811, or if a custom protocol was recognized, the data stream is forwarded to the custom protocol proxy 4812. Each protocol engine can then use the regular expression engine 4808, the user attribute manager 4807 and the content attribute manager 4806 to extract Triangulated Identity attributes from the data stream. The user attribute manager 4807 can query multiple identity stores 4802, 4911, and 4912 through Virtual Directory Infrastructure 4910 to obtain user attributes. The Virtual Directory Infrastructure 4910 can, for example, be Virtual Directory Infrastructure 4900 of FIG. 20. The attribute collector 4804 collects all attributes extracted, including attributes obtained by the environmental attribute manager 4803, to query a rule engine 4801 whether the particular request matches policies such that a policy decision can be made.

3.7 Transparent Secure Transport for End-To-End Application Protection

In one embodiment of the invention described herein, the ANA shown in FIG. 2 where a client 2001 can access applications 2005 and where the access to such applications 2005 is controlled by the APS 2000. For security and for privacy reasons the connection between the client 2001 and the APS 2000 and the connection between the APS 2000 and the application server 2005 can be protected by encryption, for example. While the secure transport approaches known in the art are not transparent to ISO Layer-4 networking, because the original TCP/IP header may get encrypted and replaced (see above), in one embodiment of the invention, a novel, Transparent Secure Transport system and method is disclosed.

Figure 54:
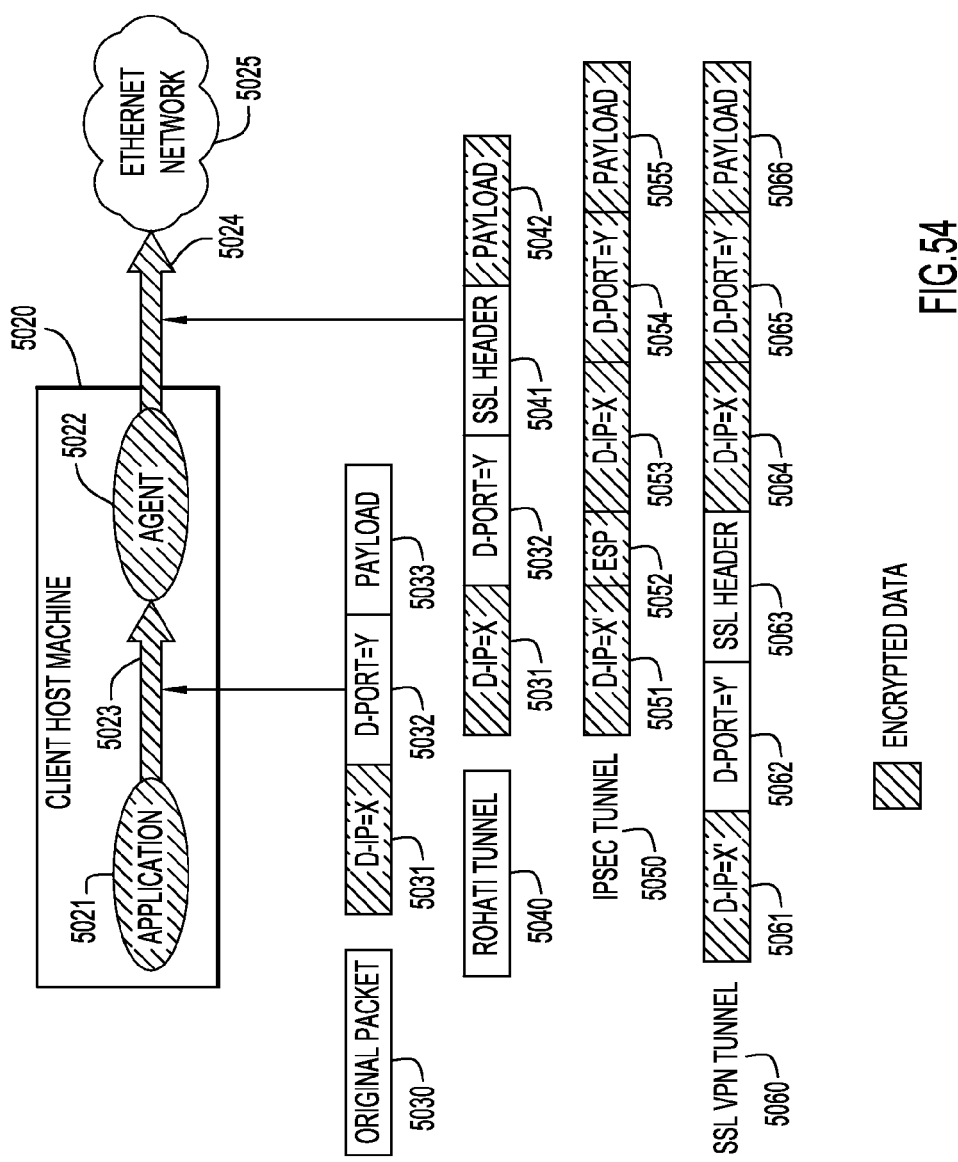
FIG. 54 is a block diagram which illustrates the various approaches for secure transport, including Transparent Secure Transport according to one embodiment of the invention.

FIG. 54 illustrates the functioning of the novel, Transparent Secure Transport as compared to other secure transport approaches known in the art. Within a Client Host Machine 5020 an application 5021 sends data to transport agent 5022. The data 5023 transmitted can look like TCP packet 5030 which comprises a header with the destination IP address 5031, the destination TCP port number 5032 and the payload 5033, all unencrypted, in clear-text. (This disclosure is relevant for TCP over IP; if another IP-based protocol is used, the disclosure still applies, but some of the parameters may differ. For example, some IP-based protocols do not use TCP and thus do not have a TCP port number available. However, the mechanism can still function in a similar manner.) When agent 5022 sends the data 5024 over an Ethernet network 5025 for privacy and security reasons the data 5024 gets encrypted. In one approach known in the art, IPSec Tunneling, the entire original packet 5030 gets encrypted into portions 5053, 5054, 5055 and ESP information 5052 and new IP destination information 5051 gets added. In one other approach known in the art, SSL-VPN Tunneling, the entire original packet 5030 gets encrypted as well and SSL header information 5063 gets added together with new IP destination 5061 and TCP port number 5062 information. In both approaches, the original IP information 5031 and 5032 gets encrypted (into 5053 and 5054, or into 5064 and 5065) and thus becomes inaccessible to ISO Layer-4 network analysis.

This drawback of encrypting the original IP information is solved by one embodiment of the invention described herein. According to one embodiment of the invention, the original data packet 5030 can be sent by transporting it within the packet 5040. The original destination IP address 5031 and the original destination TCP port number 5032 are used unencrypted such that ISO Layer-4 network analysis can seamlessly be applied. Therefore the transport mechanism of this approach is transparent to existing networking. And because the original payload 5033 gets encrypted into the encrypted payload 5042 plus an encryption header, for example SSL header 5041, the transport is also secure. In one embodiment of the invention, SSL is used for encrypting the payload. In another embodiment of the invention, DTLS is used for encrypting the payload.

Figure 55:
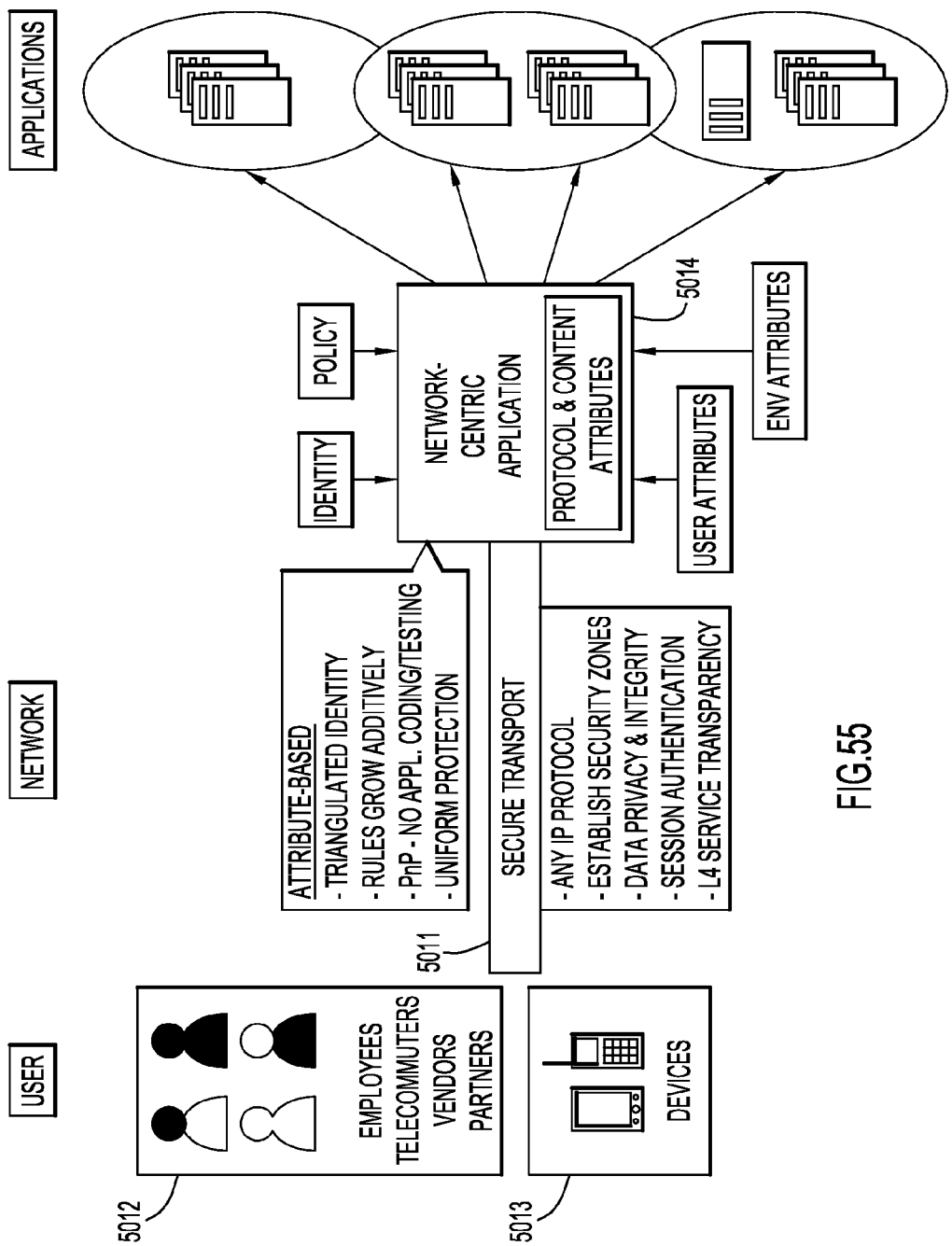
FIG. 55 is a block diagram of an ANA deploying Transparent Secure Transport according to one embodiment of the invention.
Figure 56:
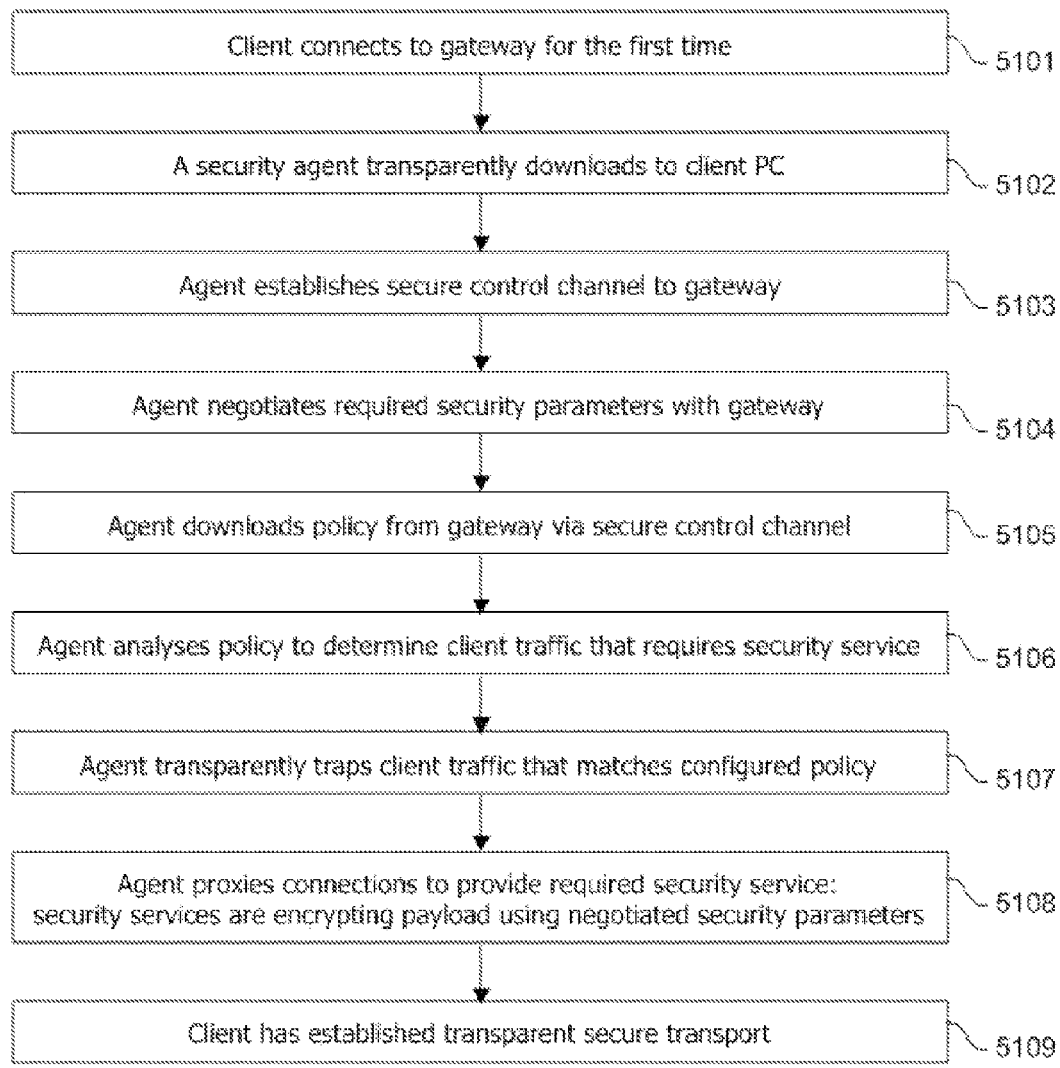
FIG. 56 is a flow diagram of a method for Transparent Secure Transport in an ANA according to one embodiment of the invention.

FIG. 55 shows the application of Transparent Secure Transport to perform policy-based access-control and policy-based Transparent Secure Transport, according to one embodiment of the invention. Users and clients, such as 5012, can use various devices 5013 to access various network-centric applications 5014. Depending on the current policy which determines access to the application, the Transparent Secure Transport 5011 can be used for communication between the client 5012 and applications 5014. This communication method can, for example, use a client-side agent as it is illustrated in FIG. 56: In step 5101, a client connects to the gateway for the first time. This gateway can, for example, be the authorization server 4730 of FIG. 8. In a second step 5102, a security agent transparently gets downloaded to and installed onto the client. This client can, for example, be client 2104 of FIG. 15. The security agent can, for example, be agent 5022 of FIG. 54 and can, for example, be a plug-in for a common web browser such as Mozilla Firefox. In a third step 5103, the agent establishes a secure control channel to the gateway. In a fourth step 5104, the agent negotiates the required security parameters with the gateway. In a fifth step 5105, the agent downloads the policy from the gateway via the secure control channel. This policy can, for example, be the policy described in step 4755 of FIG. 42. In a sixth step 5106, the agent analyzes the policy to determine the client traffic that requires Transparent Secure Transport. In a seventh step 5107, the agent transparently traps the client traffic that matches the configured policy. In an eighth step 5108, the agent proxies connections to provide the required security service by encrypting the traffic's payload using the negotiated security parameters. In a ninth step 5109, the client has established Transparent Secure Transport with the applications. This Transparent Secure Transport can, for example, use packets as shown for packet 5040 of FIG. 54. The order of the above steps is exemplary only, and is not intended to be limiting.

Figure 57:
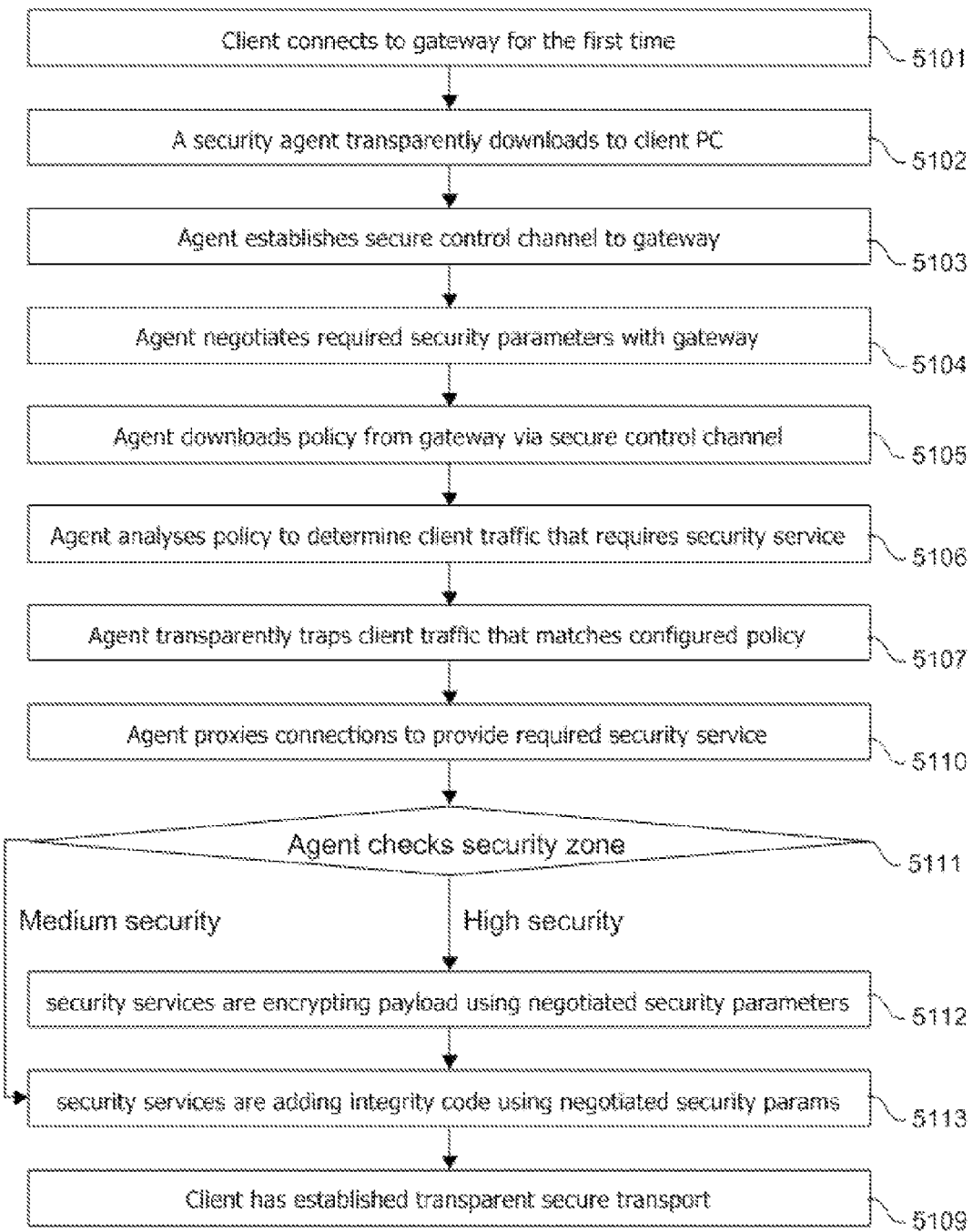
FIG. 57 is a flow diagram of a method for Transparent Secure Transport depending on security zones in an ANA according to one embodiment of the invention.

In another embodiment of the invention, the Transparent Secure Transport can use a different Transparent Secure Transport depending on a particular security zone configured in a policy. This is described in conjunction with FIG. 57. In a first step 5101, a client connects to the gateway for the first time. In a second step 5102, a security agent transparently gets downloaded to and installed onto the client. In a third step 5103, the agent establishes a secure control channel to the gateway. In a fourth step 5104, the agent negotiates the required security parameters with the gateway. In a fifth step 5105, the agent downloads the policy from the gateway via the secure control channel. In a sixth step 5106, the agent analyzes the policy to determine the client traffic that requires Transparent Secure Transport. In a seventh step 5107, the agent transparently traps the client traffic that matches the configured policy. In an eighth step 5110, the agent proxies connections to provide the required security service. In a decision 5111, the agent checks the security zone configured in the downloaded policy. If the security zone only requires medium security, the method continues at step 5113. However, if the security zone requires high security, the method continues with step 5112 in which the payload is encrypted using the negotiated security parameters. In step 5113, the agent adds an integrity code (such as a Message Authentication Code (MAC), for example), using the negotiated security parameters. In a last step 5109, the client has established Transparent Secure Transport with the applications. This Transparent Secure Transport can, for example, use packets as shown for packet 5040 of FIG. 54. In yet another embodiment of the invention, if the security zone only requires low security, no encryption may be performed on the payload and no integrity code may be added but just authorization may be performed. The order of the above steps is exemplary only, and is not intended to be limiting.

3.8 Fully Virtualized Operation

Virtualization provides a way to manage resources independent of the underlying physical implementation to increase utilization, efficiency and flexibility. For example, it allows partitioning a single physical resource into multiple logical instances with independent administration domains, which is helpful in a managed Network Service deployment.

Domains and Contexts are two key constructs for describing the virtualization features of one or more of the embodiments of some of the inventions. A context is a combination of Policy Administration Point (PAP), Policy Decision Point (PDP) and Policy Enforcement Point (PEP). Typically, an administrative boundary is identified by the context. A domain can contain one or more contexts which are useful to identify and control certain soft resources. For example, domain configuration can be used to limit the number of users, sessions, connections, etc. Domains may also have configurations which are common across contexts, for example, directory server information. Given a context, it is easy to identify the domain it is associated with because every context belongs to one and exactly one parent domain.

Figure 39:
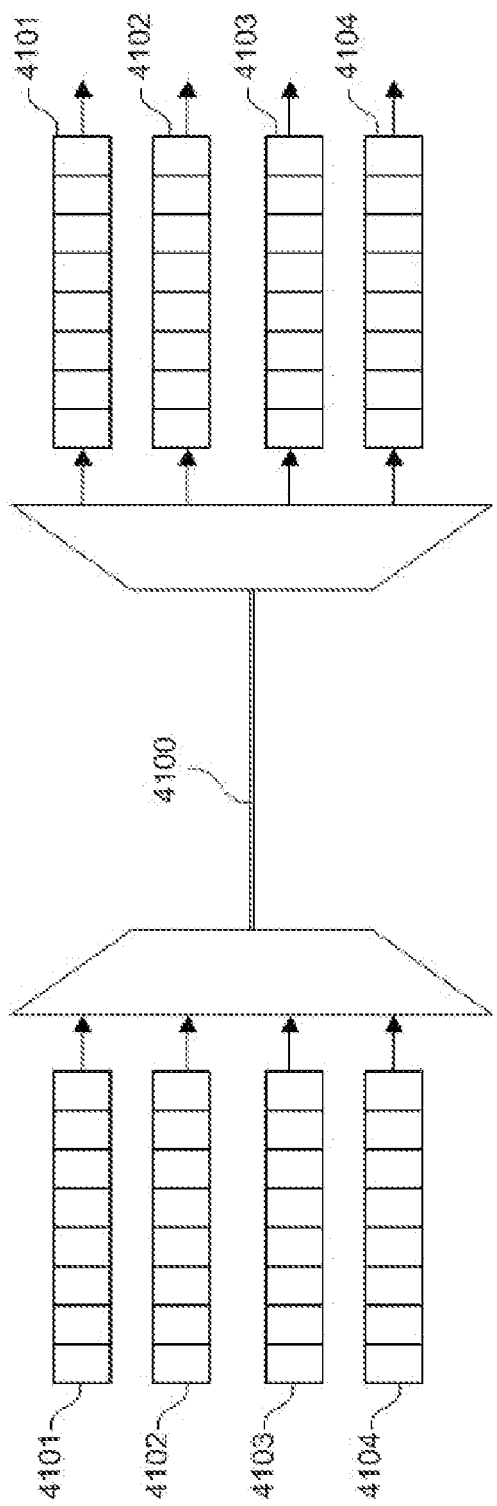
FIG. 39 is a block diagram which illustrates virtual lanes in IB communication according to one embodiment of the invention.

In one embodiment of the invention, the concept of service level is used to provide differentiated services among one or more domains having one or more contexts. The service levels can be used to control hard resources such as processor bandwidth, memory and network bandwidth. There can be one or more service levels within one ANA, and a domain can be mapped to one of these service levels. One embodiment of the invention can utilize the virtual lanes of the internal LDTF to support differentiated services. For example, the virtual lanes of IB can be used as illustrated in FIG. 39. A certain set of a virtual domain's traffic can be mapped to use one or more virtual lanes, and hence provide differentiated services among the virtual domains or contexts. As a practical example, according to one embodiment of the invention, an enterprise may have multiple business units and each business unit may have multiple application servers. In the virtualization terminology used within this description, each business unit can be mapped to a domain and each application server's policy (or group of application servers if the policy administrative owner is same for the group of application servers) can be mapped to a context.

Figure 58:
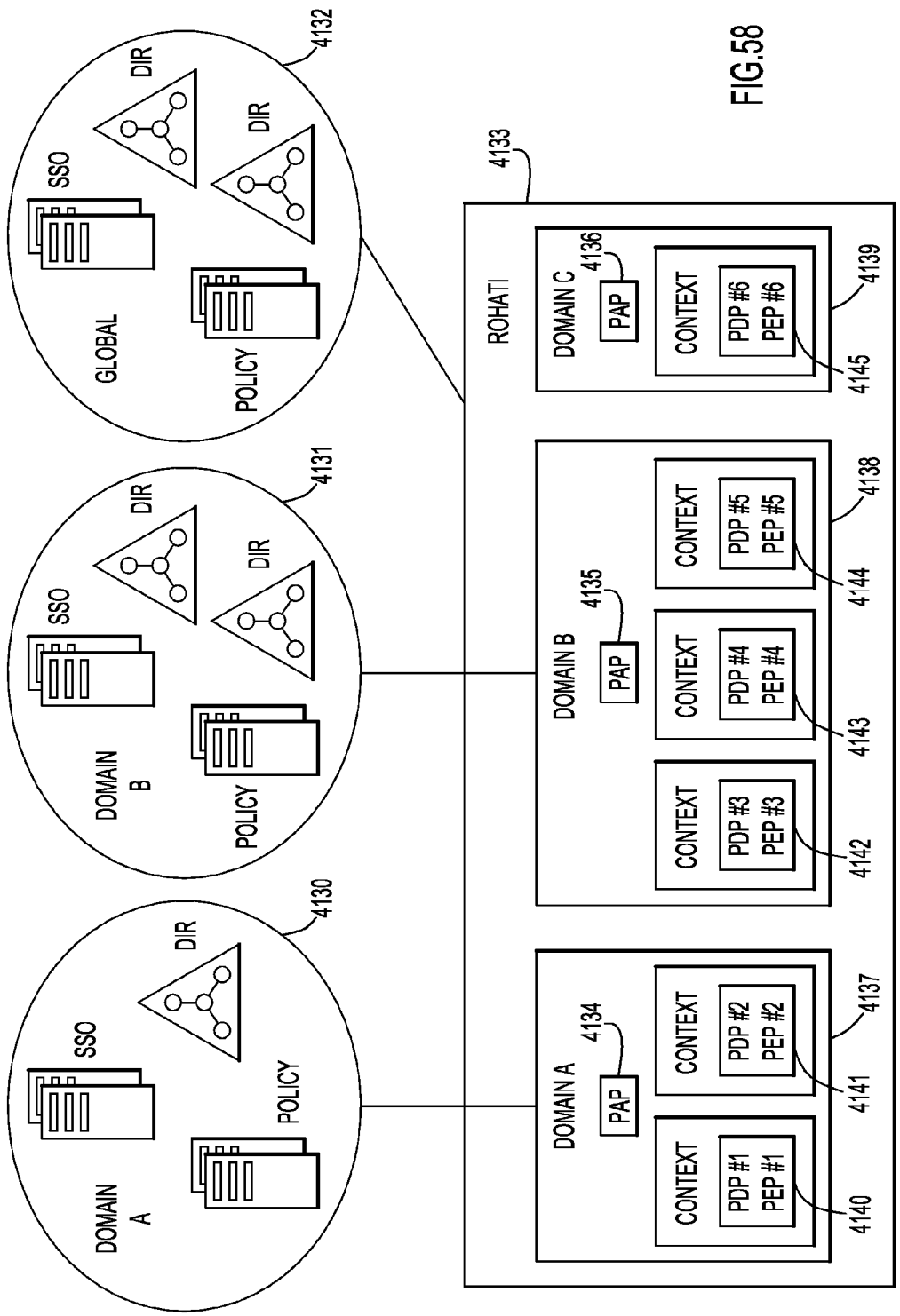
FIG. 58 is a block diagram of a virtualized Triangulated Authorization system of an ANA according to one embodiment of the invention.

FIG. 58 illustrates the mapping. According to one embodiment of the invention, an ANA 4133, which can, for example, without limitation, be the APS 2000 of FIG. 2, can provide access control to application servers 4132 within a global domain, to application servers 4130 within a Domain A or application servers 4131 within a Domain B. Service Domain A 4137 may comprise a PAP 4134 and one or more contexts, such as Context 4140 and Context 4141. The Context 4140 comprises a PDP and a PEP, as does Context 4141. Service Domain B 4138 may comprise a PAP 4135 and one or more contexts, such as Context 4142, Context 4143 and Context 4144. The Context 4142 comprises a PDP and a PEP, as does Context 4143 and Context 4144. Service Domain C 4139 may comprise a PAP 4136 and one or more contexts, such as Context 4145. The Context 4145 comprises a PDP and a PEP. While the application servers in the global domain can be served by any of the domains, such as Domain A 4137, Domain B 4138 or Domain C 4139, the application server 4130 can only be served by contexts from Domain A 4137, and the application servers 4131 can only be served by contexts from Domain B 4138. Each domain within an ANA, such as Domain A 4137, Domain B 4138, or Domain C 4139, can be identified, for example, via the application server's IP address and port number in the packet, or via the VLAN information in the packet header.

Figure 59:
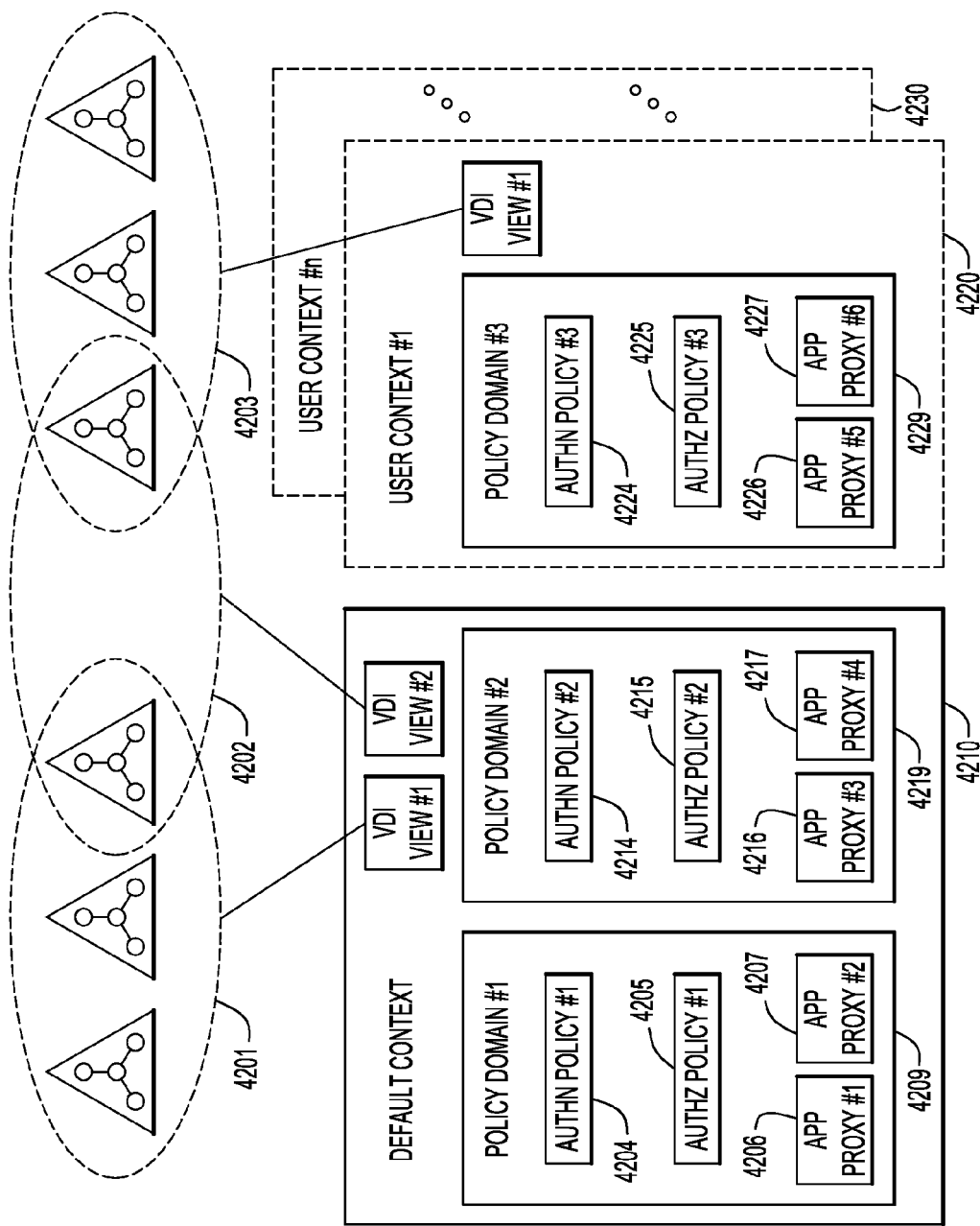
FIG. 59 is a block diagram of virtualized policy contexts in an ANA according to one embodiment of the invention.

In another embodiment of the invention, ANAs can have one or more contexts, which are associated with one or more Policy Domains. This is illustrated in FIG. 59 where an ANA comprises the default context 4210, plus the user context 4220, plus the user context 4230 etc. The default context 4210 can comprise one or more policy domains, such as the policy domain 4209 and the policy domain 4219. Each policy domain can comprise one or more policies and application proxies. For example, the policy domain 4209 comprises an authentication policy 4204, an authorization policy 4205, an application proxy 4206, and an application proxy 4207. The policy domain 4219 comprises an authentication policy 4214, an authorization policy 4215, an application proxy 4216, and an application proxy 4217. The user context 4220, for example, can comprise the policy domain 4229 which itself comprises the authentication policy 4224, the authorization policy 4225, the application proxy 4226 and the application proxy 4227. Each context can comprise Virtual Directory Infrastructure to access the directory servers, for example, directory server 4201, directory server 4202, or directory server 4203, accordingly.

Figure 60:
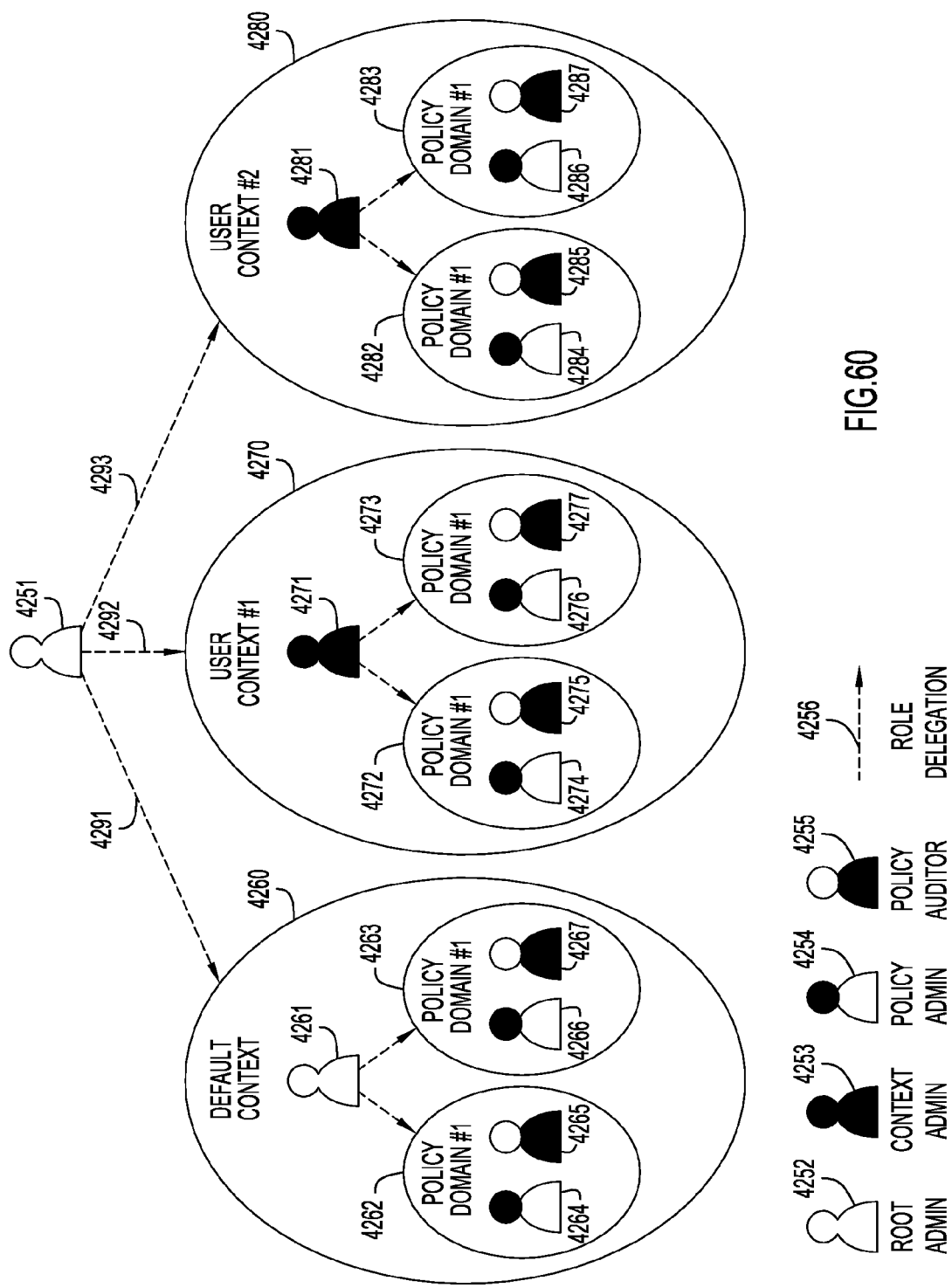
FIG. 60 is a block diagram which illustrates administration of virtualized policies in an ANA according to one embodiment of the invention.

For policy administration purposes a hierarchical approach can be used which is shown in FIG. 60. A root administrator 4251 can delegate administration to root administrator 4261 who administers the default context 4260. The root administrator 4251 can also delegate administration of user context 4270 to context administrator 4271, and administration of user context 4280 to context administrator 4281, for example.

Again, context administrators can delegate administration to policy domains. For example, root administrator 4261 can delegate administration of policy domain 4262 to policy administrator 4264 while policy auditing can be performed by policy auditor 4265, and root administrator 4261 can delegate administration of policy domain 4263 to policy administrator 4266 while policy auditing can performed by policy auditor 4267. Context administrator 4271 can delegate administration of policy domain 4272 to policy administrator 4274 while policy auditing can be performed by policy auditor 4275, and context administrator 4271 can delegate administration of policy domain 4273 to policy administrator 4276 while policy auditing can be performed by policy auditor 4277. Context administrator 4281 can delegate administration of policy domain 4282 to policy administrator 4284 while policy auditing can be performed by policy auditor 4285, and context administrator 4281 can delegate administration of policy domain 4283 to policy administrator 4286, while policy auditing can be performed by policy auditor 4287.

Figure 61:
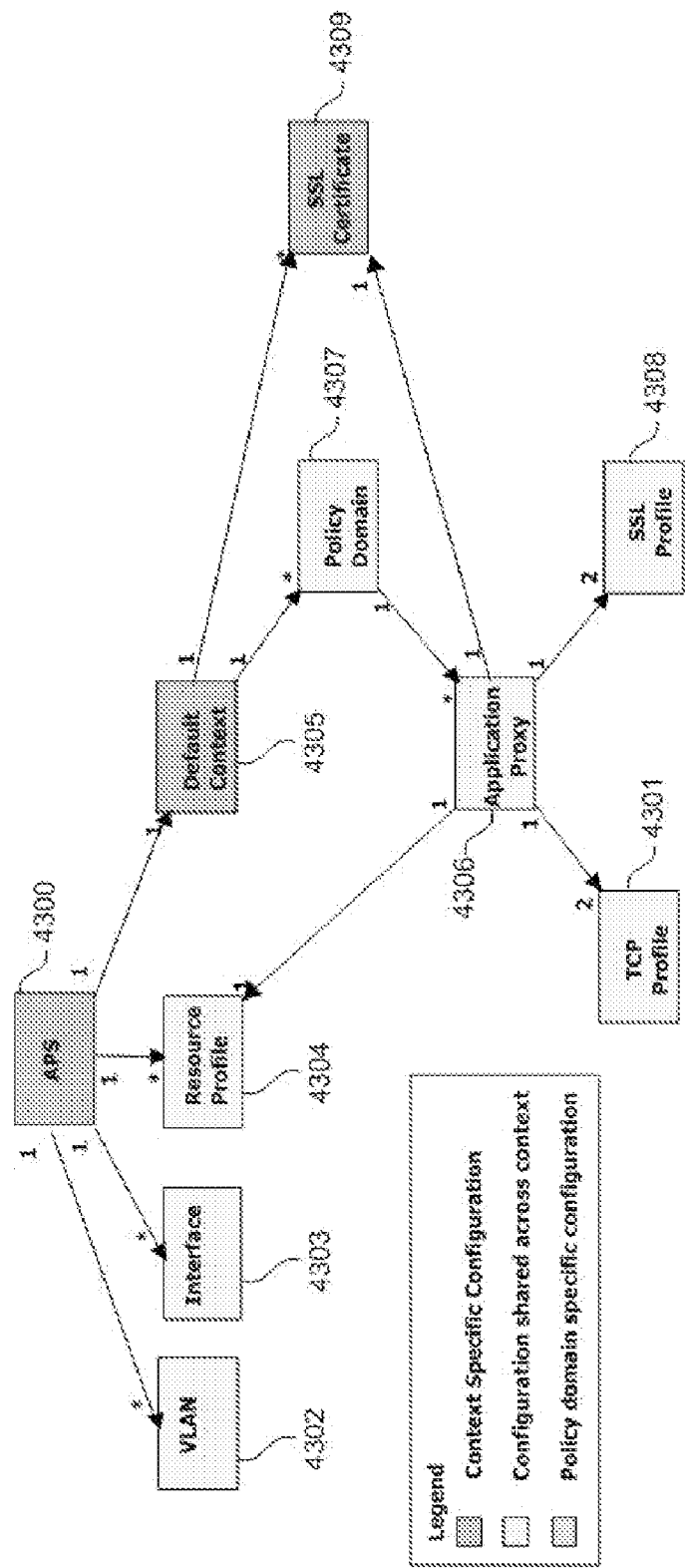
FIG. 61 is a block diagram of a Network Service Processor (NSP) objects for virtualization in an ANA according to one embodiment of the invention.

FIG. 61 shows how components of a NSM can be virtualized, according to one embodiment of the invention: The APS 4300, the default context 4305 and the SSL certificate 4309 have a context-specific configuration. The VLAN 4302, the interface 4303 and the resource profile 4304 have their configuration shared across two or more contexts.

The TCP profile 4301, the application proxy 4306, the policy domain 4307 and the SSL profile 4308 have policy domain-specific configuration.

Figure 62:
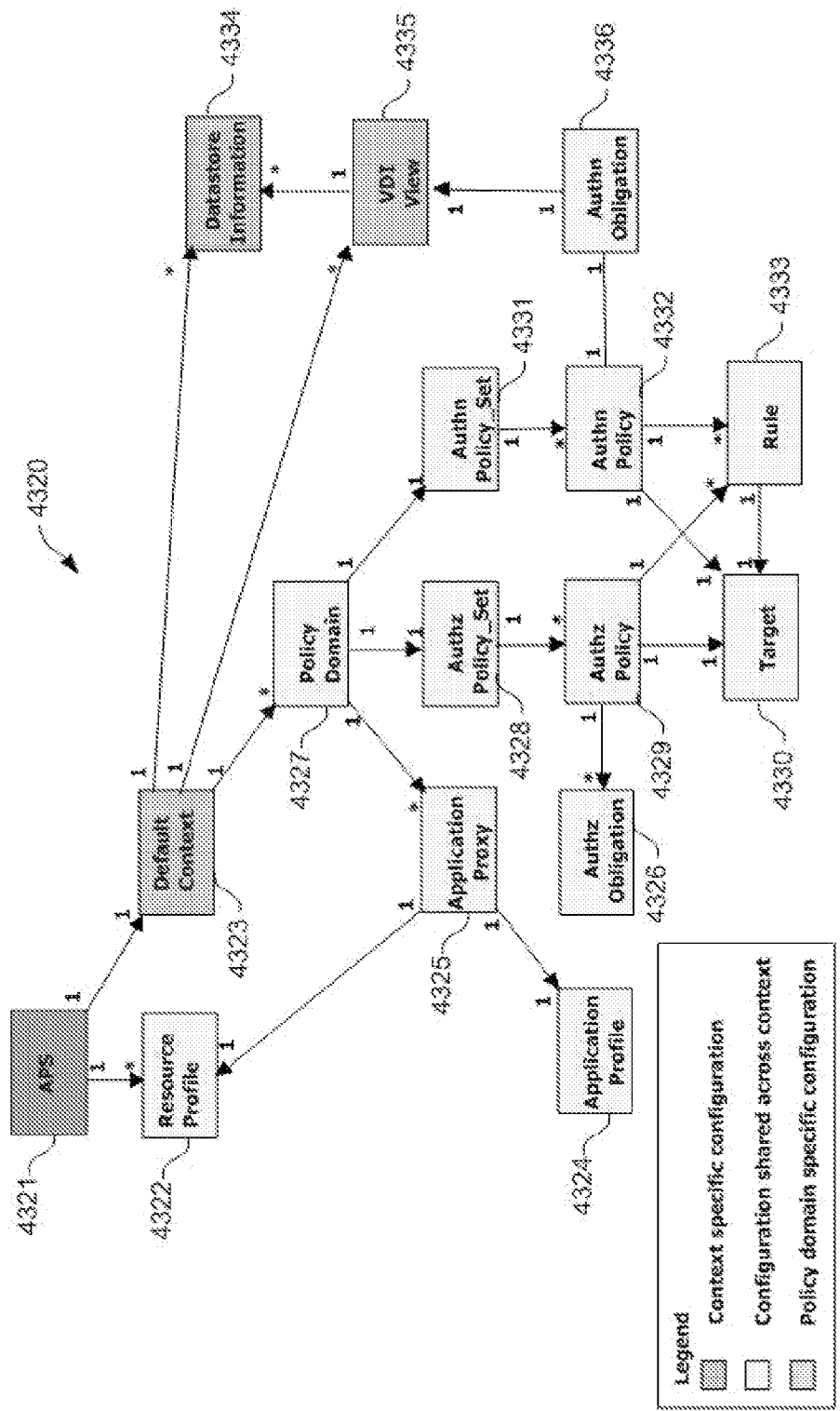
FIG. 62 is a block diagram of an Application Service Processor (ASP) objects for virtualization in an ANA according to one embodiment of the invention.

FIG. 62 shows how the key components of an ASM can be virtualized, according to one embodiment of the invention: The ANA 4321, the default context 4323, the data store information 4334 and the VDI view 4335 have a context-specific configuration. The resource profile 4322 has its configuration shared across two or more contexts.

The application profile 4324, the application proxy 4325, the policy domain 4327, the authorization policy set 4328, the authentication policy set 4331, the authorization obligation 4326, the authorization policy 4329, the authentication policy 4332, the authentication obligation 4336, the target 4330 and the rule 4333 have policy domain-specific configuration.

As a result, a network-centric application-agnostic access control platform can be built which provides guaranteed isolation of the virtual contexts and domains at all levels. For example, without limitation ISO Layer-2 to ISO Layer-4 Network Services of one context can be isolated from another context's ISO Layer-2 to ISO Layer-4 network services, ISO Layer-5 to ISO Layer-7 network services of one context can be isolated another context's ISO Layer-5 to ISO Layer-7 network services, command line interfaces for one context can be isolated from the command line interface of another context, accounting operations from one context can be isolated from the accounting operations from another context, etc. Isolation means that contexts can independently be created, deleted, managed, administered, modified, viewed, analyzed, logged, etc. from each other (see FIG. 60). Further, other divisions of labor among the ISO layers may be contemplated by one of skill in the art; the division may be into two or more service planes, or collections of ISO layers, as may be appropriate to what is needed in a given application.

4. IMPLEMENTATION DETAILS

There are several ways to implement the various embodiments of the invention; more preferably, there are specific ways which may be most cost-efficient. These are described in the following.

4.1 Stream Switch Architecture Based on LDTF

One fundamental, novel principle of this approach is to split the processing architecture into separate planes: A Management Service plane, a Network Service plane and an Application Service plane. The Management Service plane comprises one or more SCMs and is used for all out-of-band connectivity to processing elements on the Network Service plane and to processing elements on the Application Service plane and can be used, for example, for software image downloading, command-line interface, statistic collection messages, general system management functions, configuration management, etc. The Network Service plane comprises one or more NSMs for ISO Layer-2 to ISO Layer-5 processing and proxy functions. The Application Service plane comprises one or more ASMs for ISO Layer-7 services processing and for data stream analysis. As discussed above, this division into a Network Service plane and Application Service plane should be viewed as exemplary only, and other divisions and arrangements and number of service planes may be contemplated by one of skill in the art.

This tri-planar architecture is, for example, shown in FIG. 30, where ASM 2301 performs the processing for the Application Services, NSM 2303 performs the processing for the Network Services and SCM 2305 performs the processing for the Management Service plane. The lossless, low-latency, high-bandwidth LDTF 2302 connects these processing planes for efficient, reliable and scalable inter-process communication. While FIG. 30 explains the tri-planar architecture for the case of converged data center fabric connections to application servers, this tri-planar architecture can easily be adjusted to function with standard Ethernet for application server connections. The adjustments become clear when comparing the architectural aspects shown in FIG. 17 for the case of using converged data center fabric with the architectural aspects shown in FIG. 15, or in FIG. 21 for using standard Ethernet.

Figure 50:
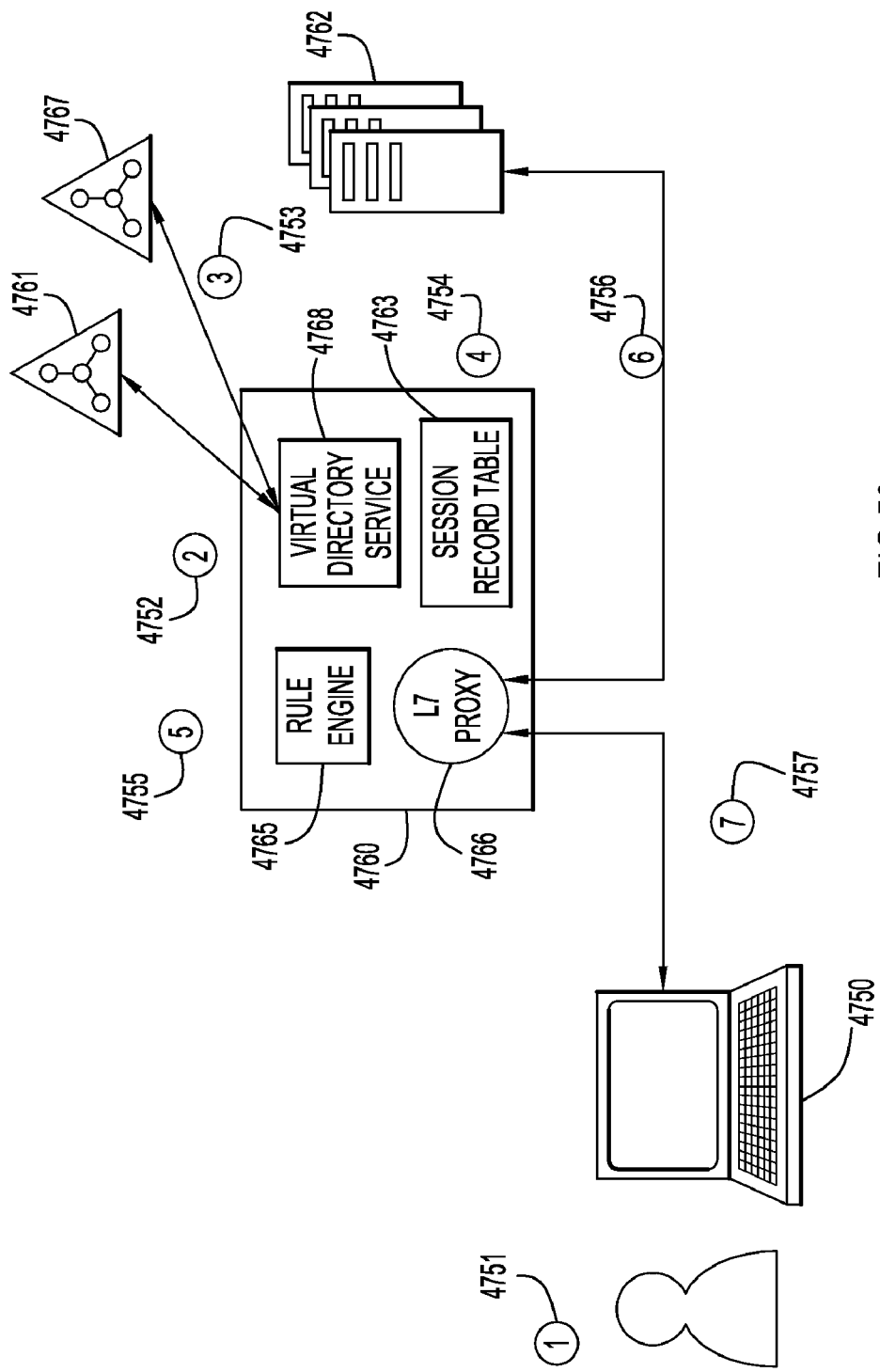
FIG. 50 is a block diagram of a system for Triangulated Authorization of a first request using a Virtual Directory Infrastructure according to another embodiment of the invention.
Figure 63:
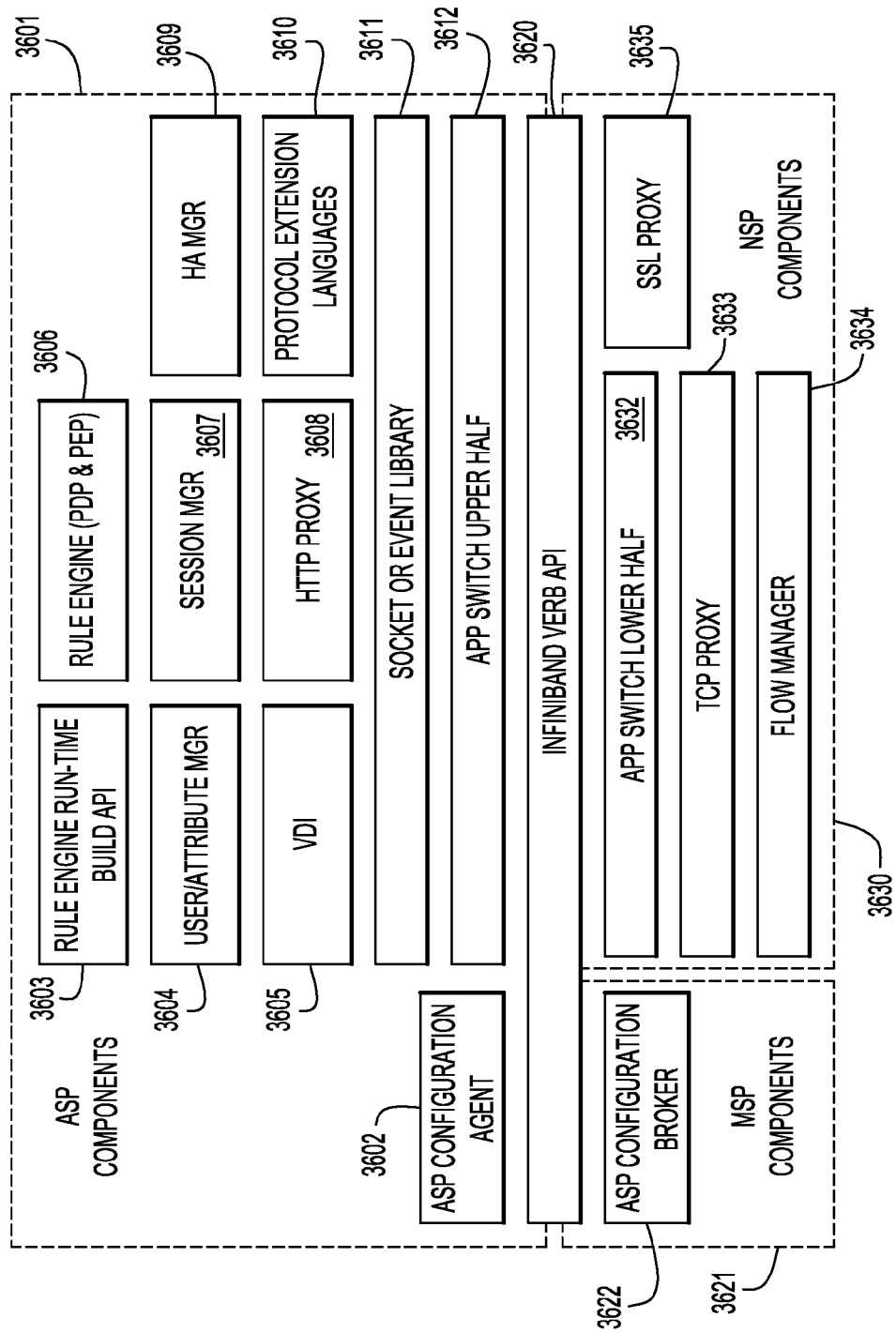
FIG. 63 is a block diagram of functional components for inter-process communication between a NSM and an ASM of an ANA according to one embodiment of the invention.

One embodiment of the invention is shown in FIG. 63, which shows exemplary, non-limiting functional components of an ANA. The processing in Application Service plane is done by ASP components 3601, the processing in the Network Service plane is done by NSP components 3630, the processing in the Management Service plane is done by Management Service processor components 3621 and the LDTF inter-process communication is done by the IB Verb API 3620 which utilizes standard IB techniques known in the art. The ASP components 3601 comprise an ASP configuration agent 3602, the rule engine run-time build API 3603, the user/attribute manager 3604, the Virtual Directory Infrastructure 3605, the rule engine PDP and PEP 3606, the session manager 3607, the HTTP proxy 3608, the high-availability manager 3609, the protocol extension languages 3610, the socket or event library 3611, the application switch upper half 3612. The ASP configuration agent 3602 interacts with the ASP configuration broker 3622 from the Management Service plane 3621 to perform administrative tasks, such as configuration of components with appropriate parameters. The rule engine run-time build API 3603 provides a procedural interface for building rules based on the policies loaded. The user and attribute manager 3604 extracts the various attributes from the data stream which are needed to evaluate policy rules. The user and attribute manager 3604 can, for example, comprise the user/attribute manager 4807 and the content attribute manager 4806 from FIG. 45. The Virtual Directory Infrastructure 3605 provides routines for interacting with Virtual Directory Infrastructure and can, for example, be Virtual Directory Infrastructure 4900 of FIG. 20. The rule engine PDP and PEP 3606 provide routines for evaluating rules from policies. The rule engine PDP and PEP 3606 can, for example, be the rule engine 4765 from FIG. 41 or from FIG. 50. The session manager 3607 provides routines for extracting, managing and storing session information and can, for example, interface with the session record table 4763 from FIG. 41 or from FIG. 50. The HTTP proxy 3608 provides routines to perform operations required when proxying the HTTP protocol in this centrally terminated stream-switch architecture. The HTTP proxy 3608 can, for example, be the HTTP proxy 4811 from FIG. 41 or from FIG. 50. The high-availability manager 3609 performs routines for monitoring components and for synchronizing redundant stateful data in the various components. The protocol extension languages 3610 provides routines required for proxying custom protocols from Application Services and interacts, for example, with the custom protocol proxy 4812 from FIG. 41 or from FIG. 50. The socket or event library 3611 provides, for example, routines for non-RDMA communication which uses TCP sockets. The application switch upper half 3612 interacts with the IB Verb API 3620 and provides routines for RDMA-based inter-process communication.

4.1.1 Modules Overview—SCM

The SCM comprises one or more Management Service processors which run, for example, routines for chassis management, configuration management, software image management, auditing and logging, and platform high-availability. Because these do not require a lot of compute power a low-end standard micro-processor for the one or more Management Service processors is sufficient.

4.1.2 Modules Overview—NSM

Figure 34:
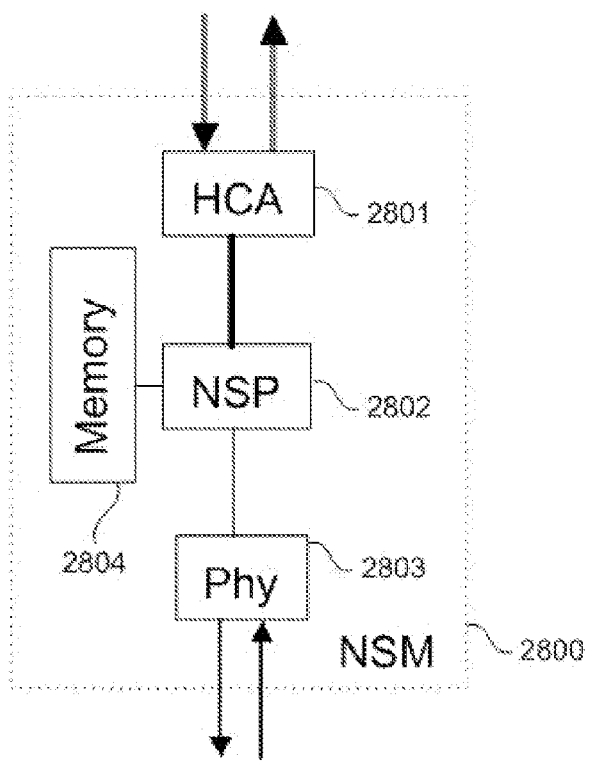
FIG. 34 is a block diagram of a Network Service Module (NSM) of an ANA according to one embodiment of the invention.
Figure 64:
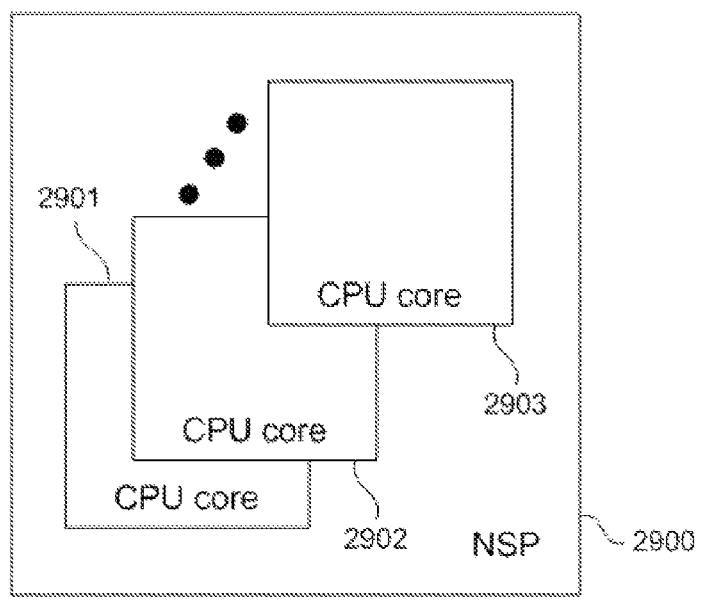
FIG. 64 is a block diagram of a NSP of an ANA according to one embodiment of the invention.
Figure 65:
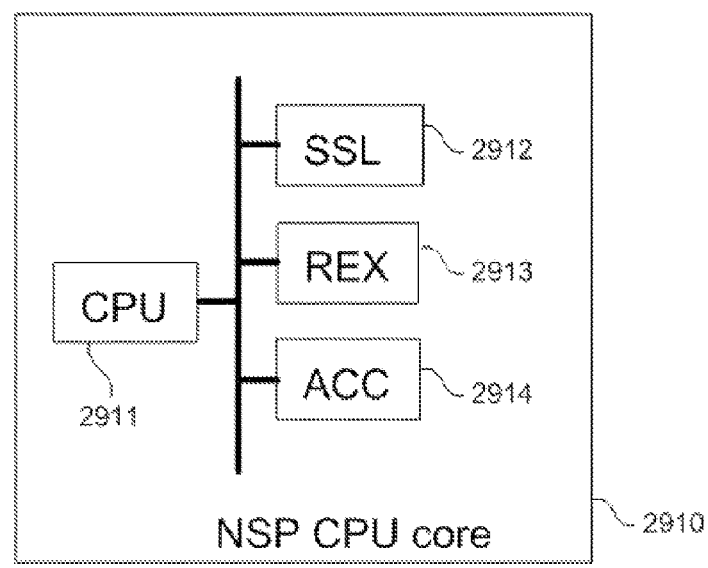
FIG. 65 is a block diagram of a NSP core of an ANA according to one embodiment of the invention.
Figure 66:
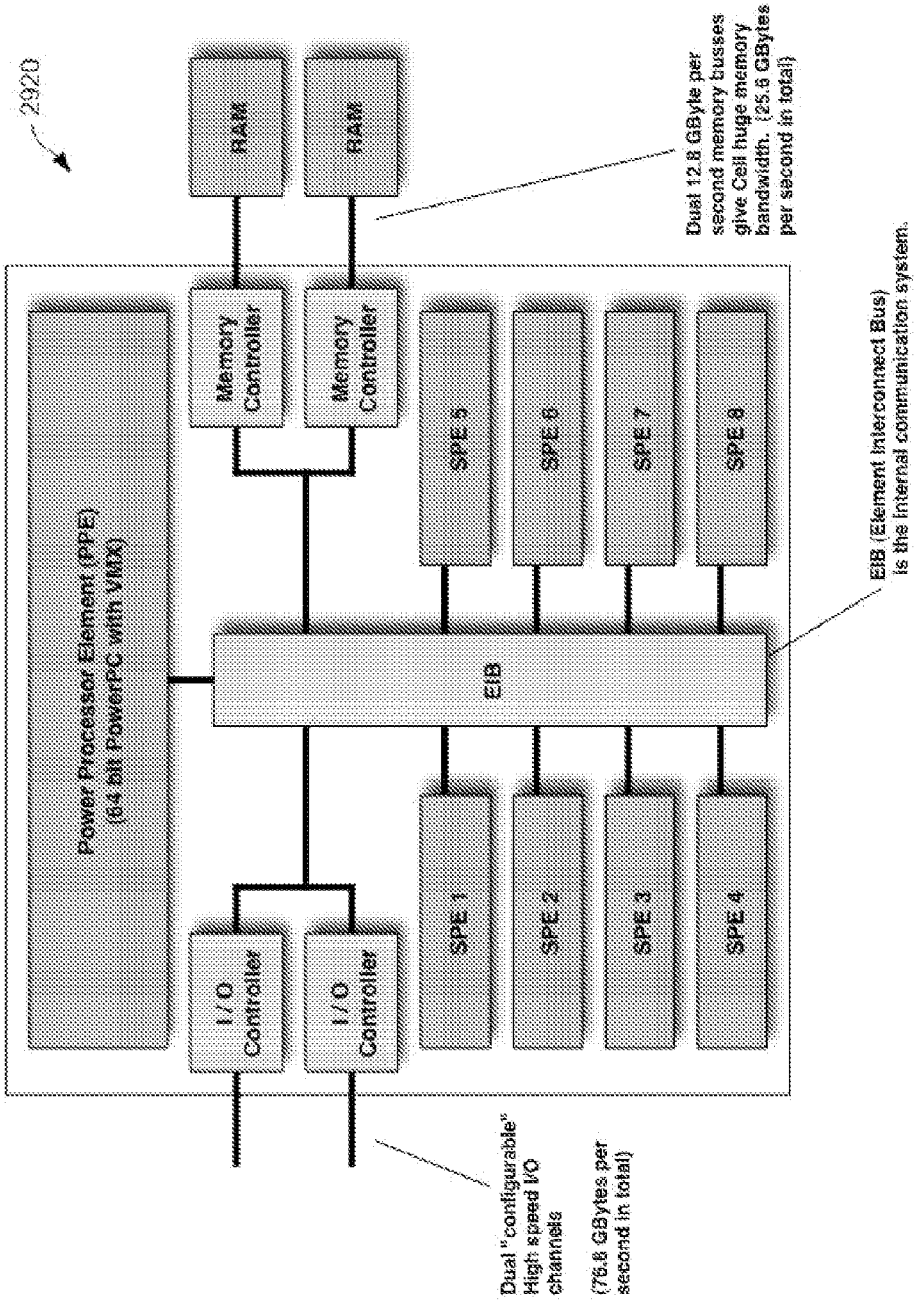
FIG. 66 is a block diagram of a chip-multi-processor for use as a NSP of an ANA according to another embodiment of the invention.
Figure 67:
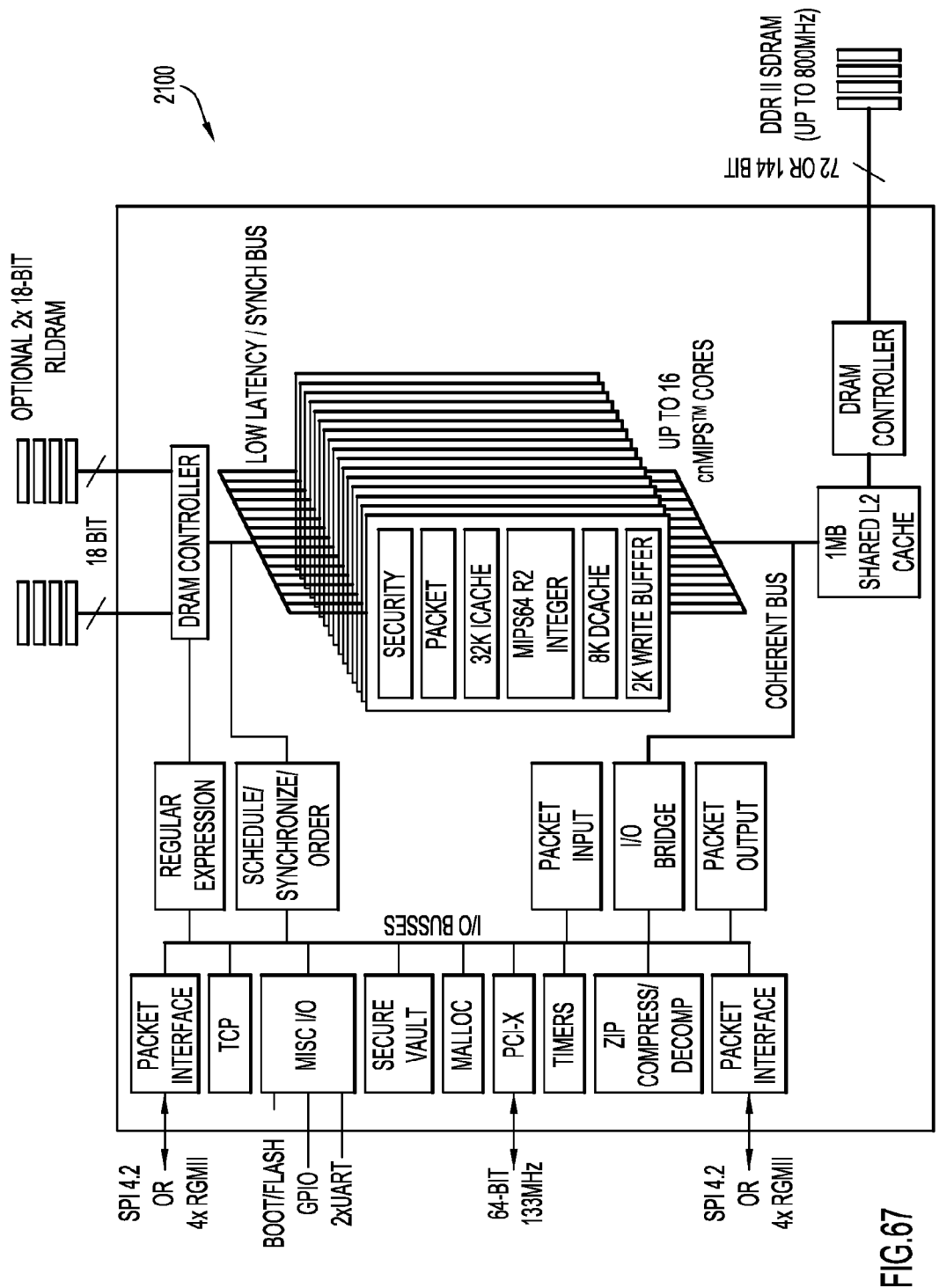
FIG. 67 is block diagram of another chip-multi-processor for use as a NSP of an ANA according to yet another embodiment of the invention.

On the hardware side, a NSM comprises one or more NSPs. In one embodiment of the invention the NSM is the NSM 2800 of FIG. 34. Because a NSP has to perform compute-intensive tasks which can be parallelized efficiently, it is desirable to use a multi-processing system for the NSP. In one embodiment of the invention, the NSP is the NSP 2900 from FIG. 64, which comprises multiple CPU cores 2901, 2902, and 2903 for parallel processing. Because very specialized processing—namely ISO Layer-2 to ISO Layer-5 processing—needs to be done within a NSP, it is also desirable to deploy special purpose hardware accelerator units within a NSP. FIG. 65 shows how in the NSP CPU core 2910, the CPU 2911 is complemented by an SSL accelerator unit 2912, a regular expression accelerator unit 2913 and an ACC accelerator 2914. In another embodiment of the invention a Chip-Multi-Processor such as the IBM cell processor 2920 from FIG. 66 is used to implement one or more NSPs. And in yet another embodiment of the invention Cavium Networks' Octeon CN5860 CPU from FIG. 67 is used to implement one or more NSPs. While the figures are described in conjunction with particular hardware, this is not intended to be a limitation. Other hardware, as known to one of skill in the art is contemplated within the scope of the present inventions.

Figure 68:
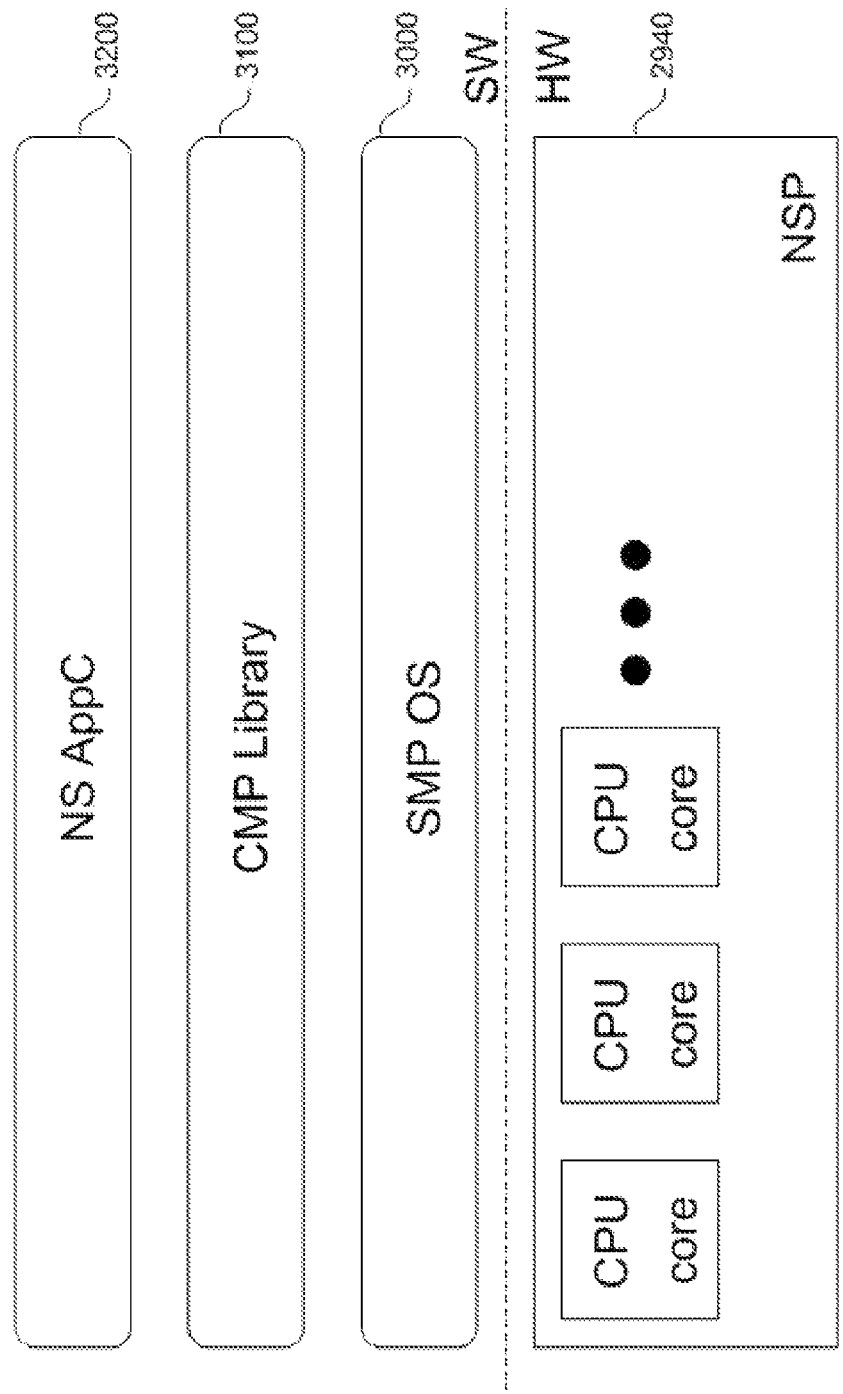
FIG. 68 is a block diagram of a software architecture for a NSP of an ANA according to one embodiment of the invention.
Figure 69:
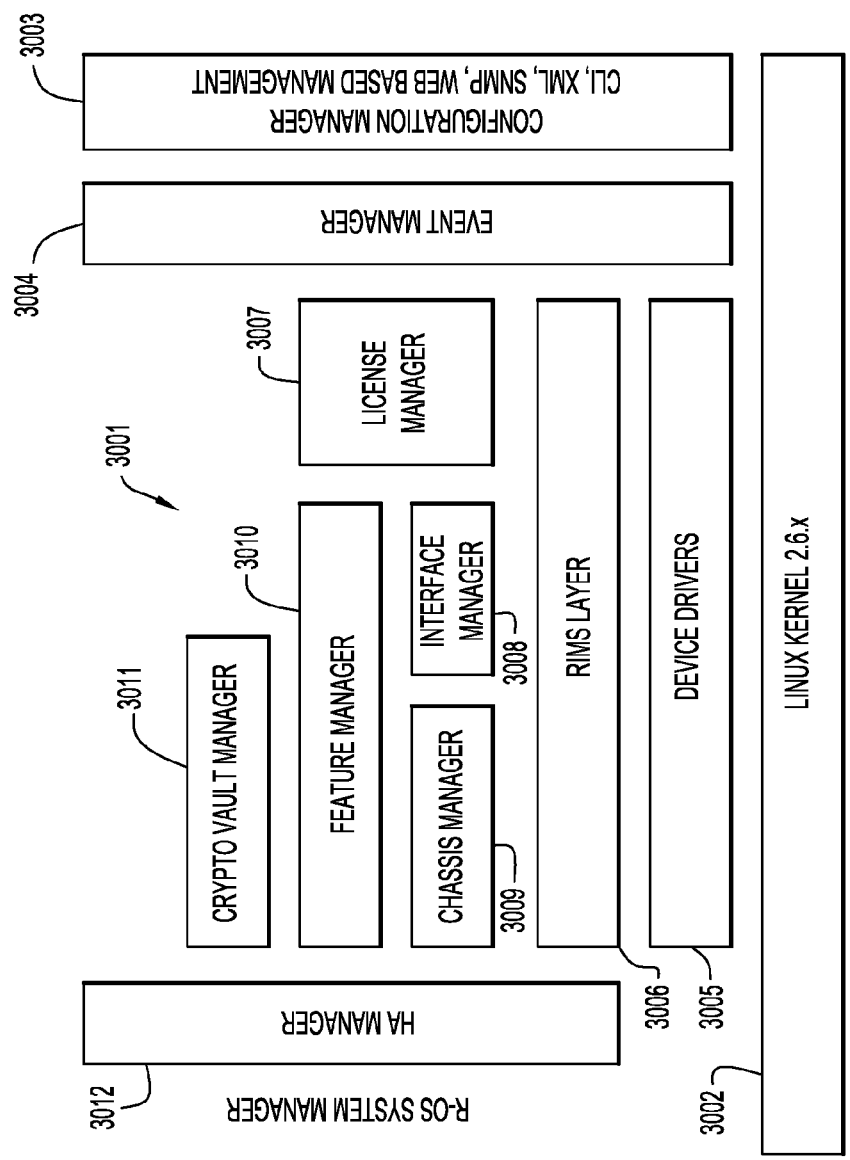
FIG. 69 is a block diagram of an operating system for a NSP of an ANA according to one embodiment of the invention.
Figure 70:
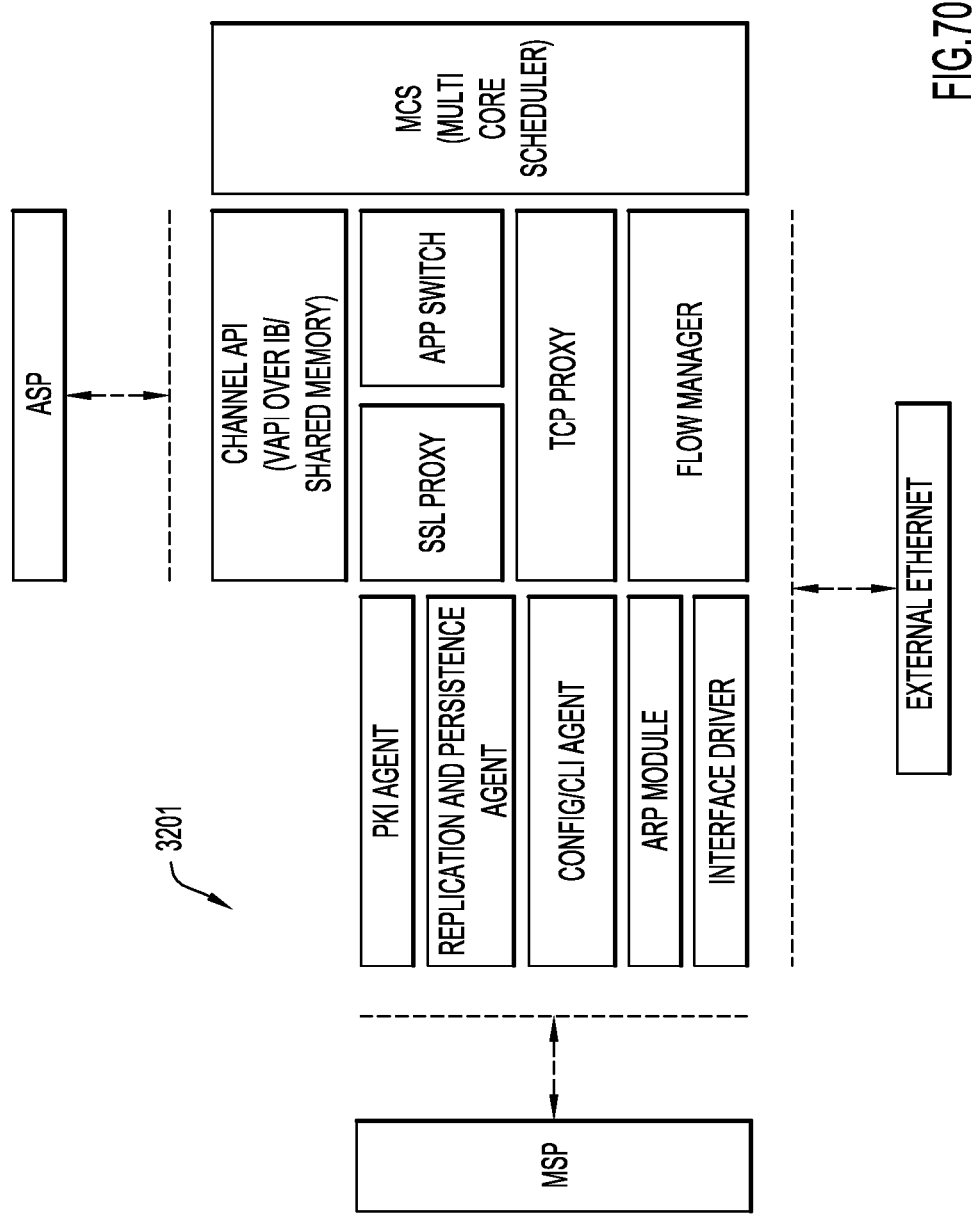
FIG. 70 is a block diagram which illustrates the application software blocks of a NSP of an ANA according to one embodiment of the invention.

On the software side, the one or more NSPs of a NSM run, for example, without limitation, routines for ingress and egress processing for external data-path, for processing of the IP stack, for TCP and SSL termination, for fast-path flow switching, for data stream load balancing among multiple ASPs, for stream replication to backup NSPs, etc. FIG. 68 shows an exemplary software architecture for a NSP according to one embodiment of the invention described herein. The NSP 2940, which comprises one or more CPU cores, runs the symmetric multiprocessing operating system 3000. Above the SMP OS 3000 sits a Chip-Multi-Processing library 3100, which has special routines to exploit the parallel compute elements within the NSP. The Chip-Multi-Processing library 3100 can support parallel or pipelined multi-processing. On top of that sits the Network Service Application Container 3200. In one embodiment of the invention, the SMP OS 3000 of FIG. 68 can be the R-OS 3001 of FIG. 69. R-OS 3001 comprises the Linux kernel 2.6.x 3002, the Configuration Manager 3003, the Event Manager 3004, Linux device drivers 3005, the RIMS layer 3006 which is an inter-process communication layer which provides R-OS infrastructure messaging services to service access points, the License Manager 3007, the Interface Manager 3008, the Chassis Manager 3009, the Feature Manager 3010, the Crypto Vault Manager 3011, and the High-Availability Manager 3012. In one embodiment of the invention the Network Service Application Container 3200 can comprise the routines 3201 as shown in FIG. 70. These can, for example, be used to perform data stream load balancing of incoming client traffic among two or more ASPs. Load balancing uses one-sided RDMA read operations for checking an ASP's load without interrupting the processing on the ASPs.

4.1.3 Modules Overview—ASM

Figure 71:
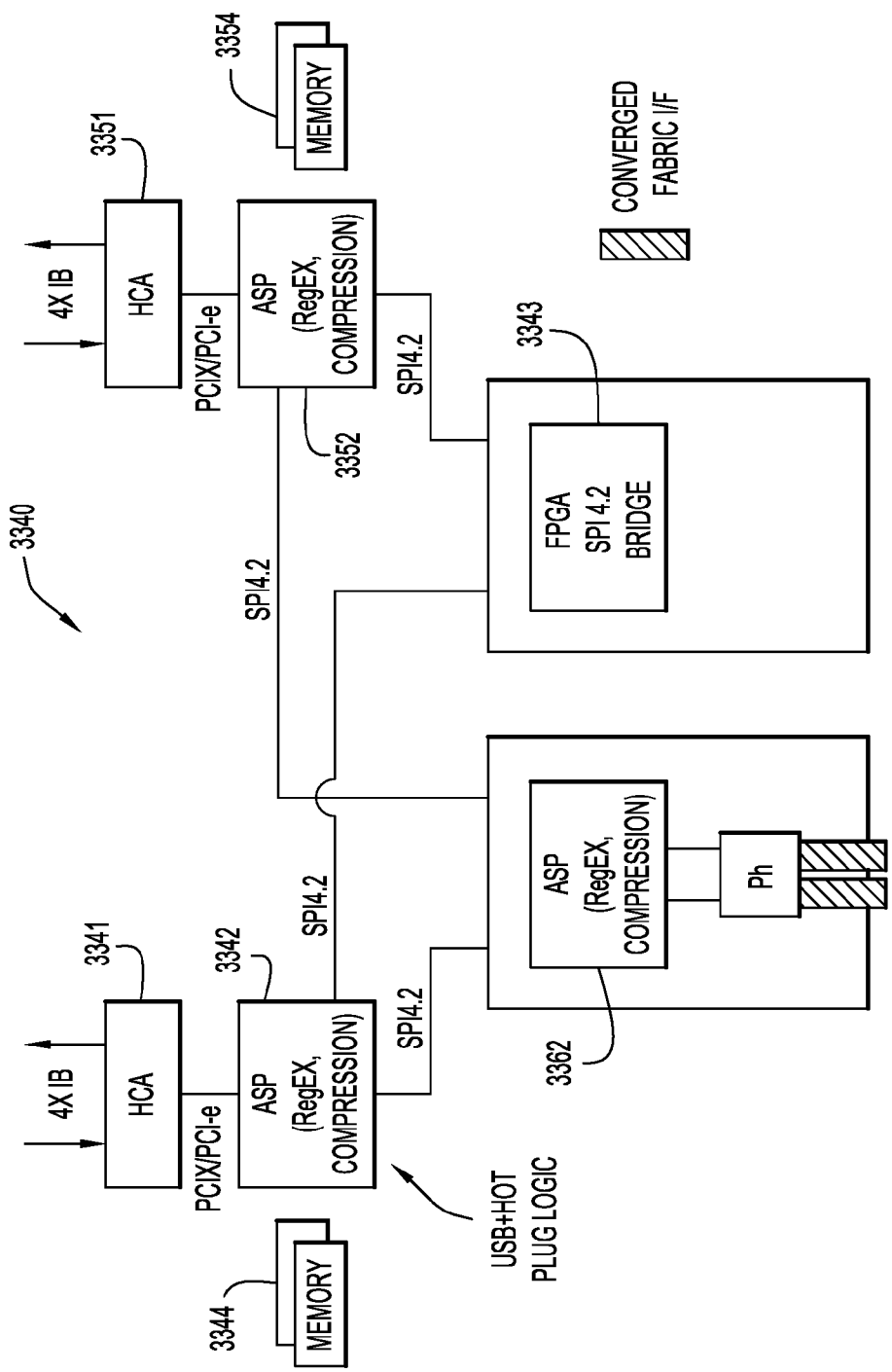
FIG. 71 is a block diagram of an ASM of an ANA according to yet another embodiment of the invention.

On the hardware side, an ASM comprises one or more ASPs. In one embodiment of the invention the ASM is the ASM 3300 of FIG. 36. In another embodiment of the invention the ASM is the ASM 3340 of FIG. 71. The ASM 3340 can comprise one or more ASPs 3342, 3352 and 3362, FPGA SPI bridge 3343, Memory 3344 and 3354, and IB host channel adapters HCA 3341 and 3351 which provide connection to the IB fabric. The ASPs 3342, 3352, 3362 and the FPGA 3343 are also connected via SPI 4.2 buses. The ASP 3362 also is connected to a Phy, which connects to converged data center fabric.

Many different possibilities exist for implementing an ASP. Because an ASP has to perform compute intensive tasks which can be parallelized efficiently, it is desirable to use a multi-processing for the ASP. In one embodiment of the invention, the ASP is similar to the one as shown in FIG. 64, which comprises multiple CPU cores 3401, 3402, and 3403 for parallel processing. Because very specialized processing—namely data stream processing—needs to be done within an ASP it is also desirable to deploy special purpose hardware accelerator units within an ASP. The ASP CPU core architecture is similar to the one as shown in FIG. 65. In another embodiment of the invention a Chip-Multi-Processor such as the IBM cell processor similar to the one as shown in FIG. 66 is used to implement one or more ASPs. And in yet another embodiment of the invention, Cavium Networks' Octeon CN5860 CPU from FIG. 67 is used to implement one or more ASPs.

On the software side, the one or more ASPs of an ASM run, for example, routines for HTTP protocol proxy functions, CIFS protocol proxy functions, JDBC protocol proxy functions, regular expression checks, protocol recognition, application authorization, and state replication to backup ASPs. The software architecture for an ASP is similar to the one shown in FIG. 68. The ASP, which comprises one or more CPU cores, runs the symmetric multiprocessing operating system. Above the SMP OS sits a Chip-Multi-Processing library, which has special routines to exploit the parallel compute elements within the ASP. The Chip-Multi-Processing library can support parallel or pipelined multi-processing. On top of that sits the Application Service Application Container. In one embodiment of the invention, the SMP OS can be the R-OS similar to the one as shown in FIG. 69. R-OS comprises the Linux kernel 2.6.x, the Configuration Manager, the Event Manager, Linux device drivers, the RIMS layer, which is an inter-process communication layer which provides R-OS infrastructure messaging services to service access points, the License Manager, the Interface Manager, the Chassis Manager, the Feature Manager, the Crypto Vault Manager, and the High-Availability Manager.

4.1.4 Modules Overview—LDTF Connectivity

Figure 72:
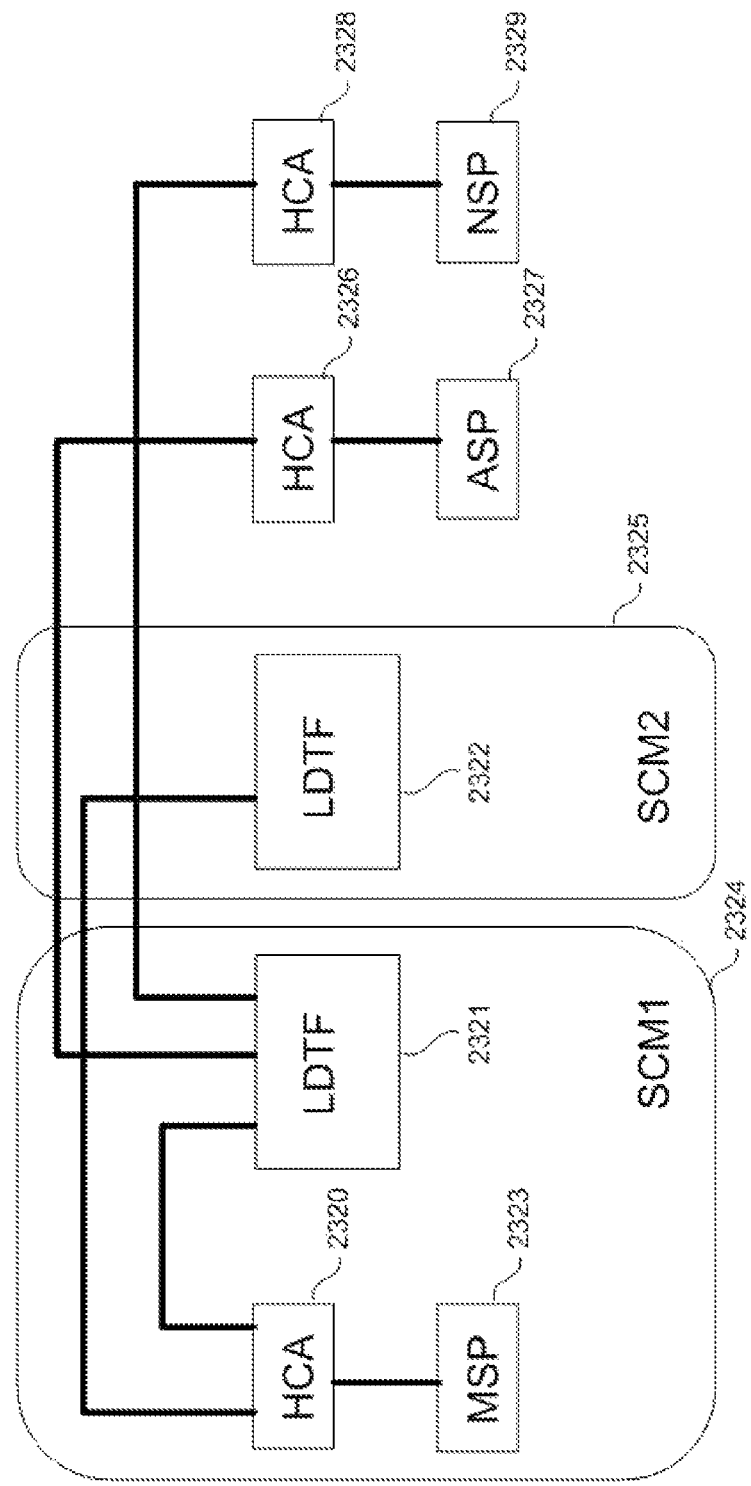
FIG. 72 is a block diagram which illustrates the connectivity of the LDTF according to another embodiment of the invention.
Figure 73:
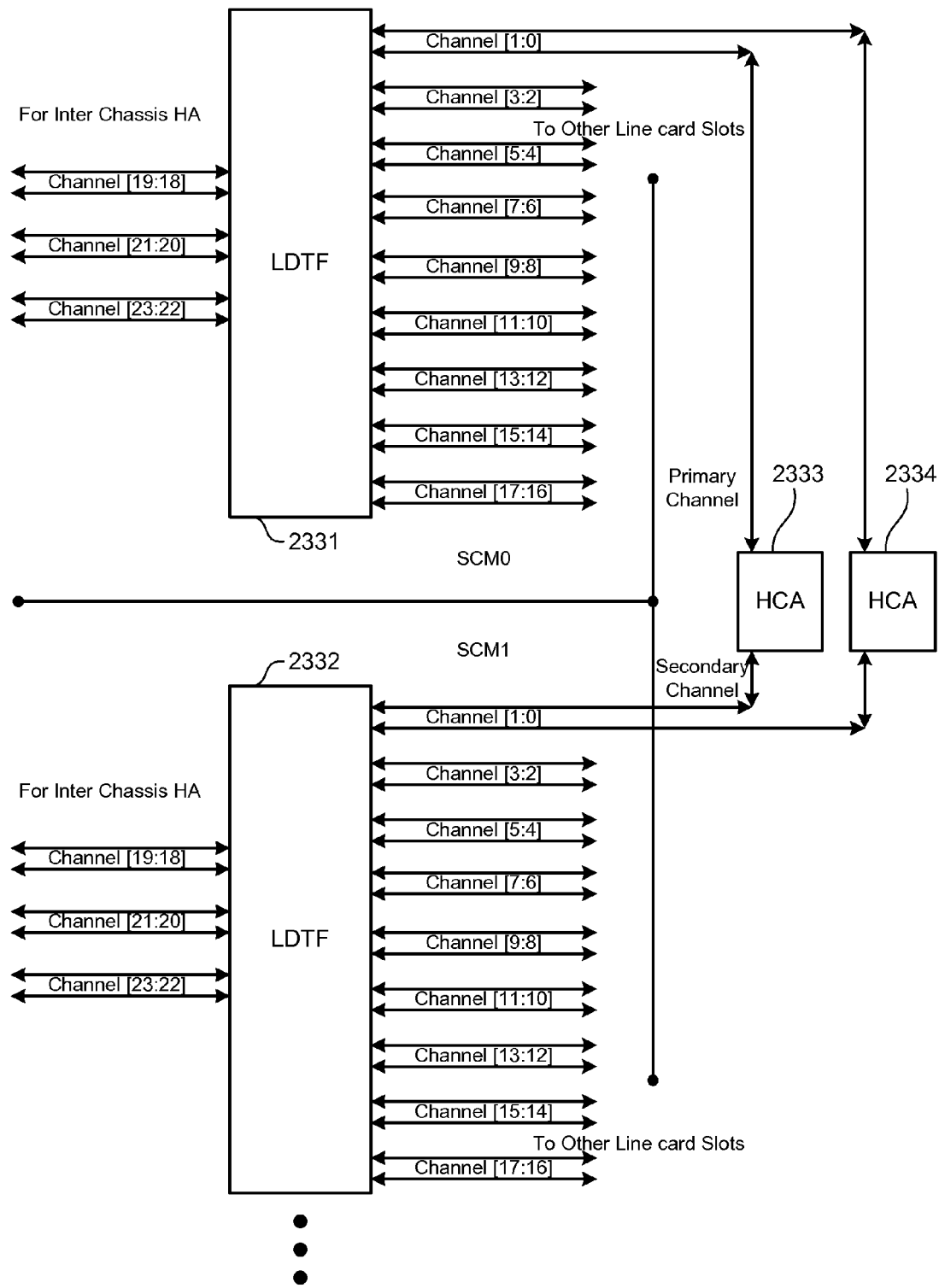
FIG. 73 is a block diagram which illustrates details of the LDTF connectivity according to another embodiment of the invention.

The LDTF provides the data plane connectivity between the one or more NSMs and the one or more ASMs. The LDTF can also provide management plane connectivity between the one or more SCMs, the one or more NSMs and the one or more ASMs. This is shown in FIG. 72 where, for example, two SCMs SCM1 2324 and SCM2 2325 provide LDTF switch 2321 and 2322. Connected to LDTF switch 2321 is Management Service processor MSP 2323—via host channel adapter HCA 2320—NSP 2327—via host channel adapter HCA 2326—and NSP 2329—via host channel adapter HCA 2328. Connected to LDTF switch 2322 is Management Service processor MSP 2323—via host channel adapter HCA 2320. In one embodiment of the invention, IB fabric is used to provide lossless, low-latency, high-bandwidth any-to-any switching. The IB fabric supports multicast communication and credit-based flow control. IB can support 16 virtual lanes; 15 virtual lanes can be used to implement the data plane and one virtual lane can be used to implement the management plane. The detailed connectivity of the IB fabric is shown in FIG. 73: The IB fabric 2331 which belongs to one SCM and the IB fabric 2322 which belongs to another SCM can be connected channel-wise via host channel adaptors HCA 2333 and HCA 2334. Other IB fabric connections can go to other line card slots within the same ANA or can be used for inter-chassis high-availability links. Other LDTF fabrics may provide different limitations on the number and type of virtual and physical lanes. Further, the IB specification may evolve and improve in future. In addition, as will be appreciated by one of skill in the art, it is possible to combine multiple fabrics, for example, IB fabrics, and both aggregate and further virtualize the virtual lanes available within and among them.

4.1.5 Processing Flows

Splitting the data network processing into two separate domains, Network Service processing and Application Service processing—especially when constrained by scalability and high-availability—may require a particular processing flow between the one or more NSPs and the one or more ASPs.

For example, it is desirable to enforce flow-control because the proxy splits the client-server connection into two portions: One client-to-proxy connection which typically has a high round-trip delay time and low throughput and a proxy-to-server connection which typically has low round-trip delay time and high throughput. The flow control for the client connection and the server connection mimic the behavior of the end-to-end flow-control of the original client-to-server connection. The internal LDTF enables the mapping of connection-level flow-control using RDMA queue-pair flow-control and therefore solves the problem created by splitting the client-server connection with a proxy.

Figure 29:
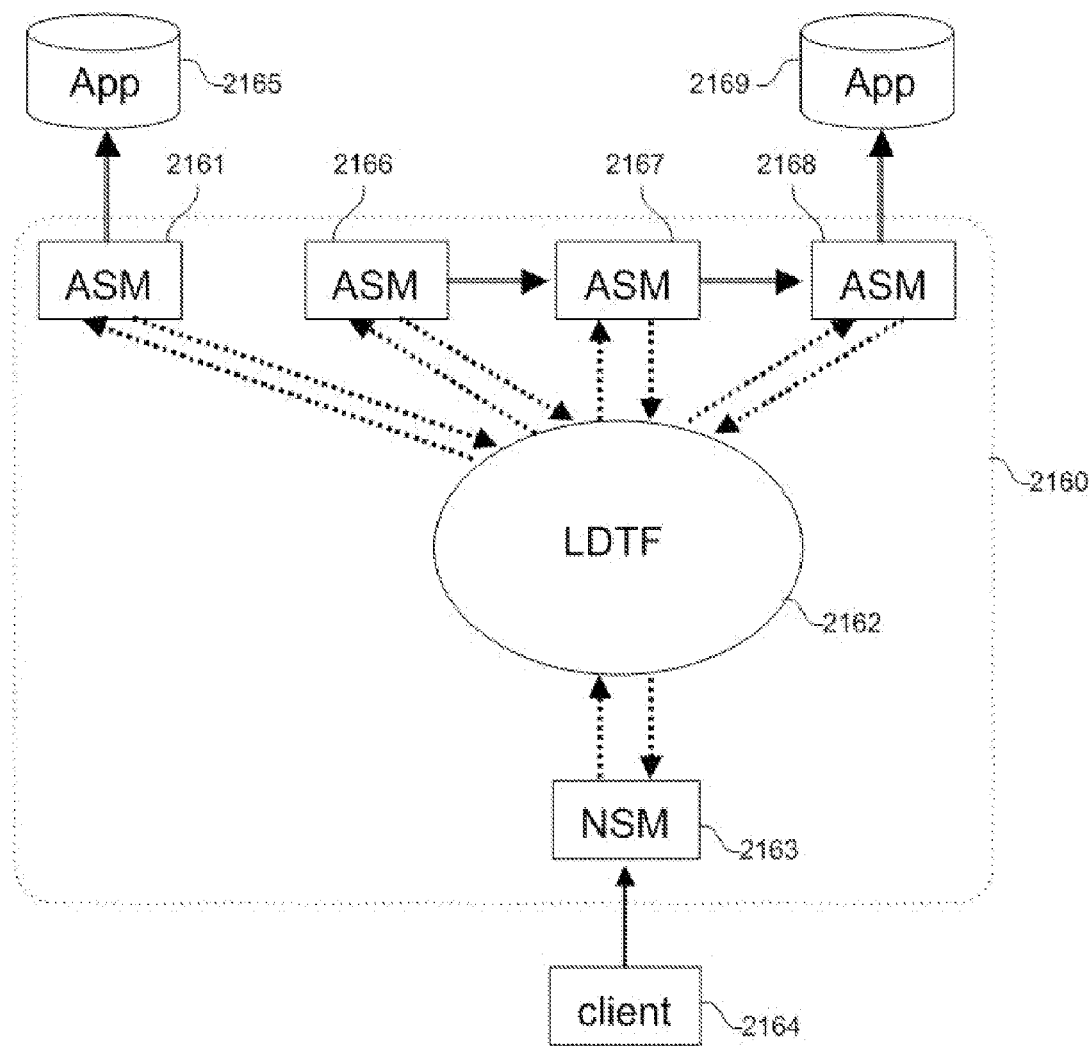
FIG. 29 is a block diagram which illustrates scalability of an ANA according to yet another embodiment of the invention.
Figure 74:
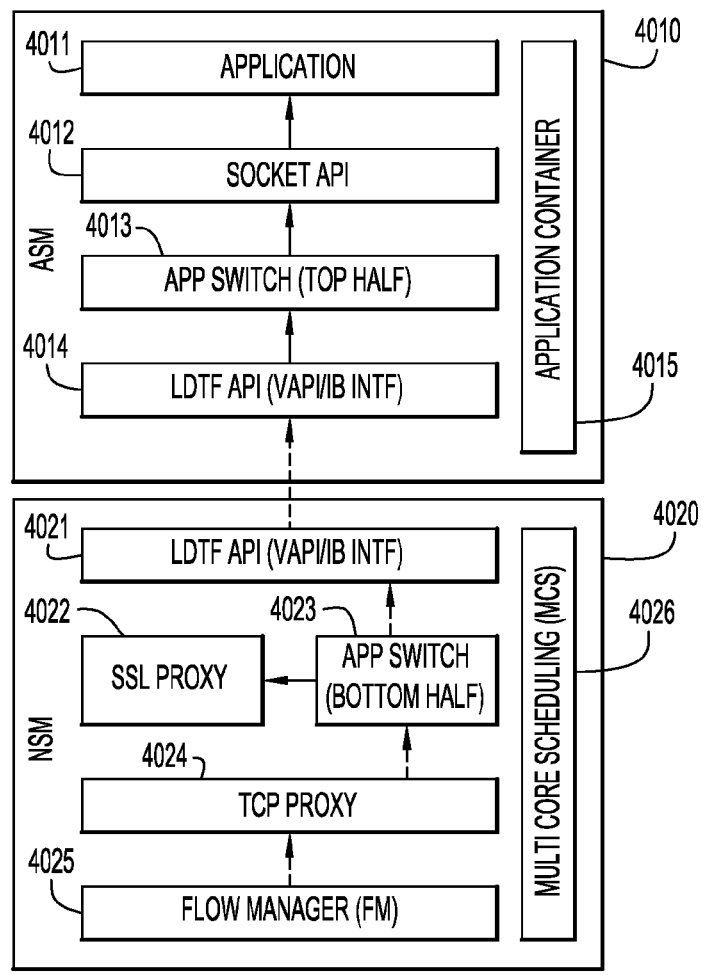
FIG. 74 is a block diagram which illustrates inter-process communication between a NSP and an ASP in an ANA according to one embodiment of the invention.

FIG. 74 shows a processing flow in accordance to one embodiment of the invention. The network processing is split between the Network Service processing 4020 and the Application Service processing 4010. The Network Service processing 4020 can, for example, be done by NSM 2103 of FIG. 15, or by NSM 2123 of FIG. 17, or by NSM 2800 of FIG. 34. The Application Service processing 4010 can, for example, be done by ASM 2101 of FIG. 15, or by ASM 2121 of FIG. 17, or by NSM 3300 of FIG. 36. The Network Service processing 4020 comprises Flow Manager 4025, TCP Proxy 4024, SSL Proxy 4022, Application Switch 4023, Channel API 4012, and Multi-Core Scheduling 4026. The Flow Manager 4025 performs network load balancing on ingress and egress network connections. The TCP Proxy 4024 does TCP termination and acts as an ISO Layer-2 to ISO Layer-4 proxy between client and server. The Application Switch 4023 transforms (among other processing) the PDU payload into a data stream. In case the network data is SSL encrypted, the data stream is forwarded to SSL Proxy 4022. Then the data stream is sent to the Channel API 4021 which sends the data stream data via the LDTF to the ASM's Channel API 4014. The Multi-Core Scheduling 4026 performs load balancing of the network processing among two or more NSPs. The Application Service processing 4010 comprises the Channel API 4014, the Application Switch 4013, the Socket API 4012, the Application processing 4011, and the Application Container 4015. The Channel API 4014 receives the data stream data from the NSM's Channel API 4021 and forwards it to the Application Switch 4013, which performs ISO Layer-7 processing on the data stream data such as Triangulated Authorization, etc. To submit the data stream data to the Application 4011, the Socket API 4012 is used. The Application 4011 can, for example, be applications 2005 from FIG. 2. The Application Container 4015 performs load balancing on the two or more ASPs such that the data stream information is either processed in a parallel fashion (refer to FIG. 27), in a pipelined fashion (refer to FIG. 28), or in a hybrid fashion (refer to FIG. 29).

Figure 75:
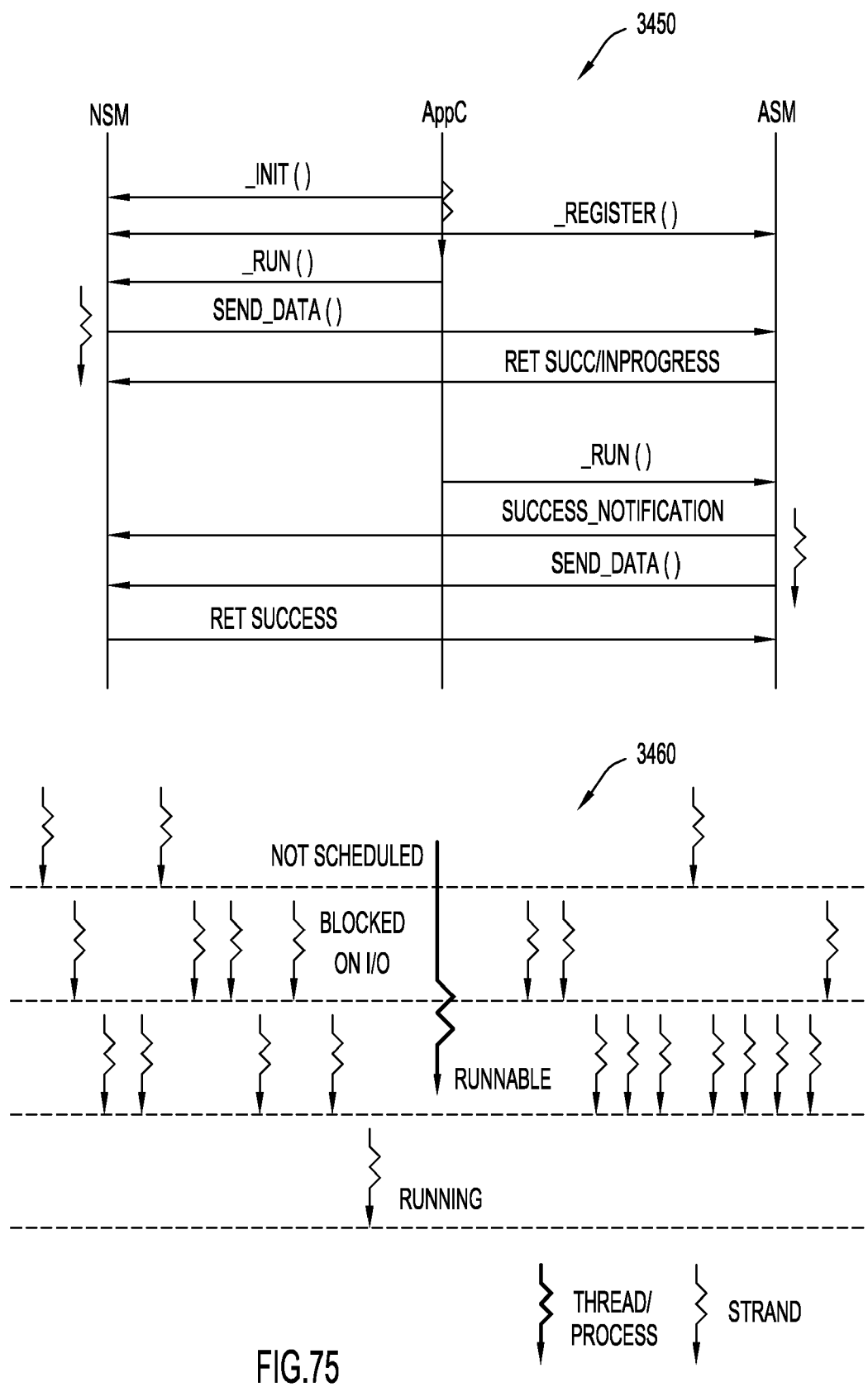
FIG. 75 is a flow diagram which illustrates inter-process communication between a NSM and an ASM of an ANA according to one embodiment of the invention.
Figure 76:
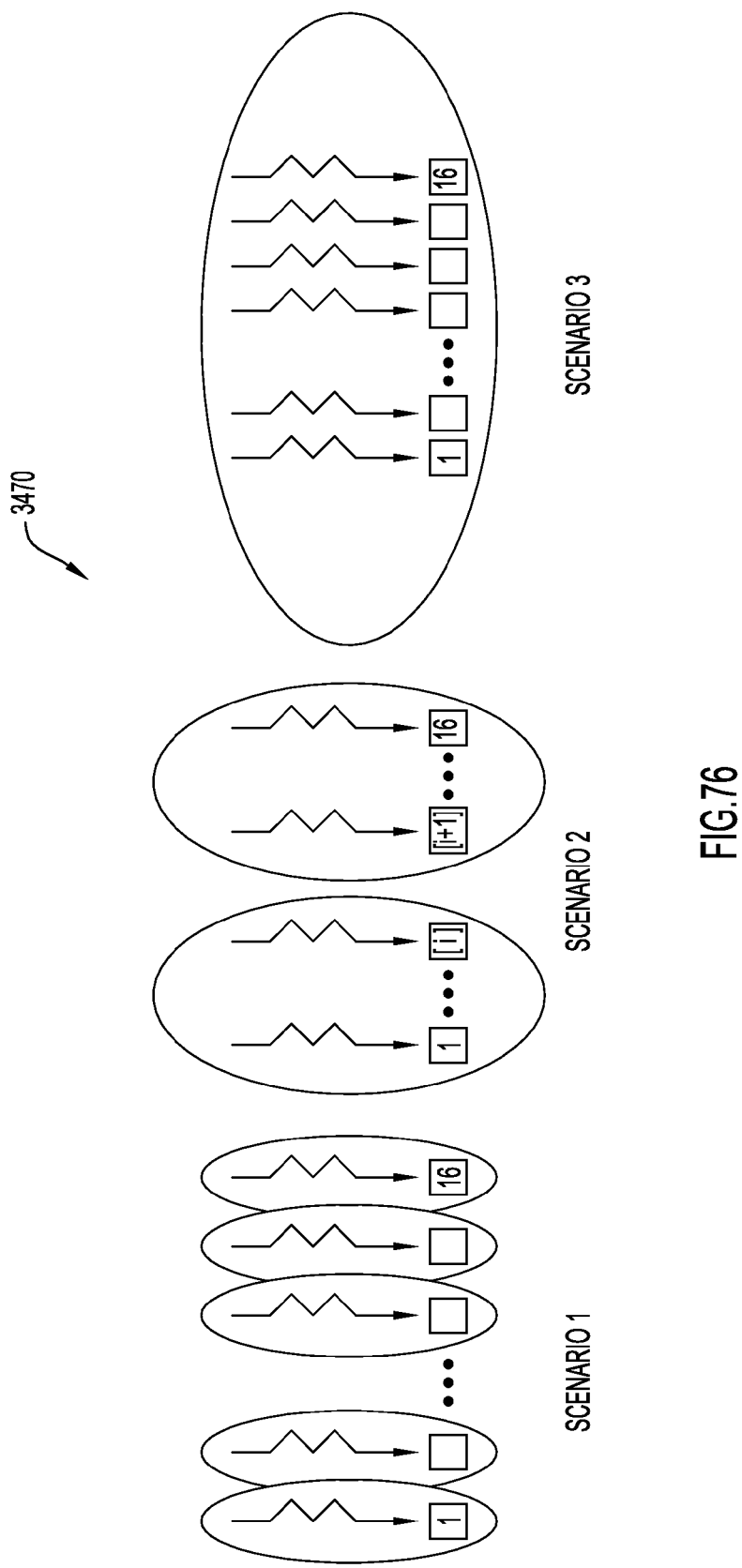
FIG. 76 is a flow diagram which illustrates inter-process communication between a NSM and an ASM of an ANA according to another embodiment of the invention.

Based on the granularity of the processing steps that can be distributed among the two or more NSPs, or the two or more ASPs, several options exist for load balancing, for example, in the Multi-Core Scheduling 4026 or in the Application Container 4015. In order to handle the events for multiple sockets, a typical application will map each socket to a thread or a process. The advantage with this approach is that the scheduling for different socket events is taken care of by the operating system. But the disadvantage is that process and thread scheduling is a very costly operation. Especially for high-speed network applications, which handle many connections, considerable CPU resources will be used just for process and thread scheduling. A library of ultra-light-weight strands can solve this problem by providing a light-weight execution context (the so-called strand) and by mapping a socket to each strand. The strand library enables having multiple strands within a system scheduling context of either processes or threads. Strand scheduling can be performed by a secondary scheduler. Essentially the operating system schedules the processes and threads, and the strand library schedules the strands. The strand scheduler can be completely I/O driven; i.e., a strand is scheduled whenever there is an incoming or outgoing event for a given socket. In order to provide an independent execution context for each strand, a separate stack can be allocated for each strand. FIG. 75 and FIG. 76 describe the use of so-called strands according to one embodiment of the invention: Communication schedule 3450 shows the communication between a NSM and an ASM via an Application Container which can, for example, be Application Container 4015. The combination of threads (or processes) and strands executing in the NSM and in the ASM is given by schedule 3460. The schedule 3470 compares three scenarios of using strands: In Scenario 1 there is one thread per Application Container and as many Application Containers as there are CPUs. In Scenario 3 there is only one Application Container with as many threads within the Application Container as there are CPUs. Different scenarios can be generated in between those two described above and are contemplated within the scope of the present inventions.

Figure 77:
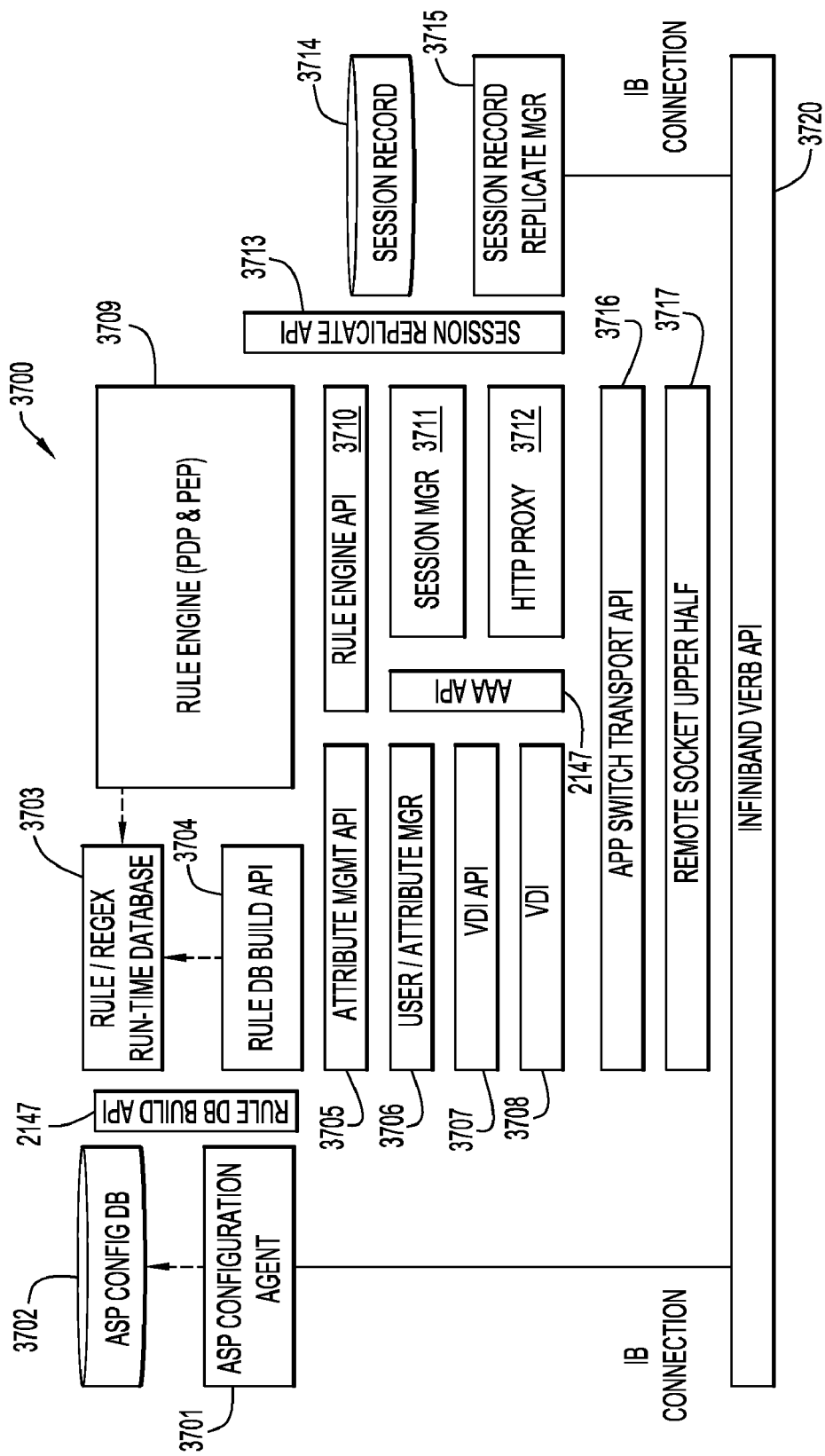
FIG. 77 is a block diagram of functional components to perform Triangulated Authorization in an ANA according to one embodiment of the invention.
Figure 78:
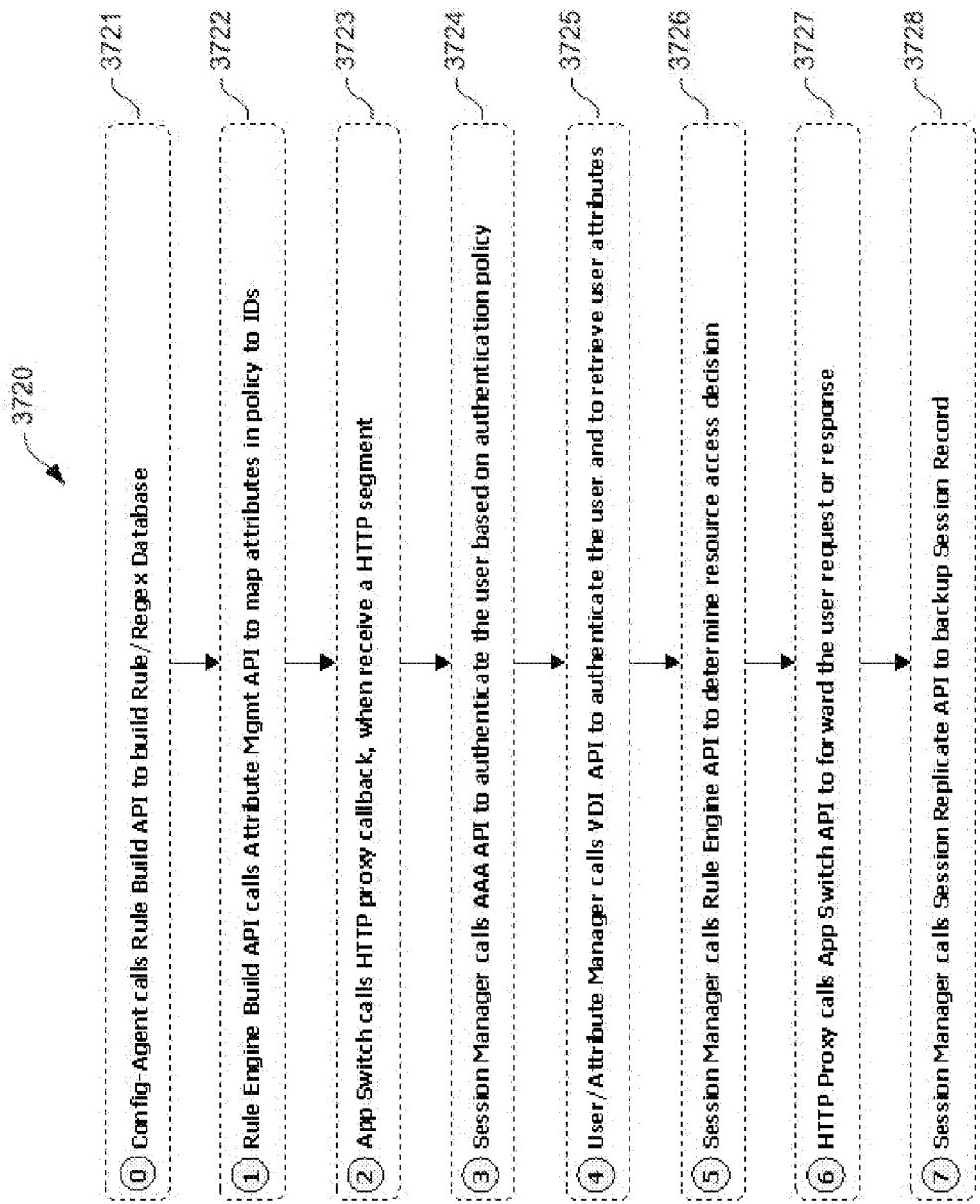
FIG. 78 is a flow diagram to perform Triangulated Authorization in an ANA according to one embodiment of the invention.

The processing flow of yet another embodiment of the invention is shown in FIG. 77 and in FIG. 78. In an initialization step 3721, the ASP Configuration Agent 3701 calls the Rule Engine Build API 3704 to build the rule and regular expression database 3703. In a first step 3722 the Rule Engine Build API 3704 calls the Attribute Management API 3705 to map attributes in the policies to identifications. In a second step 3723, the Application Switch Transport API 3716 calls the HTTP Proxy 3712 callbacks whenever it receives an HTTP segment. In a third step 3724, the Session Manager 3711 calls the AAA API 3718 to authenticate the user based on an authentication policy. In a fourth step 3725, The User and Attribute Manager 3706 calls the Virtual Directory Infrastructure Virtual Directory Infrastructure API 3707 to authenticate the user and to retrieve user attributes from the Virtual Directory Infrastructure Virtual Directory Infrastructure 3708. In a fifth step 3726, the Session Manager 3711 calls the Rule Engine (PDP and PEP) 3709 to determine the resource access decision. In a sixth step 3727, the HTTP Proxy 3712 calls the Application Switch Transport API 3716 to forward the user's request or response. In a seventh step 3728, the Session Manager 3711 calls the Session Record Replicate API 3715 to backup the session record. The order of the above steps is exemplary only, and is not intended to be limiting.

4.1.6 Scalability

Various embodiments of some of the inventions for scalability have been described in this disclosure, for example, the embodiment of the invention illustrated in FIG. 25 can not only be used for high-availability but also to scale an ANA for higher bandwidth and network processing demands. When two or more NSMs or two or more ASMs are connected via LDTF within one ANA, the inter-process communication between NSMs and ASMs then operates via so-called intra-chassis communication. Alternatively, when two or more ANAs are connected via LDTF, the inter-process communication then operates via so-called inter-chassis communication. Or, when both approaches are combined, both intra-chassis and inter-chassis communication goes over the LDTF.

Figure 79:
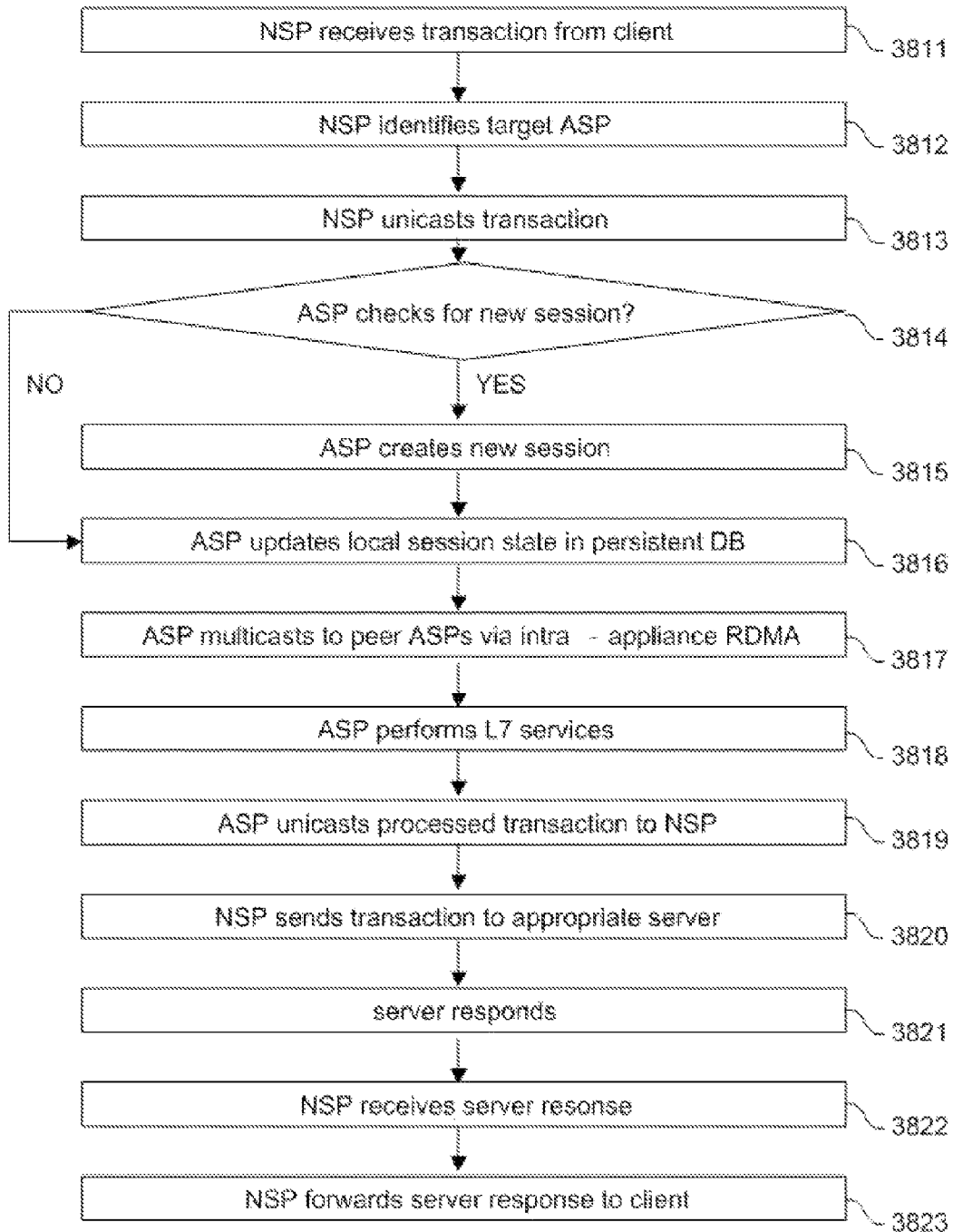
FIG. 79 is a flow diagram of inter-process communication in an ANA according to one embodiment of the invention.

FIG. 79 shows a method for intra-chassis communication between one or more NSMs and one or more ASMs when an application server is connected via classical Ethernet. In step 3811 an NSP receives a transaction from a client. That client can, for example, be client 2001 from FIG. 2. In step 3812 the NSP identifies the target ASP. In step 3813 the NSP uni-casts the transaction to the ASP identified in step 3812. In step 3814 the ASP checks whether this transaction is part of a new session. If the result of this check is positive (YES), the ASP creates a new session in step 3815 and proceeds to step 3816. Otherwise (NO), the method proceeds to step 3816 immediately. In step 3816 the ASP updates the local session state in the persistent database. In step 3817 the ASP multicasts the database information for the updated local session state to the peer ASPs via an intra-chassis RDMA operation. This step is part of achieving high-availability with zero-click fail-over. In step 3818 the ASP performs the ISO Layer-7 services, for example, based on policies. In step 3819 the ASP uni-casts the transaction, which is now processed, back to the NSP. In step 3820 the NSP sends the ISO Layer-7 processed transaction to the appropriate application server. In step 3821 the application server responds and in step 3822 the NSP receives the application server's response. In the last step 3823, the NSP then forwards the application server's response back to the client.

Figure 80:
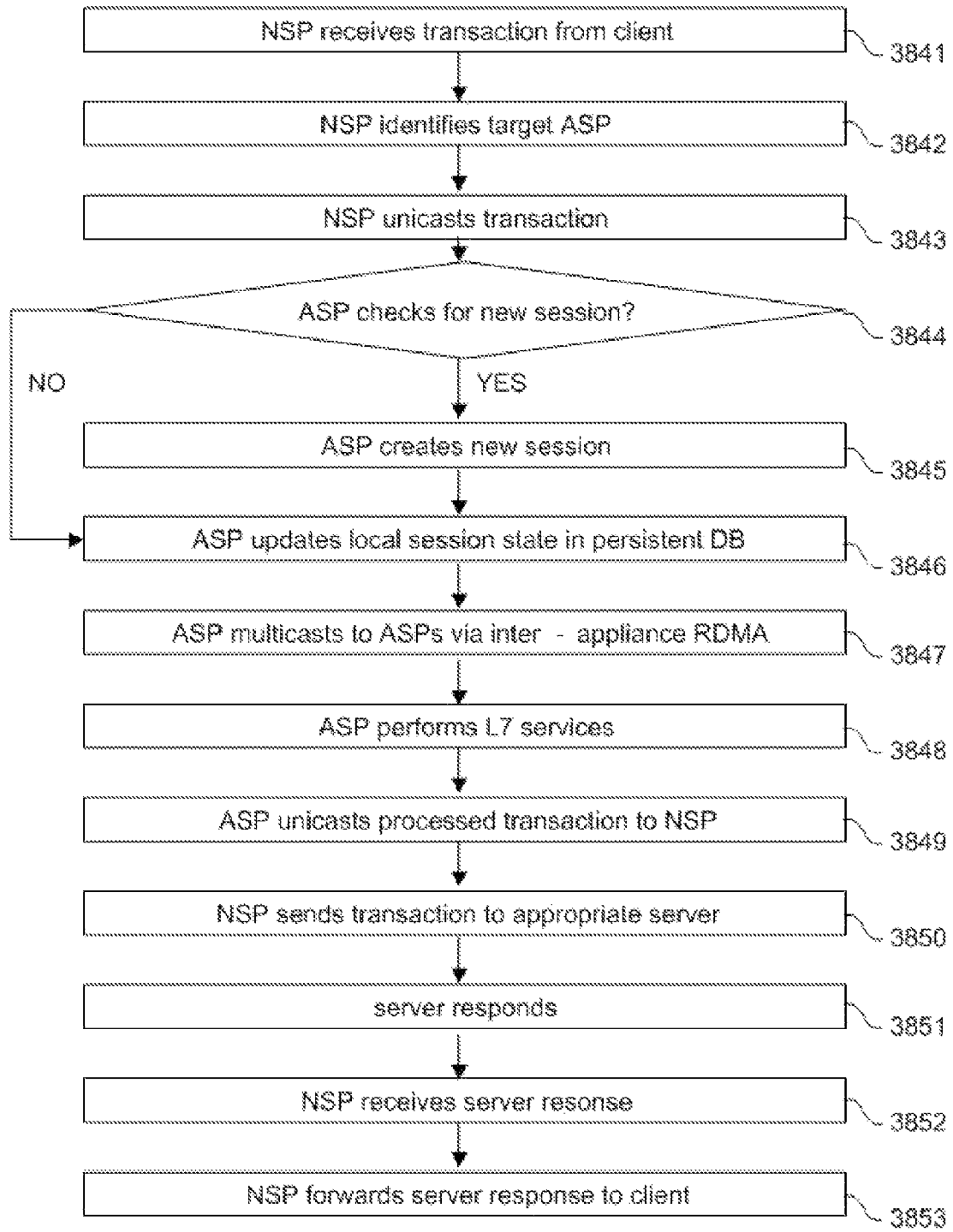
FIG. 80 is a flow diagram of inter-process communication in an ANA according to another embodiment of the invention.

FIG. 80 illustrates a method for inter-chassis communication between one or more NSMs and one or more ASMs when an application server is connected via classical Ethernet. In step 3841, an NSP receives a transaction from a client. That client can, for example, be client 2001 from FIG. 2. In step 3842, the NSP identifies the target ASP. In step 3843, the NSP uni-casts the transaction to the ASP identified in step 3842. In step 3844 the ASP checks whether this transaction is part of a new session. If the result of this check is positive (YES), the ASP creates a new session in step 3845 and proceeds to step 3846. Otherwise (NO), the method proceeds to step 3846 immediately. In step 3846, the ASP updates the local session state in the persistent database. In step 3847, the ASP multicasts the database information for the updated local session state to the peer ASPs via an inter-chassis RDMA operation. This step is part of achieving high-availability with zero-click fail-over. In step 3848, the ASP performs the ISO Layer-7 services, for example, based on policies. In step 3849 the ASP uni-casts the transaction, which is now processed, back to the NSP. In step 3850, the NSP sends the ISO Layer-7 processed transaction to the appropriate application server. In step 3851, the application server responds and in step 3852, the NSP receives the application server's response. In the last step 3853, the NSP then forwards the application server's response back to the client.

Figure 81:
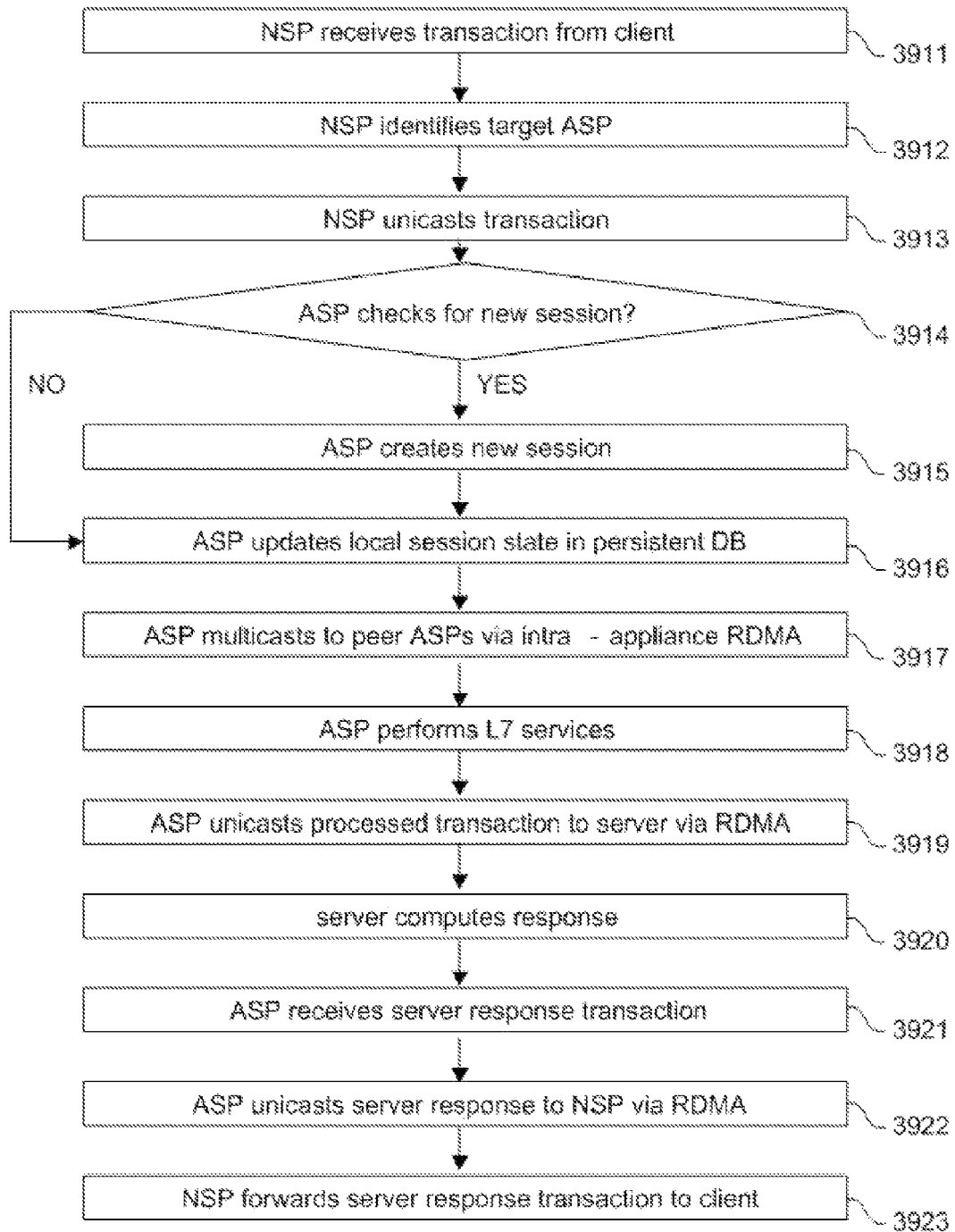
FIG. 81 is a flow diagram of inter-process communication in an ANA with converged data center fabric according to one embodiment of the invention.

FIG. 81 illustrates a method for intra-chassis communication between one or more NSMs and one or more ASMs when an application server is connected via converged data center fabric. In step 3911, an NSP receives a transaction from a client. That client can, for example, be client 2001 from FIG. 2. In step 3912, the NSP identifies the target ASP. In step 3913, the NSP uni-casts the transaction to the ASP identified in step 3912. In step 3914, the ASP checks whether this transaction is part of a new session. If the result of this check is positive (YES), the ASP creates a new session in step 3915 and proceeds to step 3916. Otherwise (NO), the method proceeds to step 3916 immediately. In step 3916, the ASP updates the local session state in the persistent database. In step 3917, the ASP multicasts the database information for the updated local session state to the peer ASPs via an intra-chassis RDMA operation. This step is part of achieving high-availability with zero-click fail-over. In step 3918, the ASP performs the ISO Layer-7 services, for example, based on policies. In step 3919, the ASP uni-casts the transaction, which is now processed, to the application server via RDMA. In step 3920, the application server computes the response and in step 3921, the ASP receives the application server's response transaction. In step 3922, the ASP uni-casts the application server's response to the NSP via the LDTF. In the last step, 3923 the NSP then forwards the application server's response back to the client.

Figure 82:
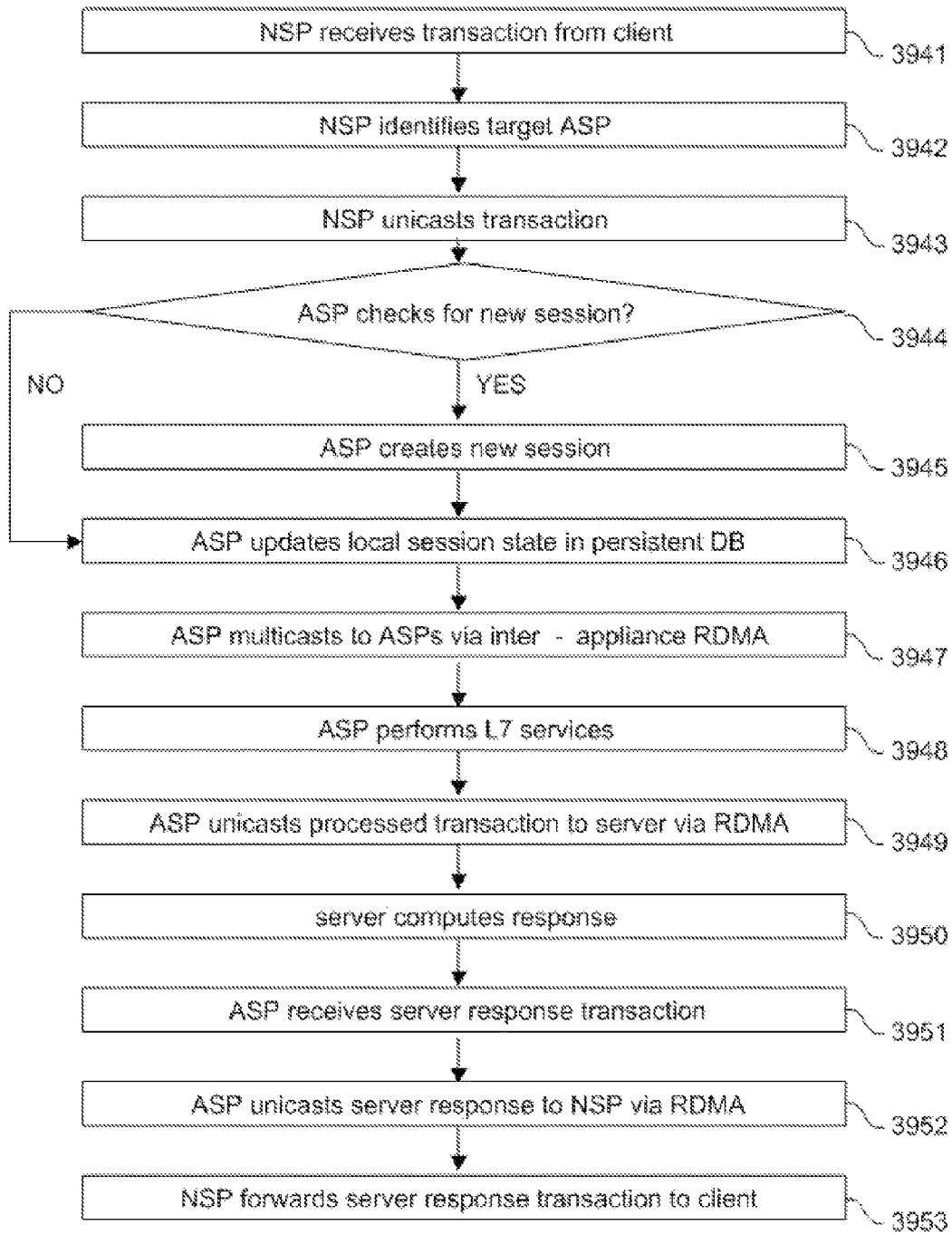
FIG. 82 is a flow diagram of inter-process communication in an ANA with converged data center fabric according to another embodiment of the invention.

FIG. 82 shows a method for inter-chassis communication between one or more NSMs and one or more ASMs when an application server is connected via converged data center fabric. In step 3941, an NSP receives a transaction from a client. That client can, for example, be client 2001 from FIG. 2. In step 3942, the NSP identifies the target ASP. In step 3943, the NSP uni-casts the transaction to the ASP identified in step 3942. In step 3944, the ASP checks whether this transaction is part of a new session. If the result of this check is positive (YES), the ASP creates a new session in step 3945 and proceeds to step 3946. Otherwise (NO), the method proceeds to step 3946 immediately. In step 3946, the ASP updates the local session state in the persistent database. In step 3947, the ASP multicasts the database information for the updated local session state to the peer ASPs via an inter-chassis RDMA operation. This step is part of achieving high-availability with zero-click fail-over. In step 3948, the ASP performs the ISO Layer-7 services, for example, based on policies. In step 3949, the ASP uni-casts the transaction, which is now processed, to the application server via RDMA. In step 3950, the application server computes the response and in step 3951, the ASP receives the application server's response transaction. In step 3952, the ASP uni-casts the application server's response to the NSP via the LDTF. In the last step 3953, the NSP then forwards the application server's response back to the client.

4.1.7 Alternative Embodiments

In one embodiment of the invention, the implementation uses Ethernet IO, which supports one or more 10/100/1000 TX or FX interfaces, or one or more 10 Gigabit XFP/SFP+/XENPAK interfaces. In one embodiment of the invention, the network interfaces are integrated into the one or more NSPs. In another embodiment of the invention, the network interfaces are dedicated devices externally connected to the one or more NSPs. In one embodiment of the invention, a NSP can be implemented using a MIPS-based CPU architecture such as provided by RAZA Microelectronics, Inc., by Cavium Networks, by Broadcom Corporation, or others. In yet another embodiment of the invention, a NSP can be implemented using the PowerPC architecture. In yet another embodiment of the invention, the NSP can be implemented using X86 architecture. In yet another embodiment of the invention, the NSP can be implemented using FPGAs from suppliers such as Altera Corporation or from Xilinx, Inc. In yet another embodiment of the invention, the NSP can be implemented using SoC devices, for example from EZChip Technologies. In yet another embodiment of the invention, the NSP can be implemented with a microprocessor which has dedicated hardware acceleration for network processing such as for TCP/SSL flow termination, initiation of TCP, encryption and decryption, etc. In one embodiment of the invention, an ASP can be implemented using a MIPS-based CPU architecture such as provided by RAZA Microelectronics, Inc., by Cavium Networks, by Broadcom Corporation, or others. In another embodiment of the invention, an ASP can be implemented using the PowerPC architecture. In yet another embodiment of the invention, the ASP can be implemented using X86 architecture. In yet another embodiment of the invention, the NSP can be implemented using FPGAs from suppliers such as Altera Corporation or from Xilinx, Inc. In yet another embodiment of the invention, the ASP can be implemented using SoC devices, for example from EZChip Technologies. In yet another embodiment of the invention, the ASP can be implemented with a microprocessor which has dedicated hardware acceleration for network processing such as for TCP/SSL flow termination, initiation of TCP, encryption and decryption, etc.

In one embodiment of the invention, a host channel adapter is used to connect the one or more ASPs and the one or more NSPs to the LDTF and the host channel adapter interfaces with PCI-X, PCIe, or HyperTransport protocol. In another embodiment of the invention, that host channel adapter is a multi port or at least a dual ported device which supports active-active configuration or which supports active-standby configuration. In one embodiment of the invention, the LDTF devices support a hardware retry mechanism. In another embodiment of the invention, the LDTF devices interface with IB. In yet another embodiment of the invention, the LDTF devices interface with Data Center Ethernet. In one embodiment of the invention, the external LDTF for inter-chassis communication is using copper fabric. In another embodiment of the invention, the external LDTF for inter-chassis communication is using a fiber optics fabric.

4.2 Use of LDTF to Provide High-Availability

LDTF as a lossless, low-latency, high-bandwidth inter-process communication infrastructure can be utilized to achieve scalability and high-availability. Scalability is achieved by having two or more processing components such as NSPs or ASPs for a more parallel or a more pipelined computation. High availability is achieved by adding redundancy to the system and by having peer ANAs or peer modules replicate the relevant state information in persistent databases. One embodiment of the invention is shown in FIG. 25, where redundancy can be added at the ANA level—ANAs 4510, 4520, 4530 and 4540 can all serve as each other's redundant backup ANA—and where redundancy can also be added at the module level—within an ANA, for example ANA 4510, two or more ASMs, for example, the two ASM 4512 and ASM 4513, can serve as each other's backup ASM. In another embodiment of the invention, two or more ANAs or two or more modules can be used for scalability—to provide high processing performance in conjunction with the other ANAs or modules, but when certain ANAs or modules fail, other peer ANAs or peer modules can act as backup. If the processing performance of this degraded system is not sufficient, certain lower priority services may get dropped in favor of critical services, which have a higher priority.

Figure 83:
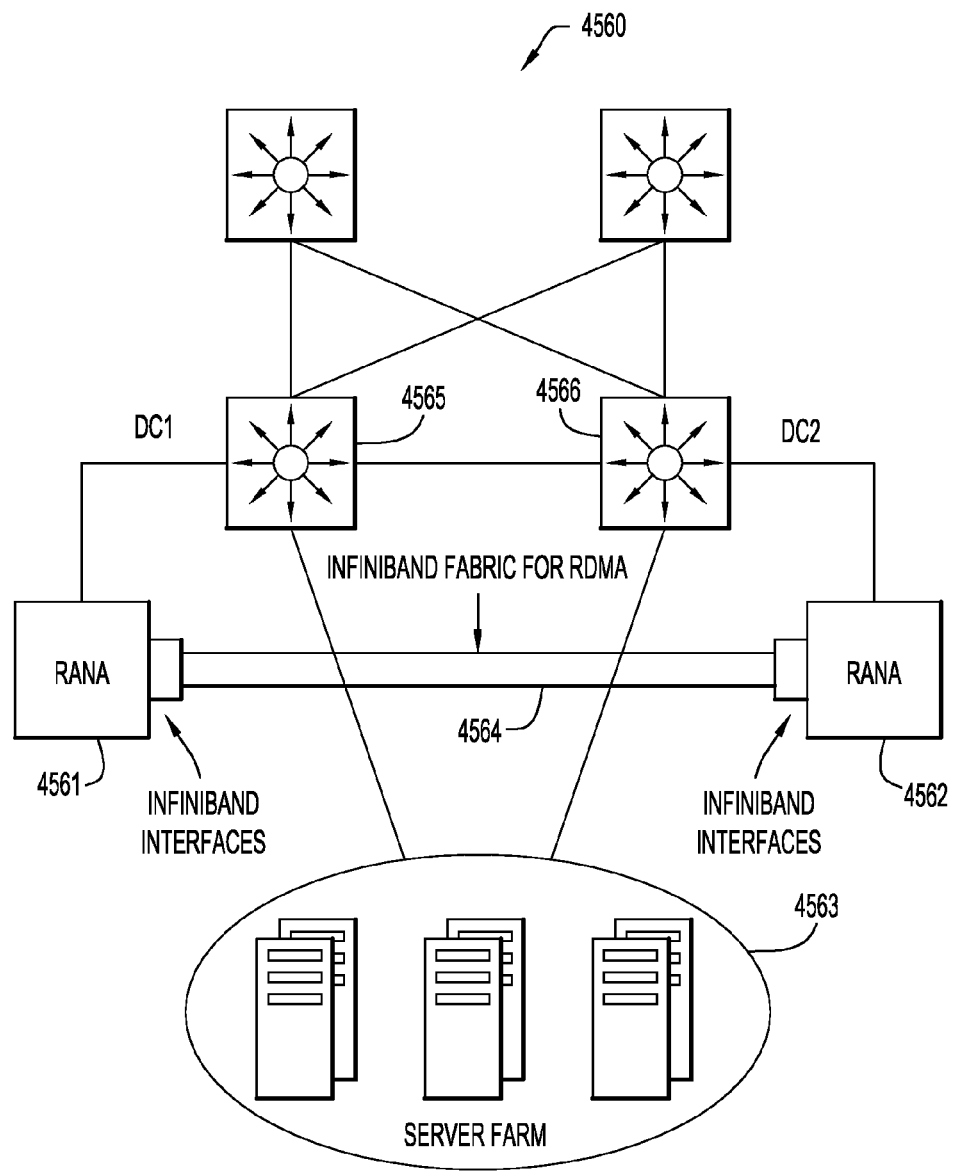
FIG. 83 is a block diagram which illustrates deployment of an ANA in a high-availability mode according to one embodiment of the invention.
Figure 84:
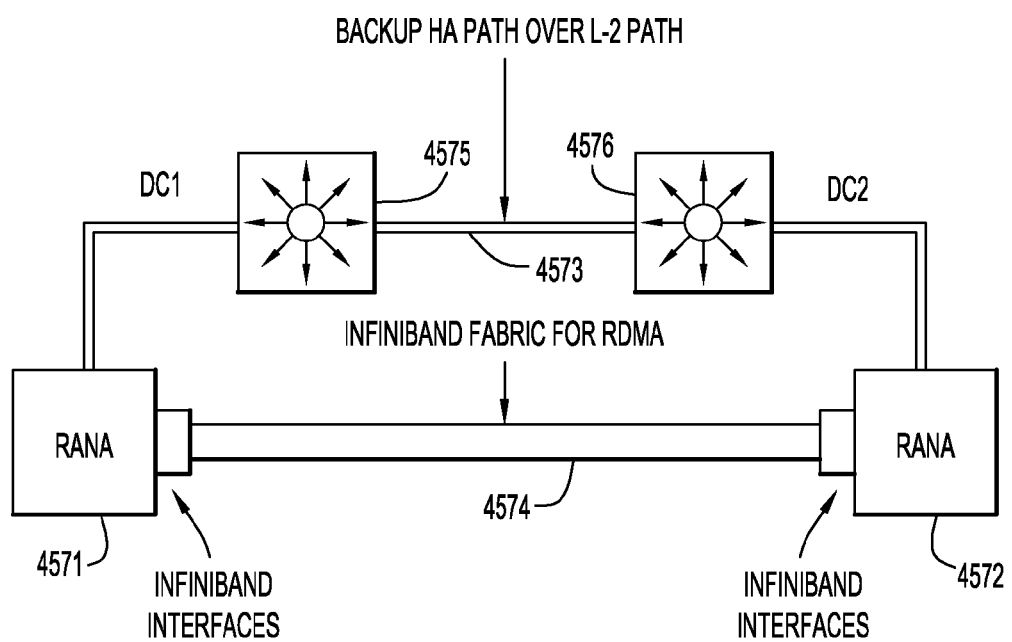
FIG. 84 is a block diagram which illustrates deployment of an ANA in a high-availability mode with a backup network path according to another embodiment of the invention.

Various embodiments for providing high-availability exist. For example, FIG. 83 shows how two (or more) ANAs 4561 and 4562, which can be, for example, the ANA 2000 of FIG. 2, provide access control to application servers 4565 and 4566, which interact with the server farm 4563 in a data center 4560. Using IB, for example, a RDMA-enabled backup link 4564 connects the two ANAs 4561 and 4562 such that both ANAs can replicate each other's state information and act as each other's backup. In FIG. 84, it is shown how, in another embodiment of the invention, the reliability can be increased further by utilizing existing connectivity between application servers as an additional backup link. Two (or more) ANAs 4571 and 4572, which can, for example, be ANAs 4561 and 4562 from FIG. 83 provide access control to application servers 4575 and 4576. Using IB, for example, a RDMA-enabled backup link 4574 connects the two ANAs 4571 and 4572 such that both ANAs can replicate each other's state information and act as each other's backup. A redundant backup path, which complements backup link 4574 can be created, by utilizing the ISO Layer-2 path 4572 via application servers 4575 and 4576.

To explain the fundamental principle of the novel approach to redundancy shown here, FIG. 85 shows, in an example, how two peer ANAs 4580 and 4590 can act as each other's backup. Appliance 4580 actively serves Domain 1 4581 and maintains state information for Domain 2 4582 and Domain 3 4583 for standby purposes. Appliance 4590 actively serves Domain 2 4582 and Domain 3 4583 and maintains state information for Domain 1 4581 for standby purposes. Domain 1 4581, Domain 2 4582 and Domain 3 4583 can, for example, relate to Service Domain A 4137, or to Service Domain B 4138, or to Service Domain C 4139 from FIG. 58 and thus, the high-availability concept in this approach can make use of virtualization. Upon a failure in either ANA the peer ANA takes over and now actively serves the one or more domains for which it had kept state information for standby purposes. For example, upon a failure in ANA 4580 the peer ANA 4590 now actively serves all three domains, Domain 1 4581, Domain 2 4582 and Domain 3 4583. Because ANA 4590 has kept state information in a persistent replicated database for all domains it can provide zero-click fail-over.

Such state information can, for example, include chassis configuration information, information about the transport protocol streams that have reached an ANA, as well as ISO Layer-7 state information.

System configuration information can be synchronized for many of the configured components. There are two aspects to system configuration. The first is during system startup. This is when either both peers are powered ON at the same time and both discover each other. One of the first things that happen at discovery is configuration information synchronization. It is desirable to have the configuration information in synchronization to ensure proper transport protocol stream and ISO Layer-7 state replication. The second aspect is during runtime. Administrators may choose to add, modify and delete portions of the configuration information. These changes can be replicated instantaneously.

The transport protocol traffic reaching one or more ANAs (or modules) can be distributed in a balanced manner. Some client-to-server sessions that are initiated may arrive at one of the one or more ANAs (or modules) while transport protocol traffic for other client-to-server sessions may reach peer ANAs (or modules) because of the way in which domains can be distributed across these peer ANAs (or modules). In any event of failure, when one ANA (or module) takes over the transport protocol traffic that previously was processed by its peer, all the ISO Layer-4 state information must be present to ensure zero-click fail-over. There are multiple ways to do this transport protocol traffic replication. In one embodiment of the invention, just the ISO Layer-4 state information from one ANA (or module) is replicated to the peer ANA (or module). This can happen always during session creation and deletion, and periodically during the lifetime of the session. This way, sessions remain in synchronization across ANAs (or modules). Also, this exchange of ISO Layer-4 state information can happen in a bi-directional manner. In another embodiment of the invention, the transport protocol stream reaching one ANA (or module) is replicated to the peer ANAs (or modules). This ensures that the backup ANA (or module) sees the same transport protocol traffic for those domains that are in a passive standby mode, so that it can go through the same steps of terminating the connection, initiating another connection and behaving as a proxy. However, domains that are passive (i.e., in standby), the backup ANA (or module) will not actually forward any traffic to either client or server but will continue to build state information as though it is actually proxying the connection. The advantage with this approach is that under any failure event on its peer, it can actively forward the session traffic transparently.

All the ISO Layer-7 state information is retained in a shared memory database that can be marked with a synchronization stamp. Therefore, any state changes in the database for ISO Layer-7 state information can be used to trigger an event to replicate the state over a high-availability link to the peer's ISO Layer-7 state information for that domain. For this purpose, several in-memory databases and embedded databases can be considered such as Berkeley-DB, for example. Database synchronizations can operate via LDTF such as, for example, IB. RDMA allows memory visibility into the peer's databases. That way the events triggered can cause a very quick, reliable update of the peer's database for the ISO Layer-7 state information.

Figure 86:
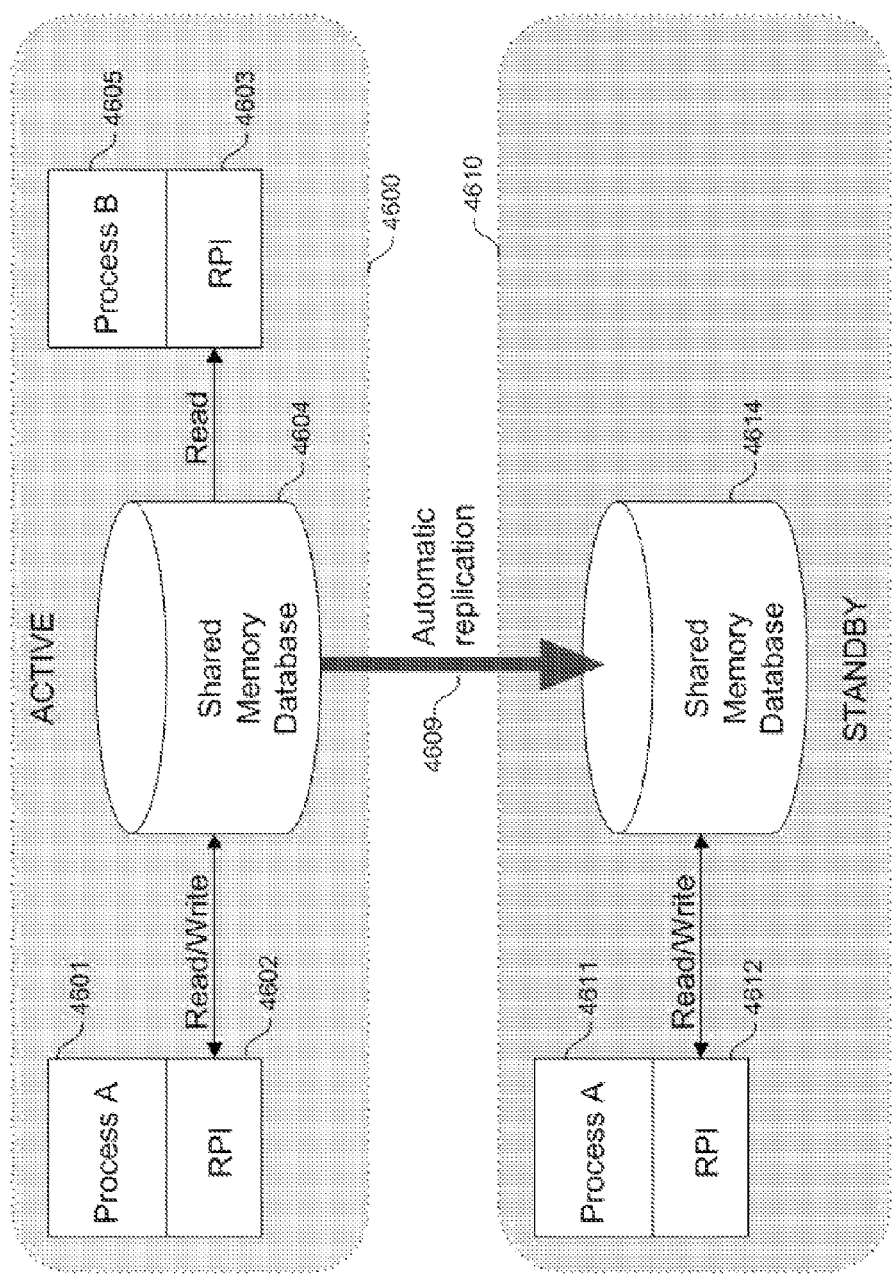
FIG. 86 is a block diagram of a replication component of an ANA in a high-availability mode according to one embodiment of the invention.

FIG. 86 shows the details for keeping persistent state information. Within one single ANA 4600 (or one single module 4600) a process, Process A 4601, actively processes the state information for one particular domain. Through Remote Procedure Interface RPI 4602, Process A 4601 can read from and write to the persistent Shared Memory Database 4604 the state information which relates to the actively served domain. Through Remote Procedure Interface RPI 4603, another process, Process B 4605, can read-only from the Shared Memory Database 4604 and thus may get immediate access to the state information of the domain which is actively served by Process A 4601. Therefore, Process B 4605 can act as a backup for Process A 4601 and perform a zero-click fail-over. Now, via automatic replication, Shared Memory Database 4604 and Shared Memory Database 4614 can be synchronized such that the state information, for example, for the domain actively served by Process A 4601, can be made readily available in Shared Memory Database 4614 as well. The Shared Memory Database 4614 can be located, for example, in a peer ANA 4610 (or in a peer module 4610) which is connected via LDTF 4609 to ANA 4600 (or module 4600). Through Remote Procedure Interface RPI 4612, another process, Process C 4611, can read-only from the Shared Memory Database 4614 and thus may also get immediate access to the state information of the domain which is actively served by Process A 4601. Therefore, Process C 4611 can also act as a backup for Process A 4601 and perform a zero-click fail-over. The LDTF-based automatic replication between shared memory databases can be achieved, for example, by the methods illustrated in FIGS. 79-82, respectively.

Figure 87:
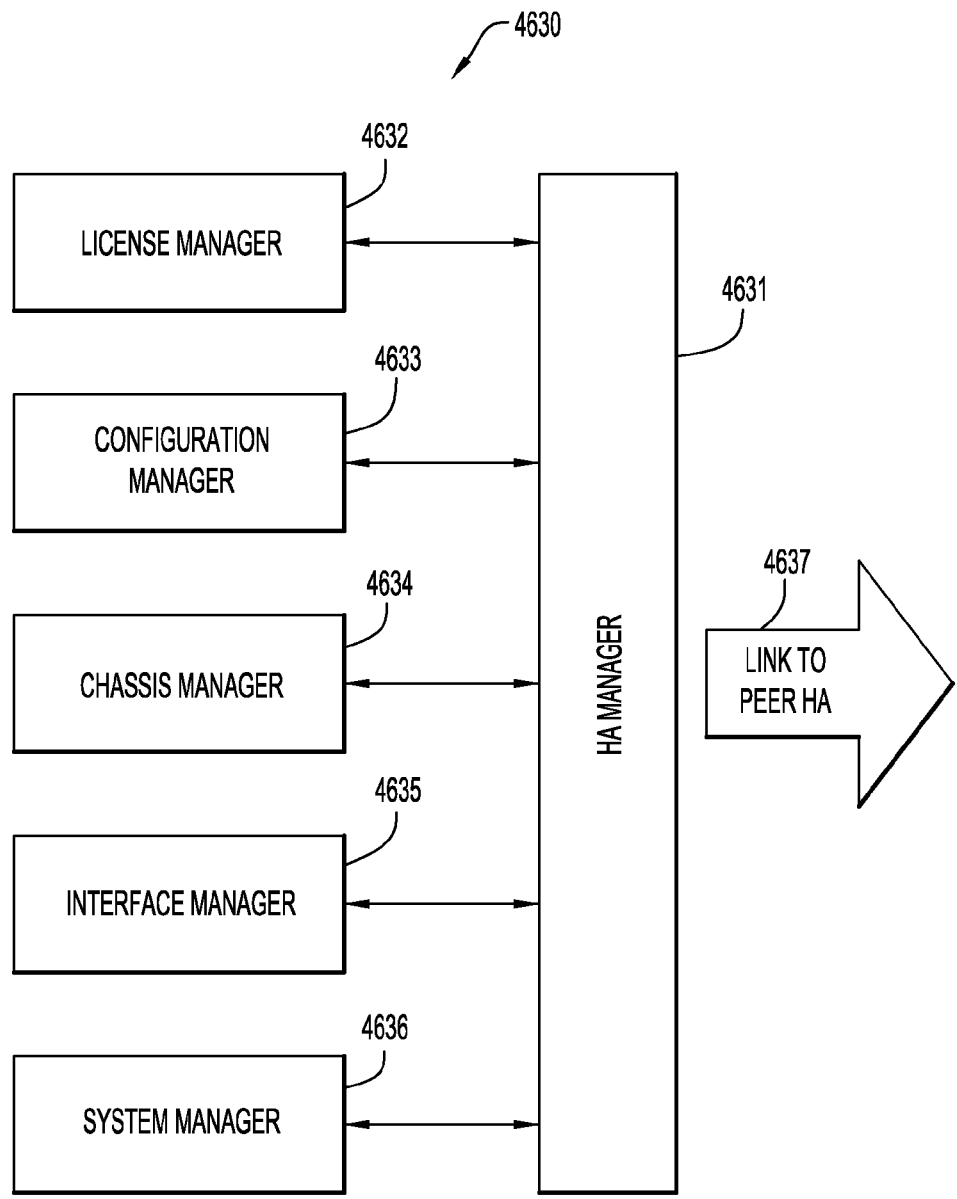
FIG. 87 is a block diagram which illustrates health monitoring in a high-availability ANA according to one embodiment of the invention.

Key to provide high-availability lies in monitoring the necessary components and ANAs to detect failures. This is illustrated in FIG. 87. Within an ANA 4630 a High-Availability Manager 4631 periodically checks the vital signs of a License Manager 4632, a Configuration Manager 4633, a Chassis Manager 4634, an Interface Manager 4635 and a System Manager 4636, for example. Each License Manager 4632, Configuration Manager 4633, Chassis Manager 4634, Interface Manager 4635 and System Manager 4636 periodically check the vital signs of their corresponding modules. Such vital signs can, for example, include voltages, temperatures, humidity, air pressure, shock, noise, vibration, fan speed, CRC error count, self-check results, etc.

Figure 88:
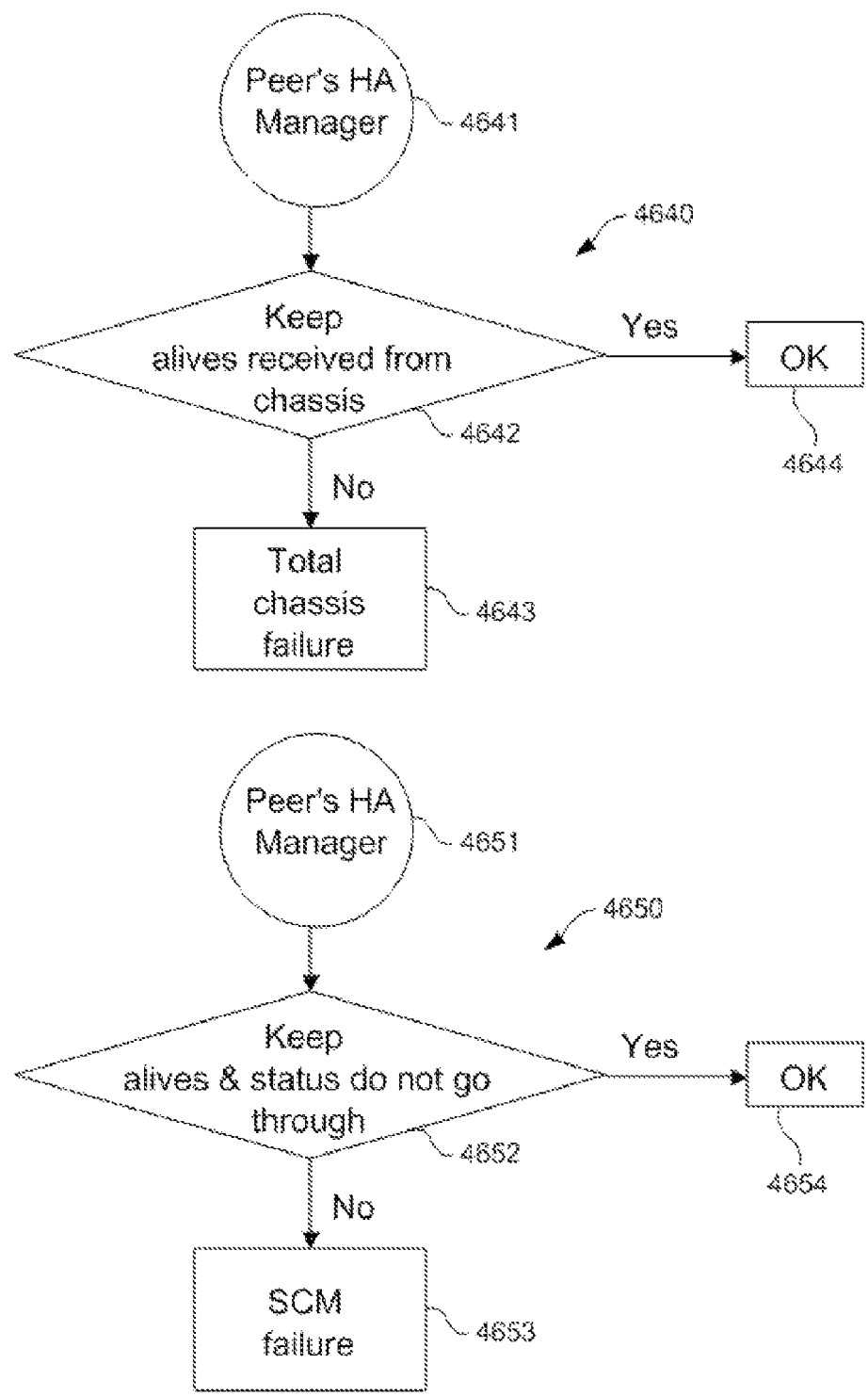
FIG. 88 are two exemplary flow diagrams for health monitoring in a high-availability ANA according to one embodiment of the invention.

FIG. 88 shows two exemplary methods for a high-availability manager according to one embodiment of the invention. In method 4640 a peer's high-availability manager, which can, for example, be High-Availability Manager 4631 from FIG. 87, periodically sends keep-alive messages in step 4641. The high-availability manager of an ANA performs a check 4642 whether these periodic keep-alive messages are received. If these keep-alive messages have been received (YES), the high-availability manager considers the peer ANA as OK 4644. If these keep-alive messages have not been received (NO), the high-availability manager considers the peer ANA as having a total chassis failure 4643. In method 4650 a high-availability manager, which can, for example, be High-Availability Manager 4631 from FIG. 87, periodically sends keep-alive messages in step 4651 and then performs a check 4652 whether these periodic keep-alive messages did get through to other peers. If these keep-alive messages could be sent successfully (YES), the high-availability manager considers itself as OK 4654. If these keep-alive messages could not be sent (NO), the high-availability manager considers its SCM as having a potential failure 4643.

Because IB allows peer memory visibility through specialized hardware, for example IB host channel adapters (HCA), all CPUs such as the NSPs, the ASPs and the Management Service processors can be connected to LDTF. In one embodiment of the invention, pre-allocated local memory buffers can store the shared data structures of each process and DMA can be initiated and completed directly by host channel adapters, which frees up the CPUs. Update and synchronization can be done periodically or event based. The benefit is that it can eliminate multiple memory-to-memory data copies, and that the transport protocol stack can be bypassed to reduce protocol overhead and reduce the cost of context switches. The virtual lane feature of IB allows multiple virtual lanes to be used, for example, one or more management lanes and one or more data lanes. In one embodiment of the invention, virtual lanes can be used to provide prioritized channels for high-availability traffic as well as making multiple logical links available over one single physical link. In another embodiment of the invention, virtual lanes also can be used to prioritize traffic through service links to virtual lane. In yet another embodiment of the invention, virtual lanes can be used for one single management link over the same physical link, for example, to perform health checks, or transmit monitoring information, or to send high-availability handshakes while leaving other virtual lanes open for ISO Layer-4 to ISO Layer-7 state replication and transport protocol stream replication.

5. RAMIFICATIONS

5.1 Inter-Module Communication Using USB

In one embodiment of the invention, a modular architecture is used. Within this architecture the one or more SCMs or the one or more NSMs or the one or more ASMs can upload software and firmware, can perform configuration management, and they can exchange status and control information which can, for example, be diagnostics, initialization, power up and power down commands, reset, environment monitoring, etc. This requires certain inter-module communication. Various options exist in the art for such inter-module communication. An $I^2C$ bus may be used which has very low cost but which also is very slow and does not support hot-plug connectivity. A serial RS-232 or RS-422 link may be used which has the same drawbacks as the $I^2C$ bus. Alternatively, Ethernet may be used, which has sufficient bandwidth however, generally, this is not cost effective.

Figure 89:
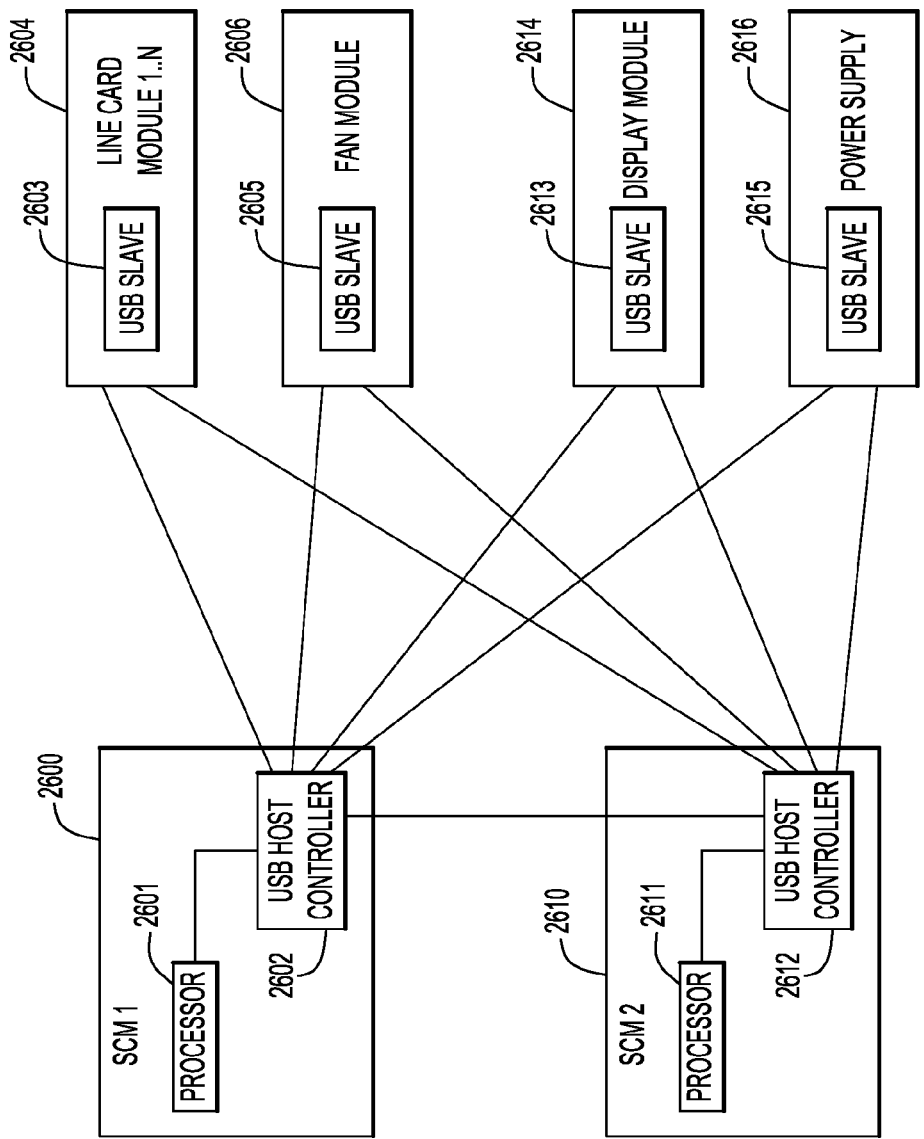
FIG. 89 is a block diagram which illustrates connectivity of SCMs and other modules according to one embodiment of the invention.

To overcome these disadvantages, in one embodiment of the invention, the various inter-module communication buses are consolidated into one common out-of-band bus, which utilizes USB technology. USB technology is well-established in PC and consumer products and is very fast (USB 2.0 supports up to 480 Mbps), cost-efficient, supports hot-plug connectivity and has high reliability. FIG. 89 shows how such inter-module communication can be implemented using USB technology. An ANA which can, for example, be ANA 2000 from FIG. 2, comprises one or more SCMs 2600 and 2610 which each have one Management Service processor 2601 and 2611, respectively. Each SCM also has one USB Host Controller 2602 and 2612, respectively, which each is connected to a Line Card Module 2604 (via USB Slave 2603), to a Fan Module 2606 (via USB Slave 2606), to a Display Module 2614 (via USB Slave 2613) and to a Power Supply 2616 (via USB Slave 2615). Each SCM can then act as a USB master for inter-module communication. The USB connectivity can either be half-duplex or full-duplex.

Figure 90:
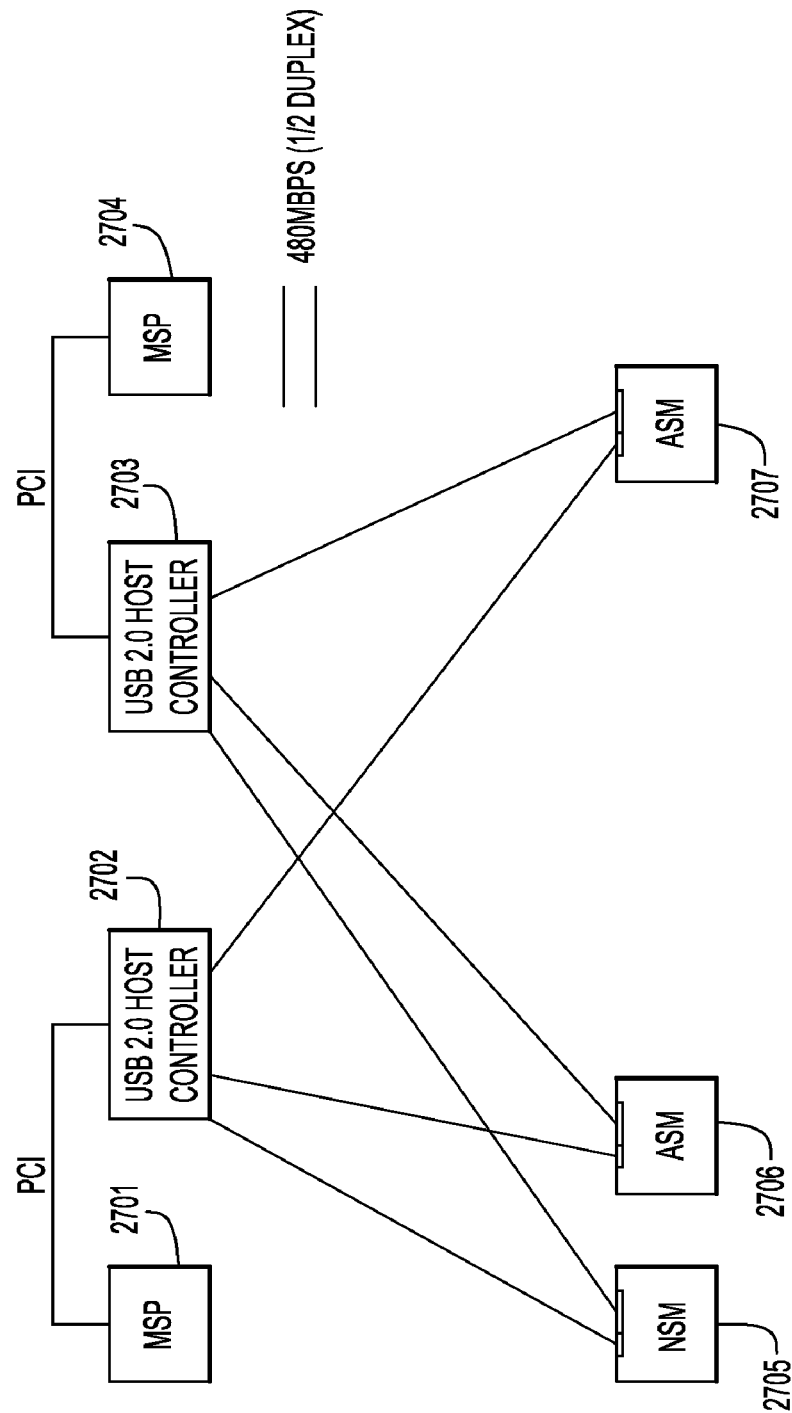
FIG. 90 is a block diagram which illustrates connectivity of SCMs and other modules according to another embodiment of the invention.
Figure 91:
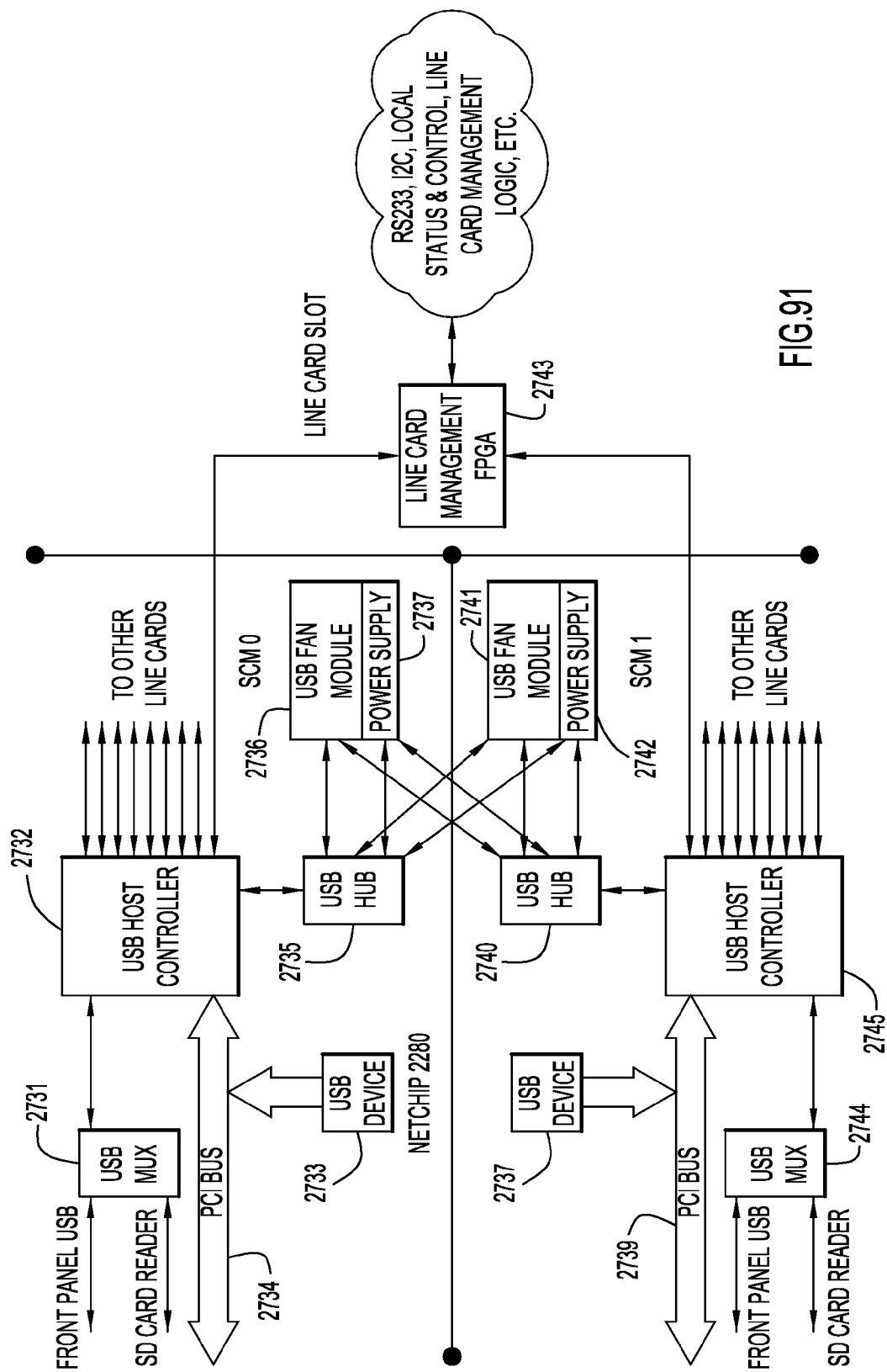
FIG. 91 is a block diagram of a management plane for SCMs of an ANA according to one embodiment of the invention.

FIG. 90 shows the detailed connectivity between the various processing elements if USB is used for inter-module communication. USB communication can be duplex or n-plex. In an ANA, one or more Management Service processors 2701 and 2704, for example, are connected to the USB Host Controller 2702 and 2704, respectively, for example, via a PCI bus. Connected to these USB Host Controllers 2702 and 2704 are the various modules in the ANA, for example, NSM 2705, ASM 2706 and ASM 2707. In yet another embodiment of the invention, shown in FIG. 91, two (or more) SCMs and their respective USB inter-module connectivity are given. The SCM SCM0 comprises the USB Multiplexer 2731, the USB Host Controller 2732, the USB Device 2733, the USB Hub 2734, the USB Fan Module 2736, and the Power Supply 2737. The SCM SCM1 comprises the USB Multiplexer 2744, the USB Host Controller 2745, the USB Device 2738, the USB Hub 2740, the USB Fan Module 2741, and the Power Supply 2742. The USB Device 2733 is connected to the USB Host Controller 2732 via PCI bus 2734. The USB Device 2738 is connected to the USB Host Controller 2745 via PCI bus 2739. USB Multiplexers 2731 and 2744 can, for example, be connected to a front panel of a chassis. The USB Fan Module 2736 and the Power Supply 2737 are connected with the USB Host Controller 2732 via the USB Hub 2735. The USB Fan Module 2741 and the Power Supply 2742 are connected with the USB Host Controller 2745 via the USB Hub 2740. Also connected to both USB Host Controllers 2732 and 2745 is the Line Card Management FPGA 2743 which can, for example, be located on a chassis backplane to support line card management functions.

Figure 92:
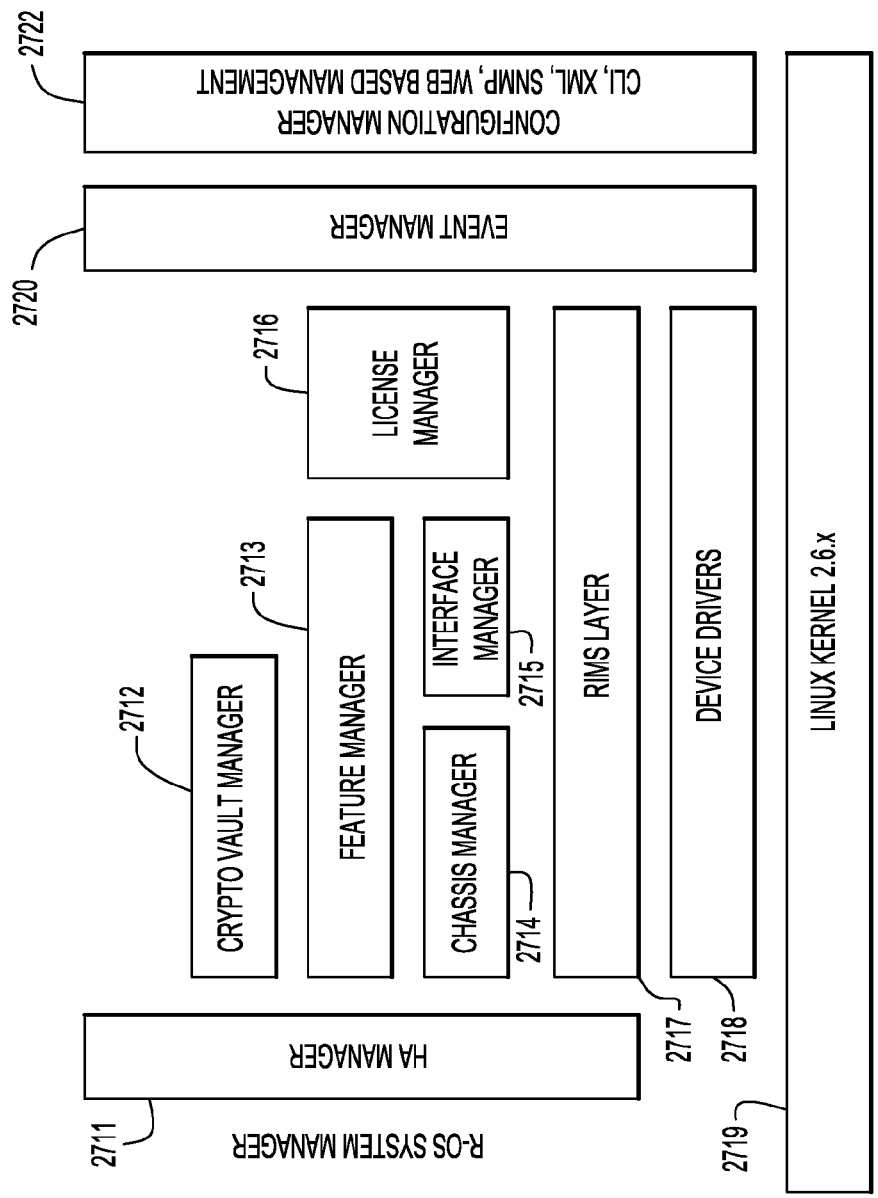
FIG. 92 illustrates an operating system with drivers for a SCM of an ANA according to one embodiment of the invention.
Figure 93:
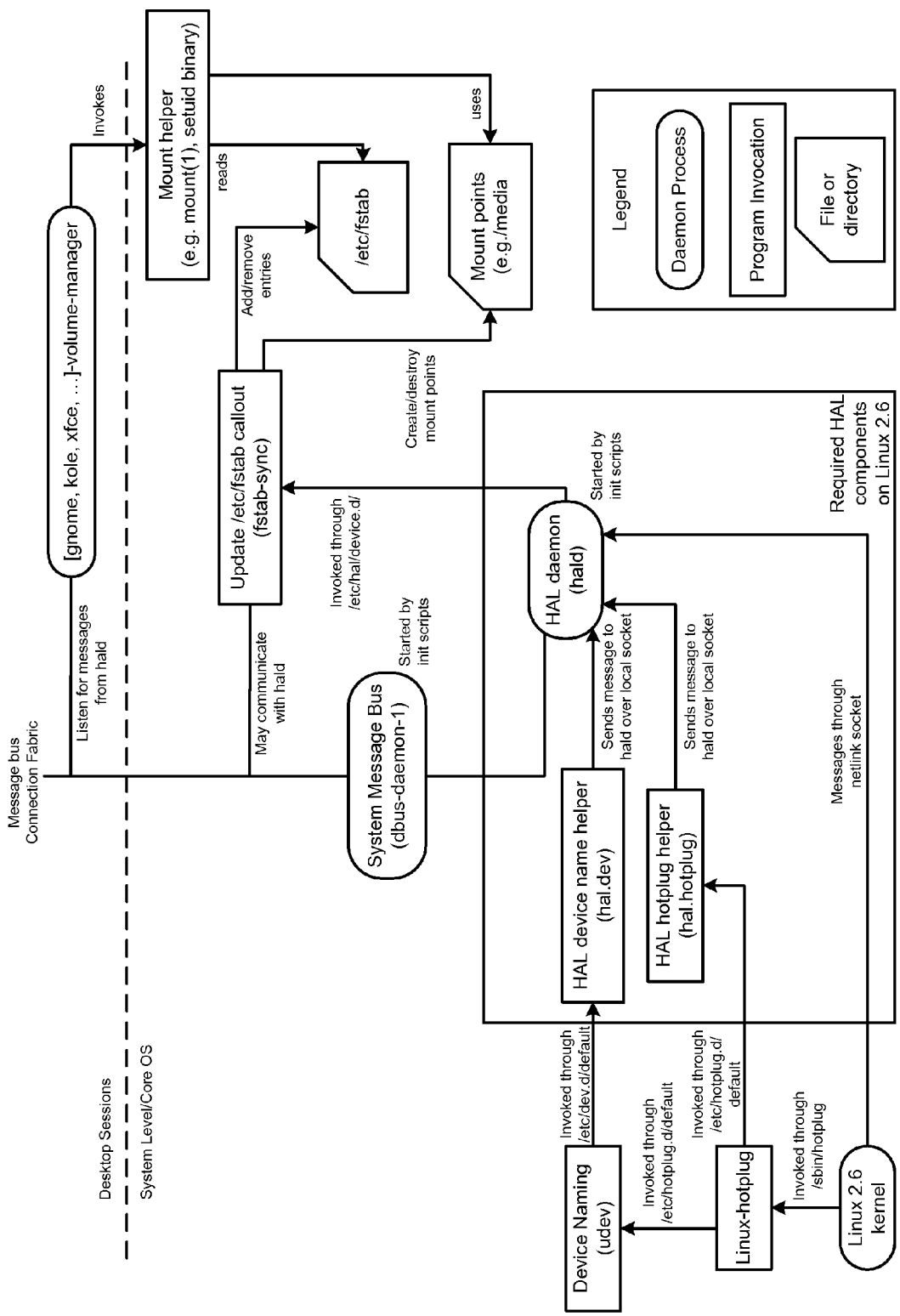
FIG. 93 is a flow diagram which illustrates device hot-plug capability of an operating system of an ANA according to one embodiment of the invention.

One of the advantages of using USB technology, compared to other approaches known in the art, is that common operating systems, for example the R-OS shown in FIG. 92, support so-called hot-plug of components. FIG. 93 shows the Linux user-space hot-plug manager, the so-called udev device. This facilitates the administration of a high-availability enterprise ANA, such as the ANA 2000 from FIGS. 2 and 18. Modules can be added, removed, replaced, etc. during run-time while the ANA is operating, without disrupting the services performed by the ANA.

6. USE CASES

The various embodiments of these inventions can be applied to a wide variety of enterprise network applications. Because of the high scalability and the high-availability it can be used as the ANA 2000 of FIGS. 2 and 18 to perform access control with or without Transparent Secure Transport. Because the network processing has been split into Network Service processing and Application Service processing a 3-tier processing model is facilitated:

In a typical use model, according to one embodiment of the invention, full application data processing is performed. The transport protocol connections on the client side are terminated while the transport protocol connections (or the RDMA connection in case of converged data center fabric) on the server side are kept open. This way a client connection is bound to a server connection, and the application data can be processed according to the application's semantics. This embodiment of the invention then can operate similar to a switch by transporting application data from one side to the other. Because application data (ISO Layer-7 data) is processed, the one or more ASMs are involved.

In another use model, according to one embodiment of the invention, application switching is performed without the need to process application data. This use model can, for example, be applied once a client has been authorized and when it is desirable to just switch application data from the client. Because no application data (ISO Layer-7 data) is processed, the one or more ASMs are not involved and the main processing is done in the one or more NSMs.

In yet another use model, according to one embodiment of the invention, flow switching is performed which does not involve application data processing, nor any transport protocol termination. Directly performed by the one or more NSMs, the transport protocol sequence numbers are adjusted, for example, and the payload is switched from the client to the server.

Figure 94:
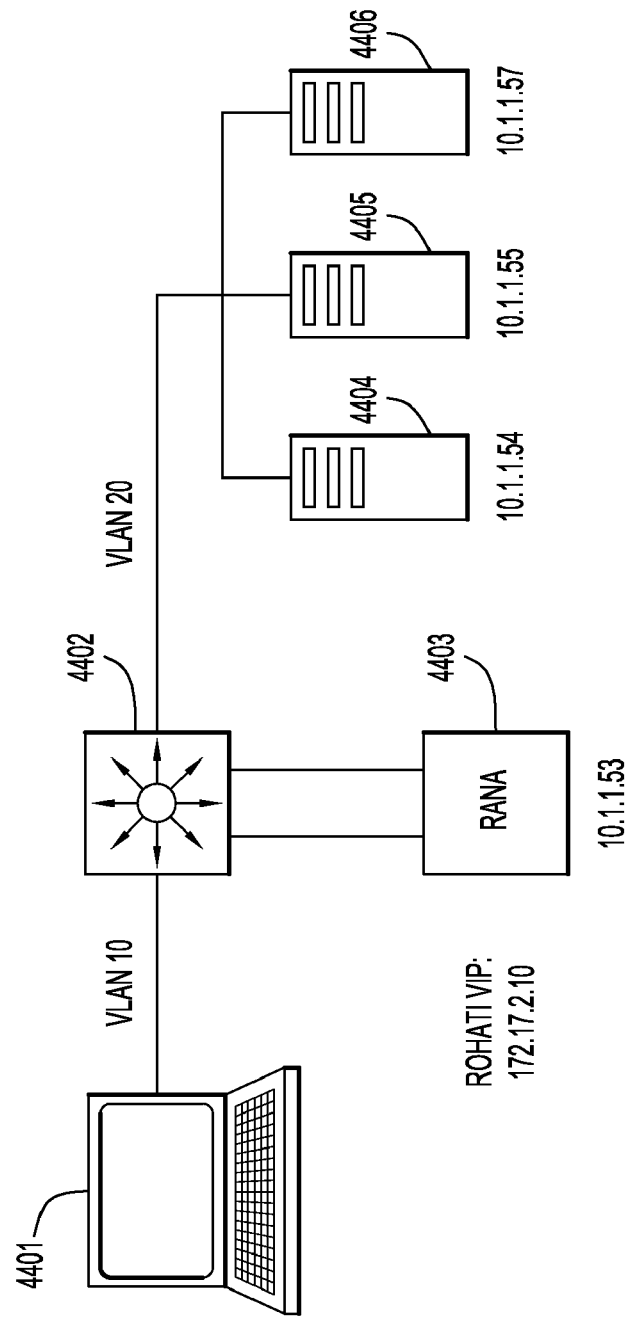
FIG. 94 is a block diagram which illustrates deployment of an ANA in a routed network topology according to one embodiment of the invention.
Figure 95:
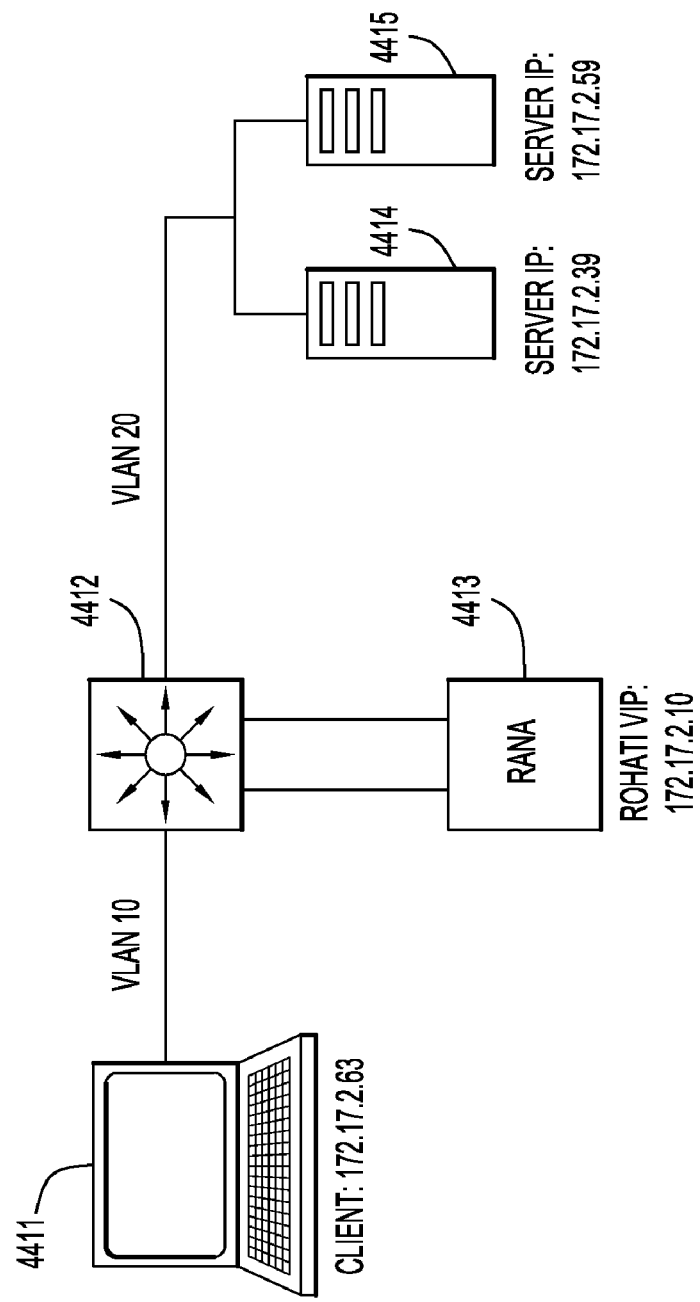
FIG. 95 is a block diagram which illustrates deployment of an ANA in a bridged network topology according to one embodiment of the invention.

The deployment of an embodiment of the invention can, for example, be in an enterprise's data center, for example, in an enterprise data center. In in-line deployment, the ANA is located in-line for the traffic destined towards an application server and "owns" a virtual IP address of the application server—which is similar to load balancing setups known in the art. The application server can, for example, be application server 2005 of FIGS. 2 and 18, or application server 2105 of FIG. 15, or application server 4762 of FIGS. 42, 44, 51, and 53. Therefore, the ANA sees all the traffic going to the application server, for example, when used in so-called Routed Mode, when the client-side and the server-side VLANs are on different subnets, as illustrated in FIG. 94, or when used in so-called Bridged Mode where the client-side and the server-side VLANs are on the same subnet, which is illustrated in FIG. 95. The deployment of a embodiment of one of these inventions can also be in so-called one-arm deployment where selected application server traffic for which ISO Layer-7 services are needed is diverted (for example via a ISO Layer-2 switch or a ISO Layer-3 router) through the ANA to perform Policy-Based routing, for example.

Various other use cases are contemplated within the scope of the present invention, for example, the use as an application firewall in ISO Layer-7 networking, for server load balancing in ISO Layer-7 networking, for acceleration in an application front-end in ISO Layer-7 networking, for SSL acceleration in ISO Layer-7 networking, for XML acceleration in ISO Layer-7 networking, for intrusion detection and prevention in ISO Layer-7 networking, etc.

Figure 96:
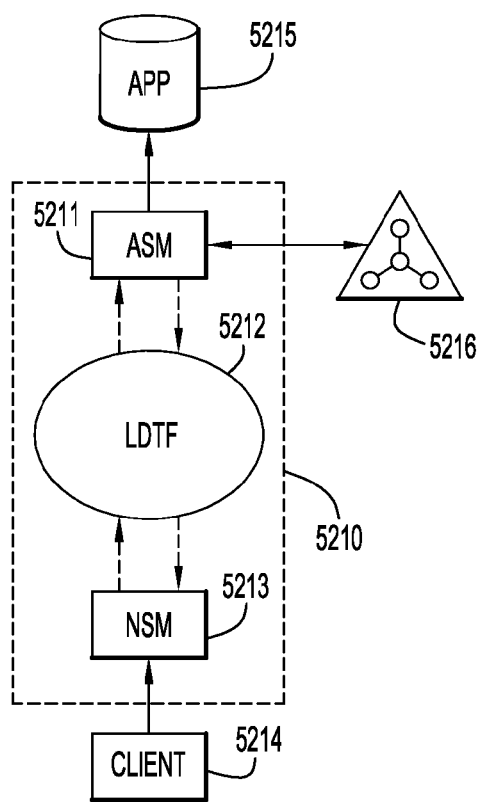
FIG. 96 is a block diagram of an ANA for use as an application firewall according to one embodiment of the invention.

FIG. 96 shows one embodiment of the invention used as an application firewall 5210 in ISO Layer-7 networking: The client 5214 which can, for example, be client 2001 of FIG. 2, or client 2104 of FIG. 15, or client 2124 of FIG. 17, connects to the NSM 5213 which, for example, acts as a protocol proxy, terminates the transport protocol and transforms the PDU payload into a data stream. The NSM 5213 then sends the data stream via LDTF 5212 to the ASM 5211 for ISO Layer-7 processing. The ASM 5211 interacts with a directory server 5216 to perform policy-based authorization. If the request from client 5214 is permitted, the application server 5215 can be accessed.

Figure 97:
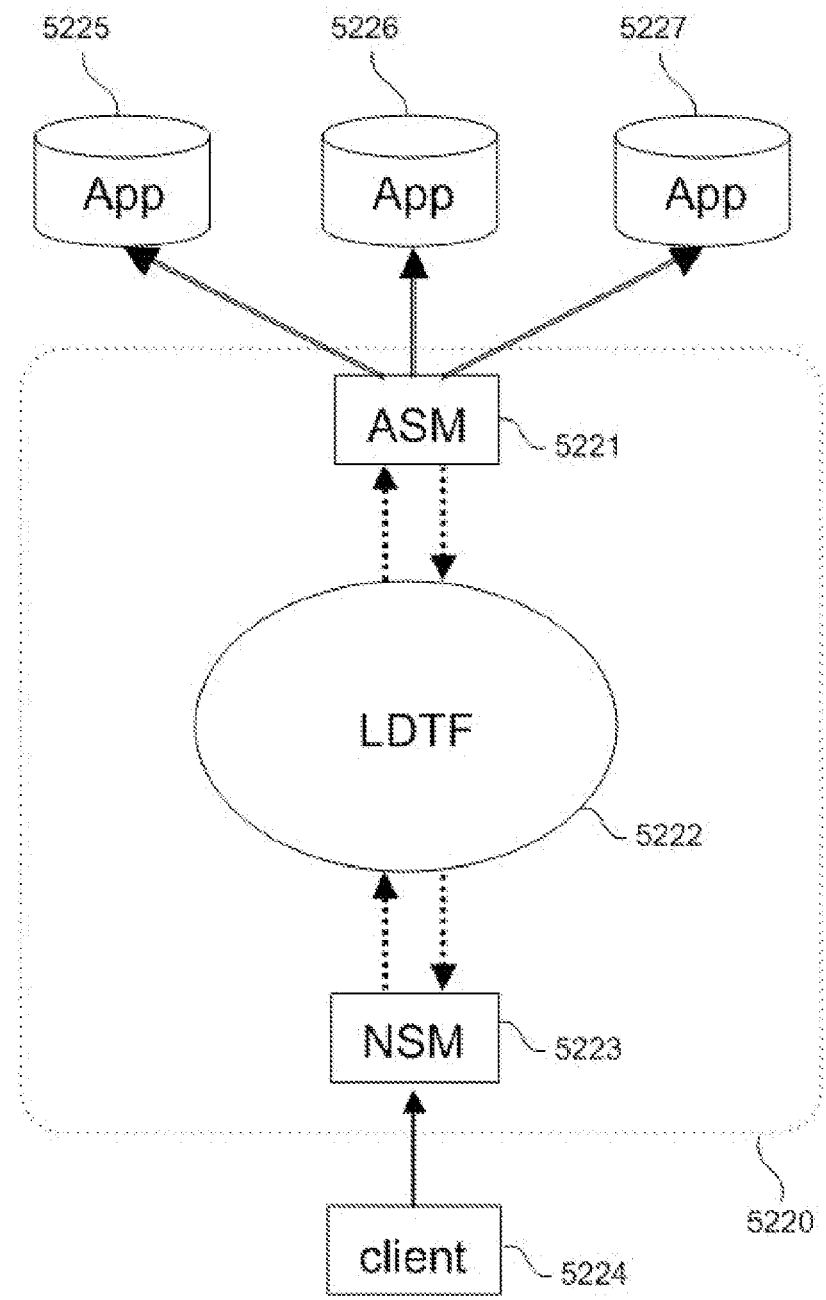
FIG. 97 is a block diagram of an ANA for use in server load balancing according to one embodiment of the invention.

FIG. 97 shows one embodiment of the invention used for server load balancing 5220 in ISO Layer-7 networking: The client 5224 which can, for example, be client 2001 of FIG. 2, or client 2104 of FIG. 15, or client 2124 of FIG. 17, connects to the NSM 5223 which, for example, acts as a protocol proxy, terminates the transport protocol and transforms the PDU payload into a data stream. The NSM 5223 then sends the data stream via LDTF 5222 to the ASM 5221 for ISO Layer-7 processing. The ASM 5221 then performs load balancing, for example, by interacting with the least loaded application server from a set of application servers 5225, 5226, and 5227.

Figure 98:
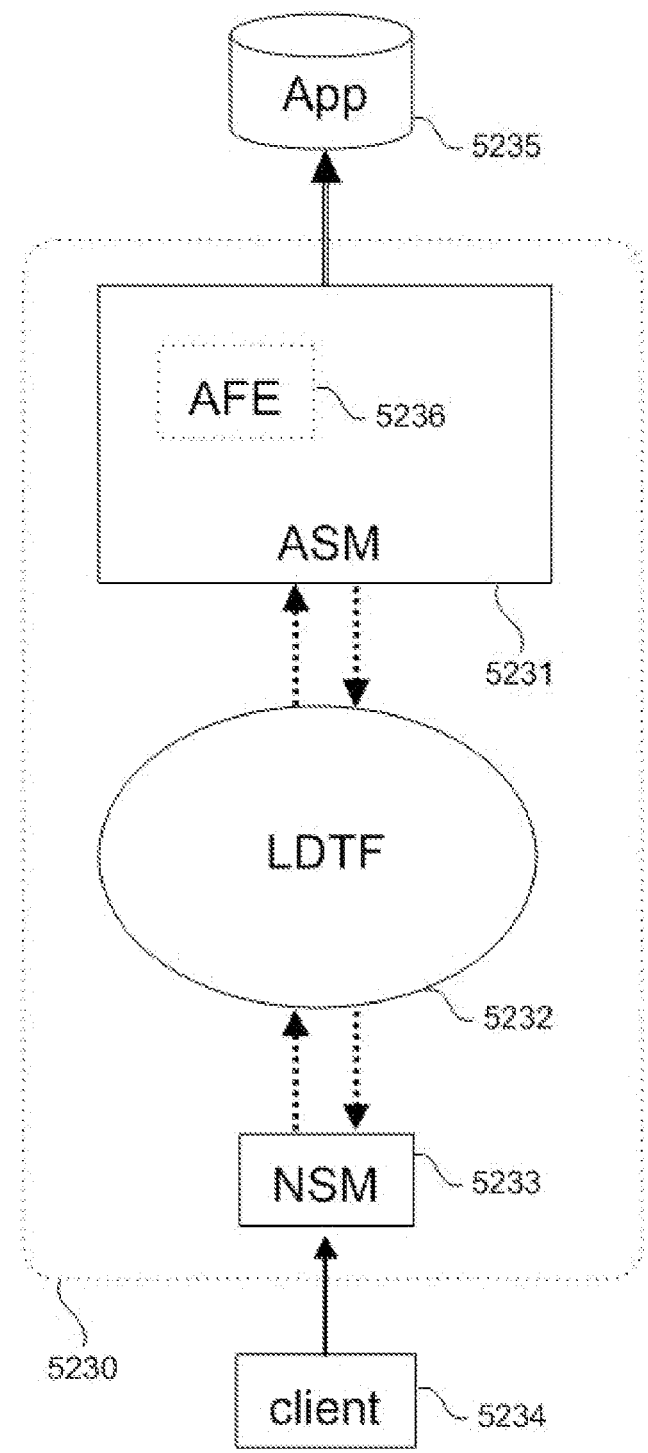
FIG. 98 is a block diagram of an ANA for use in an application front-end according to one embodiment of the invention.

FIG. 98 shows one embodiment of the invention used for acceleration in an application front-end 5230 in ISO Layer-7 networking: The client 5234 which can, for example, be client 2001 of FIG. 2, or client 2104 of FIG. 15, or client 2124 of FIG. 17, connects to the NSM 5233 which, for example, acts as a protocol proxy, terminates the transport protocol and transforms the PDU payload into a data stream. The NSM 5233 then sends the data stream via LDTF 5232 to the ASM 5231 for ISO Layer-7 processing. The ASM 5231 then performs certain compute intensive tasks normally performed by the application server 5235 itself, thereby offloading the compute intensive tasks from the application server 5235 and processing these tasks on dedicated processing elements 5236.

Figure 99:
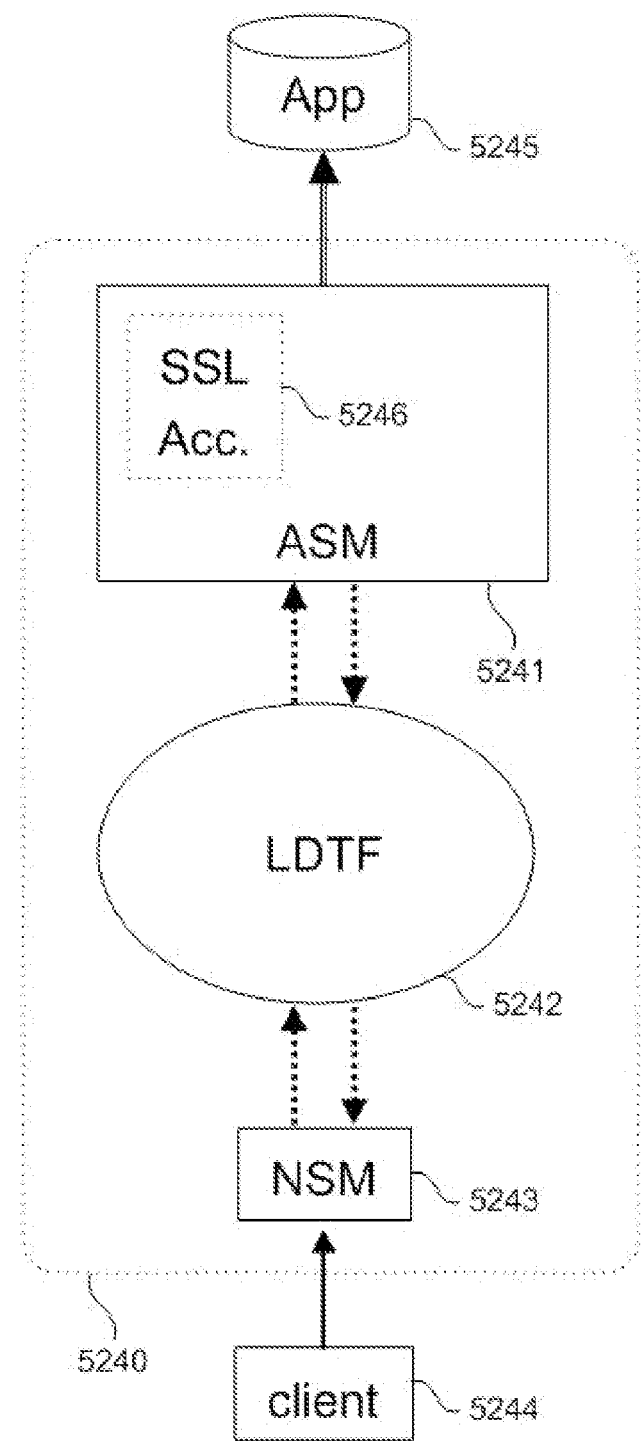
FIG. 99 is a block diagram of an ANA for use in SSL acceleration according to one embodiment of the invention.

FIG. 99 shows one embodiment of the invention used for SSL acceleration in an application front-end 5240 in ISO Layer-7 networking: The client 5244 which can, for example, be client 2001 of FIG. 2, or client 2104 of FIG. 15, or client 2124 of FIG. 17, connects to the NSM 5243 which, for example, acts as a protocol proxy, terminates the transport protocol and transforms the PDU payload into a data stream. The NSM 5243 then sends the data stream via LDTF 5242 to the ASM 5241 for ISO Layer-7 processing. The ASM 5241 then performs SSL processing on dedicated processing elements 5246 thereby offloading the compute-intensive SSL processing tasks from the application server 5245.

Figure 100:
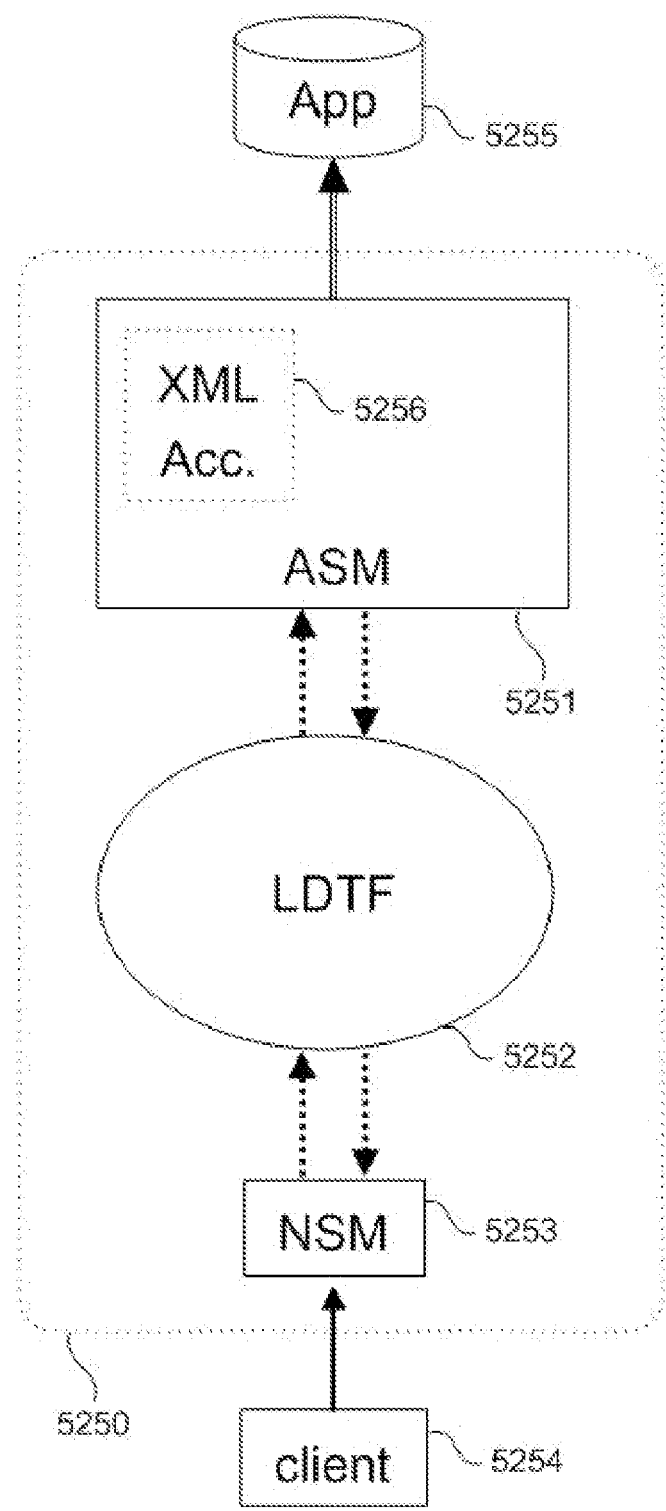
FIG. 100 is a block diagram of an ANA for use in XML acceleration according to one embodiment of the invention.

FIG. 100 shows one embodiment of the invention used for XML acceleration in an application front-end 5250 in ISO Layer-7 networking: The client 5254 which can, for example, be client 2001 of FIG. 2, or client 2104 of FIG. 15, or client 2124 of FIG. 17, connects to the NSM 5253 which, for example, acts as a protocol proxy, terminates the transport protocol and transforms the PDU payload into a data stream. The NSM 5253 then sends the data stream via LDTF 5252 to the ASM 5251 for ISO Layer-7 processing. The ASM 5251 then performs XML processing on dedicated processing elements 5256 thereby offloading the compute-intensive XML processing tasks from the application server 5255.

Figure 101:
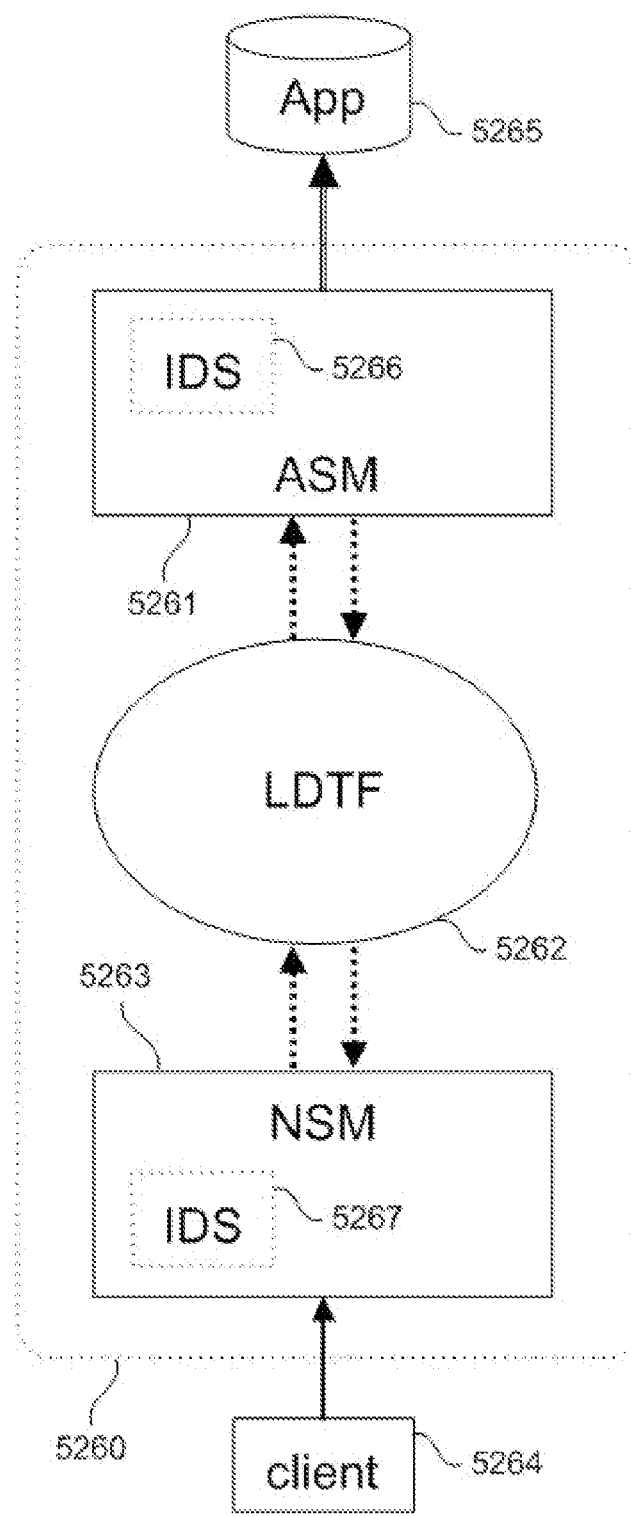
FIG. 101 is a block diagram of an ANA for use as a network intrusion detection system according to one embodiment of the invention.

FIG. 101 shows one embodiment of the invention used for intrusion detection 5260 in ISO Layer-7 networking: The client 5264 which can, for example, be client 2001 of FIG. 2, or client 2104 of FIG. 15, or client 2124 of FIG. 17, connects to the NSM 5263 which, for example, acts as a protocol proxy, terminates the transport protocol and transforms the PDU payload into a data stream. The NSM 5263 then sends the data stream via LDTF 5262 to the ASM 5261 for ISO Layer-7 processing. The ASM 5261 then performs ISO Layer-7 processing before sending the client's request to the application server 5255. At the same time the NSM 5263 interacts with an intrusion detection component 5267, which gathers information at networking ISO Layer-2 to ISO Layer-5 and sends this information via LDTF 5262 to the ASM 5261. The ASM 5261 receives the information from intrusion detection component 5267 and also interacts with an intrusion detection component 5266, which gathers information at networking ISO Layer-7. By putting the information gathered by the intrusion detection component 5267 and the intrusion detection component 5266 in context, the ASM 5261 can detect malicious network traffic and unwanted manipulations, such as trojans, worms, viruses, etc., in an enterprise network.

The use of LDTF in combination with a highly scalable compute architecture and the use of dedicated processing elements allows many compute-intensive ISO Layer-7 network problems to be addressed. In combination with Centralized Transport Protocol Termination, application data can be efficiently processed in many networking applications. For example, ISO Layer-7 processing of streaming multi-media, video, audio, IPTV, VoIP, etc., can be done. The ANA can then act as a proxy, for example a multi-media proxy, a video proxy, an audio proxy, a VoIP proxy, etc., and server for network system performance monitoring, for fixed mobile convergence, for GSM/WiMax authorization. In one particular application, the ANA can perform insertion of advertising into the application data. Because of the use of Triangulated Identity advertisement can be inserted based on location, demographics, personal preferences, or any other information that correlates with the user, the client, the application server, the network environment, and so on. Additionally, the application data stream can be analyzed to perform elaborated advertisement analysis, by analyzing clicks-per-million, or how long a client spends using certain Internet content. The same concept can be applied to streaming multimedia services where, based on geographic location, the ANA can centrally terminate RTSP, for example, and block or let pass certain streaming multi-media content based on the Triangulated Identity.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network device comprising:
a switch fabric;
a first service module coupled to the switch fabric; and
a second service module coupled to the first service module over the switch fabric,
wherein in response to packets of a network transaction received from a client device over a first network to access a server of a data center having a plurality of servers over a second network, the first service module is configured to:
perform a first portion of OSI (open system interconnection) compatible layers of network processes on the packets;
wherein the second service module is configured to perform a second portion of the OSI compatible layers of network processes on the packets and
wherein the first portion includes at least one OSI compatible layer that is not included in the second portion.

2. The network device of claim 1, wherein the network device is configured to operate as a security gateway between the client device and any of the plurality of servers.

3. The network device of claim 1, wherein the switch fabric is a lossless switch fabric.

4. The network device of claim 1, wherein the first service module is implemented in a first service plane and the second service module is implemented in a second service plane coupled to the first service plane via a backplane.

5. The network device of claim 4, wherein the backplane includes at least a portion of connections to the switch fabric.

6. The network device of claim 1, wherein the first service module is configured to perform layer 2 to layer 5 (layers 2-5) of the network processes on the packets, and wherein the second service module is configured to perform layer 6 to layer 7 (layer 6-7) of the network processes on the packets.

7. The network device of claim 6, wherein after performing the layers 2-5 of the network processes, the first service module is configured to transmit a data stream to the second service module over the switch fabric.

8. The network device of claim 7, wherein the data stream represents the packets without header information associated with layers 2-5.

9. The network device of claim 1, wherein each of the first and second service modules is configured to perform anyone or more of OSI compatible layers of network processes.

10. The network device of claim 9, further comprising a memory configured to store information indicating which of the plurality of OSI compatible layers of network processes that the first and second service modules are to perform respectively.

11. A method comprising:
at a network device, receiving packets of a network transaction from a client device over a first network for accessing a server of a data center having a plurality of servers over a second network;
processing at a first service module of the network device a first portion of OSI (open system interconnection) compatible layers of network processes on the packets; and
processing at a second service module of the network device a second portion of OSI compatible layers of network processes on the packets, wherein the first portion includes at least one layer that is not included in the second portion.

12. The method of claim 11, wherein receiving comprises receiving the packets such that the network device operates as a security gateway between the client device and any of the plurality of servers.

13. The method of claim 11, wherein receiving comprises receiving the packets over a switch fabric, wherein the switch fabric is a lossless switch fabric.

14. The method of claim 11, wherein processing the first portion of layers comprises processing the first portion of layers on the packets in a first service plane and wherein processing the second portion of layers comprises processing the second portion of layers on the packets in a second service plane coupled to the first service plane via a backplane.

15. The method of claim 14, wherein processing the first portion of layers comprises performing layer 2 to layer 5 (layers 2-5) network processes on the packets, and wherein processing the second portion of layers comprises performing layer 6 to layer 7 (layer 6-7) network processes on the packets.

16. The method of claim 15, further comprising after performing the layers 2-5 of the network processes, the first service module transmitting a data stream after the layers 2-5 processing for the second portion of layer processing.

17. The method of claim 16, wherein transmitting comprises transmitting the data stream that represents the packets without header information associated with layers 2-5 processing.

18. A machine-readable storage medium having instructions stored therein, which when executed by a processor, cause the processor to:
receive packets of a network transaction at a network device from a client device over a first network for accessing a server of a data center having a plurality of servers over a second network;
process at a first service module of the network device a first portion of OSI (open system interconnection) compatible layers of network processes on the packets; and
process at a second service module of the network device a second portion of OSI compatible layers of network processes on the packets, wherein the first portion includes at least one layer that is not included in the second portion.

19. The machine-readable storage medium of claim 18, wherein instructions that cause the processor to receive the packets comprise instructions that cause the processor to receive the packets such that the network device operates as a security gateway between the client device and any of the plurality of servers.

20. The machine-readable storage medium of claim 18, wherein the instructions that cause the processor to receive the packets comprise instructions that cause the processor to receive the packets over a switch fabric, wherein the switch fabric is a lossless switch fabric.

21. The machine-readable storage medium of claim 18, wherein the instructions that cause the processor to process the first portion of layers comprise instructions that cause the processor to process the first portion of layers on the packets in the first service module a first service plane and wherein the instructions that cause the processor to process the second portion of layers comprise instructions that cause the processor to process the second portion of layers on the packets in the second service module second service plane coupled to the first service plane via a backplane.

22. The machine-readable storage medium of claim 18, wherein the instructions that cause the processor to process the first portion of layers comprise instructions that cause the processor to perform layer 2 to layer 5 (layers 2-5) processing on the packets, and wherein the instructions that cause the processor to process the second portion of layers comprise instructions that cause the processor to perform layer 6 to layer 7 (layers 6-7) processing on the packets.

23. The machine-readable storage medium of claim 22, further comprising instructions that cause the processor to generate a data stream after layers 2-5 processing for performing the second portion of layer processing.

24. The machine-readable storage medium of claim 23, wherein the instructions that cause the processor to generate the data stream comprise instructions that cause the processor to the data stream that represents the packets without header information associated with the layers 2-5 processing.

* * * * *